US009973270B2

(12) United States Patent
Kitamura et al.

(10) Patent No.: US 9,973,270 B2
(45) Date of Patent: May 15, 2018

(54) MULTI-LANE TRANSMISSION DEVICE AND MULTI-LANE TRANSMISSION METHOD

(71) Applicant: NIPPON TELEGRAPH AND TELEPHONE CORPORATION, Tokyo (JP)

(72) Inventors: Kei Kitamura, Yokosuka (JP); Kenji Hisadome, Yokosuka (JP); Mitsuhiro Teshima, Yokosuka (JP); Yoshiaki Yamada, Yokosuka (JP); Osamu Ishida, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days. days.

(21) Appl. No.: 14/377,555

(22) PCT Filed: Feb. 21, 2013

(86) PCT No.: PCT/JP2013/054280
§ 371 (c)(1),
(2) Date: Aug. 8, 2014

(87) PCT Pub. No.: WO2013/125621
PCT Pub. Date: Aug. 29, 2013

(65) Prior Publication Data

US 2016/0056886 A1 Feb. 25, 2016

(30) Foreign Application Priority Data

Feb. 22, 2012 (JP) ................................ 2012-036417
Feb. 22, 2012 (JP) ................................ 2012-036421
(Continued)

(51) Int. Cl.
*H04B 10/00* (2013.01)
*H04J 14/00* (2006.01)
(Continued)

(52) U.S. Cl.
CPC .......... *H04B 10/032* (2013.01); *H04J 3/1652* (2013.01); *H04L 47/34* (2013.01);
(Continued)

(58) Field of Classification Search
CPC ................................ H04J 14/00; H04J 14/06
(Continued)

(56) References Cited

U.S. PATENT DOCUMENTS 5,812,532 A 9/1998 Oki et al.
7,076,569 B1 * 7/2006 Bailey .................... H04L 69/12
709/212
(Continued)

FOREIGN PATENT DOCUMENTS

CN 102511171 6/2012
EP 0700230 3/1996
(Continued)

OTHER PUBLICATIONS

Supplementary European Search Report dated Feb. 11, 2016 corresponding to European Application No. EP13752287, 14 pages.
(Continued)

*Primary Examiner* — David Payne
*Assistant Examiner* — Pranesh Barua
(74) *Attorney, Agent, or Firm* — Ohlandt, Greeley, Ruggiero & Perle, L.L.P.

(57) ABSTRACT

It is an object to provide a technique capable of using a single framer as a necessary framer and causing the framer to be shared among a plurality of transmission destinations and priorities when coping with a plurality of transmission destinations or priorities and a change in a bandwidth of a physical lane that is caused by a change in a modulation scheme or a change in the number of wavelengths.
A multilane transmission device that allocates client signals based on a transmission destination or a priority, decides the
(Continued)

number of virtual lanes necessary for transmission of the client signals allocated based on each transmission destination or each priority, allocates the client signals allocated based on each transmission destination or each priority to the virtual lanes whose number has been decided, and frames the client signals allocated to the virtual lanes as transport frames, multiplexes the virtual lanes into a physical lane, and transmits the framed transport frames by using the physical lane.

6 Claims, 151 Drawing Sheets

(30) Foreign Application Priority Data

| | | |
|---|---|---|
| Sep. 14, 2012 | (JP) | 2012-203553 |
| Sep. 19, 2012 | (JP) | 2012-206187 |
| Oct. 19, 2012 | (JP) | 2012-232026 |
| Oct. 19, 2012 | (JP) | 2012-232028 |
| Oct. 19, 2012 | (JP) | 2012-232031 |
| Oct. 26, 2012 | (JP) | 2012-236877 |
| Nov. 27, 2012 | (JP) | 2012-258532 |

(51) Int. Cl.

| | |
|---|---|
| ***H04J 3/14*** | (2006.01) |
| ***G06F 11/00*** | (2006.01) |
| ***H04L 12/26*** | (2006.01) |
| ***H04B 10/032*** | (2013.01) |
| ***H04J 3/16*** | (2006.01) |
| ***H04L 12/911*** | (2013.01) |
| ***H04L 12/801*** | (2013.01) |
| ***H04L 12/927*** | (2013.01) |
| ***H04L 12/939*** | (2013.01) |
| ***H04Q 11/00*** | (2006.01) |
| *H04L 12/709* | (2013.01) |
| *H04L 12/703* | (2013.01) |
| *H04L 12/851* | (2013.01) |

(52) U.S. Cl.

CPC .......... *H04L 47/745* (2013.01); *H04L 47/805* (2013.01); *H04L 49/552* (2013.01); *H04Q 11/0005* (2013.01); *H04Q 11/0062* (2013.01); *H04Q 11/0066* (2013.01); *H04J 3/1664* (2013.01); *H04J 2203/0094* (2013.01); *H04L 45/245* (2013.01); *H04L 45/28* (2013.01); *H04L 47/2433* (2013.01); *H04Q 2011/0045* (2013.01); *H04Q 2011/0081* (2013.01); *H04Q 2011/0083* (2013.01); *H04Q 2011/0086* (2013.01)

(58) Field of Classification Search

USPC ................................ 398/5, 66; 370/225, 226

See application file for complete search history.

(56) References Cited

U.S. PATENT DOCUMENTS

| | | | | |
|---|---|---|---|---|
| 7,564,789 | B2 * | 7/2009 | Betker | H04L 12/5693 370/235 |
| 7,773,592 | B1 * | 8/2010 | Dropps | H04L 49/101 370/216 |
| 8,761,209 | B1 * | 6/2014 | Brown | H04L 12/413 370/535 |
| 9,170,952 | B1 * | 10/2015 | Vijayaraghavan | H03K 19/17744 |
| 2003/0048805 | A1 * | 3/2003 | Yoshihara | H04J 3/1694 370/468 |
| 2003/0195983 | A1 * | 10/2003 | Krause | H04L 47/12 709/238 |
| 2003/0223416 | A1 * | 12/2003 | Rojas | H04L 49/25 370/389 |
| 2004/0001503 | A1 * | 1/2004 | Manter | H04L 49/252 370/462 |
| 2004/0013088 | A1 * | 1/2004 | Gregg | H04L 12/5602 370/235 |
| 2004/0120336 | A1 * | 6/2004 | Hendel | H04L 47/24 370/412 |
| 2005/0018606 | A1 * | 1/2005 | Dropps | H04L 12/10 370/230 |
| 2005/0147411 | A1 * | 7/2005 | Hamou | H04J 14/0201 398/59 |
| 2008/0138075 | A1 * | 6/2008 | Gustlin | H04L 47/10 398/115 |
| 2009/0245251 | A1 * | 10/2009 | Koide | H04L 12/4633 370/390 |
| 2010/0040370 | A1 | 2/2010 | Aoki et al. | |
| 2010/0142525 | A1 * | 6/2010 | Cho | H04J 3/1652 370/389 |
| 2010/0153614 | A1 | 6/2010 | Ushigome et al. | |
| 2010/0246389 | A1 * | 9/2010 | Toyoda | H04L 41/0677 370/226 |
| 2010/0254704 | A1 * | 10/2010 | Aoki | H04B 10/40 398/45 |
| 2010/0287449 | A1 | 11/2010 | Kubo et al. | |
| 2010/0303075 | A1 * | 12/2010 | Tripathi | G06F 13/385 370/392 |
| 2010/0322630 | A1 * | 12/2010 | Takeuchi | H04J 3/1652 398/65 |
| 2011/0051750 | A1 | 3/2011 | Tanaka | |
| 2011/0123196 | A1 * | 5/2011 | Ye | H04J 3/1652 398/66 |
| 2011/0150468 | A1 | 6/2011 | Uchida et al. | |
| 2011/0249684 | A1 | 10/2011 | Nagai et al. | |
| 2011/0261682 | A1 * | 10/2011 | Han | H04L 12/413 370/225 |
| 2012/0047419 | A1 | 2/2012 | Shinya | |
| 2012/0219282 | A1 * | 8/2012 | Koganei | H04L 25/14 398/1 |
| 2012/0269093 | A1 * | 10/2012 | Grammel | H04L 41/12 370/254 |
| 2013/0121700 | A1 | 5/2013 | Dong et al. | |

FOREIGN PATENT DOCUMENTS

| | | |
|---|---|---|
| JP | 08-079257 | 3/1996 |
| JP | 2001053705 | 2/2001 |
| JP | 2007013390 | 1/2007 |
| JP | 2010147702 | 7/2010 |
| JP | 2010-263610 | 11/2010 |
| JP | 2010258816 | 11/2010 |
| JP | 2010263555 | 11/2010 |
| JP | 2010263610 | 11/2010 |
| JP | 2011-049659 | 3/2011 |
| JP | 2010114691 | 5/2011 |
| JP | 2011101106 | 5/2011 |
| JP | 2011130245 | 6/2011 |
| JP | 2011199361 | 10/2011 |
| JP | 2011211532 | 10/2011 |
| JP | 2011-223386 | 11/2011 |
| JP | 2011-223454 | 11/2011 |
| JP | 2012039176 | 2/2012 |
| JP | 2012044496 | 3/2012 |
| JP | 2012044574 | 3/2012 |
| JP | 2010232787 | 10/2014 |
| WO | 2011030423 | 3/2011 |

OTHER PUBLICATIONS

Reviriego P et al: "Improving Energy Efficiency in IEEE 802.3ba High-Rate Ethernet Optical Links", IEEE Journal of Selected Topics in Quantum Electronics, IEEE Service Center.

Stephen J Trowbridge Lucent Technologies USA: "Enabling use of 40 Gbe and 100 Gbe optical modules for transport of 0TU3 and

(56) References Cited

OTHER PUBLICATIONS

0TU4", ITU-T Draft; Study Period 2005-2008, International Telecommunication Union.
"Interfaces for the Optical Transport Network (OTN); G.709/Y. 1331 (Dec. 2009); Annexes C, D; Appendix VII", ITU-T Standard, International Telecommunication Union.
Jinno M et al: "Introducing elasticity and adaptation into the optical domain toward more efficient and scalable optical transport networks", Kaleidoscope: Beyond the Internet?—Innovations for Future Networks and Services, 2010 ITU-T, IEEE.
Second Chinese Office Action dated Apr. 24, 2017 from corresponding Chinese Patent Application No. 201380010403.8, 12 pages.
International Search Report dated May 28, 2013 corresponding to PCT/JP2013/054280 with English translation, 11 pp.
K. Hisadone, et al., "100 Gb/s Ethernet Inverse Multiplexing based on Aggregation at the Physical Layer," IEICE Transactions on Communications, vol. E94-B, No. 4, Apr. 2011, pp. 904-909, 7 pp.
ITU-T Recommendation G.709, "Interfaces for the Optical Transport Network (OTN)." 218 pp.
"Link Capacity adjustment scheme (LCAS) for virtual concatenated signals," ITU-T G.7042, 2004, 23 pp.
ITU-T Recommendation G.798 "Characteristics of optical transport network hierarchy equipment functional blocks", 384 pp.
Jinno, et al., "Multi-flow Optical Transponders: Toward Efficient Multi-layer Elastic Optical Networking", IEICE technical report, OCS 2011-21, Jun. 2011, 16 pp.
Kitamura, et al., "Link Failure Detection and Error Condition Notification for Adaptive Multiple Lane Transport," IEICE Technical Report, PN 2012-32, Nov. 2012, 14 pp.
Ohara, et al., "OTN Technology for Multi-flow Optical Transponder in Elastic 400G/1T Transmission Era," OFC/NFOEC Technical Digest, JW2A.8, 2012, 3 pp.
Ohara, et al., "OTN Technology for Multi-flow Optical Transponder in Elastic 400G/1T Transmission Era," OFC/NFOEC Technical Digest, c 2012, 3 pp.
Teshima et al., "Architecture designing of a reconfigurable optical transponder applied to a dynamically photonic node," IEICE Technical Report, OCS2012-11, Jun. 2012, 22 pp.
Mitsuhiro Teshima, "Parallel Transport Technology for 40 Gb/s Ethernet over OTN", Communication 2, Proceedings of the 2010 IEICE general conference with partial English translation thereof.
Japanese Patent Office Action dated Nov. 10, 2015 corresponding to Japanese Patent Application No. 2014-264713; 4 pages.
International Preliminary Report on Patentability dated Sep. 4, 2014 corresponding to International Patent Application No. PCT/JP2013/054280; 11 pages.
First Chinese Office Action dated Sep. 2, 2016 from corresponding Chinese Patent Application No. 201380010403.8, 12 pages.
Hiroshi Ohta et al, "CDV Free Hitless Protection Switching Method", IEICE Technical Report , The Institute of Electronics, Information and Communication Engineers, May 26, 1997, vol. 97, No. 72, pp. 29-34.
Japanese Patent Office Action dated Dec. 8, 2015 corresponding to Japanese Patent Application No. 2014-264778; 6 pages.
Japanese Patent Office Action dated Dec. 8, 2015 corresponding to Japanese Patent Application No. 2014-264806; 5 pages.
Japanese Patent Office Action dated Dec. 8, 2015 corresponding to Japanese Patent Application No. 2014-264818; 4 pages.
Japanese Patent Office Action dated Dec. 15, 2015 corresponding to Japanese Patent Application No. 2014-264762; 7 pages.
Japanese Patent Office Action dated Dec. 15, 2015 corresponding to Japanese Patent Application No. 2014-264830; 6 pages.

* cited by examiner

FIG. 2-3

SETTING TABLE 1

| ITS OWN NODE | VID | PCP | FLOW | FLOW GROUP | LANE GROUP | LANE | COUNTERPART NODE |
|---|---|---|---|---|---|---|---|
| 100 | 0x0001～0x0100, 0x0FFE | 7 | #1 | #1 | #1 | #1,#2,#3, #4,#5,#6 | 200 |
| | 0x0001～0x0100, 0x0FFE | 0～6 | #2 | | | | |
| | 0x0101～0x0200, 0x0FFE | 7 | #3 | #2 | #2 | #7,#8, #9,#10 | 300 |
| | 0x0101～0x0200, 0x0FFE | 0～6 | #4 | | | | |
| | | | | | | | |
| 200 | 0x0001～0x0100, 0x0FFE | 7 | #1 | #1 | #2 | #5,#6,#7, #8,#9,#10 | 100 |
| | 0x0001～0x0100, 0x0FFE | 0～6 | #2 | | | | |
| | 0x0201～0x0300, 0x0FFE | 7 | #3 | #3 | #1 | #1,#2, #3,#4 | 300 |
| | 0x0201～0x0300, 0x0FFE | 0～6 | #4 | | | | |
| | | | | | | | |
| 300 | 0x0101～0x0200, 0x0FFE | 7 | #1 | #2 | #1 | #1,#2, #3,#4 | 100 |
| | 0x0101～0x0200, 0x0FFE | 0～6 | #2 | | | | |
| | 0x0201～0x0300, 0x0FFE | 7 | #3 | #3 | #2 | #5,#6, #7,#8 | 200 |
| | 0x0201～0x0300, 0x0FFE | 0～6 | #4 | | | | |

FIG. 4-22
| BYTE | SCRAMBLE PATTERN |
|---|---|
| 1 | NO SCRAMBLE |
| 2 | |
| 3 | |
| 4 | |
| 5 | |
| 6 | |
| 7 | 0b11111111 |
| 8 | 0b11111111 |
| 9 | 0b01001110 |
| 10 | 0b10010001 |
| 11 | 0b00000101 |
| 12 | 0b11010010 |
| 13 | 0b00010011 |
| 14 | 0b00011111 |
| 15 | 0b01110111 |
| 16 | 0b11100111 |
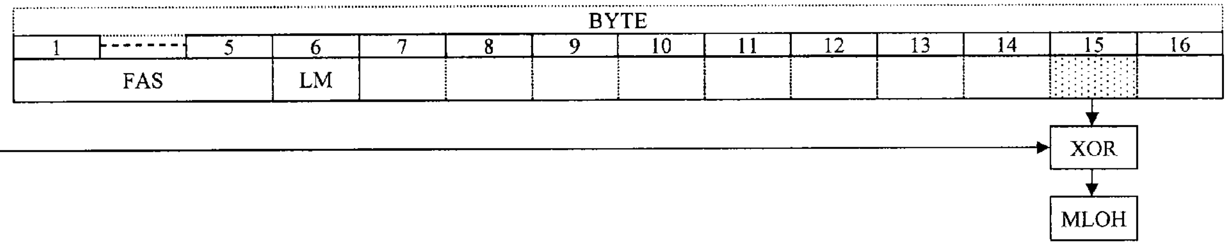
FIG. 4-22-A CASE OF ARRANGING MLOH IN HEAD OF OPUfn OH
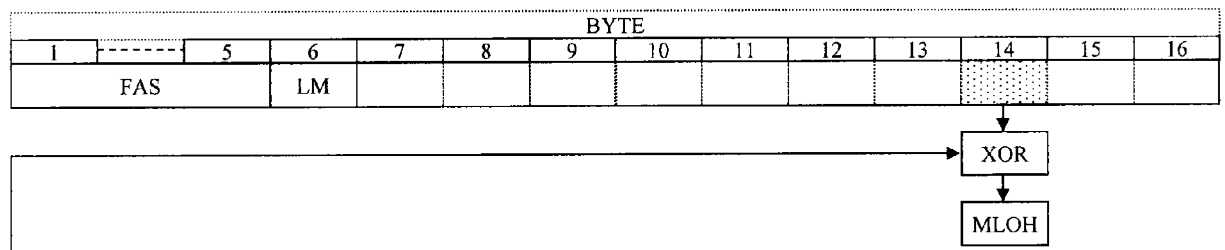
FIG. 4-22-B CASE OF ARRANGING MLOH IN SPEAR REGION OF OTUfn OH

FIG. 4-23-A BEFORE DELAY DIFFERENCE COMPENSATION

FIG. 4-23-B AFTER DELAY DIFFERENCE COMPENSATION

FIG. 4-24

SETTING OF DATA FLOW AT TRANSMISSION SIDE

| DATA FLOW | DESTINATION | BAND | SERVICE CLASS |
|---|---|---|---|
| 1 | MLOT 2 | 500 Gbps | EXP = 0x06～0x07 |
| 2 | MLOT 2 | 100 Gbps | EXP = 0x00～0x03 |
| 3 | MLOT 3 | 200 Gbps | N/A |
| 4 | MLOT 4 | 200 Gbps | N/A |

FIG. 4-25

MAIN ITEMS OF VCOH AND PSI AT TRANSMISSION SIDE

| | SOID | SKID | EXID | SQ | OMFN | NSC | SCI |
|---|---|---|---|---|---|---|---|
| OPU4#1 | 0x1000 | 0x2000 | 0x00 | 0x00 | 0x00 | 0x07 | 0b11000000 |
| OPU4#2 | 0x1000 | 0x2000 | 0x00 | 0x01 | 0x00 | 0x07 | 0b11000000 |
| OPU4#3 | 0x1000 | 0x2000 | 0x00 | 0x02 | 0x00 | 0x07 | 0b11000000 |
| OPU4#4 | 0x1000 | 0x2000 | 0x00 | 0x03 | 0x00 | 0x07 | 0b11000000 |
| OPU4#5 | 0x1000 | 0x2000 | 0x00 | 0x04 | 0x00 | 0x07 | 0b11000000 |
| OPU4#6 | 0x1000 | 0x2000 | 0x01 | 0x00 | 0x00 | 0x00 | 0b00001111 |
| OPU4#7 | 0x1000 | 0x3000 | 0x00 | 0x00 | 0x00 | 0x00 | not used |
| OPU4#8 | 0x1000 | 0x3000 | 0x00 | 0x01 | 0x00 | 0x00 | not used |
| OPU4#9 | 0x1000 | 0x4000 | 0x00 | 0x00 | 0x00 | 0x00 | not used |
| OPU4#10 | 0x1000 | 0x4000 | 0x00 | 0x01 | 0x00 | 0x00 | not used |

FIG. 4-26

MAIN ITEMS OF VCOH AND PSI AT TRANSMISSION SIDE

| | SOID | SKID | EXID | SQ | OMFN | NSC | SCI |
|---|---|---|---|---|---|---|---|
| OPU4#1 | 0x1000 | 0x2000 | 0x00 | 0x00 | 0x00 | 0x07 | 0b11000000 |
| OPU5#2 | 0x1000 | 0x2000 | 0x00 | 0x01 | 0x03 | 0x07 | 0b11000000 |
| OPU4#3 | 0x1000 | 0x2000 | 0x01 | 0x00 | 0x00 | 0x00 | 0b00001111 |
| OPU4#4 | 0x1000 | 0x3000 | 0x00 | 0x00 | 0x00 | 0x00 | not used |
| OPU4#5 | 0x1000 | 0x3000 | 0x00 | 0x01 | 0x00 | 0x00 | not used |
| OPU4#6 | 0x1000 | 0x4000 | 0x00 | 0x00 | 0x00 | 0x00 | not used |
| OPU4#7 | 0x1000 | 0x4000 | 0x00 | 0x01 | 0x00 | 0x00 | not used |

FIG. 4-27

MAIN ITEMS OF VCOH AND PSI AT TRANSMISSION SIDE

| | VCGID | EXID | SQ | OMFN | NSC | SCI |
|---|---|---|---|---|---|---|
| OPU4#1 | 0x00001000 | 0x00 | 0x00 | 0x00 | 0x07 | 0b11000000 |
| OPU4#2 | 0x00001000 | 0x00 | 0x01 | 0x00 | 0x07 | 0b11000000 |
| OPU4#3 | 0x00001000 | 0x00 | 0x02 | 0x00 | 0x07 | 0b11000000 |
| OPU4#4 | 0x00001000 | 0x00 | 0x03 | 0x00 | 0x07 | 0b11000000 |
| OPU4#5 | 0x00001000 | 0x00 | 0x04 | 0x00 | 0x07 | 0b11000000 |
| OPU4#6 | 0x00001000 | 0x01 | 0x00 | 0x00 | 0x00 | 0b00001111 |
| OPU4#7 | 0x00002000 | 0x00 | 0x00 | 0x00 | 0x00 | not used |
| OPU4#8 | 0x00002000 | 0x00 | 0x01 | 0x00 | 0x00 | not used |
| OPU4#9 | 0x00003000 | 0x00 | 0x00 | 0x00 | 0x00 | not used |
| OPU4#10 | 0x00003000 | 0x00 | 0x01 | 0x00 | 0x00 | not used |

FIG. 4-28

MAIN ITEMS OF VCOH AND PSI AT RECEPTION SIDE

| | SOID | SKID | EXID | SQ | OMFN | NSC | SCI |
|---|---|---|---|---|---|---|---|
| OPU4#1 | 0x1000 | 0x2000 | 0x00 | 0x00 | 0x00 | 0x07 | 0b11000000 |
| OPU4#2 | 0x1000 | 0x2000 | 0x00 | 0x01 | 0x00 | 0x07 | 0b11000000 |
| OPU4#3 | 0x1000 | 0x2000 | 0x00 | 0x02 | 0x00 | 0x07 | 0b11000000 |
| OPU4#4 | 0x1000 | 0x2000 | 0x00 | 0x03 | 0x00 | 0x07 | 0b11000000 |
| OPU4#5 | 0x1000 | 0x2000 | 0x00 | 0x04 | 0x00 | 0x07 | 0b11000000 |
| OPU4#6 | 0x1000 | 0x2000 | 0x01 | 0x00 | 0x00 | 0x00 | 0b00001111 |
| OPU4#7 | 0x3000 | 0x2000 | 0x00 | 0x00 | 0x00 | 0x00 | not used |
| OPU4#8 | 0x3000 | 0x2000 | 0x00 | 0x01 | 0x00 | 0x00 | not used |
| OPU4#9 | 0x4000 | 0x2000 | 0x00 | 0x00 | 0x00 | 0x00 | not used |
| OPU4#10 | 0x4000 | 0x2000 | 0x00 | 0x01 | 0x00 | 0x00 | not used |

FIG. 4-29

MAIN ITEMS OF VCOH AND PSI AT RECEPTION SIDE

| | SOID | SKID | EXID | SQ | OMFN | NSC | SCI |
|---|---|---|---|---|---|---|---|
| ODU4#1 | 0x1000 | 0x2000 | 0x00 | 0x00 | 0x00 | 0x07 | 0b11000000 |
| ODU5#2 | 0x1000 | 0x2000 | 0x00 | 0x01 | 0x03 | 0x07 | 0b11000000 |
| OPU4#2 | 0x1000 | 0x2000 | 0x01 | 0x00 | 0x00 | 0x00 | 0b00001111 |
| OPU4#3 | 0x3000 | 0x2000 | 0x00 | 0x00 | 0x00 | 0x00 | not used |
| OPU4#4 | 0x3000 | 0x2000 | 0x00 | 0x01 | 0x00 | 0x00 | not used |
| OPU4#5 | 0x4000 | 0x2000 | 0x00 | 0x00 | 0x00 | 0x00 | not used |
| OPU4#6 | 0x4000 | 0x2000 | 0x00 | 0x01 | 0x00 | 0x00 | not used |

FIG. 4-30

MAIN ITEMS OF VCOH AND PSI AT RECEPTION SIDE

| | VCGID | EXID | SQ | OMFN | NSC | SCI |
|---|---|---|---|---|---|---|
| OPU4#1 | 0x00001000 | 0x00 | 0x00 | 0x00 | 0x07 | 0b11000000 |
| OPU4#2 | 0x00001000 | 0x00 | 0x01 | 0x00 | 0x07 | 0b11000000 |
| OPU4#3 | 0x00001000 | 0x00 | 0x02 | 0x00 | 0x07 | 0b11000000 |
| OPU4#4 | 0x00001000 | 0x00 | 0x03 | 0x00 | 0x07 | 0b11000000 |
| OPU4#5 | 0x00001000 | 0x00 | 0x04 | 0x00 | 0x07 | 0b11000000 |
| OPU4#6 | 0x00001000 | 0x01 | 0x00 | 0x00 | 0x00 | 0b00001111 |
| OPU4#7 | 0x00004000 | 0x00 | 0x00 | 0x00 | 0x00 | not used |
| OPU4#8 | 0x00004000 | 0x00 | 0x01 | 0x00 | 0x00 | not used |
| OPU4#9 | 0x00005000 | 0x00 | 0x00 | 0x00 | 0x00 | not used |
| OPU4#10 | 0x00005000 | 0x00 | 0x01 | 0x00 | 0x00 | not used |

FIG. 4-31

DELAY TIME DIFFERENCE MEASURED BY DEFRAMER

| SEQUENCE OF RECEIVED FRAMES | | 1 | 2 | 3 | 4 | 5 | 6 |
|---|---|---|---|---|---|---|---|
| OPU4#1 | MFAS | 0x02 | 0x03 | 0x04 | 0x05 | 0x06 | 0x07 |
| | MFI | 0x0010 | 0x0010 | 0x0010 | 0x0010 | 0x0010 | 0x0010 |
| OPU4#2 | MFAS | 0x05 | 0x06 | 0x07 | 0x08 | 0x09 | 0x0A |
| | MFI | 0x0010 | 0x0010 | 0x0010 | 0x0010 | 0x0010 | 0x0010 |
| OPU4#3 | MFAS | 0xFE | 0xFF | 0x00 | 0x01 | 0x02 | 0x03 |
| | MFI | 0x000F | 0x000F | 0x0010 | 0x0010 | 0x0010 | 0x0010 |
| OPU4#4 | MFAS | 0x07 | 0x08 | 0x09 | 0x0A | 0x0B | 0x0C |
| | MFI | 0x0010 | 0x0010 | 0x0010 | 0x0010 | 0x0010 | 0x0010 |
| OPU4#5 | MFAS | 0xFF | 0x00 | 0x01 | 0x02 | 0x03 | 0x04 |
| | MFI | 0x000F | 0x0010 | 0x0010 | 0x0010 | 0x0010 | 0x0010 |

FIG. 4-32

DELAY TIME DIFFERENCE MEASURED BY DEFRAMER

| SEQUENCE OF RECEIVED FRAMES | | 1 | 2 | 3 | 4 | 5 | 6 |
|---|---|---|---|---|---|---|---|
| OPU4#1 | MFAS | 0xFF | 0x00 | 0x01 | 0x02 | 0x03 | 0x04 |
| | MFI | 0x000F | 0x0010 | 0x0010 | 0x0010 | 0x0010 | 0x0010 |
| OPU5#2 | MFAS | 0x02 | 0x03 | 0x04 | 0x05 | 0x06 | 0x07 |
| | MFI | 0x0010 | 0x0010 | 0x0010 | 0x0010 | 0x0010 | 0x0010 |

FIG. 4-33

SETTING OF DATA FLOW AT RECEPTION SIDE

| DATA FLOW | TRANSMIS SION SOURCE | BAND | SERVICE CLASS |
|---|---|---|---|
| 1 | MLOT 1 | 500 Gbps | EXP = 0x06～0x07 |
| 2 | MLOT 1 | 100 Gbps | EXP = 0x00～0x03 |
| 3 | MLOT 3 | 200 Gbps | N/A |
| 4 | MLOT 4 | 200 Gbps | N/A |

FIG. 4-34

MAIN ITEMS OF MLOH AND PSI AT TRANSMISSION SIDE

| OPUfn-Y | NSC | SCI | Lane | SOID | SKID | EXID |
|---|---|---|---|---|---|---|
| OPUf400-5 | 0x07 | 0b11000000 | L#1 | 0x1000 | 0x2000 | 0x00 |
| | | | L#2 | 0x1000 | 0x2000 | 0x00 |
| | | | L#3 | 0x1000 | 0x2000 | 0x00 |
| | | | L#4 | 0x1000 | 0x2000 | 0x00 |
| | | | L#5 | 0x1000 | 0x2000 | 0x00 |
| OPUf80-1 | 0x00 | 0b00001111 | L#6 | 0x1000 | 0x2000 | 0x01 |
| OPUf160-2 | 0x00 | not used | L#7 | 0x1000 | 0x3000 | 0x00 |
| | | | L#8 | 0x1000 | 0x3000 | 0x00 |
| OPUf160-2 | 0x00 | not used | L#9 | 0x1000 | 0x4000 | 0x00 |
| | | | L#10 | 0x1000 | 0x4000 | 0x00 |

FIG. 4-35

MAIN ITEMS OF MLOH AND PSI AT TRANSMISSION SIDE

| OPUfn-Y | NSC | SCI | Lane | MLGID | EXID |
|---|---|---|---|---|---|
| OPUf400-5 | 0x07 | 0b11000000 | L#1 | 0x00001000 | 0x00 |
| | | | L#2 | 0x00001000 | 0x00 |
| | | | L#3 | 0x00001000 | 0x00 |
| | | | L#4 | 0x00001000 | 0x00 |
| | | | L#5 | 0x00001000 | 0x00 |
| OPUf80-1 | 0x00 | 0b00001111 | L#6 | 0x00001000 | 0x01 |
| OPUf160-2 | 0x00 | not used | L#7 | 0x00002000 | 0x00 |
| | | | L#8 | 0x00002000 | 0x00 |
| OPUf160-2 | 0x00 | not used | L#9 | 0x00003000 | 0x00 |
| | | | L#10 | 0x00003000 | 0x00 |

FIG. 4-36

MAIN ITEMS OF MLOH AND PSI AT RECEPTION SIDE

| OTU | NSC | SCI | Lane | SOID | SKID | EXID |
|---|---|---|---|---|---|---|
| OTUf400-5 | 0x07 | 0b11000000 | L#1 | 0x1000 | 0x2000 | 0x00 |
| | | | L#2 | 0x1000 | 0x2000 | 0x00 |
| | | | L#3 | 0x1000 | 0x2000 | 0x00 |
| | | | L#4 | 0x1000 | 0x2000 | 0x00 |
| | | | L#5 | 0x1000 | 0x2000 | 0x00 |
| OTUf80-1 | 0x00 | 0b00001111 | L#6 | 0x1000 | 0x2000 | 0x01 |
| OTUf160-2 | 0x00 | not used | L#7 | 0x3000 | 0x2000 | 0x00 |
| | | | L#8 | 0x3000 | 0x2000 | 0x00 |
| OTUf160-2 | 0x00 | not used | L#9 | 0x3000 | 0x2000 | 0x00 |
| | | | L#10 | 0x3000 | 0x2000 | 0x00 |

FIG. 4-37

MAIN ITEMS OF MLOH AND PSI AT RECEPTION SIDE

| OPU | NSC | SCI | Lane | MLGID | EXID |
|---|---|---|---|---|---|
| OTUf400-5 | 0x07 | 0b11000000 | L#1 | 0x00001000 | 0x00 |
| | | | L#2 | 0x00001000 | 0x00 |
| | | | L#3 | 0x00001000 | 0x00 |
| | | | L#4 | 0x00001000 | 0x00 |
| | | | L#5 | 0x00001000 | 0x00 |
| OTUf80-1 | 0x00 | 0b00001111 | L#6 | 0x00001000 | 0x01 |
| OTUf160-2 | 0x00 | not used | L#7 | 0x00004000 | 0x00 |
| | | | L#8 | 0x00004000 | 0x00 |
| OTUf160-2 | 0x00 | not used | L#9 | 0x00005000 | 0x00 |
| | | | L#10 | 0x00005000 | 0x00 |

FIG. 6-7

| ELEMENTS OF EXTENSION FIELD GF ($2^8$) | CORRESPONDING 8-BIT SYMBOLS |
|---|---|
| 0 | 00000000 |
| $\alpha^0$ | 00000001 |
| $\alpha^1$ | 00000010 |
| $\alpha^2$ | 00000100 |
| $\alpha^3$ | 00001000 |
| $\alpha^4$ | 00010000 |
| $\alpha^5$ | 00100000 |
| $\alpha^6$ | 01000000 |
| $\alpha^7$ | 10000000 |
| $\alpha^8 = \alpha^4 + \alpha^3 + \alpha^2 + \alpha^0$ | 00011101 |
| $\alpha^9 = \alpha^5 + \alpha^4 + \alpha^3 + \alpha^1$ | 00111010 |
| $\alpha^{10} = \alpha^6 + \alpha^5 + \alpha^4 + \alpha^2$ | 01110100 |
| $\alpha^{11} = \alpha^7 + \alpha^6 + \alpha^5 + \alpha^3$ | 11101000 |
| ... | ... |
| $\alpha^{254} = \alpha^7 + \alpha^3 + \alpha^2 + \alpha^1$ | 10001110 |

FIG. 6-13 (Addition)
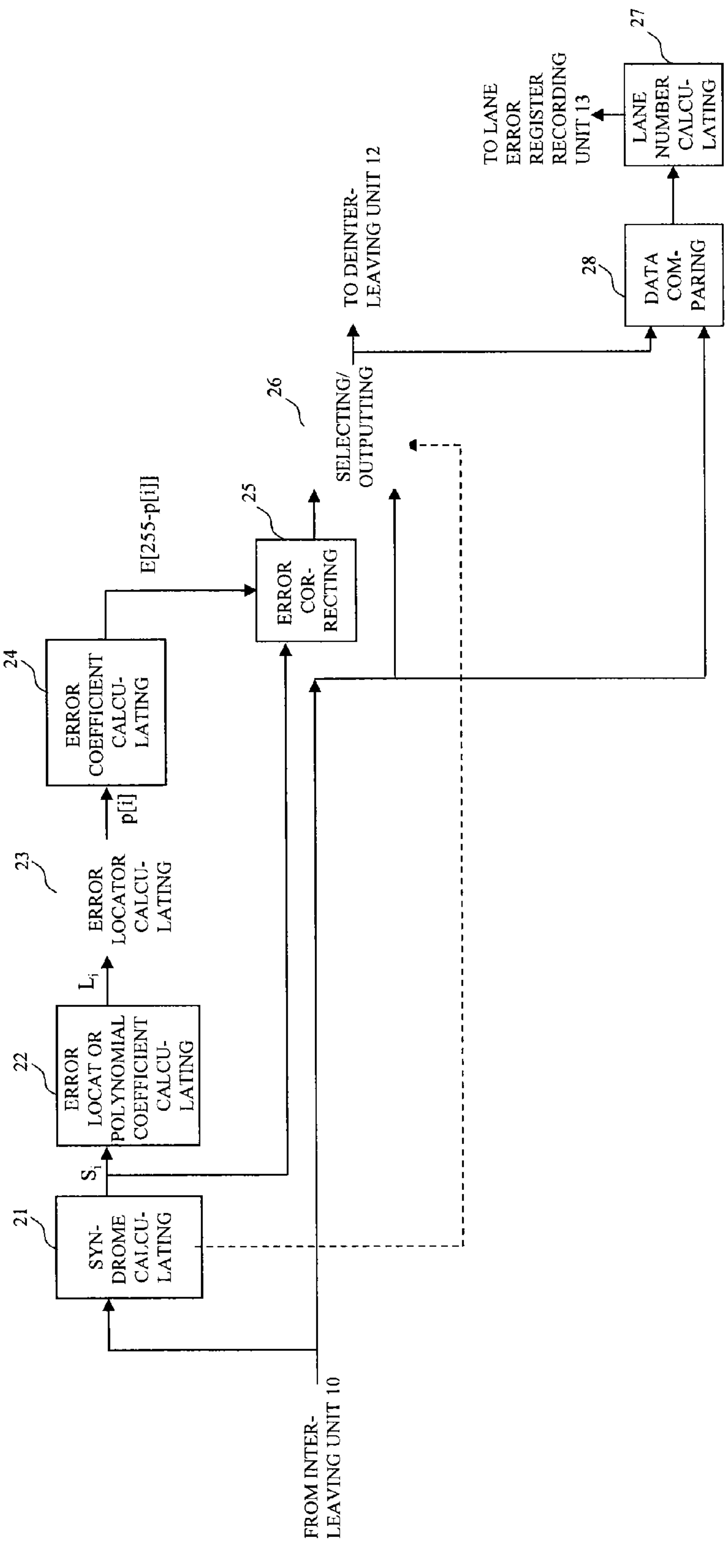

FIG. 6-14(Addition)
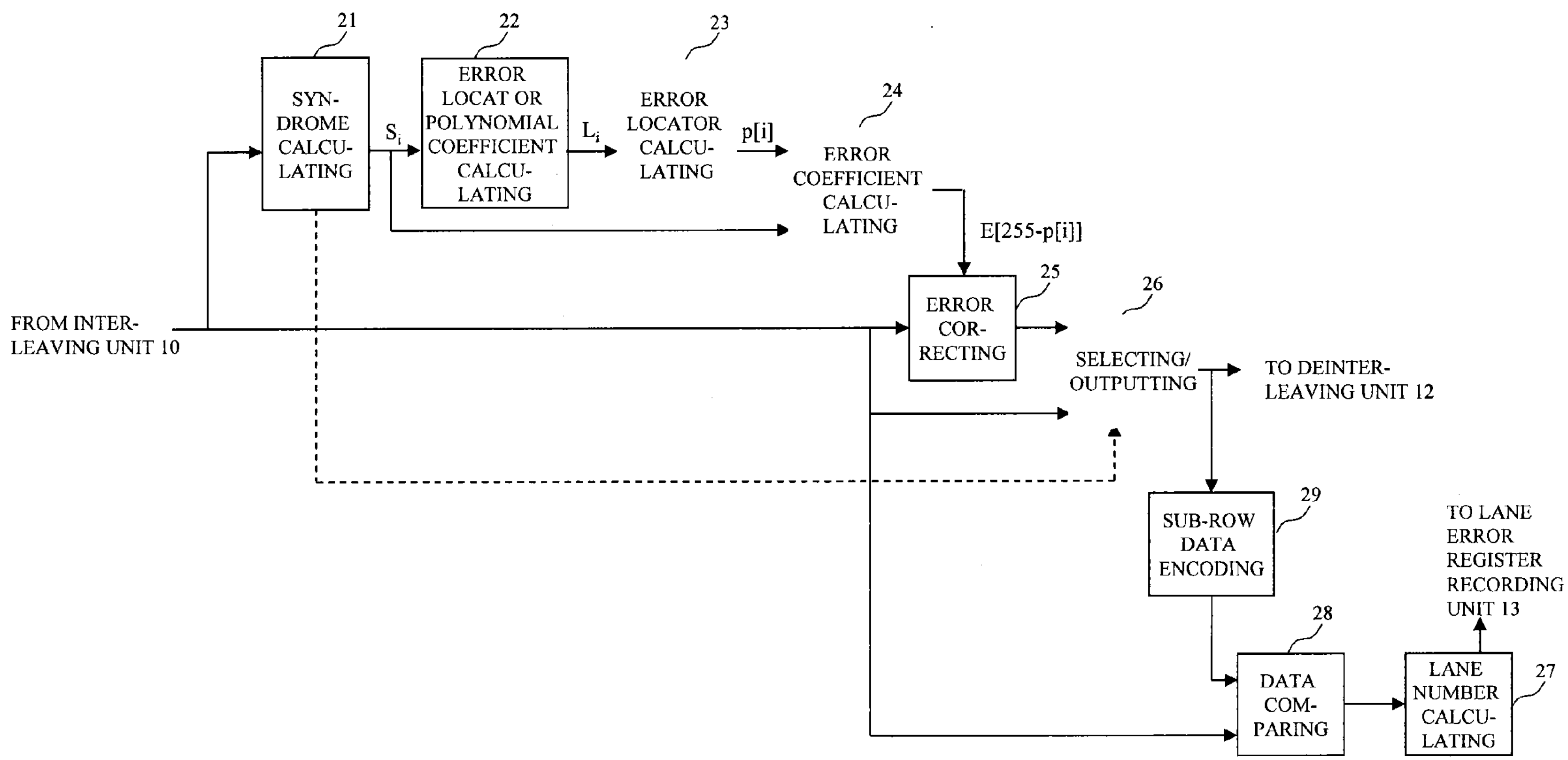

| BYTE | SCRAMBLE PATTERN |
|---|---|
| 1 | NO SCRAMBLE |
| 2 | |
| 3 | |
| 4 | |
| 5 | |
| 6 | |
| 7 | 0b11111111 |
| 8 | 0b11111111 |
| 9 | 0b01001110 |
| 10 | 0b10010001 |
| 11 | 0b00000101 |
| 12 | 0b11010010 |
| 13 | 0b00010011 |
| 14 | 0b00011111 |
| 15 | 0b01110111 |
| 16 | 0b11100111 |

FIG. 8-3

| REPLACEMENT PATTERN | DISTANCE FROM OA1 (11110110) |
|---|---|
| 00001001 | 8 |
| 11001001 | 6 |
| 10101001 | 6 |
| 10011001 | 6 |
| 10001101 | 6 |
| 10001011 | 6 |
| 01101001 | 6 |
| 01011001 | 6 |
| 01001010 | 6 |
| 01001010 | 6 |
| 00111001 | 6 |
| 00101101 | 6 |
| 00101010 | 6 |
| 00011101 | 6 |
| 00011011 | 6 |
| 00001111 | 6 |

FIG. 8-5

E-OH FORMAT

| ROW | COLUMN 8 | 9 | 10 | 11 | 12 |
|---|---|---|---|---|---|
| 1 | NFL | FL1 | FL2 | FL3 | CRC-8 |

WHEN FAULT HAS OCCURRED IN LL1#4 AND LL1#5

| ROW | COLUMN 8 | 9 | 10 | 11 | 12 |
|---|---|---|---|---|---|
| 1 | 2 | 4 | 5 | 5 | CRC-8 |

WHEN FAULT HAS OCCURRED IN LL1#2, LL1#3, LL1#4, AND LL1#5

FIRST E-OH

| ROW | COLUMN 8 | 9 | 10 | 11 | 12 |
|---|---|---|---|---|---|
| 1 | 4 | 2 | 3 | 4 | CRC-8 |

SECOND E-OH

| ROW | 8 | 9 | 10 | 11 | 12 |
|---|---|---|---|---|---|
| 1 | 4 | 5 | 5 | 5 | CRC-8 |

| BYTE | SCRAMBLE PATTERN |
|---|---|
| 1 | NO SCRAMBLE |
| 2 | |
| 3 | |
| 4 | |
| 5 | |
| 6 | |
| 7 | 11111111 |
| 8 | 11111111 |
| 9 | 01001110 |
| 10 | 10010001 |
| 11 | 00000101 |
| 12 | 11010010 |
| 13 | 00010011 |
| 14 | 00011111 |
| 15 | 01110111 |
| 16 | 11100111 |

FIG. 8-8

E-OH FORMAT

| | | COLUMN | | | | | |
|---|---|---|---|---|---|---|---|
| | | 8 | | 9 | 10 | 11 | 12 |
| ROW | 1 | SN | NEOH | LSBM1 | LSBM2 | LSBM3 | CRC-8 |

WHEN FAULT HAS OCCURRED IN LL1#4 AND LL1#5

| | | COLUMN | | | | |
|---|---|---|---|---|---|---|
| | | 8 | 9 | 10 | 11 | 12 |
| ROW | 1 | 1/1 | 00001100 | 00000000 | 00000000 | CRC-8 |

WHEN FAULT HAS OCCURRED IN LL1#4, LL1#5, LL1#30, AND LL1#31

FIRST E-OH

| | | COLUMN | | | | |
|---|---|---|---|---|---|---|
| | | 8 | 9 | 10 | 11 | 12 |
| ROW | 1 | 1/2 | 00001100 | 00000000 | 00000000 | CRC-8 |

SECOND E-OH

| | | | | | | |
|---|---|---|---|---|---|---|
| | | 8 | 9 | 10 | 11 | 12 |
| ROW | 1 | 2/2 | 00000011 | 00000000 | 00000000 | CRC-8 |

MULTI-LANE TRANSMISSION DEVICE AND MULTI-LANE TRANSMISSION METHOD

TECHNICAL FIELD

First Invention

The present invention relates to a multilane transmission device that transmits a data frame by using a plurality of lanes and a multilane reception device that receives a data frame by using a plurality of lanes.

Second Invention

The present invention relates to a multilane transmission device that transmits a data frame by using a plurality of lanes and a multilane reception device that receives a data frame by using a plurality of lanes.

Third Invention

The present invention relates to a multilane transmission device that divides a signal of a frame format into data blocks, and distributes the data blocks to one or more lanes and transmits the data blocks.

Fourth Invention

The present invention relates to a multilane optical transport system.

Fifth Invention

The present invention relates to a multilane transmission system in which a signal of a frame format is divided into data blocks, and the data blocks are distributed to one or more lanes and transmitted, and a bandwidth change method thereof.

Sixth Invention

The present invention relates to a monitoring technology of transmission quality in a broad area optical transport network.

Seventh Invention

The present invention relates to an individual lane monitoring method in a multilane transmission system in which a signal of a frame format is divided into data blocks, and the data blocks are distributed to one or more lanes and transmitted.

Eighth Invention

The present invention relates to a multilane transmission device and a fault lane notifying method.

Ninth Invention

The present invention relates to a multilane transfer system and a multilane transfer method in which a signal of a frame format is divided into data blocks, and the data blocks are distributed to a plurality of lanes and transmitted from a transmission device to a reception device.

Note that both a "virtual lane" in the first invention and the ninth invention and a "lane" from the second invention to the eighth invention indicates a logical lane, and they are not distinguished from each other in the present application.

BACKGROUND ART

First Invention

As a bit rate increases, it has been under review to configure a network by using an optical switch without performing routing by an electrical processing. This is because when a bit rate of a signal to be switched has a grade from several tens of Gbps to several hundreds of Gbps, there is a large merit due to a feature in which a switching processing of an optical switch does not depend on a bit rate. Here, the optical switch is a switch that is made by a technology such as MEMS (Micro Electro Mechanical Systems) or LCOS (Liquid Crystal On Silicon) and that does not perform O-E-O conversion of a data signal. When this optical switch is used, a function of changing an end node at a wavelength level is provided, and a switching unit can be a wavelength bandwidth or one or more wavelengths (see Non-Patent Literature 1-1).

Non-Patent Literature 1-2 describes a method of distributing a transport frame to a plurality of wavelengths by using a logical lane technology in order to transfer the transport frame at the plurality of wavelengths. Here, a case of transferring an OTU4 (Optical channel Transport Unit 4) frame is described. When the OTU4 frame for carrying a client signal of 100 Gbps is transferred at a plurality of wavelengths, the transfer is performed at 25 Gbps×4 wavelengths or 10 Gbps×10 wavelengths. Twenty (which is a least common multiple of 4 and 10) logical lanes are defined so that the transfer can be performed in both cases. The transfer is performed at a plurality of wavelengths by multiplexing 5 logical lanes into one wavelength when the transfer is performed at 4 wavelengths, and multiplexing 2 logical lanes into one wavelength when the transfer is performed at 10 wavelengths.

In Non-Patent Literature 1-2, virtual concatenation (VCAT) has been standardized in order to make a transport frame capacity variable. At a transmission side, a high-speed client signal received from a client device is demultiplexed, low-speed transport frames are generated using the demultiplexed high-speed client signal as a payload, and the low-speed transport frames are transferred through separate physical lanes. At a reception side, payloads are taken out from low-speed transport frames received through separate physical lanes, the payloads taken out are multiplexed to generate a high-speed client signal, and the high-speed client signal is transferred to the client device.

Second Invention

In order to economically realize a high-speed data link, various kinds of approaches of logically bundling a plurality of physical lanes have been proposed. For example, in APL (Aggregation at the Physical Layer) used in Non-Patent Literature 2-1, a high-speed data link is economically realized by bundling logically a plurality of physical lanes such that at a transmission side, sequence numbers are added to packets and then the packets are distributed to a plurality of physical lanes, and at a reception side, the packets are rearranged based on the sequence numbers.

Third Invention

Currently, an OTN (Optical Transport Network) described in Non-Patent Literature 3-1 is being widely used as a wide area optical transport network. An OTN frame has a structure illustrated in FIG. 3-1. A frame is denoted by 4 rows×4080 columns, and $1^{st}$ to $4080^{th}$ bytes of the frame correspond to $1^{st}$ to $4080^{th}$ columns of a $1^{st}$ row, $4081^{st}$ to $8160^{th}$ bytes correspond to $1^{st}$ to $4080^{th}$ columns of a $2^{nd}$ row, $8161^{st}$ to $12240^{th}$ bytes correspond to $1^{st}$ to $4080^{th}$ columns of a $3^{rd}$ row, and $12241^{st}$ to $16320^{th}$ bytes correspond to $1^{st}$ to $4080^{th}$ columns of a $4^{th}$ row. A client signal is mapped to an OPU (Optical channel Payload Unit) PLD (Payload) of the $17^{th}$ to $3824^{th}$ columns of the frame. An OPU OH (OverHead) is inserted into the 15 to $16^{th}$ columns, and, for example, information necessary for mapping/demapping of the client signal is included in the 15 to $16^{th}$ columns. An ODU (Optical channel Data Unit) OH is inserted into the $1^{st}$ to $14^{th}$ columns of the $2^{nd}$ to $4^{th}$ rows, and path management operation information of an optical channel is included in the $1^{st}$ to $14^{th}$ columns of the $2^{nd}$ to $4^{th}$ rows. An FA (Frame Alignment) OH including an FAS (Frame Alignment Signal) necessary for frame synchronization and an MFAS (Multiframe Alignment Signal) indicating the position in a multi-frame is inserted into the $1^{st}$ to $7^{th}$ column of the $1^{st}$ row, and an OTU (Optical channel Transport Unit) OH including section monitoring information of an optical channel is inserted into the $8^{th}$ to $14^{th}$ columns. A parity check byte for FEC (Forward Error Correction) is added to the $3825^{th}$ to $4080^{th}$ columns.

The FAS including OA1s and OA2s are arranged in $1^{st}$ to $5^{th}$ bytes of the FA OH, an LLM is arranged in a $6^{th}$ byte of the FA OH, and the MFAS is arranged in a $7^{th}$ byte of the FA OH. Here, OA1 is 0b11110110, and OA2 is 0b00101000.

As a technique of economically realizing high-speed optical transmission, 16-byte increment distribution (hereinafter, referred to as OTN-MLD in the present invention) of distributing data of an OTU frame of 40 Gbps or 100 Gbps to multiple lanes and performing parallel transmission has been standardized (for example, see Annex C of Non-Patent Literature 3-1). In the OTN-MLD, as illustrated in FIG. 3-2, a frame is divided into 1020 data blocks on a 16-byte basis, and the data blocks are distributed to the lanes one by one. FIG. 3-2 illustrates an example of distributing data blocks to 4 lanes.

A number of a data block including the FAS is set to b=1, and the LLM (Logical Lane Marker) is inserted into the $6^{th}$ byte of the data block (in FIG. 3-2, the LLM is described in [ ]). By equally distributing the FA OH (the FAS, the LLM, and the MFAS) included in a head data block to all lanes, identifying a lane number and adjusting a delay between lanes can be realized.

In a first frame (LLM=0), the data blocks are distributed as follows:

lane #0: b=1, 5, 9, . . . , 1117
lane #1: b=2, 6, 10, . . . , 1118
lane #2: b=3, 7, 11, . . . , 1119
lane #3: b=4, 8, 12, . . . , 1020

In a second frame (LLM=1), the lanes are rotated, and the data blocks are distributed as follows:

lane #0: b=4, 8, 12, . . . , 1020
lane #1: b=1, 5, 9, . . . , 1117
lane #2: b=2, 6, 10, . . . , 1118
lane #3: b=3, 7, 11, . . . , 1119

In a third frame (LLM=2), the lanes are rotated, and the data blocks are distributed as follows:

lane #0: b=3, 7, 11, . . . , 1119
lane #1: b=4, 8, 12, . . . , 1020
lane #2: b=1, 5, 9, . . . , 1117
lane #3: b=2, 6, 10, . . . , 1118

In a fourth frame (LLM=3), the lanes are rotated, and the data blocks are distributed as follows:

lane #0: b=2, 6, 10, . . . , 1118
lane #1: b=3, 7, 11, . . . , 1119
lane #2: b=4, 8, 12, . . . , 1020
lane #3: b=1, 5, 9, . . . , 1117

Meanwhile, at the reception side, a degree of rotation relative to the frame of LLM=0 can be known by reading the LLM included in the data block in which the FAS is detected in each lane and calculating LLM mod 4. Thus, reconstructing an original frame by compensating for a delay time difference between lanes, then restoring the original positions of the lanes by performing reverse rotation and sequentially connecting the data blocks can be realized.

Fourth Invention

Currently, an OTN (Optical Transport Network) described in Non-Patent Literature 4-1 is being widely used as a wide area optical transport network. An OTN frame has a structure illustrated in FIG. 4-1. A frame is denoted by 4 rows×4080 columns, and $1^{st}$ to $4080^{th}$ bytes of the frame correspond to $1^{st}$ to $4080^{th}$ columns of a $1^{st}$ row, $4081^{st}$ to $8160^{th}$ bytes correspond to $1^{st}$ to $4080^{th}$ columns of a $2^{nd}$ row, $8161^{st}$ to $12240^{th}$ bytes correspond to $1^{st}$ to $4080^{th}$ columns of a $3^{rd}$ row, and $12241^{st}$ to $16320^{th}$ bytes correspond to $1^{st}$ to $4080^{th}$ columns of a $4^{th}$ row. A client signal is mapped to an OPU (Optical channel Payload Unit) PLD (Payload) of the $17^{th}$ to $3824^{th}$ columns of the frame. An OPU OH (OverHead) is inserted into the 15 to $16^{th}$ columns, and, for example, information necessary for mapping/demapping of the client signal is included in the 15 to $16^{th}$ columns. An ODU (Optical channel Data Unit) OH is inserted into the $1^{st}$ to $14^{th}$ columns of the $2^{nd}$ to $4^{th}$ rows, and path management operation information of an optical channel is included in the $1^{st}$ to $14^{th}$ columns of the $2^{nd}$ to $4^{th}$ rows. An FA (Frame Alignment) OH including an FAS (Frame Alignment Signal) necessary for frame synchronization is inserted into the $1^{st}$ to $7^{th}$ column of the $1^{st}$ row, and an OTU (Optical channel Transport Unit) OH including section monitoring information of an optical channel is inserted into the $8^{th}$ to $14^{th}$ columns. Redundancy bits for FEC (Forward Error Correction) are added to the $3825^{th}$ to $4080^{th}$ columns. Note that since there is a plurality of speeds of 1.25 Gbps to 100 Gbps in the OTN, a suffix k (k=0, 1, 2, 2e, 3, and 4) is added in order to identify the speed (provided that k=0 only for the OPU and the ODU). Note that an OTN of 400 Gbps has not been now standardized, and hereinafter it is temporarily represented by k=5.

In a future optical transport network, an optical path whose capacity can be flexibly made variable according to a variation in traffic is considered to become important. As means of realizing a variable capacity optical path based on an OTN technology, for example, VCAT (Virtual Concatenation) and an OTUflex are mentioned in Non-Patent Literature 4-2.

The details of the VCAT is described in chapter 18 of Non-Patent Literature 4-1, and an LCAS (Link capacity adjustment scheme) which is an approach of making the capacity of the VCAT variable is described in Non-Patent Literature 4-3, and thus the following description will be given based on both the literatures. In the VCAT, an OPUk-Xv configured by virtually coupling number of X OPUks is defined as a variable capacity management frame.

Here, a variable capacity management frame is identical to a variable frame.

As illustrated in FIG. 4-2, the OPUk-Xv includes an OPUk-Xv OH and an OPUk-Xv PLD, the OPUk-Xv OH is arranged in $(14X+1)^{th}$ to $16X^{th}$ columns, and the OPUk-Xv PLD is arranged in $(16X+1)^{th}$ to $3824X^{th}$ columns. A $\{(a-1)\times X+b\}^{th}$ column of an n-$^{th}$ row of the OPUk-Xv corresponds to a $b^{th}$ column of an $a^{th}$ row of an OPUk #i. Further, a set of multi-frames includes the 256 OPUk-Xvs, and a position of a frame in the multi-frame is identified by using an MFAS (Multiframe Alignment Signal) arranged in a $7^{th}$ byte of an FA OH.

An individual OPUk OH configuring the OPUk-Xv OH is illustrated in FIG. 4-3. VCOHs (Virtual Concatenation OHs) and the PSI (Payload Structure Identifier) are arranged in a $15^{th}$ column, and information (for example, stuff control information) according to a mapping format of a client signal is included in a $16^{th}$ column.

The VCOHs are arranged in $1^{st}$ to $3^{rd}$ rows of the $15^{th}$ column, and denoted as VCOH1, VCOH2, and VCOH3. The VCOHs have 96 bytes (3 bytes×32), and content of the VCOH is as follows (5 bits [0 to 31] of $4^{th}$ to $8^{th}$ bits of an MFAS are used as indices of the VCOH1 to the VCOH3).

MFI (Multiframe Indicator) is arranged in VCOH1[0] and VCOH1[1]. The MFI is used for measurement of and compensation for a delay time difference between lanes in combination with an MFAS (see section 18.1.2.2.2.1 of Non-Patent Literature 4-1 and section 6.2.1 of Non-Patent Literature 4-3). Here, a numerical value in brackets of VCOH1[X] is a numerical value (0 to 31) denoted by lower 5 bits of $4^{th}$ to $8^{th}$ bits of an MFAS.

SQ (Sequence Indicator) is arranged in VCOH1[4]. The SQ indicates a sequence of coupling an OPUk to an OPUk-Xv (see section 18.1.2.2.2.2 of Non-Patent Literature 4-1 and section 6.2.2 of Non-Patent Literature 4-3).

CTRL (Control) is arranged in $1^{st}$ to $4^{th}$ bits of VCOH1[5]. The CTRL is used for transfer of an LCAS control command (see section 18.1.2.2.2.3 of Non-Patent Literature 4-1 and section 6.2.3 of Non-Patent Literature 4-3).

GID (Group Identification) is arranged in a $5^{th}$ bit of VCOH1[5]. The GID includes a 15-stage pseudo random signal, and is used for identifying a VCG (Virtual Concatenation Group) (see section 18.1.2.2.2.5 of Non-Patent Literature 4-1 and section 6.2.4 of Non-Patent Literature 4-3).

RSA (Re-Sequence Acknowledge) is arranged in a $6^{th}$ bit of VCOH1[5]. The RSA is a response from a reception side to a transmission side using an RSA bit when a capacity is increased and decrease and a change in the SQ is made (see section of 18.1.2.2.2.6 of Non-Patent Literature 4-1 and section 6.2.7 of Non-Patent Literature 4-3). $7^{th}$ and $8^{th}$ bits of VCOH1[5] and VCOH1[6] to VCOH1[31] are spare regions.

The MST (Member Status) is arranged in VCOH2[0] to VCOH2[31]. The MST is a notification of states of all members of a VCG from a reception side to a transmission side (see section 18.1.2.2.2.4 of Non-Patent Literature 4-1 and section 6.2.6 of Non-Patent Literature 4-3).

CRC (Cyclic Redundancy Check) is arranged in VCOH3 [0] to VCOH3[31]. The CRC is used for performing error detection on VCOH1 and VCOH2 (see section 18.1.2.2.2.7 of Non-Patent Literature 4-1 and 6.2.5 of Non-Patent Literature 4-3).

As above, VCOH[0] to VCOH[31] are repeated 8 times in a set of multi-frames.

The PSI is arranged in the $4^{th}$ row of the $15^{th}$ column. The PSI has 256 bytes, and content of the PSI is as follows (8 bits [0 to 255] of a MFAS are used as indices of the PSI).

A PT (Payload Type) is arranged in PSI[0]. In the case of the VCAT, PT=0x06 (see section 15.9.2.1.1 of Non-Patent Literature 4-1).

vcPT (virtual concatenated Payload Type) is arranged in PSI[1]. The vcPT indicates a payload type of the VCAT. For example, when a payload is a GFP (Generic Framing Procedure), vcPT=0x05 (see section 18.1.2.2.1.1 of Non-Patent Literature 4-1).

CSF (Client Signal Fail) is arranged in a $1^{st}$ bit of PSI[2]. The CSF is used for notifying a management system of a client signal fault.

$2^{nd}$ to $8^{th}$ bits of PSI[2] and PSI[3] to PSI[255] are spare regions (see section 18.1.2.2.1.2 of Non-Patent Literature 4-1).

At the transmission side of the VCAT, a client signal is included in an OPUk-Xv PLD, an OPUk-Xv OH and an ODUk-Xv OH are added, and an individual ODUk is included in an appropriate OTUj (j≥k) and transmitted. At the reception side, a delay among a plurality of lanes is compensated for according to the received MFAS and the MFI, an OPUk-Xv is reconfigured according to the SQ of the OPUk, and the client signal is demapped from the OPUk-Xv PLD.

Meanwhile, in the OTUflex, a plurality of frames that is chronologically arrayed are collectively dealt as a variable capacity management frame, and client signals are sequentially contained in a frame and transmitted. When a plurality of lanes is used, each frame is divided in a unit of data blocks, and the data blocks are allocated to a plurality of lanes and transferred.

Note that a variable capacity management frame is identical to a variable frame.

Fifth Invention

Currently, an OTN (Optical Transport Network) described in Non-Patent Literature 5-1 is being widely used as a wide area optical transport network. An OTN frame has a structure illustrated in FIG. 5-1. A frame is denoted by 4 rows×4080 columns, and $1^{st}$ to $4080^{th}$ bytes of the frame correspond to $1^{st}$ to $4080^{th}$ columns of a $1^{st}$ row, $4081^{st}$ to $8160^{th}$ bytes correspond to $1^{st}$ to $4080^{th}$ columns of a $2^{nd}$ row, $8161^{st}$ to $12240^{th}$ bytes correspond to $1^{st}$ to $4080^{th}$ columns of a $3^{rd}$ row, and $12241^{st}$ to $16320^{th}$ bytes correspond to $1^{st}$ to $4080^{th}$ columns of a $4^{th}$ row. A client signal is mapped to an OPU (Optical channel Payload Unit) PLD (Payload) of the $17^{th}$ to $3824^{th}$ columns of the frame. An OPU OH (OverHead) is inserted into the 15 to $16^{th}$ columns, and, for example, information necessary for mapping/demapping of the client signal is included in the 15 to $16^{th}$ columns. An ODU (Optical channel Data Unit) OH is inserted into the $1^{st}$ to $14^{th}$ columns of the $2^{nd}$ to $4^{th}$ rows, and path management operation information of an optical channel is included in the $1^{st}$ to $14^{th}$ columns of the $2^{nd}$ to $4^{th}$ rows. An FA (Frame Alignment) OH including an FAS (Frame Alignment Signal) necessary for frame synchronization, an LLM (Logical Lane Marker) used for lane identification, and an MFAS (Multiframe Alignment Signal) indicating a position in a multi-frame is added to the $1^{st}$ to $7^{th}$ columns of the $1^{st}$ row. An OTU (Optical channel Transport Unit) OH including section monitoring information of an optical channel is inserted into the $8^{th}$ to $14^{th}$ columns. A parity check byte for FEC (Forward Error Correction) is added to the $3825^{th}$ to $4080^{th}$ columns.

The FAS including OA1s and OA2s are arranged in $1^{st}$ to $5^{th}$ bytes of the FA OH, the LLM is arranged in a $6^{th}$ byte of the FA OH, and the MFAS is arranged in a $7^{th}$ byte of the FA OH. Here, OA1 is 0b11110110, and OA2 is 0b00101000.

As a technique of economically realizing high-speed optical transmission, OTN-MLD (Multilane Distribution) of distributing data of an OTU frame of 40 Gbps or 100 Gbps to multiple lanes and performing parallel transmission has been standardized (for example, see Annex C of Non-Patent Literature 5-1). In the OTN-MLD, as illustrated in FIG. 5-2, a frame is divided into 1020 data blocks on a 16-byte basis, and the data blocks are distributed to the lanes one by one (the LLM is described in [ ] in the figure). FIG. 5-2 illustrates an example of distributing data blocks to 4 lanes.

In a first frame (LLM=0), data blocks are distributed as follows.

lane #0: b=1, 5, 9, . . . , 1117
lane #1: b=2, 6, 10, . . . , 1118
lane #2: b=3, 7, 11, . . . , 1119
lane #3: b=4, 8, 12, . . . , 1020

In a second frame (LLM=1), the lanes are rotated, and the data blocks are distributed as follows:

lane #0: b=4, 8, 12, . . . , 1020
lane #1: b=1, 5, 9, . . . , 1117
lane #2: b=2, 6, 10, . . . , 1118
lane #3: b=3, 7, 11, . . . , 1119

In a third frame (LLM=2), the lanes are rotated, and the data blocks are distributed as follows:

lane #0: b=3, 7, 11, . . . , 1119
lane #1: b=4, 8, 12, . . . , 1020
lane #2: b=1, 5, 9, . . . , 1117
lane #3: b=2, 6, 10, . . . , 1118

In a fourth frame (LLM=3), the lanes are rotated, and the data blocks are distributed as follows:

lane #0: b=2, 6, 10, . . . , 1118
lane #1: b=3, 7, 11, . . . , 1119
lane #2: b=4, 8, 12, . . . , 1020
lane #3: b=1, 5, 9, . . . , 1117

FIG. 5-3 illustrates a transmitting unit of a multilane transmission device using the OTN-MLD. The transmitting unit of the multilane transmission device includes a mapping unit 1, an OH processing unit 2, an interleaving unit 3, encoding units 4-1 to 4-16, a deinterleaving unit 5, a scrambling unit 6, a data block dividing unit 7, and a lane number deciding unit 8. Hereinafter, a case in which the number M of lanes is 16 will be described.

The mapping unit 1 maps a client signal to an OPU PLD.

The OH processing unit 2 adds an overhead to an OPU frame. Examples of the overhead include an FA OH, an OTU OH, and an ODU OH. Here, as illustrated in FIG. 5-1, the LLM is arranged in a $6^{th}$ byte of the FA OH.

The interleaving unit 3 performs 16-byte interleaving on a frame of 4 rows×3824 columns in which the overhead is added to the OPU frame for each row (3824 bytes).

The encoding units 4-1 to 4-16 encode sub-row data (239 bytes) which have been subjected to byte interleaving, and outputs sub-row data (255 bytes) to which a 16-byte parity check is added.

The deinterleaving unit 5 deinterleaves the encoded sub-row data, and outputs an encoded OTU frame of 4 rows×4080 columns.

The scrambling unit 6 scrambles all regions of the FEC-coded OTU frame of 4 rows×4080 columns except the FAS.

The data block dividing unit 7 divides the scrambled OTU frame into 16-byte data blocks.

The lane number deciding unit 8 decides a lane number, and outputs data blocks obtained by dividing the frame to the corresponding lane.

Here, a lane number m (m=0 to M−1) of a lane to which a head data block including the FAS is output is decided by:

$$m = \text{LLM} \bmod M$$

In the case of the remaining data blocks, when m' is an immediately previous lane number, the lane number m is decided by:

$$m = (m'+1) \bmod M$$

FIG. 5-4 illustrates configuration of a receiving unit of the multilane transmission device. The receiving unit of the multilane transmission device includes a lane identifying & delay difference compensating unit 10, an OTU frame reconfiguring unit 11, a descrambling unit 12, an interleaving unit 13, decoding units 14-1 to 14-16, a deinterleaving unit 15, an OH processing unit 16, and a demapping unit 17. FIG. 5-5 illustrates configuration of the lane identifying & delay difference compensating unit 10. The lane identifying & delay difference compensating unit 10 includes FA OH detecting units 20-1 to 20-M, a delay comparing unit 21, and delay adjusting units 22-1 to 22-M.

The FA OH detecting units 20-1 to 20-M find the head data block including the FAS, and read the FAS, the LLM, and the MFAS. The delay comparing unit 21 determines a delay time difference, and compensates for the delay time difference by using the delay adjusting units 22-1 to 22-M as will be described in the following example. FIGS. 5-6(*a*) and 5-6(*b*) illustrate an example of compensating for a delay difference in the case of 4 lanes.

In the case in which assuming that a head position of a data block of MFAS=0 received through a lane #0 is a reference, when there is no delay time difference between lanes, a head position of a data block of MFAS=1 received through a lane #1, a head position of a data block of MFAS=2 received through a lane #2, a head position of a data block of MFAS=3 received through a lane #3 should be delayed by 4080 bytes, 8160 bytes, and 12240 bytes, respectively. However, since signals of the respective lanes are transmitted through light of different wavelengths, a delay time difference occurs due to influence of dispersion or the like.

Here, when the head positions of the data blocks of MFAS=1, MFAS=2, and MFAS=3 with the head position of the data block of MFAS=0 as the reference are assumed to have been delayed by 3980 bytes, 8460 bytes, and 12440 bytes, respectively, as illustrated in FIG. 5-6(*a*), it is understood that a delay time difference of −100 bytes, a delay time difference of +300 bytes, and a delay time difference of +200 bytes with respect to an expected delay time have occurred in the lane #1, lane #2, and lane #3, respectively. Then, when a delay of 300 bytes, a delay of 400 bytes, and a delay of 100 bytes are given to the delay adjusting unit of the lane #0, the delay adjusting unit of the lane #1, and the delay adjusting unit of the lane #3, respectively, all lanes can be conformed to the lane #2 that has the largest delay as illustrated in FIG. 5-6(*b*).

The OTU frame reconfiguring unit 11 receives the data blocks of the respective lanes which have been subjected to delay time difference compensation, restores the original sequence of the data blocks of the respective lanes based on the lane numbers identified by the lane identifying & delay difference compensating unit 10, and reconfigures an OTU frame of 4 rows×4080 columns.

The descrambling unit 12 descrambles all regions of the reconfigured OTU frame except the FAS.

The interleaving unit 13 performs 16-byte interleaving on the OTU frame of 4 rows×4080 columns for each row (4080 bytes).

The decoding units 14-1 to 14-16 decode the byte-interleaved sub-row data (255 bytes), and outputs error-corrected sub-row data (238 bytes).

The deinterleaving unit 15 deinterleaves the decoded sub-row data, and outputs an error-corrected frame of 4 rows×3824 columns.

The OH processing unit 16 outputs an OPU frame in which the overheads such as the FA OH, the OTU OH, the LM OH, and the ODU OH are eliminated from the error-corrected frame of 4 rows×3824 columns.

The demapping unit 17 demaps the client signal from the OPU PLD based on information of the OPU OH, and outputs the client signal.

Sixth Invention

Currently, an OTN (Optical Transport Network) described in Non-Patent Literature 6-1 is being widely used as a wide area optical transport network. An OTN frame has a structure illustrated in FIG. 6-1. A frame is denoted by 4 rows×4080 columns, and $1^{st}$ to $4080^{th}$ bytes of the frame correspond to $1^{st}$ to $4080^{th}$ columns of a $1^{st}$ row, $4081^{st}$ to $8160^{th}$ bytes correspond to $1^{st}$ to $4080^{th}$ columns of a $2^{nd}$ row, $8161^{st}$ to $12240^{th}$ bytes correspond to $1^{st}$ to $4080^{th}$ columns of a $3^{rd}$ row, and $12241^{st}$ to $16320^{th}$ bytes correspond to $1^{st}$ to $4080^{st}$ columns of a $4^{th}$ row.

A client signal is mapped to an OPU (Optical channel Payload Unit) PLD (Payload) of the $17^{th}$ to $3824^{th}$ columns of the frame.

An OPU OH (OverHead) is inserted into the 15 to $16^{th}$ columns, and, for example, information necessary for mapping/demapping of the client signal is included in the 15 to $16^{th}$ columns.

An ODU (Optical channel Data Unit) OH is inserted into the $1^{st}$ to $14^{th}$ columns of the $2^{nd}$ to $4^{th}$ rows, and path management operation information of an optical channel is included in the $1^{st}$ to $14^{th}$ columns of the $2^{nd}$ to $4^{th}$ rows.

An FA (Frame Alignment) OH including an FAS (Frame Alignment Signal) necessary for frame synchronization and an MFAS (Multiframe Alignment Signal) indicating the position in a multi-frame is inserted into the $1^{st}$ to $7^{th}$ column of the $1^{st}$ row, and an OTU (Optical channel Transport Unit) OH including section monitoring information of an optical channel is inserted into the $8^{th}$ to $14^{th}$ columns. A parity check byte for FEC (Forward Error Correction) is added to the $3825^{th}$ to $4080^{th}$ columns.

In the OTN, SM (Section Monitoring) OH and PM (Path Monitoring) OH are defined in the OTU OH and the ODU OH, respectively, for transmission quality management.

As illustrated in FIG. 6-2, the SM is arranged in $8^{th}$ to $10^{th}$ columns of a $1^{st}$ row (see section 15.7.2.1 of Non-Patent Literature 6-1).

A TTI (Trail Trace Identifier) is a sub field arranged in a $1^{st}$ byte of the SM OH. The TTI includes an SAPI (Source Access Point Identifier) indicating a section monitoring starting point and a DAPI (Destination Access Point Identifier) indicating a section monitoring ending point (see sections 15.2 and 15.7.2.1.1 of Non-Patent Literature 6-1).

BIP-8 (Bit Interleaved Parity-8) is a sub field arranged in a $2^{nd}$ byte of the SM OH. As illustrated in FIG. 6-3, at a transmission side, OPU data of a second previous frame is interleaved, an 8-bit parity (BIP-8) is calculated, and the 8-bit parity (BIP-8) is inserted into the BIP-8 sub field of the SM OH. At a reception side, a value obtained by calculating the BIP-8 from the OPU data is compared with a value of the BIP-8 sent through the BIP-8 sub field of the SM OH, and an error occurring in a section monitoring zone is detected (see section 15.7.2.1.2 of Non-Patent Literature 6-1).

As illustrated in FIG. 6-4, the PM OH is arranged in $10^{th}$ to $12^{th}$ columns of a $3^{rd}$ row (see section 15.8.2.1 of Non-Patent Literature 6-1).

The TTI is a sub field arranged in a $1^{st}$ byte of the PM OH. The TTI includes an SAPI indicating a path monitoring starting point and a DAPI indicating a path monitoring ending point (see sections 15.2 and 15.8.2.1.1 of Non-Patent Literature 6-1).

The BIP-8 is a sub field arranged in a $2^{nd}$ byte of the PM OH. As illustrated in FIG. 6-5, at a transmission side, OPU data of a second previous frame is interleaved, an 8-bit parity (BIP-8) is calculated, and the 8-bit parity (BIP-8) is inserted into the BIP-8 sub field of the PM OH. At a reception side, a value obtained by calculating the BIP-8 from the OPU data is compared with a value of the BIP-8 sent through the BIP-8 sub field of the PM OH, and an error occurring in a path monitoring zone is detected (see section 15.8.2.1.2 of Non-Patent Literature 6-1).

As described above, in the OTN, counting the number of errors occurring in the section monitoring zone and the path monitoring zone by using the BIP-8s in the SM OH and the PM OH can be realized.

Seventh Invention

Currently, an OTN (Optical Transport Network) described in Non-Patent Literature 7-1 is being widely used as a wide area optical transport network. An OTN frame has a structure illustrated in FIG. 7-1. A frame is denoted by 4 rows×4080 columns, and $1^{st}$ to $4080^{th}$ bytes of the frame correspond to $1^{st}$ to $4080^{th}$ columns of a $1^{st}$ row, $4081^{st}$ to $8160^{th}$ bytes correspond to $1^{st}$ to $4080^{th}$ columns of a $2^{nd}$ row, $8161^{st}$ to $12240^{th}$ bytes correspond to $1^{st}$ to $4080^{th}$ columns of a $3^{rd}$ row, and $12241^{st}$ to $16320^{th}$ bytes correspond to $1^{st}$ to $4080^{th}$ columns of a $4^{th}$ row. A client signal is mapped to an OPU (Optical channel Payload Unit) PLD (Payload) of the $17^{th}$ to $3824^{th}$ columns of the frame. An OPU OH (OverHead) is inserted into the 15 to $16^{th}$ columns, and, for example, information necessary for mapping/demapping of the client signal is included in the 15 to $16^{th}$ columns. An ODU (Optical channel Data Unit) OH is inserted into the $1^{st}$ to $14^{th}$ columns of the $2^{nd}$ to $4^{th}$ rows, and path management operation information of an optical channel is included in the $1^{st}$ to $14^{th}$ columns of the $2^{nd}$ to $4^{th}$ rows. An FA (Frame Alignment) OH including an FAS (Frame Alignment Signal) necessary for frame synchronization and an MFAS (Multiframe Alignment Signal) indicating the position in a multi-frame is inserted into the $1^{st}$ to $7^{th}$ column of the $1^{st}$ row, and an OTU (Optical channel Transport Unit) OH including section monitoring information of an optical channel is inserted into the $8^{th}$ to $14^{th}$ columns. A parity check byte for FEC (Forward Error Correction) is added to the $3825^{th}$ to $4080^{th}$ columns.

The FAS including OA1s and OA2s are arranged in $1^{st}$ to $5^{th}$ bytes of the FA OH, an LLM is arranged in a $6^{th}$ byte of the FA OH, and the MFAS is arranged in a $7^{th}$ byte of the FA OH. Here, OA1 is 0b11110110, and OA2 is 0b00101000.

In the OTN, an SM (Section Monitoring) OH and a PM (Path Monitoring) OH are defined in an OTU OH and an ODU OH, respectively, for transmission quality management.

As illustrated in FIG. 7-2, an SM OH is arranged in $8^{th}$ to $10^{th}$ columns of a $1^{st}$ row (see section 15.7.2.1 of Non-Patent Literature 7-1).

The TTI (Trail Trace Identifier) is a sub field arranged in a $1^{st}$ byte of the SM OH. The TTI includes an SAPI (Source Access Point Identifier) indicating a section monitoring starting point and a DAPI (Destination Access Point Identifier) indicating a section monitoring ending point (see sections 15.2 and 15.7.2.1.1 of Non-Patent Literature 7-1).

The BIP-8 (Bit Interleaved Parity-8) is a sub field arranged in a $2^{nd}$ byte of the SM OH. As illustrated in FIG. 7-3, at a transmission side, OPU data of a second previous frame is interleaved, an 8-bit parity (BIP-8) is calculated, and the 8-bit parity (BIP-8) is inserted into the BIP-8 sub field of the SM OH. At a reception side, a value obtained by calculating the BIP-8 from the OPU data is compared with a value of the BIP-8 sent through the BIP-8 sub field of the SM OH, and an error occurring in a section monitoring zone is detected (see section 15.7.2.1.2 of Non-Patent Literature 7-1).

As illustrated in FIG. 7-4, the PM OH is arranged in $10^{th}$ to $12^{th}$ columns of a $3^{rd}$ row (see section 15.8.2.1 of Non-Patent Literature 7-1).

The TTI is a sub field arranged in a $1^{st}$ byte of the PM OH. The TTI includes an SAPI indicating a path monitoring starting point and a DAPI indicating a path monitoring ending point (see sections 15.2 and 15.8.2.1.1 of Non-Patent Literature 7-1).

The BIP-8 is a sub field arranged in a $2^{nd}$ byte of the PM OH. As illustrated in FIG. 7-5, at a transmission side, OPU data of a second previous frame is interleaved, an 8-bit parity (BIP-8) is calculated, and the 8-bit parity (BIP-8) is inserted into the BIP-8 sub field of the PM OH. At a reception side, a value obtained by calculating the BIP-8 from the OPU data is compared with a value of the BIP-8 sent through the BIP-8 sub field of the PM OH, and an error occurring in a path monitoring zone is detected (see section 15.8.2.1.2 of Non-Patent Literature 7-1).

As described above, in the OTN, counting the number of errors occurring in the section monitoring zone and the path monitoring zone using the BIP-8s in the SM OH and the PM OH can be realized.

Eighth Invention

Currently, an OTN (Optical Transport Network) is being widely used as a wide area optical transport network (for example, see Non-Patent Literature 8-1). An OTN frame has a structure illustrated in FIG. 8-9. FIG. 8-9 is a diagram illustrating an OTN frame structure. A frame is denoted by 4 rows×4080 columns, and $1^{st}$ to $4080^{th}$ bytes of the frame correspond to $1^{st}$ to $4080^{th}$ columns of a $1^{st}$ row, $4081^{st}$ to $8160^{th}$ bytes correspond to $1^{st}$ to $4080^{th}$ columns of a $2^{nd}$ row, $8161^{st}$ to $12240^{th}$ bytes correspond to $1^{st}$ to $4080^{th}$ columns of a $3^{rd}$ row, and $12241^{st}$ to $16320^{th}$ bytes correspond to $1^{st}$ to $4080^{th}$ columns of a $4^{th}$ row.

A client signal is mapped to an OPU (Optical channel Payload Unit) PLD (Payload) of the $17^{th}$ to $3824^{th}$ columns of the frame. An OPU OH (OverHead) is inserted into the 15 to $16^{th}$ columns, and, for example, information necessary for mapping/demapping of the client signal is included in the 15 to $16^{th}$ columns. An ODU (Optical channel Data Unit) OH is inserted into the $1^{st}$ to $14^{th}$ columns of the $2^{nd}$ to $4^{th}$ rows, and path management operation information of an optical channel is included in the $1^{st}$ to $14^{th}$ columns of the $2^{nd}$ to $4^{th}$ rows. An FA (Frame Alignment) OH including an FAS (Frame Alignment Signal) necessary for frame synchronization and an MFAS (Multiframe Alignment Signal) indicating the position in a multi-frame is inserted into the $1^{st}$ to $7^{th}$ column of the $1^{st}$ row, and an OTU (Optical channel Transport Unit) OH including section monitoring information of an optical channel is inserted into the $8^{th}$ to $14^{th}$ columns. A parity check byte for FEC (Forward Error Correction) is added to the $3825^{th}$ to $4080^{th}$ columns.

In the OTN, an SM (Section Monitoring) OH and a PM (Path Monitoring) OH are defined in an OTU OH and an ODU OH, respectively, for transmission quality management. As illustrated in FIG. 8-10, an SM OH is arranged in $8^{th}$ to $10^{th}$ columns of a $1^{st}$ row. FIG. 8-10 is a diagram illustrating the position of the SM OH in the OTU OH. The TTI (Trail Trace Identifier) is a sub field arranged in a $1^{st}$ byte of the SM OH. The TTI includes an SAPI (Source Access Point Identifier) indicating a section monitoring starting point and a DAPI (Destination Access Point Identifier) indicating a section monitoring ending point.

The BIP-8 (Bit Interleaved Parity-8) is a sub field arranged in a $2^{nd}$ byte of the SM OH. At a transmission side, OPU data of a second previous frame is interleaved, an 8-bit parity (BIP-8) is calculated, and the 8-bit parity (BIP-8) is inserted into the BIP-8 sub field of the SM OH. At a reception side, a value obtained by calculating the BIP-8 from the OPU data is compared with a value of the BIP-8 sent through the BIP-8 sub field of the SM OH, and an error occurring in a section monitoring zone is detected.

The BEI/BIAE (Backward Error Indication and Backward Incoming Alignment Error) is a sub field arranged in $1^{st}$ to $4^{th}$ bits of a $3^{rd}$ byte of the SM OH. "0000" to "1000" are used when a notification of an error count number (0 to 8) detected in the BIP-8 in the section monitoring zone (BEI) is given to an upper stream, and "1011" is used when a notification of a frame synchronization error is given to the upper stream (BIAE).

The BDI (Backward Defect Indication) is a sub field arranged in a $5^{th}$ bit of the $3^{rd}$ byte of the SM OH. When a notification indicating that a fault has been detected in the section monitoring zone is given to the upper stream, the BDI is "1," and otherwise, the BDI is "0."

The IAE (Incoming Alignment Error) is a sub field arranged in a $6^{th}$ bit of the $3^{rd}$ byte of the SM OH. When a notification of a frame synchronization error is given to an end node, the IAE is "1," and otherwise, the IAE is "0." Note that $7^{th}$ to $8^{th}$ bits ("00") of the $3^{rd}$ byte of the SM OH are spare regions.

As described above it can be realized to give a notification indicating that a fault or a frame synchronization error has occurred in section monitoring from the reception side to the transmission side by using the BEI/BIAE and the BDI in the SM OH in the OTN.

Ninth Invention

In recent years, as a bit rate of a client signal increases, large capacity communication by multilane transfer has been under review in order to transfer a client signal that has exceeded a bit rate of one wavelength. As multilane transfer, a scheme of performing multilane transfer by distributing blocks obtained by dividing an OTUk frame on a 16-byte basis to a plurality of lanes is described in Annex C of the international standard ITU-T G.709 which is an OTN interface standard (for example, see Non-Patent Literature 9-1), and operation thereof is described in the international standard ITU-T G.798 (for example, see Non-Patent Literature 9-2). Here, an OTUk frame is an OTUk of G.709, and is assumed to be a frame having a frame structure of 4×4080 bytes. Further, in multilane transfer intended for realizing an elastic optical path network (for example, see Non-Patent Literature 9-3), multilane transfer that allows the number of lanes to be changed according to a transfer capacity of the flow is required in an interface of a transmission device. A flow in the specification of the present application is assumed to be information transferred with the same end node or QoS priority. As an example of a frame scheme and a transfer scheme of realizing multilane transfer according to a transfer capacity, Patent Literature 9-1 is proposed.

Further, a case can be mentioned in which as the speed of an interface increases, a fault occurs, and influence on communication when transfer is stopped increases. In order to suppress this influence, there is a technology of performing shrink operation, or protection of securing a transfer capacity by using a free lane, and in multilane transfer a mechanism of performing transfer by using a normal lane without performing transfer through a lane having a fault has been under review. In the specification of the present application, a lane refers to a virtual lane. A virtual lane in the specification of the present application refers to a lane used for transferring data in conformity to a transfer speed of a physical lane even when the transfer speed of the physical lane is changed. By arbitrarily multiplexing one or more virtual lanes, transfer is performed in conformity to the changed transfer speed of the physical lane. For example, transfer using a physical lane of 10 Gbps, 25 Gbps, or 100 Gbps can be performed by multiplexing 2 virtual lanes, 5 virtual lanes, or 20 virtual lanes each of which is 5 Gbps. In addition, the shrink operation refers to operation in which while multilane transfer is being performed, when a fault has occurred in one of the lanes and thus the multilane transfer cannot be performed, transfer is performed at a decreased transfer speed by using a lane having no fault through which transfer can be normally performed. Further, the protection refers to operation in which while multilane transfer is being performed, when a fault has occurred in some lanes and thus the multilane transfer cannot be performed, by switching from a lane having a fault to an unused normal lane, transfer is performed at the same transfer speed as before the fault occurs.

In an OTN interface of the related art, monitoring using an OTUk frame is performed for each wavelength, and a physical lane to be used for transfer is managed by a frame. Here, a physical lane refers to a wavelength, or one channel in super channel transmission.

Further, the multilane transfer in Annex C of Non-Patent Literature 9-1 is a scheme of dividing an OTUk frame into 1020 blocks on a 16-byte basis, distributing the blocks to a plurality of lanes, and performing transfer. State monitoring of each lane used for the multilane transfer is described in Non-Patent Literature 9-2, and in the multilane transfer, a plurality of lanes is monitored, and it is determined whether or not reconstructing a frame from the plurality of lanes is possible. This state monitoring is performed by monitoring LOR (Loss of Recovery), LOL (Loss of Lane Alignment), or the like, specifically, by checking a value of an LLM (Logical Lane Marker). When a value of the LLM becomes correct five times consecutively in a unit of 16320 bytes, it is regarded as an IR (In-Recovery) state, and when a value of the LLM is incorrect, it is determined to be an OOR (Out-of-Recovery) state indicating a state in which a frame cannot be reconstructed from a plurality of lanes. When the OOR state is continued for 3 ms, it is determined to be the LOR (Loss of Recovery) state. Here, the LLM is a word described in G.709 Annex C, and is a value positioned at a $6^{th}$ byte of a frame alignment overhead and necessary for reconstructing a frame from a plurality of lanes in multilane transfer.

In addition, a monitoring/management layer structure of multilane transfer in Annex C of Non-Patent Literature 9-1 is illustrated in FIG. 9-14. An OTUk frame is divided into an OTL (Optical Channel Transport Lane) corresponding to a physical lane and transferred. In a monitoring/management model, a structure of managing an individual physical lane OTL through an OTLC (Optical Transport Lane Carrier) serving as a transfer medium, and managing an OTLCG (Optical Transport Lane Carrier Group) in which OTLCs are collected, through an OPSM (Optical Physical Section Multilane) is provided.

Further, Patent Literature 9-1 describes a multilane transfer scheme that allows a transfer capacity to be changed through a mechanism in which the number of multiple lanes used in transferring 16-byte blocks can be changed and a frame can be reconstructed even when the number of lanes is changed.

CITATION LIST

Patent Literature

Third Invention

Patent Literature 1-1: JP 2011-223454 A

Fifth Invention

Patent Literature 5-1: JP 2011-223454 A

Seventh Invention

Patent Literature 7-1: JP 2011-223454 A

Eighth Invention

Patent Literature 8-1: JP 2011-223454 A

Ninth Invention

Patent Literature 9-1: JP 2011-223454 A

Non-Patent Literature

First Invention

Non-Patent Literature 1-1: Masahiko Jinno, Hidehiko Takara, Yoshiaki Sone, Kazushige Yonenaga, Akira Hirano, Shingo Kawai, "Multi-flow Optical Transponders: Toward Efficient Multi-layer Elastic Optical Networking", IEICE technical report, OCS 2011-21, June 2011.

Non-Patent Literature 1-2: ITU-T Recommendation G.709, "Interfaces for the Optical Transport Network (OTN)."

Second Invention

Non-Patent Literature 2-1: K. Hisadome, et al., "100 Gb/s Ethernet (registered trademark) Inverse Multiplexing based on Aggregation at the Physical Layer," IEICE Transactions on Communications, Vol. E94-B, No. 4, pp. 904-909, April 2011.

Third Invention

Non-Patent Literature 3-1: "Interfaces for the Optical Transport Network (OTN)," ITU-T G.709, 2009

Fourth Invention

Non-Patent Literature 4-1: "Interfaces for the Optical Transport Network (OTN)," ITU-T G.709, 2009

Non-Patent Literature 4-2: T. Ohara et. al., "OTN Technology for Multi-flow Optical Transponder in Elastic 400G/1T Transmission Era," OFC/NFOEC Technical Digest, JW2A.8, 2012

Non-Patent Literature 4-3: "Link capacity adjustment scheme (LCAS) for virtual concatenated signals," ITU-TG.7042, 2004

Fifth Invention

Non-Patent Literature 5-1: "Interfaces for the Optical Transport Network (OTN)," ITU-T G.709, 2009

Sixth Invention

Non-Patent Literature 6-1: ITU-T G.709/Y.1331 Annex C

Seventh Invention

Non-Patent Literature 7-1: "Interfaces for the Optical Transport Network (OTN)," ITU-T G.709, 2009

Eighth Invention

Non-Patent Literature 8-1: "Interfaces for the Optical Transport Network (OTN)," ITU-T G.709, 2009

Ninth Invention

Non-Patent Literature 9-1: ITU-T Recommendation G.709 "Interfaces for the Optical Transport Network (OTN)"

Non-Patent Literature 9-2: ITU-T Recommendation G.798 "Characteristics of optical transport network hierarchy equipment functional blocks"

Non-Patent Literature 9-3: Masahiko Jinno, Hidehiko Takara, Yoshiaki Sone, Kazushige Yonenaga, Akira Hirano, Shingo Kawai, "Toward effective interworking of multi-flow optical transponder-IP layer and elastic optical layer", IEICE technical report, OCS 2011-21, June 2011.

Non-Patent Literature 10-1: Teshima et al., "Architecture designing of a reconfigurable optical transponder applied to a dynamically adaptive photonic node," IEICE Technical Report, OCS 2012-11, June 2012

Non-Patent Literature 10-2: Kitamura et al., "Link Failure Detection and Error Condition Notification for Adaptive Multiple Lane Transport," IEICE Technical Report, PN 2012-32, November 2012

Non-Patent Literature 10-3: T. Ohara, M. Teshima, S. Aisawa, and M. Jinno, "OTN Technology for Multi-flow Optical Transponder in Elastic 400G/1T Transmission Era," OFC/NFOEC Technical Digest c 2012 OSA

SUMMARY OF INVENTION

Technical Problem

First Invention

In the logical lane technology and the VCAT in Non-Patent Literature 1-2, transferring a transport frame according to a single transmission destination or priority is premised, but transferring a transport frame according to a plurality of transmission destinations or priorities is not envisaged. In order to transfer a transport frame according to a plurality of transmission destinations or priorities, since a plurality of transmission destinations or priorities differs in a bit rate, the identical number of framers as a plurality of transmission destinations or priorities is necessary, but in general all framers are not constantly used.

In the logical lane technique and the VCAT of Non-Patent Literature 1-2, a framer needs to be switched according to a change in a bandwidth of a physical lane that is caused by a change in a modulation scheme or a change in the number of wavelengths.

Therefore, in order to solve the above problem, it is an object of the present invention to provide a technique capable of using a single framer as a necessary framer and causing the framer to be shared among a plurality of transmission destinations or priorities when coping with a plurality of transmission destinations or priorities and a change in a bandwidth of a physical lane that is caused by a change in a modulation scheme or a change in the number of wavelengths.

Second Invention

In the APL, transmitting a data flow destined for an identical end node can be realized, but it is difficult to transmit a data flow destined for a plurality of end nodes. Further, when the number of lanes is increased and decreased according to increase and decrease in a bandwidth of a data flow, during a transitional period of time until a change of the number of lanes is completed at a transmission side and a reception side, there is a possibility that the number of lanes at the transmission side is not match the number of lanes at the reception side, and a data flow can be lost. Note that when a TCP (Transmission Control Protocol) is used, loss of a data flow is recognized as congestion of a network, and a transmission rate decreases. However, when a protection time is established, loss of a data flow can be prevented, although an application needs to be temporarily halted during that time.

Therefore, in order to solve the above problem, it is an object of the present invention to provide a technique that enables transmission of a data frame destined for a plurality of end nodes when a data frame is transmitted and received by using a plurality of lanes, and enables prevention of loss of a data frame without establishing a protection time even when the number of lanes is increased and decreased.

Third Invention

It becomes possible to perform multilane transmission in which the number of lanes is variable by extending the OTN-MLD. However, when the number of lanes is not a divisor of the number of data blocks per frame, a dummy block needs to be inserted (for example, see Patent Literature 3-1).

FIG. 3-3 illustrates an example of a case in which the number of lanes is 8. Since 1020 mod 8=4, 4 (=8−4) dummy blocks are inserted after a $1120^{th}$ data block. Generally, when the number of lanes is M, {M−(1020 mod M)} dummy blocks need to be inserted.

However, when the dummy blocks are inserted as described above, it becomes necessary to increase a bit rate of a lane by the percentage of the dummy blocks as follows.

When a nominal frequency of a lane is $f_0$ and a frequency increase is $\Delta f$, the following are obtained.

M=7, $\Delta f/f_0$=0.196%

M=8, $\Delta f/f_0$=0.392%

M=9, $\Delta f/f_0$=0.588%

As described above, when the number of lanes is changed, there is a possibility that it become necessary to change a bit rate of each lane, and thus such a problem arises that circuit configuration becomes complicated.

Fourth Invention

As management information of a variable capacity optical path, information for uniquely identifying an individual variable capacity optical path in an optical transport network, information indicating a service class carried through a variable capacity optical path, and the like become necessary. Further, since a combination of optical modulation schemes of different speeds is also considered in a variable capacity path, when it is based on the VCAT, information necessary for dividing a variable capacity management frame into transport frames of different speeds and also combining transport frames of different speeds to reconfigure a variable capacity management frame also becomes necessary.

Here, the variable capacity management frame is identical to the variable frame.

In the VCAT and the LCAS, the GID is used for identifying a VCG. Further, MFI is defined by 2 bytes, and indicates a sequence of multi-frames. The multi-frames that belong to the identical VCG and have the identical MFI have the identical GID. Thus, in order to specify a VCG to which a received VCAT frame belongs, GID bits obtained from 15 sets of consecutive multi-frames become necessary. When VCAT frames belonging to a plurality of VCGs set for each end node or for each service class are simultaneously received, it is necessary to identify a plurality of VCGs and perform delay compensation between frames and reconfiguration of an OPUk-Xv for each VCG. In this case, a large-capacity memory corresponding to 15 sets of multi-frames necessary for identifying the VCGs become necessary, and latency increases as well.

Further, the VCAT is an approach of virtually realizing a variable capacity management frame by using OPUks having an identical speed, and using OPUks having different speeds is not considered. Further, the LCAS is an approach for managing increase and decrease in the capacity of the VCAT but not a technique of describing a service class of a client signal carried through a variable capacity optical path.

Meanwhile, in the case of the OTUflex, there is means of identifying a lane number of each lane, but there is no means of knowing which lanes are bundled for each end node or for each service class from lanes themselves when a plurality of lanes that transfers a plurality of variable capacity optical paths set for each end node or for each service class is simultaneously received. Further, there is no means of describing a service class of a client signal carried through a variable capacity optical path.

Therefore, it is an object of the present invention to provide a technique capable of knowing a bundled end node or service class through a lane itself without using a plurality of OPUs having different speeds.

Fifth Invention

It becomes possible to perform multilane transmission in which the number of lanes is variable by extending the OTN-MLD (for example, see Patent Literature 5-1). However, when the number of lanes is increased at a timing of A in FIG. 5-7, since a delay amount of a new lane #4 is not known, frame reconfiguration cannot be performed until a data block including an FAS is received in the lane #4 (a timing of B). Thus, when the number of lanes is increased, latency increases as well.

It is an object of the present invention to provide a technique capable of increasing a bandwidth without increase in latency.

Sixth Invention

As a technique of economically realizing high-speed optical transmission, the OTN-MLD (Multilane Distribution) of distributing data of OTU frames of 40 Gbps or 100 Gbps to multiple lanes and performing parallel transmission has been standardized (for example, see Annex C of Non-Patent Literature 6-1).

As a technique of economically realizing high-speed optical transmission, a multilane optical transmission technique extended from the OTN-MLD is also considered in which the number of lanes is variable. Even when the OTN-MLD is used, calculating transmission quality in the section monitoring zone and the path monitoring zone can be realized by using the BIP-8 in the SM OH and the PM OH.

However, when the OTN-MLD is used, such a case is envisaged that due to performance degradation of a laser or a modulator in a certain optical transmitting unit, transmission quality degrades to a degree in which optical signal interruption does not occur, though. In order to specify such a lane, it is essential to determine a bit error rate for each lane, but such means does not exist in the current OTN-MLD.

Therefore, it is an object of the present invention to provide a technique capable of determining a bit error rate or the like for each lane.

Seventh Invention

As a technique of economically realizing high-speed optical transmission, the OTN-MLD (Multilane Distribution) of distributing data of OTU frames of 40 Gbps or 100 Gbps to multiple lanes and performing parallel transmission has been standardized (for example, see Annex C of Non-Patent Literature 7-1). Further, a multilane optical transmission technique extended from the OTN-MLD has been also proposed (for example, see Patent Literature 7-1).

Even when the OTN-MLD is used, calculating transmission quality in the section monitoring zone and the path monitoring zone can be realized by using the BIP-8 in the SM OH and the PM OH. However, when the OTN-MLD is used, such a case is envisaged that performance of, for example, a laser or a modulator in a certain optical transmitting unit degrades. In order to specify a lane in which transmission quality degrades to a degree in which optical signal interruption does not occur, it is essential to determine a bit error rate for each lane, but such means does not exist in the current OTN-MLD.

It is an object of the present invention to provide a technique capable of monitoring quality for each lane.

Eighth Invention

As a technique of economically implementing high-speed optical transmission, the OTN-MLD (Multilane Distribution) of distributing data of OTU frames of 40 Gbps or 100 Gbps to multiple lanes and performing parallel transmission has been standardized (for example, see Non-Patent Literature 8-1). Further, a multilane optical transmission technique extended from the OTN-MLD has been also proposed (for example, see Patent Literature 8-1). Even when the OTN-MLD is used, it can be realized to give a notification indicating that a fault or a frame synchronization error has occurred in section monitoring from the reception side to the transmission side by using the BEI/BIAE and the BDI in the SM OH.

However, when the OTN-MLD is used, for example, such a case is envisaged that performance of, for example, a laser or a modulator in a certain optical transmitting unit degrades to cause a fault in only a certain lane. In this case, if notification of the transmission side of a lane number of the lane having a fault is realized, to take a measure of performing shrink operation by using only the remaining normal lanes can be realized, but there is such a problem in the current OTN-MLD that notifying the number of the lane having a fault to the transmission side of the lane cannot be realized.

The present invention has been made in light of the foregoing, and it is an object of the present invention to provide a multilane transmission device and a fault lane notifying method, which can give a notification indicating a lane number of a lane having a fault from a reception side to a transmission side.

Ninth Invention

Meanwhile, in the multilane transfer in Annex C of Non-Patent Literature 9-1 and Patent Literature 9-1, only data to be transferred is distributed to a plurality of virtual lanes, and a function of performing monitoring and managing for each virtual lane is not defined. Here, a virtual lane is assumed to be a lane corresponding on a 1-to-1 basis to one physical lane, or a lane corresponding on a 1-to-N basis to one physical lane into which N virtual lanes are multiplexed. Examples of a function of performing monitoring and managing in a unit of virtual lanes include a function of monitoring an error for each lane and a function of notifying of a fault lane number.

A case in which there is no function of notifying of a fault lane number is considered. In the multilane transfer using a plurality of wavelengths, such a case is envisaged that due to a fault of an optical modulator or fiber interruption, a fault occurs in some wavelengths being used, decrease in a received optical level or an OOR state in a virtual lane occurs, and it becomes difficult to reconstruct a frame. In the techniques of Annex C of Non-Patent Literature 9-1 and Patent Literature 9-1, one frame is partitioned into 16-byte blocks, and the 16-byte blocks are distributed to a plurality of virtual lanes by a round robin. In such a multilane transfer scheme, since it is necessary to receive all a plurality of virtual lanes in order to reconstruct a frame in a transmission device at a reception device side, even when a fault occurs in only one of lanes being used in the multilane transfer, it is not possible to reconstruct a frame, and communication stops in all lanes including a normal lane.

Here, in order to avoid a situation in which transfer by a normal lane also stops, a method of determining a normal lane and a lane having a fault between a transmitter and a receiver and performing the shrink operation or the protection by using the normal lane is considered. However, in order to perform the shrink operation or the protection, a mechanism of notifying of a lane number of a lane having a fault is necessary, but in Patent Literature 9-1 described regarding the multilane transfer in which the number of lanes can be changed, a method of notifying of a fault lane number for each lane in the multilane transfer using a plurality of virtual lanes is not described. Further, such a case is envisaged that as the protection is performed, a path difference occurs between lanes, and a skew between lanes increases, or the number of virtual lanes used for the multilane transfer increases, and thus a virtual lane number that can be expressed by the 8-bit LLM region defined in the FA OH (frame alignment OverHead) of the related art is deficient, and it becomes difficult to satisfy a desired deskew amount.

Further, in the multilane transfer of transferring a frame in the form of a 16-byte block by using a plurality of virtual lanes (wavelengths), it is necessary to newly review a method of giving a notification indicating a lane number from a reception device side to a transmission device side without using an OTUk frame. This is because in the related art, a lane state is monitored by using one OTUk frame for each physical lane, but in the case of the multilane transfer of distributing 16-byte blocks to a plurality of virtual lanes, OTUk frame format is not taken for each lane. In the related art, since a frame cannot be reconstructed for each lane, it is also not possible to perform error monitoring for each lane which has been performed by a BIP (Bit Interleaved Parity) calculated for an OPUk in an SM (Section Monitoring) of an OTUk overhead of G.709.

In order to solve the above problem, it is an object of the present invention to provide a technique capable of performing error monitoring for each virtual lane and thus specifying a lane number of a lane having a fault in a multilane transfer scheme.

Solution to Problem

First Invention

In a multilane transmission device, when a data signal is allocated based on a transmission destination or a priority, and data signals are framed into data frames, a plurality of virtual lanes is multiplexed into a physical lane.

In a multilane reception device, when data frames are deframed into data signals, a physical lane is demultiplexed into a plurality of virtual lanes.

Specifically, the present invention is a multilane transmission device characterized by including: a data signal allocating unit that allocates data signals based on a transmission destination or a priority; a number of virtual lanes deciding unit that decides the number of virtual lanes necessary for transmission of the data signals allocated based on each transmission destination or each priority by the data signal allocating unit; a framer unit that allocates the data signals allocated based on each transmission destination or each priority by the data signal allocating unit to the virtual lanes whose number has been decided by the number of virtual lanes deciding unit, and frames the data signals allocated to the virtual lanes as data frames; and a data frame transmitting unit that multiplexes the virtual lanes into a physical lane, and transmits the data frames framed by the framer unit by using the physical lane.

Further, the present invention is a multilane transmission method characterized by including in order: a data signal allocating step of allocating data signals based on a transmission destination or a priority; a number of virtual lanes deciding step of deciding the number of virtual lanes necessary for transmission of the data signals allocated based on each transmission destination or each priority in the data signal allocating step; a framer step of allocating the data signals allocated based on each transmission destination or each priority in the data signal allocating step to the virtual lanes whose number has been decided in the number of virtual lanes deciding step, and framing the data signals allocated to the virtual lanes as data frames; and a data frame transmitting step of multiplexing the virtual lanes into a physical lane and transmitting the data frames framed in the framer step by using the physical lane.

According to this configuration, when coping with a plurality of transmission destinations or priorities and a change in a bandwidth of a physical lane that is caused by a change in a modulation scheme or a change in the number of wavelengths, a single framer can be used as a necessary framer, and the framer can be shared among a plurality of transmission destinations or priorities.

Further, the present invention is the multilane transmission device characterized in that a capacity for including the data signals input by the data signal allocating unit in the data frames transmitted by the data frame transmitting unit is set such that a communication speed of the data frames transmitted by the data frame transmitting unit becomes equal to a communication speed of the data signals input by the data signal allocating unit.

Further, the present invention is the multilane transmission method characterized in that a capacity for including the data signals input in the data signal allocating step in the data frames transmitted in the data frame transmitting step is set such that a communication speed of the data frames transmitted in the data frame transmitting step becomes equal to a communication speed of the data signals input in the data signal allocating step.

Further, the present invention is a multilane reception device characterized by including: a data frame receiving unit that acquires the number of virtual lanes necessary for reception of data signals allocated based on each transmission destination or each priority, receives data frames framed from the data signals by using a physical lane, and demultiplexes the physical lane into virtual lanes; and a deframer unit that deframes the data frames allocated to the virtual lanes as data signals.

Further, the present invention is a multilane reception method characterized by including in order: a data frame receiving step of acquiring the number of virtual lanes necessary for reception of data signals allocated based on each transmission destination or each priority, receiving data frames framed from the data signals by using a physical lane, and demultiplexing the physical lane into virtual lanes; and a deframer step of deframing the data frames allocated to the virtual lanes as data signals.

According to this configuration, when coping with a plurality of transmission destinations or priorities and a change in a bandwidth of a physical lane that is caused by a change in a modulation scheme or a change in the number of wavelengths, a single deframer can be used as a necessary deframer, and the deframer can be shared among a plurality of transmission destinations or priorities.

Further, the present invention is the multilane reception device characterized in that a capacity for including the data signals deframed by the deframer unit in the data frames received by the data frame receiving unit is set such that a communication speed of the data frames received by the data frame receiving unit becomes equal to a communication speed of the data signals deframed by the deframer unit.

Further, the present invention is the multilane reception method characterized in that a capacity for including the data signals deframed in the deframer step in the data frames received in the data frame receiving step is set such that a communication speed of the data frames received in the data frame receiving step becomes equal to a communication speed of the data signals deframed in the deframer step.

Second Invention

In a multilane transmission device, flow group information indicating a flow group corresponding to a transmission source and transmission destinations and sequence information indicating a sequence of data frames are added to data frames allocated based on each transmission destination. Then, in a multilane reception device, the data frames to which the flow group information indicating a flow group corresponding to transmission sources and a transmission destination and the sequence information indicating a sequence of data frames are added are rearranged based on the respective sequence information and reconfigured.

Specifically, the present invention is a multilane transmission device that transmits data frames by using a plurality of lanes, characterized by including: a data frame allocating unit that allocates data frames based on a transmission destination; a flow group information sequence information adding unit that adds flow group information indicating a flow group corresponding to a transmission source and transmission destinations and sequence information indicating a sequence of the data frames to the data frames allocated based on each transmission destination by the data frame allocating unit; and a lane selecting/outputting unit that transmits the data frames having the respective flow group information and the respective sequence information added thereto by the flow group information sequence information adding unit to the transmission destinations by using one or more lanes corresponding to the respective flow group information.

Further, the present invention is a multilane transmission method in a multilane transmission device that transmits data frames by using a plurality of lanes, characterized by including in order: a data frame allocating step of allocating data frames based on a transmission destination; a flow group information sequence information adding step of adding flow group information indicating a flow group corresponding to a transmission source and transmission destinations and sequence information indicating a sequence of the data frames to the data frames allocated based on each transmission destination in the data frame allocating step; and a lane selecting/outputting step of transmitting the data frames having the respective flow group information and the respective sequence information added thereto in the flow group information sequence information adding step to the transmission destinations by using one or more lanes corresponding to the respective flow group information.

According to this configuration, when data frames are transmitted and received by using a plurality of lanes, transmission of data frames destined for a plurality of end nodes can be realized.

Further, the present invention is a multilane reception device that receives data frames by using a plurality of lanes, characterized by including: a data frame receiving unit that receives data frames having flow group information indicating a flow group corresponding to transmission sources and a transmission destination and sequence information indicating a sequence of the data frames added thereto, from the transmission sources by using one or more lanes corresponding to the respective flow group information; and a data frame reconfiguring unit that rearranges and reconfigures the data frames having the respective flow group information and the respective sequence information added thereto, based on the respective sequence information.

Further, the present invention is a multilane reception method in a multilane reception device that receives data frames by using a plurality of lanes, characterized by including in order: a data frame receiving step of receiving data frames having flow group information indicating a flow group corresponding to transmission sources and a transmission destination and sequence information indicating a sequence of the data frames added thereto, from the transmission sources by using one or more lanes corresponding to the respective flow group information; and a data frame reconfiguring step of rearranging and reconfiguring the data frames having the respective flow group information and the respective sequence information added thereto, based on the respective sequence information.

According to this configuration, when data frames are transmitted and received by using a plurality of lanes, transmission of data frames destined for a plurality of end nodes can be realized.

Further, the present invention is the multilane reception device characterized in that the data frame reconfiguring unit constantly monitors all the plurality of lanes connected to the multilane reception device for the data frames being received.

Further, the present invention is the multilane reception method characterized in that in the data frame reconfiguring step, all the plurality of lanes connected to the multilane reception device is constantly monitored for the data frames being received.

According to this configuration, when data frames are transmitted and received by using a plurality of lanes, prevention of loss of a data frame can be realized without establishing a protection time even when the number of lanes is increased and decreased.

Third Invention

In order to achieve the above objects, a multilane transmission device of the invention of the present application is a multilane transmission device that divides a signal of a frame format into data blocks, distributes the data blocks to M lanes, and transmits the data blocks, and frames that are equal in number to a multiple of M are collectively regarded as a variable frame, and rotation is performed for each variable frame, and thus even when the number of lanes is not a divisor of 1020, a dummy block is unnecessary.

Specifically, a multilane transmission device of the invention of the present application is a multilane transmission device that divides a signal of a frame format into data blocks, distributes the data blocks to one or more lanes, and transmits the data blocks, and includes an identifier writing function unit that writes a frame identifier in a predetermined field of each frame; and a lane rotating function unit that performs lane rotation when the frame identifier is a predetermined value indicating a multiple of the number of lanes.

In the multilane transmission device of the invention of the present application, the number of lanes of the multilane transmission device may be M, the identifier writing function unit may write a numerical value increasing or decreasing for each frame as the frame identifier, and the lane rotating function unit may perform the lane rotation when a remainder obtained by dividing the frame identifier by a multiple of M becomes a certain value.

In the multilane transmission device of the invention of the present application, the number of lanes of the multilane transmission device may be M, the identifier writing function unit may write a value indicating that a head is a head of a variable frame in frames corresponding to a multiple of M among frames as the frame identifier, and the lane rotating function unit may perform the lane rotation when the frame identifier indicates that a head is the head of the variable frame.

Specifically, a multilane transmission method of the invention of the present application is a multilane transmission method of dividing a signal of a frame format into data blocks, distributing the data blocks to one or more lanes, and transmitting the data blocks, and includes an identifier writing procedure of writing a frame identifier in a predetermined field of each frame indicating a multiple of the number of lanes, and a lane rotation procedure of performing lane rotation when the frame identifier is a predetermined value.

In the multilane transmission method of the invention of the present application, the number of lanes of the multilane transmission device may be M, in the identifier writing procedure, a numerical value increasing or decreasing for each frame may be written as the frame identifier, and in the lane rotation procedure, the lane rotation may be performed when a remainder obtained by dividing the frame identifier by a multiple of M becomes a certain value.

In the multilane transmission method of the invention of the present application, the number of lanes of the multilane transmission device may be M, in the identifier writing procedure, a value indicating that a head is a head of a variable frame may be written in frames corresponding to a multiple of M among frames as the frame identifier, and in the lane rotation procedure, the lane rotation may be performed when the frame identifier indicates that a head is the head of the variable frame.

Fourth Invention

In order to achieve the above objects, a multilane optical transport system of the invention of the present application relates to a multilane optical transport system in which data flows are distributed to a plurality of lanes, and distributed signals are combined to reconstruct original data flows, and particularly, identification information to be written in a set of multi-frames is used instead of the GID (Group Identification) to be written in 15 sets of multi-frames which has identified a VCG (Virtual Concatenation Group).

Specifically, a multilane optical transport system of the invention of the present application is a multilane optical transport system in which a data flow is distributed to signals of a plurality of lanes and transmitted from a transmitting unit, and the signals distributed to the plurality of lanes are combined in a receiving unit to reconstruct an original data flow, wherein the transmitting unit attaches unique identification information capable of identifying a distribution source and a delay difference measurement signal to the signals distributed to the lanes, and the receiving unit compensates for a delay difference of the signals of the lanes classified based on the identification information, based on the delay difference measurement signal information.

In the multilane optical transport system of the invention of the present application, the transmitting unit may include identification information specific to a device including the transmitting unit and identification information specific to a device including the receiving unit in the unique identification information.

The multilane optical transport system of the invention of the present application may further include a network management system that decides identification information for a combination of the transmitting unit and the receiving unit, and the transmitting unit may acquire identification information for a combination of the identification information specific to a device including the transmitting unit and the identification information specific to a device including the receiving unit from the network management system, and include the acquired identification information in the unique identification information.

In the multilane optical transport system of the invention of the present application, the transmitting unit may attach the unique identification information to a variable capacity management frame, and when the variable capacity management frame is divided into one or more transport frames and transmitted, attach the unique identification information to each of the transport frames, and the receiving unit may receive the transport frames, read the unique identification information, classify the received transport frames, and perform data combining from the classified transport frames to the variable capacity management frame.

Here, the variable capacity management frame is identical to the variable frame.

In the multilane optical transport system of the invention of the present application, when the variable capacity management frame is divided into one or more transport frames of different transmission speeds, the transmitting unit may perform data distribution of the management frame to the transport frame according to a ratio of the transmission speeds and attach information identifying the ratio of the transmission speeds to the transport frame, and when the management frame is reconfigured from the one or more transport frames of different transmission speeds, the receiving unit may read the information identifying a ratio of the transmission speeds from the transport frame and perform data combining from the transport frame to the management frame according to the ratio of the transmission speeds.

In the multilane optical transport system of the invention of the present application, the transmitting unit may attach the unique identification information to a variable capacity management frame including one or more transport frames and when the transport frame is divided into a plurality of data blocks, distributed to one or more lanes, and transmitted, distribute the unique identification information to all the one or more lanes, and the receiving unit may receive signals of all the lanes, read the unique identification information, classify the data blocks of the received lanes, and perform data combining from the classified data blocks of the lanes to the transport frame.

In the multilane optical transport system of the invention of the present application, the transmitting unit may attach service class identification information of a data flow to the transport frame, and the receiving unit may read the service class identification information from the transport frame.

Specifically, a multilane optical transport method of the invention of the present application is a multilane optical transport method in which a data flow is distributed to signals of a plurality of lanes and transmitted from a transmitting unit, and the signals distributed to the plurality of lanes are combined in a receiving unit to reconstruct an original data flow, and includes a transmission procedure of attaching unique identification information capable of identifying at least a distribution source to the signals distributed to the lanes and attaching a delay difference measurement signal to the signals distributed to the lanes, and a reception procedure of compensating for a delay difference of the signals of the lanes classified based on the unique identification information, based on the delay difference measurement signal information.

In the multilane optical transport method of the invention of the present application, in the transmission procedure, the unique identification information may be attached to a variable capacity management frame, and when the variable capacity management frame is divided into one or more transport frames and transmitted, the unique identification information may be attached to each of the transport frames, and in the reception procedure, the transport frames may be received, the unique identification information may be read, the received transport frames may be classified, and data combining from the classified transport frames to the variable capacity management frame may be performed.

In the multilane optical transport method of the invention of the present application, in the transmission procedure, the unique identification information may be attached to a variable capacity management frame including one or more transport frames, and when the transport frame is divided into a plurality of data blocks, distributed to one or more lanes, and transmitted, the unique identification information may be distributed to all the one or more lanes, and in the reception procedure, signals of all the lanes may be received, the unique identification information may be read, the data blocks of the received lanes may be classified, and data combining from the classified data blocks of the lanes to the transport frame may be performed.

Fifth Invention

In order to achieve the above objects, a bandwidth change method of the invention of the present application relates to delay compensation when the number of lanes is increased in multilane transmission in which a signal of a frame format is divided into data blocks, distributed to a plurality of lanes, and transmitted, and particularly, a copy of a data block including a synchronization pattern and a frame number of a frame of an existing lane is transmitted through a new lane in advance, delays of synchronization patterns for an identical frame number are compared, a delay difference between the existing lane and the new lane is compensated for by giving a delay difference to the new lane when the delay of the synchronization pattern in the existing lane is larger and giving a delay difference to the existing lane when the delay of the synchronization pattern in the new lane is larger, and then the number of lanes to which the data blocks are distributed is changed at a transmission side of the multilane transmission.

Specifically, a multilane transmission system of the invention of the present application is a multilane transmission system in which a signal of a frame format is divided into data blocks, distributed to one or more lanes, and transmitted from a transmission device to a reception device, wherein the transmission device includes a data block copying function unit that copies a data block including a synchronization pattern and a frame number of a frame in an existing lane, and a new lane output function unit that outputs the data block copied by the data block copying function unit to a lane different from the existing lane, and the reception device includes a synchronization pattern reading function unit that reads the synchronization pattern and the frame number of the frame in the existing lane, and a synchronization pattern and a frame number of a frame in a new lane, and a new lane delay compensating function unit that compares delays of the synchronization patterns of the existing lane and the new lane having an identical frame number, gives a delay difference to one of the existing lane and the new lane having a small delay, and compensates for a delay difference between the existing lane and the new lane.

In the multilane transmission system of the invention of the present application, the transmission device may further include an overhead generating function unit that generates an overhead of a signal of a frame format including change lane information indicating a lane to be increased or decreased together with control information of increasing or decreasing the number of lanes, the new lane output function unit may output the overhead generated by the overhead generating function unit to the new lane, the synchronization pattern reading function unit may read the control information and the change lane information, and the new lane delay compensating function unit may identify the existing lane and the new lane by using the control information and the change lane information.

Specifically, the invention of the present application is a bandwidth change method in a multilane transmission system in which a signal of a frame format is divided into data blocks, distributed to one or more lanes, and transmitted from a transmission device to a reception device, and the bandwidth change method includes: a new lane output procedure in which the transmission device copies a data block including a synchronization pattern and a frame number of a frame in an existing lane, and outputs the copied data block to a lane different from the existing lane; and a new lane delay compensation procedure in which the reception device reads the synchronization pattern and the frame number of the frame in the existing lane, and a synchronization pattern and a frame number of a frame in a new lane, and compares delays of the synchronization patterns of the existing lane and the new lane having an identical frame number, gives a delay difference to one of the existing lane and the new lane having a small delay, and compensates for a delay difference between the existing lane and the new lane.

In the bandwidth change method in the invention of the present application, in the new lane output procedure, the transmission device may generate an overhead of a signal of a frame format including change lane information indicating a lane to be increased or decreased together with control information of increasing or decreasing the number of lanes and output the generated overhead to the new lane, and in the new lane delay compensation procedure, the reception device may identify the existing lane and the new lane by using the control information and the change lane information and compare delays of the synchronization patterns of the existing lane and the new lane having an identical frame number.

Sixth Invention

In order to achieve the above objects, according to the invention of the present application, in a multilane monitoring method in which a receiving unit of a multilane communication device that distributes frame signals to a plurality of lanes and transmitting the frame signals monitors an error of each lane, the frame signal includes a plurality of rows, each row is interleaved into a plurality of N sub rows, each sub row includes a plurality of symbols that has been subjected to an error correction coding processing, and distribution to each lane is performed by using as a unit data blocks each of which includes symbols that are equal in number of a natural number multiple of N, in the receiving unit, a decoding processing unit for the sub row of the frame signal calculates an error locator indicating what number symbol from a head among symbols of the sub row has an error, converts a value of the error locator into a lane number, and counts the number of appearances of the converted lane number.

Specifically, a multilane monitoring system of the invention of the present application includes: a transmitting unit that interleaves each row in a frame including a plurality of rows, divides each row into predetermined number of sub rows, encodes data of each sub row by using an error correction code, deinterleaves each encoded sub row, and performs conversion into the frame including the plurality of rows; and a receiving unit that monitors an error of each lane by interleaving each row of the frame transmitted from the transmitting unit, dividing each row into the number of sub rows, detecting an error included in data of each sub row, calculating a value of an error locator indicating a position of the error, converting the value of the error locator into a lane number, and counting the number of appearances of the lane number converted from the value of the error locator.

Specifically, a multilane monitoring method of the invention of the present application includes: a transmission procedure of interleaving each row in a frame including a plurality of rows, dividing each row into predetermined number of sub rows, encoding data of each sub row by using an error correction code, deinterleaving each encoded sub row, and performing conversion into the frame including the plurality of rows; and an error monitoring procedure of monitoring an error of each lane by interleaving each row of the transmitted frame, dividing each row into the number of sub rows, detecting an error included in data of each sub row, calculating a value of an error locator indicating a position of the error, converting the value of the error locator into a lane number, and counting the number of appearances of the lane number converted from the value of the error locator.

Seventh Invention

A multilane transmission system of the invention of the present application is a multilane transmission system in which a signal of a frame format is divided into data blocks, distributed to one or more lanes, and transmitted from a transmission device to a reception device, wherein the transmission device includes an error detection code calculating function unit that detects a synchronization pattern in each lane, and calculates an error detection code for data subsequent to data blocks arrived after a data block including the synchronization pattern, and an error detection code inserting function unit that detects a synchronization pattern in each lane, and inserts the error detection code calculated for data before the data block including the synchronization pattern by the error detection code calculating function unit into a predetermined field, and the reception device includes an error monitoring function unit that detects a synchronization pattern in each lane, calculates an error detection code for data subsequent to data blocks arrived after a data block including the synchronization pattern, and monitors an error of each lane by using the calculation result and the error detection code read from the predetermined field.

An individual lane monitoring method in a multilane transmission system of the invention of the present application is an individual lane monitoring method in a multilane transmission system in which a signal of a frame format is divided into data blocks, distributed to one or more lanes, and transmitted from a transmission device to a reception device, and includes: an error detection code insertion procedure in which when a synchronization pattern in each lane is detected, the transmission device calculates an error detection code for data subsequent to data blocks arrived after a data block including the synchronization pattern, and inserts the error detection code calculated for data before the data block including the synchronization pattern into a predetermined field; and an error monitoring procedure in which when a synchronization pattern in each lane is detected, the reception device calculates an error detection code for data subsequent to data blocks arrived after a data block including the synchronization pattern, and monitors an error of each lane by using the calculation result and the error detection code read from the predetermined field.

Eighth Invention

The present invention is a multilane transmission device that divides a signal of a frame format into data blocks, distributes the data blocks to lanes, and transmits the data blocks, characterized by including: a fault detecting unit that detects a fault of the lanes at a reception side; and a fault notifying unit that notifies a transmission side of identification information specifying a lane in which a fault has been detected, by using a part of the data blocks including a synchronization pattern when a fault has been detected by the fault detecting unit.

The present invention is characterized in that the fault notifying unit changes a part of the synchronization pattern in the data blocks including the identification information specifying the fault lane when notifying of the identification information specifying the lane.

The present invention is characterized in that the transmission side that has been notified of the identification information specifying the lane in which the fault has been detected distributes the divided data blocks to lanes other than the lane in which the fault has been detected, and transmits the divided data blocks.

The present invention is a fault lane notifying method performed by a multilane transmission device that divides a signal of a frame format into data blocks, distributes the data blocks to lanes, and transmits the data blocks, and the fault lane notifying method is characterized by including: a fault detecting step of detecting a fault of the lanes at a reception side; and a fault notifying step of notifying a transmission side of identification information specifying a lane in which a fault has been detected, by using a part of the data blocks including a synchronization pattern when a fault has been detected in the fault detecting step.

The present invention is characterized in that in the fault notifying step, a part of the synchronization pattern in the data block including the identification information specifying the fault lane is changed when a notification of the identification information specifying the lane is given.

Ninth Invention

A multilane transmission device of the invention of the present application is a multilane transmission device that divides a signal of a frame format into data blocks, distributes the data blocks to a plurality of lanes, and transmits the data blocks, and includes: a block inserting unit that inserts a multilane transfer function extension block including information of a fault lane into a predefined position in the data block of each lane.

In the multilane transmission device of the invention of the present application, the multilane transfer function extension block may include a region for notifying of a lane number of a virtual lane having a fault, as the information of the fault lane.

In the multilane transmission device of the invention of the present application, the multilane transfer function extension block may include a region for notifying of a parity bit in each lane, as the information of the fault lane.

In the multilane transmission device of the invention of the present application, the multilane transfer function extension block may include a region for notifying of BIP (Bit Interleaved Parity) in each lane, as the information of the fault lane.

A multilane transmission system of the invention of the present application is a multilane transmission system in which a signal of a frame format is divided into data blocks, distributed to a plurality of lanes, and transmitted from a transmission device to a reception device, wherein the transmission device includes a block inserting unit that inserts a multilane transfer function extension block including information of an error detection code of each lane into a predefined position in the data block of each lane to be transferred to the reception device, and the reception device includes a lane monitoring unit that compares a value of the error detection code for each lane obtained from the block other than the multilane transfer function extension block among the data blocks received from the transmission device with a value of the multilane transfer function extension block, and performs error monitoring for each lane, and a block inserting unit that inserts a multilane transfer function extension block including information of a lane in which an error has been detected in the lane monitoring unit into a predefined position in the data block of each lane to be transferred to the transmission device.

A multilane transmission system of the invention of the present application is a multilane transmission system in which a signal of a frame format is divided into data blocks, distributed to a plurality of lanes, and transmitted from a transmission device to a reception device, wherein the transmission device includes a block inserting unit that inserts a multilane transfer function extension block including a lane number of a lane having a fault into a predefined position in the data block of each lane to be transferred to the reception device, and the reception device performs distribution to normal lanes other than the lane having a fault, based on information of the multilane transfer function extension block in each lane.

A multilane transmission system of the invention of the present application is a multilane transmission system in which a signal of a frame format is divided into data blocks, distributed to a plurality of lanes, and transmitted from a transmission device to a reception device, wherein the transmission device includes a block inserting unit that inserts a multilane transfer function extension block including a value indicating a deskew amount used when a frame is reconstructed from a plurality of lanes into a predefined position in the data block of each lane to be transferred to the reception device, and the reception device reconstructs a frame from a plurality of lanes by using the value indicating the deskew amount obtained from the multilane transfer function extension block among the data blocks received from the transmission device.

A multilane transmission method of the invention of the present application is a multilane transmission method of dividing a signal of a frame format into data blocks, distributing the data blocks to a plurality of lanes, and transmitting the data blocks, and includes: a block insertion procedure of inserting a multilane transfer function extension block including information of a fault lane into a predefined position in the data block of each lane.

In the multilane transmission method of the invention of the present application, the multilane transfer function extension block may include a region for notifying of a lane number of a virtual lane having a fault and a region for notifying of BIP (Bit Interleaved Parity) in each lane, as the information of the fault lane.

Note that the inventions described above can be combined wherever possible.

Advantageous Effect of Invention

First Invention

The present invention can use a single framer as a necessary framer and cause the framer to be shared among a plurality of transmission destinations or priorities when coping with a plurality of transmission destinations or priorities and a change in a bandwidth of a physical lane that is caused by a change in a modulation scheme or a change in the number of wavelengths.

Second Invention

The present invention enables transmission of a data frame destined for a plurality of end nodes when a data frame is transmitted and received by using a plurality of lanes, and enables prevention of loss of a data frame without establishing a protection time even when the number of lanes is increased and decreased.

Third Invention

According to the present invention, even when the number of lanes is changed, a bit rate of each lane can be made constant, and thus a multilane transmission device can be realized by using simple circuit configuration.

Fourth Invention

According to the present invention, it can be realized to know a bundled end node or service class by using a lane itself without using a plurality of OPUs having different speeds.

Fifth Invention

According to the present invention, it becomes possible to increase a bandwidth without increase in latency because delay compensation is performed before the bandwidth is actually increased.

Sixth Invention

According to the present invention, monitoring transmission quality for each lane can be realized and recovery is realized when only a certain lane has degraded transmission quality.

Seventh Invention

According to the present invention, since monitoring quality for each lane can be realized, when only a certain lane has degraded transmission quality, it is realized to use a backup lane or a lane being used for a service having a low priority if the lane is available. Further, it is realized to perform the shrink by excluding a lane having degraded transmission quality and using the remaining normal lane.

Eighth Invention

According to the present invention, such an effect can be obtained that it becomes possible to perform the shrink operation by only the normal lane because a notification of identification information of a lane having a fault is given to a transmission side.

Ninth Invention

According to the present invention, performing error monitoring for each virtual lane is realized and thus specifying a lane number of a lane having a fault in a multilane transfer scheme.

BRIEF DESCRIPTION OF DRAWINGS

First Invention

FIG. 1-2 is a diagram illustrating configuration of a multilane transmission device of the present invention.

FIG. 1-3 is a diagram illustrating configuration of a multilane transmission device of the present invention.

FIG. 1-4 is a diagram illustrating configuration of a multilane reception device of the present invention.

FIG. 1-5 is a diagram illustrating configuration of a virtual lane group before a bandwidth of a physical lane is changed.

FIG. 1-6 is a diagram illustrating configuration of a virtual lane group after a bandwidth of a physical lane is changed.

FIG. 1-7 is a diagram illustrating configuration of a virtual lane group associated with a change in a communication bandwidth between transmission devices.

FIG. 1-8 is a diagram illustrating a method of mapping a client signal to a transport frame.

Second Invention

Figure 1:
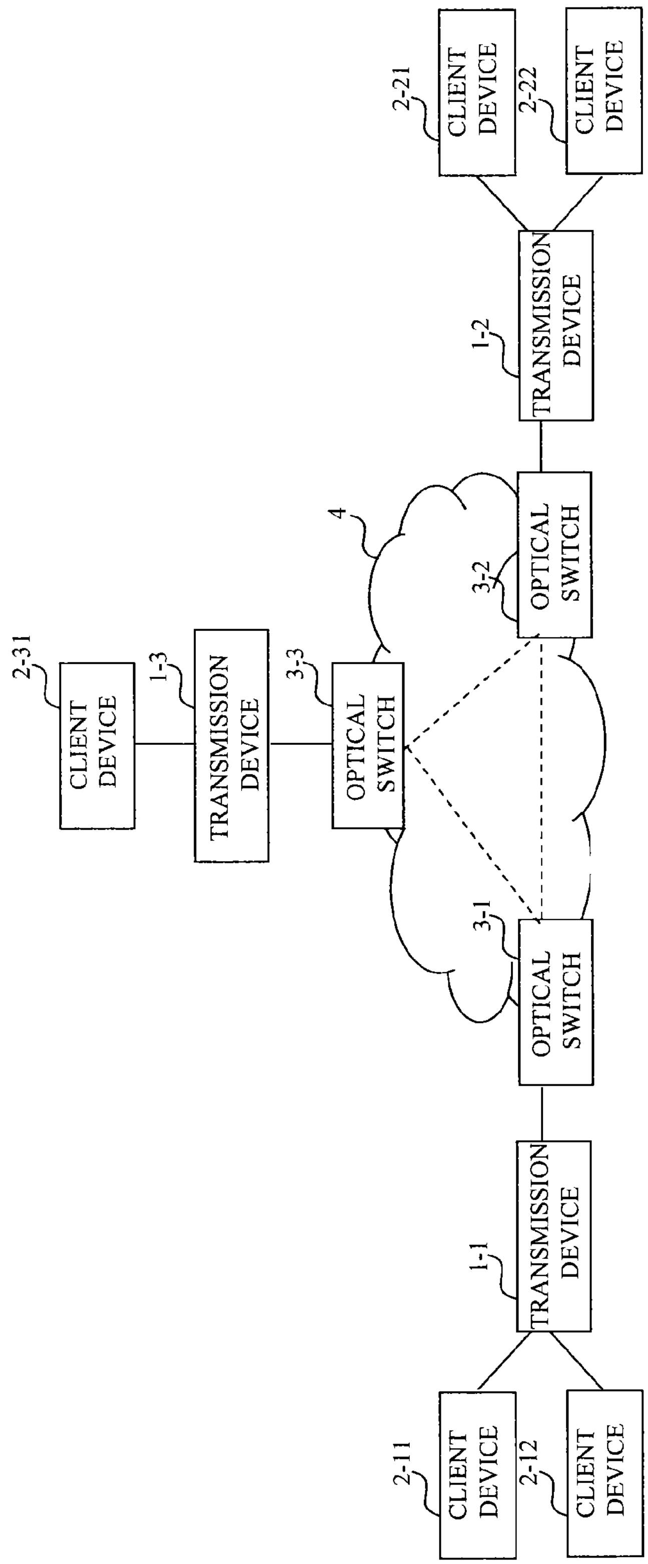
FIG. 1-1 is a diagram illustrating configuration of a multilane communication system of the present invention.
Figures 1, 2:
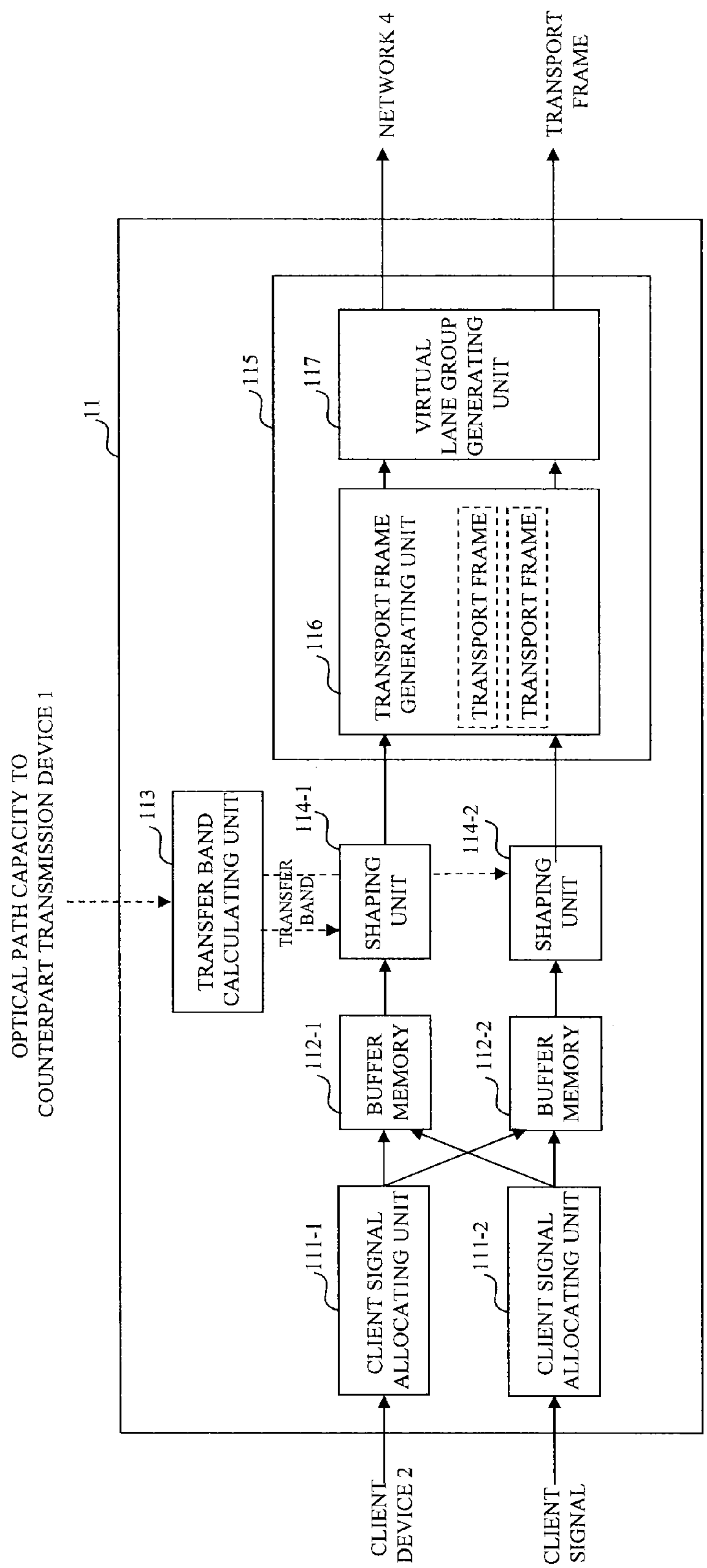

FIG. 2-1 is a diagram illustrating configuration of a multilane communication system of the present invention.

FIG. 2-2 is a diagram illustrating configuration of a multilane of the present invention.

Figures 1, 2, 3:
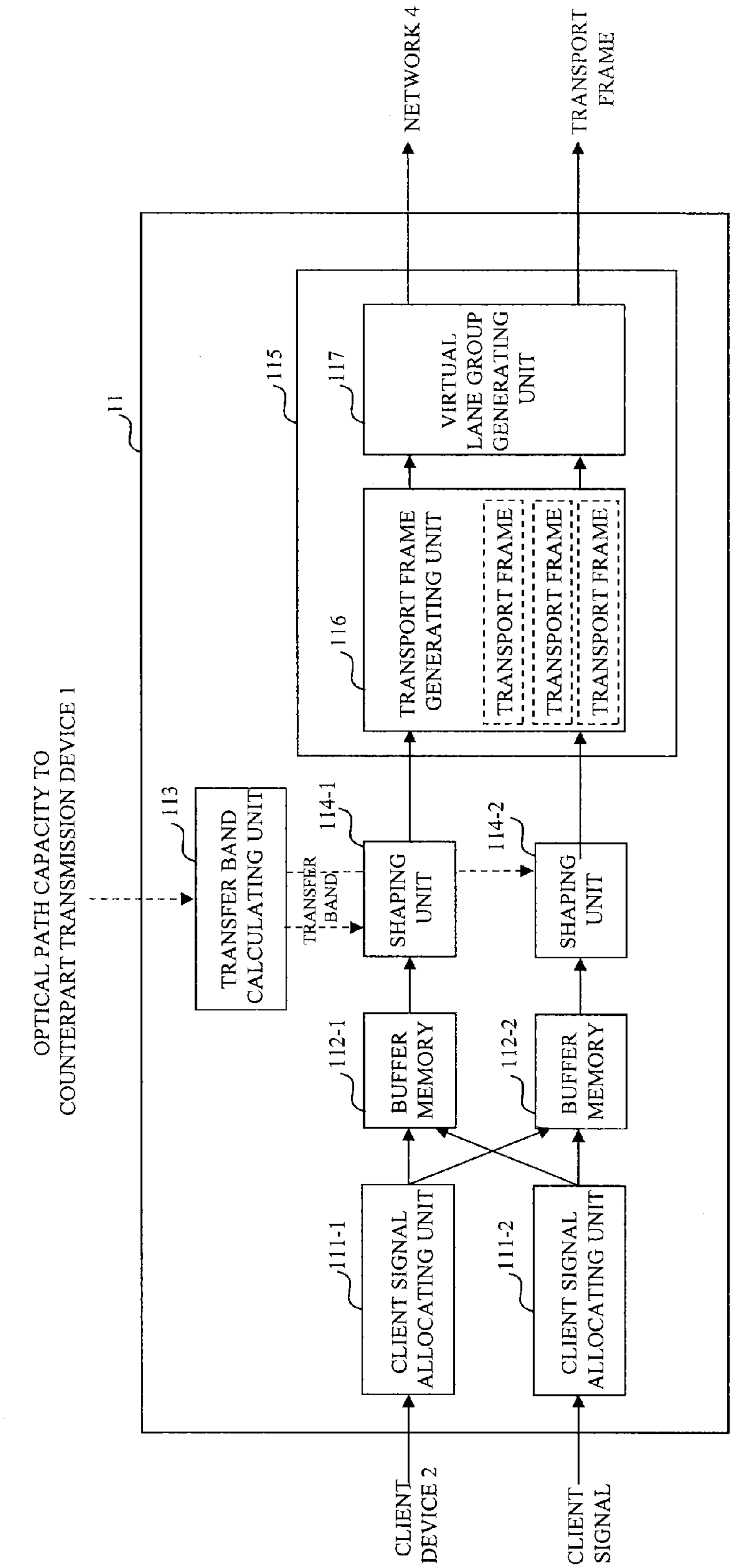

FIG. 2-3 is a diagram illustrating content of a setting table of the present invention.

Figures 1, 2, 3, 4:
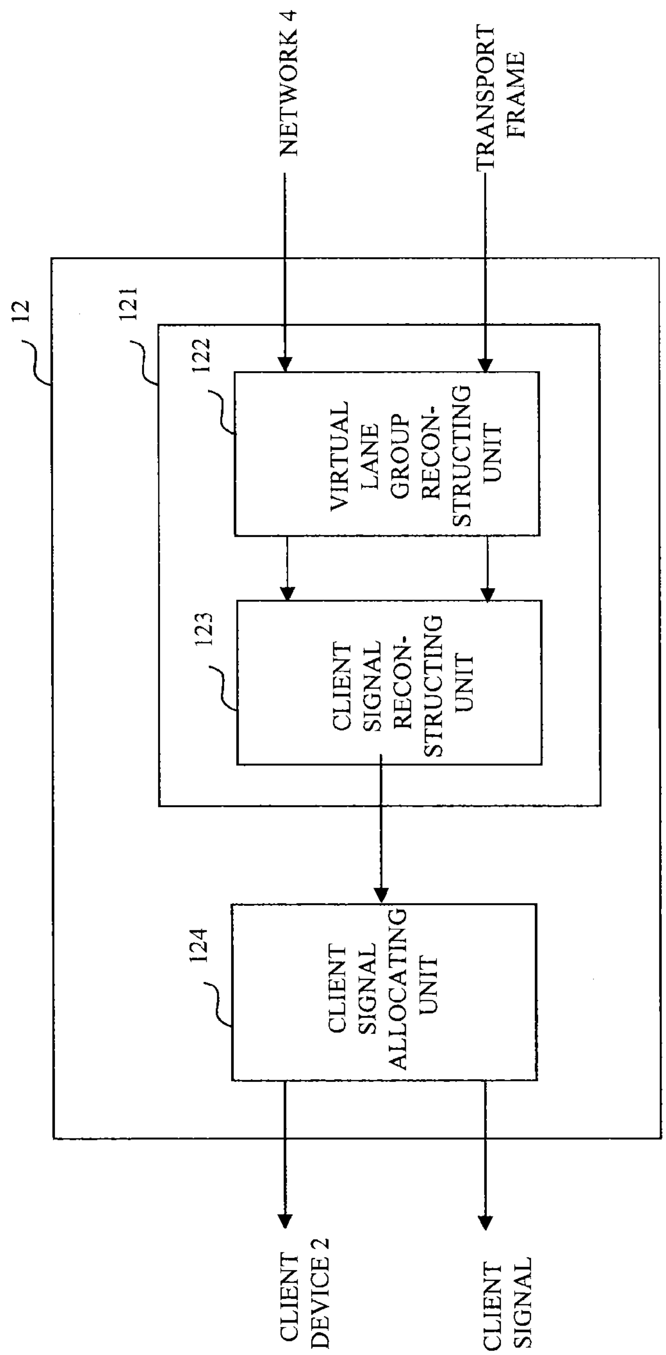

FIG. 2-4 is a diagram illustrating configuration of a multilane transmission device of the present invention.

FIG. 2-5 is a diagram illustrating configuration of a data frame allocating unit of the present invention.

FIG. 2-6 is a diagram illustrating processing of data frame allocation of the present invention.

FIG. 2-7 is a diagram illustrating configuration of a data stream dividing unit of the present invention.

FIG. 2-8 is a diagram illustrating processing of data stream division of the present invention.

FIG. 2-9 is a diagram illustrating configuration of a multilane reception device of the present invention.

FIG. 2-10 is a diagram illustrating configuration of a data frame reconfiguring unit of the present invention.

FIG. 2-11 is a diagram illustrating processing of data frame reconfiguration of the present invention.

FIG. 2-12 is a diagram illustrating processing of data frame multiplexing of the present invention.

Third Invention

FIG. 3-1 is a diagram illustrating an OTN frame structure.

FIG. 3-2 is a diagram illustrating an example of an OTN-MLD (4 lanes) of a related art.

FIG. 3-3 is a diagram illustrating an example of an OTN-MLD (8 lanes) of a related art.

FIG. 3-4 is a diagram illustrating an example of multilane distribution (8 lanes) of the present invention.

Figures 1, 2, 3, 4, 5:
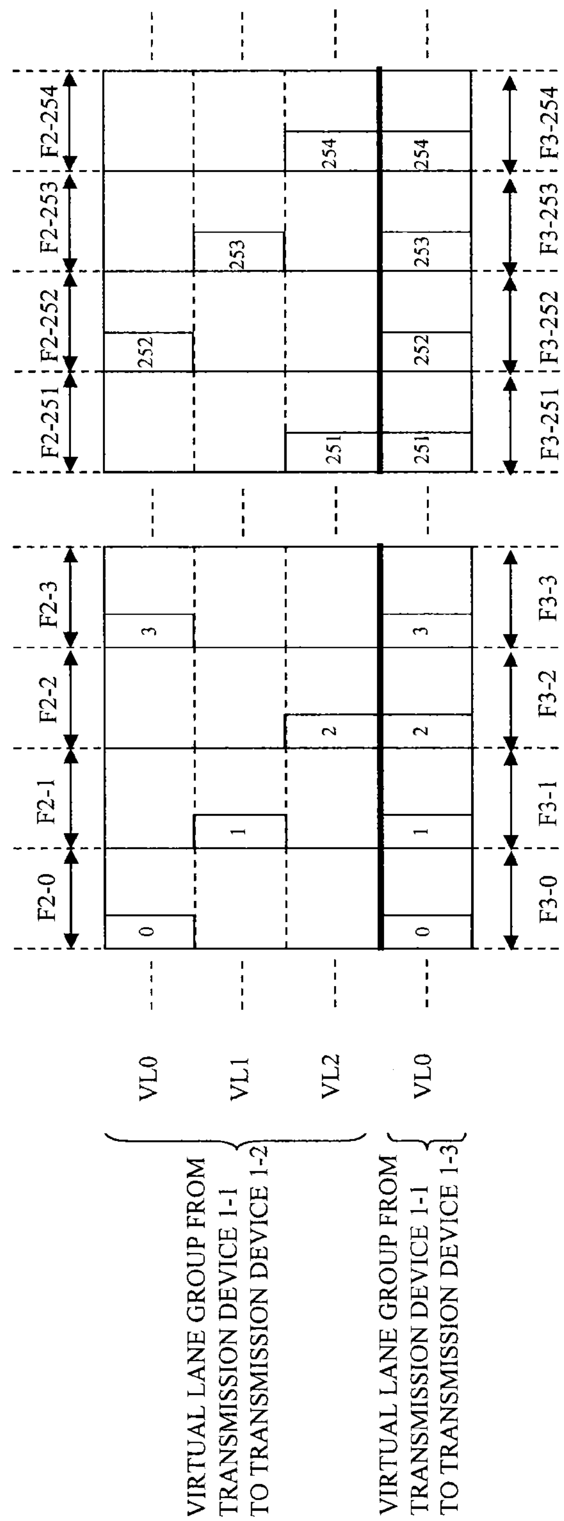

FIG. 3-5 is a diagram illustrating another example of multilane distribution (8 lanes) of the present invention.

FIG. 3-6 is a diagram illustrating configuration of a transmitting unit of a multilane transmission device of the present invention.

FIG. 3-7 is a diagram illustrating a position of an LLM used in a multilane transmission device of the present invention.

FIG. 3-8 is a flowchart illustrating a method of deciding a value of an LLM in an OH processing unit of a transmitting unit of a multilane transmission device in a first embodiment of the present invention.

FIG. 3-9 is a flowchart illustrating a method of deciding a lane number in a lane number deciding unit of a transmitting unit of a multilane transmission device in the first embodiment of the present invention.

FIG. 3-10 is a diagram illustrating configuration of a receiving unit of a multilane transmission device of the present invention.

FIG. 3-11(*a*) is a diagram illustrating an example of a state before delay difference compensation in a lane identifying & delay difference compensating unit of a receiving unit of a multilane transmission device of the present invention.

FIG. 3-11(*b*) is a diagram illustrating an example of a state after delay difference compensation in a lane identifying & delay difference compensating unit of a receiving unit of a multilane transmission device of the present invention.

FIG. 3-12 is a diagram illustrating a position of an LLM when 2 bytes are used for an LLM in the present invention.

FIG. 3-13 is a flowchart illustrating a method of deciding a value of an LLM in an OH processing unit of a transmitting unit of a multilane transmission device in a second embodiment of the present invention.

FIG. 3-14 is a flowchart illustrating a method of deciding a lane number in a lane number deciding unit of a transmitting unit of a multilane transmission device in the second embodiment of the present invention.

Fourth Invention

FIG. 4-1 is a diagram illustrating an OTN frame structure.

FIG. 4-2 is a diagram illustrating a relation between an OPUk-Xv and an OPUk in a VCAT.

FIG. 4-3 is a diagram illustrating configuration of a VCOH and the PSI used in a VCAT.

FIG. 4-4 is a diagram illustrating a relation between OPU4-1+5-2ve and OPU4 and OPU5 in an extended VCAT of the present invention.

FIG. 4-5 is a diagram illustrating arrangement and configuration of a VCOH and the PSI used in an extended VCAT in first and second embodiments of the present invention.

Figures 1, 2, 3, 4, 5, 6:
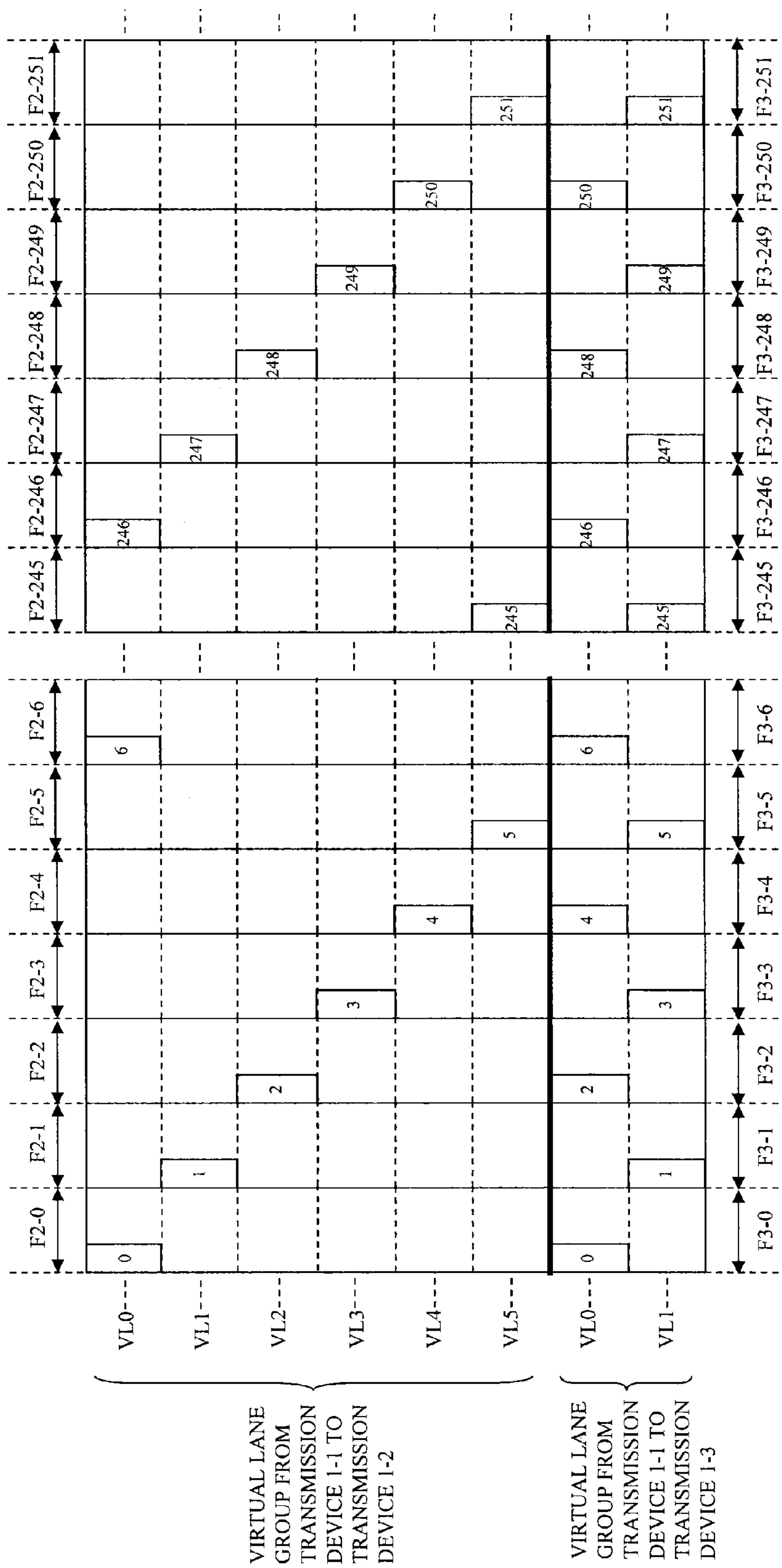

FIG. 4-6 is a diagram illustrating an OH of an extended VCAT in a third embodiment of the present invention.

FIG. 4-7 is a diagram illustrating network configuration envisaged in first to fifth embodiments of the present invention.

FIG. 4-8 is a diagram illustrating configuration of a transmission side of a multilane optical transport system in the first and third embodiments of the present invention.

FIG. 4-9 is a diagram illustrating configuration of an extended ODU in the first to third embodiments of the present invention.

FIG. 4-10 is a diagram illustrating configuration of a reception side of the multilane optical transport system in the first and third embodiments of the present invention.

FIG. 4-11 is a diagram illustrating configuration of a transmission side of the multilane optical transport system in the second embodiment of the present invention.

FIG. 4-12 is a diagram illustrating configuration of a reception side of the multilane optical transport system in the second embodiment of the present invention.

FIG. 4-13 is a diagram illustrating a relation between an OPUfn-Y and an OPUfn in an OTUflex of the present invention.

FIG. 4-14 is a diagram illustrating configuration of an MCOH and the PSI used in an OTUflex in the fourth embodiment of the present invention.

FIG. 4-15 is a diagram illustrating configuration of an MCOH and the PSI used in an OTUflex in the fifth embodiment of the present invention.

FIG. 4-16(*a*) is a diagram illustrating arrangement of an MLOH used in an OTUflex when an MLOH is arranged in a head of an OPUfn OH in the fourth and fifth embodiments of the present invention.

FIG. 4-16(*b*) is a diagram illustrating arrangement of an MLOH used in an OTUflex when an MLOH is arranged in a spare region of an OTUfn OH in the fourth and fifth embodiments of the present invention.

FIG. 4-16(*c*) is a diagram illustrating arrangement of an MLOH used in an OTUflex when an MLOH is arranged in a $1^{th}$ byte of an FA OH in the fourth and fifth embodiments of the present invention.

FIG. 4-17 is a diagram illustrating configuration of a transmission side of the multilane optical transport system in the fourth and fifth embodiments of the present invention.

FIG. 4-18(*a*) is a diagram illustrating configuration of an extended ODU when an MLOH is arranged in a head of an OPUfn OH in the fourth and fifth embodiments of the present invention.

FIG. 4-18(*b*) is a diagram illustrating configuration of an extended ODU when an MLOH is arranged in a spare region of an OTUfn OH in the fourth and fifth embodiments of the present invention.

FIG. 4-18(*c*) is a diagram illustrating configuration of an extended ODU when an MLOH is arranged in a $1^{th}$ byte of an FA OH in the fourth and fifth embodiments of the present invention.

FIG. 4-19 is a diagram illustrating a way of multilane distribution in the fourth and fifth embodiments of the present invention.

FIG. 4-20 is a diagram illustrating a way of a case in which the number of data blocks is indivisible by the number of lanes in multilane distribution in the fourth and fifth embodiments of the present invention.

FIG. 4-21 is a diagram illustrating configuration of a reception side of the multilane optical transport system in the fourth and fifth embodiments of the present invention.

FIG. 4-22 is a diagram illustrating descrambling of an MLOH in an MLOH detecting unit in the fourth and fifth embodiments of the present invention.

FIG. 4-23 is a diagram illustrating compensation for a delay time difference between lanes in a multilane combiner in the fourth and fifth embodiments of the present invention.

FIG. 4-24 is a table illustrating a setting of a data flow at a transmission side in the first and fifth embodiments of the present invention.

FIG. 4-25 is a table illustrating main items of a VCOH and the PSI at the transmission side in the first embodiment of the present invention.

FIG. 4-26 is a table illustrating main items of a VCOH and the PSI at the transmission side in the second embodiment of the present invention.

FIG. 4-27 is a table illustrating main items of a VCOH and the PSI at the transmission side in the third embodiment of the present invention.

FIG. 4-28 is a table illustrating main items of a VCOH and the PSI at the reception side in the first embodiment of the present invention.

FIG. 4-29 is a table illustrating main items of a VCOH and the PSI at the reception side in the second embodiment of the present invention.

FIG. 4-30 is a table illustrating main items of a VCOH and the PSI at the reception side in the third embodiment of the present invention.

FIG. 4-31 is a table illustrating a delay time difference measured in a deframer in the first and third embodiments of the present invention.

FIG. 4-32 is a table illustrating a delay time difference measured in a deframer in the second embodiment of the present invention.

FIG. 4-33 is a table illustrating a setting of a data flow at the reception side in the first to fifth embodiments of the present invention.

FIG. 4-34 is a table illustrating main items of an MLOH and the PSI at the transmission side in the fourth embodiment of the present invention.

FIG. 4-35 is a table illustrating main items of an MLOH and the PSI at the transmission side in the fifth embodiment of the present invention.

FIG. 4-36 is a table illustrating main items of an MLOH and the PSI at the reception side in the fourth embodiment of the present invention.

FIG. 4-37 is a table illustrating main items of an MLOH and the PSI at the reception side in the fifth embodiment of the present invention.

FIG. 4-38 is a diagram illustrating another example of an OH of an extended VCAT in the first embodiment and the second embodiment of the present invention.

FIG. 4-39 is a diagram illustrating another example of an OH of an extended VCAT in the first embodiment and the second embodiment of the present invention.

FIG. 4-40 is a diagram illustrating another example of an OH of an extended VCAT in the third embodiment of the present invention.

FIG. 4-41 is a diagram illustrating another example of an OH of an extended VCAT in the third embodiment of the present invention.

FIG. 4-42 is a diagram illustrating another example of configuration of an MLOH used in an OTUflex in the fourth embodiment of the present invention FIG. 4-43 is a diagram illustrating another example of configuration of an MLOH used in an OTUflex in the fourth embodiment of the present invention.

FIG. 4-44 is a diagram illustrating another example of configuration of an MLOH used in an OTUflex in the fifth embodiment of the present invention.

FIG. 4-45 is a diagram illustrating another example of configuration of an MLOH used in an OTUflex in the fifth embodiment of the present invention.

Fifth Invention

FIG. 5-1 is a diagram illustrating an OTN frame structure.

FIG. 5-2 is a diagram illustrating an example of an OTN-MLD (4 lanes).

FIG. 5-3 is a diagram illustrating configuration of a transmitting unit of a multilane transmission device using an OTN-MLD.

FIG. 5-4 is a diagram illustrating configuration of a receiving unit of a multilane transmission device using an OTN-MLD.

FIG. 5-5 is a diagram illustrating configuration of a lane identifying & delay difference compensating unit in a receiving unit of a multilane transmission device using an OTN-MLD.

FIG. 5-6(*a*) is a diagram illustrating an example of a state (4 lanes) before delay compensation in an OTN-MLD.

FIG. 5-6(*b*) is a diagram illustrating an example of a state (4 lanes) after delay compensation in an OTN-MLD.

Figures 1, 2, 3, 4, 5, 6, 7:
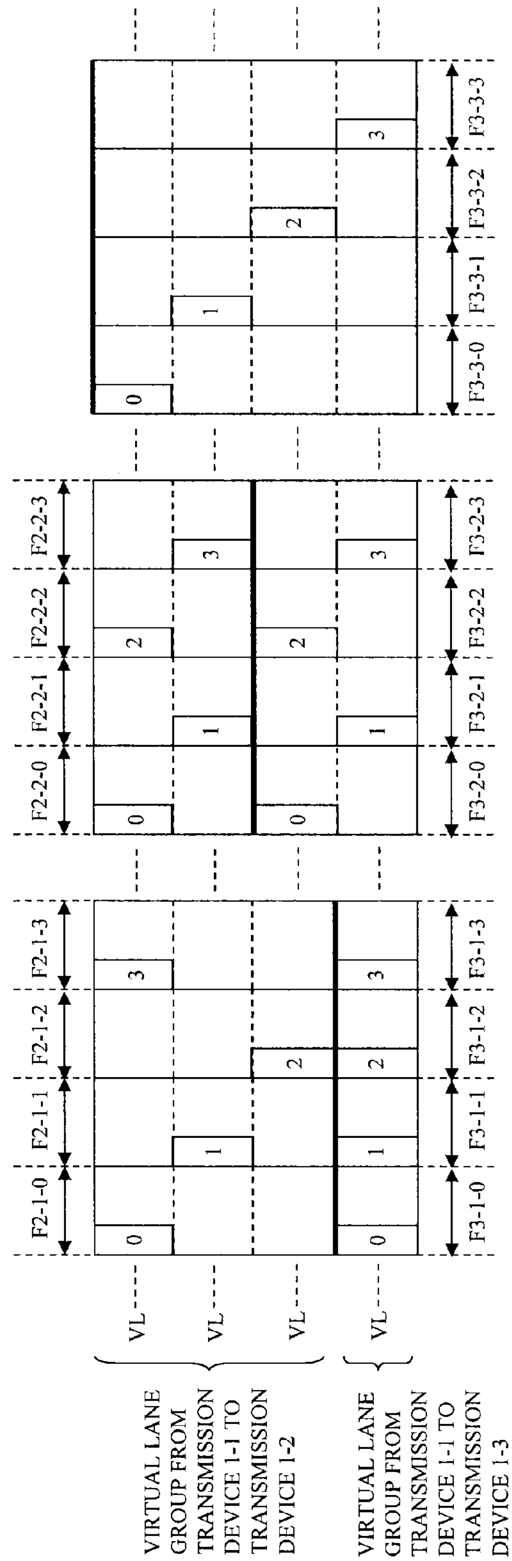

FIG. 5-7 is a diagram illustrating operation of increasing a bandwidth in an OTN-MLD of a related art.

FIG. 5-8 is a diagram illustrating operation of increasing a bandwidth in an OTN-MLD according to the present invention.

FIG. 5-9(*a*) is a diagram illustrating an example of arrangement of an RCOH according to the present invention.

FIG. 5-9(*b*) is a diagram illustrating an example of allocation of an LNUM in an RCOH according to the present invention.

FIG. 5-10 is a diagram illustrating a procedure of increasing a bandwidth by using an RCOH of the present invention.

FIG. 5-11 is a diagram illustrating a procedure of decreasing a bandwidth by using an RCOH of the present invention.

FIG. 5-12 is a diagram illustrating another example of arrangement of an RCOH according to the present invention.

Sixth Invention

FIG. 6-1 is a diagram illustrating an OTN frame structure.

FIG. 6-2 is a diagram illustrating the SM OH and a position of the BIP-8 of performing quality monitoring of a section monitoring zone.

FIG. 6-3 is a diagram illustrating a calculation and insertion of the BIP-8 in the SM OH.

FIG. 6-4 is a diagram illustrating the PM OH and a position of the BIP-8 of performing quality monitoring of a path monitoring zone.

FIG. 6-5 is a diagram illustrating a calculation and insertion of the BIP-8 in the PM OH.

FIG. 6-6 (*a*) is a diagram illustrating byte interleaving before FEC coding.

FIG. 6-6(*b*) is a diagram illustrating a positional relation of each byte in FEC coding.

FIG. 6-6(*c*) is a diagram illustrating deinterleaving after FEC coding.

FIG. 6-7 is a table illustrating a part of correspondence of an element of an extension field GF ($2^8$) and an 8-bit symbol.

Figures 1, 2, 3, 4, 5, 6, 7, 8:
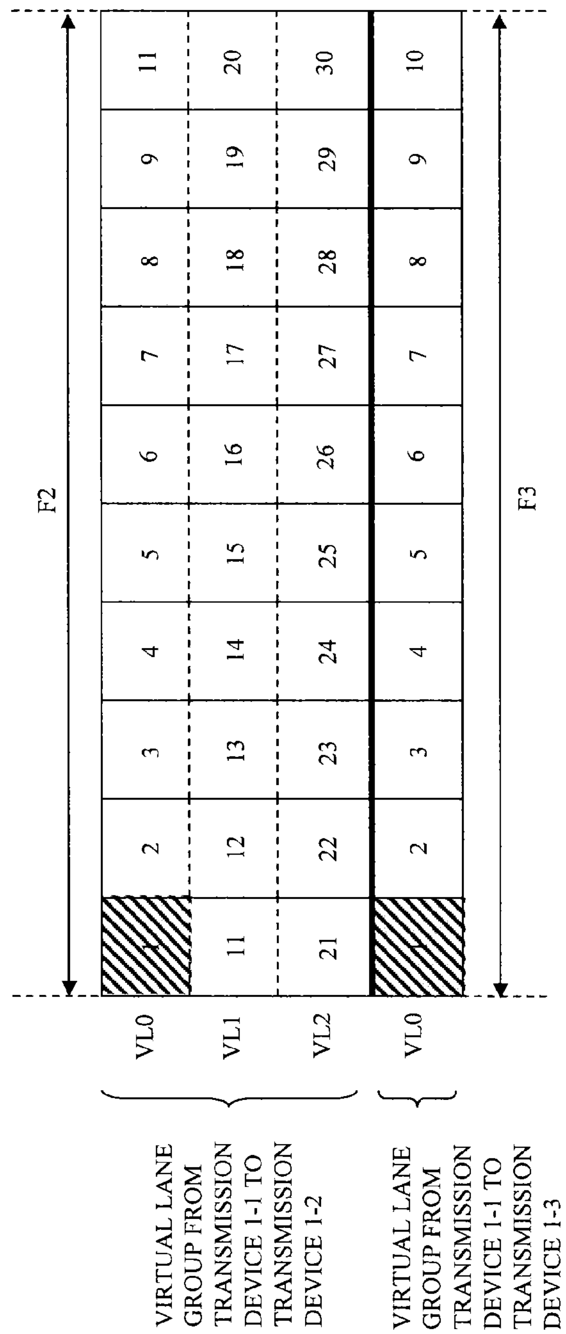

FIG. 6-8(*a*) is a diagram illustrating byte interleaving before FEC decoding.

FIG. 6-8(*b*) is a diagram illustrating deinterleaving after FEC decoding.

FIG. 6-9 is a diagram illustrating a relation between a position of a 16-byte data block and a lane in an OTN-MLD.

FIG. 6-10 is a diagram illustrating configuration of a receiving unit of a multilane transmission device using a multilane monitoring scheme of the present invention.

FIG. 6-11 is a diagram illustrating configuration of an FEC decoding unit in a receiving unit of a multilane transmission device using a multilane monitoring scheme of the present invention.

FIG. 6-12 is a diagram illustrating configuration of a sub-row data decoding unit in a receiving unit of a multilane transmission device using a multilane monitoring scheme of the present invention.

FIG. 6-13 is a diagram illustrating second configuration of a sub-row data decoding unit in a receiving unit of a multilane transmission device using a multilane monitoring scheme of the present invention.

FIG. 6-14 is a diagram illustrating third configuration of a sub-row data decoding unit in a receiving unit of a multilane transmission device using a multilane monitoring scheme of the present invention.

Seventh Invention

FIG. 7-1 is a diagram illustrating an OTN frame structure.

FIG. 7-2 is a diagram illustrating an SM OH and a position of the BIP-8 of performing quality monitoring of a section monitoring zone.

FIG. 7-3 is a diagram illustrating a calculation and insertion of the BIP-8 in an SM OH.

FIG. 7-4 is a diagram illustrating a PM OH and a position of the BIP-8 of performing quality monitoring of a path monitoring zone.

FIG. 7-5 is a diagram illustrating a calculation and insertion of the BIP-8 in a PM OH.

FIG. 7-6 is a diagram illustrating a position of an LM OH.

FIG. 7-7 is a diagram illustrating a calculation and insertion of a CRC-8 at transmission side and error detection at a reception side.

FIG. 7-8 is a diagram illustrating a configuration example of a transmission device in a multilane transmission system device using the present invention.

Figures 1, 2:
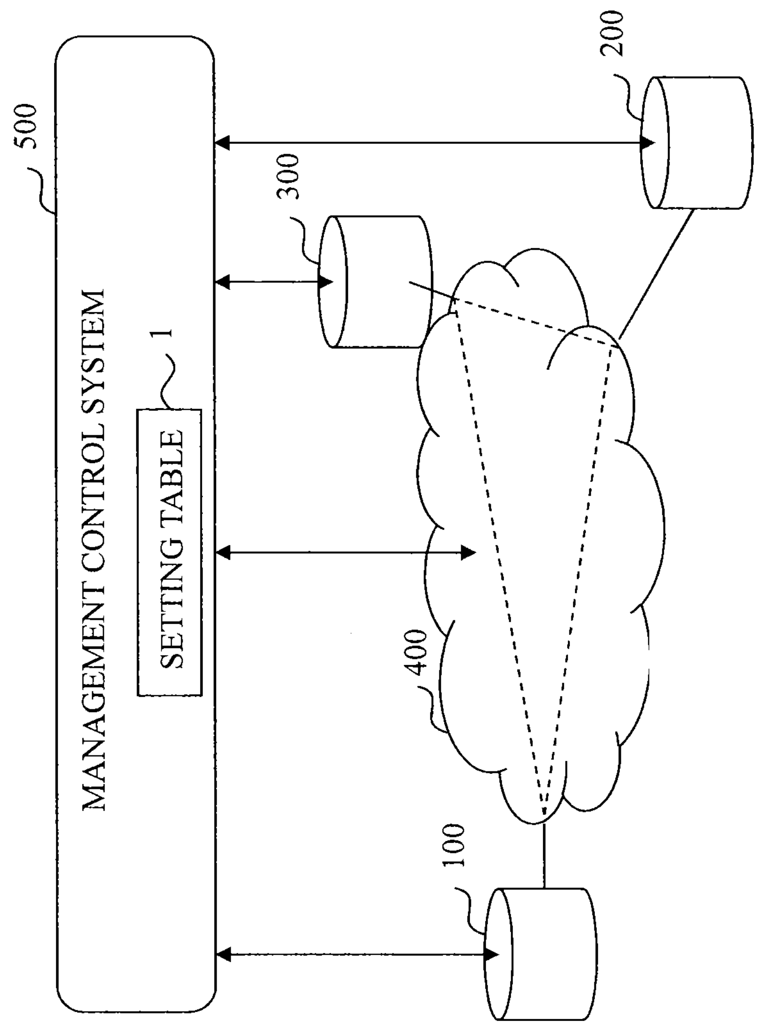
Figure 2:
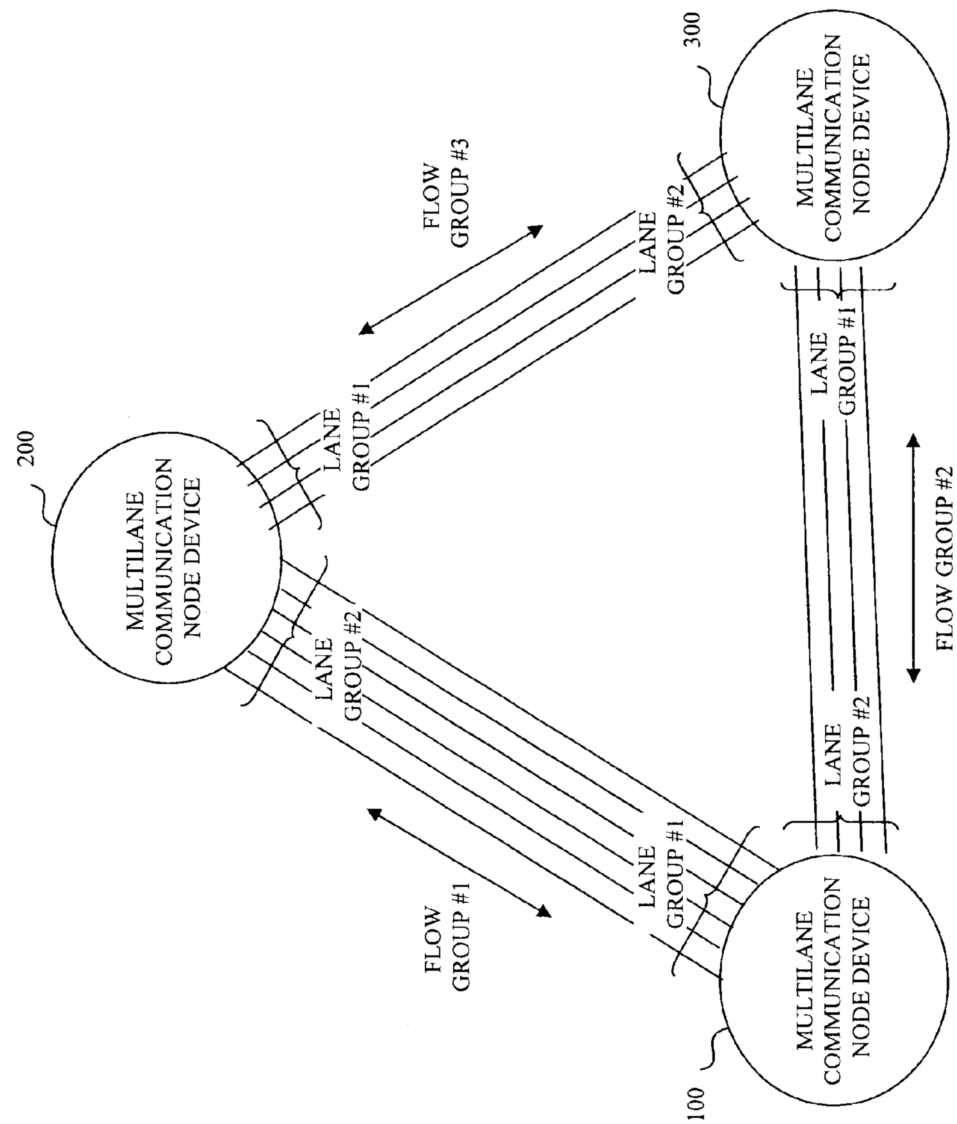
Figures 2, 3, 4:
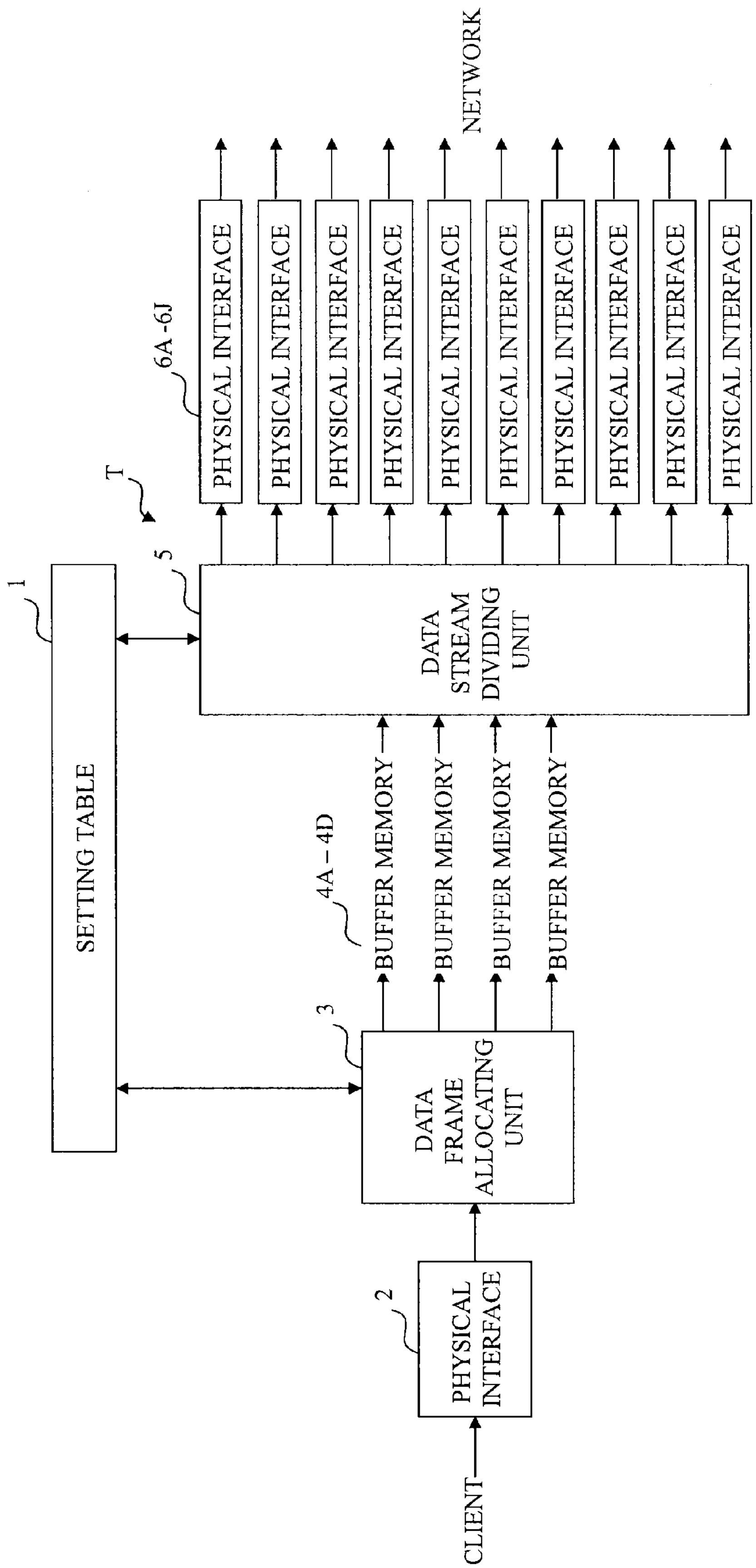
Figures 2, 3, 4, 5:
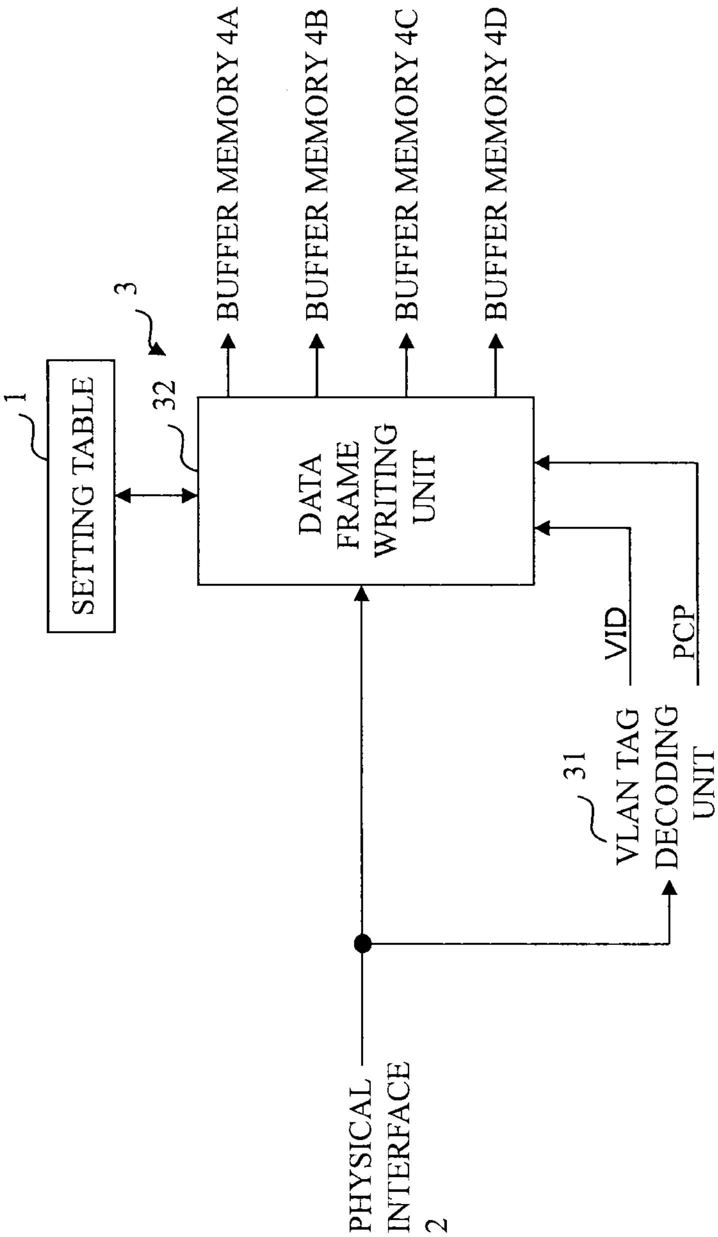
Figures 2, 3, 4, 5, 6:
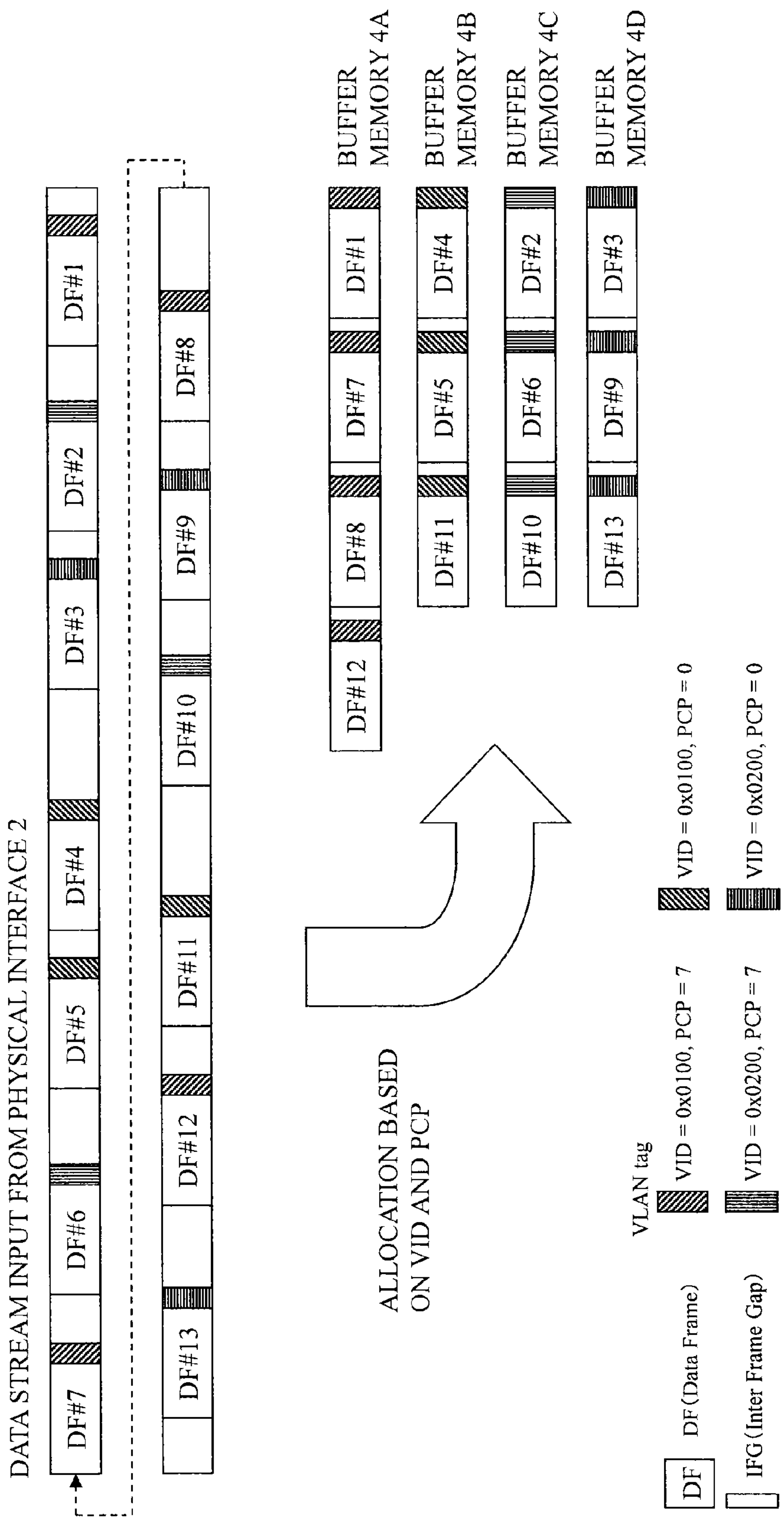
Figures 2, 3, 4, 5, 6, 7:
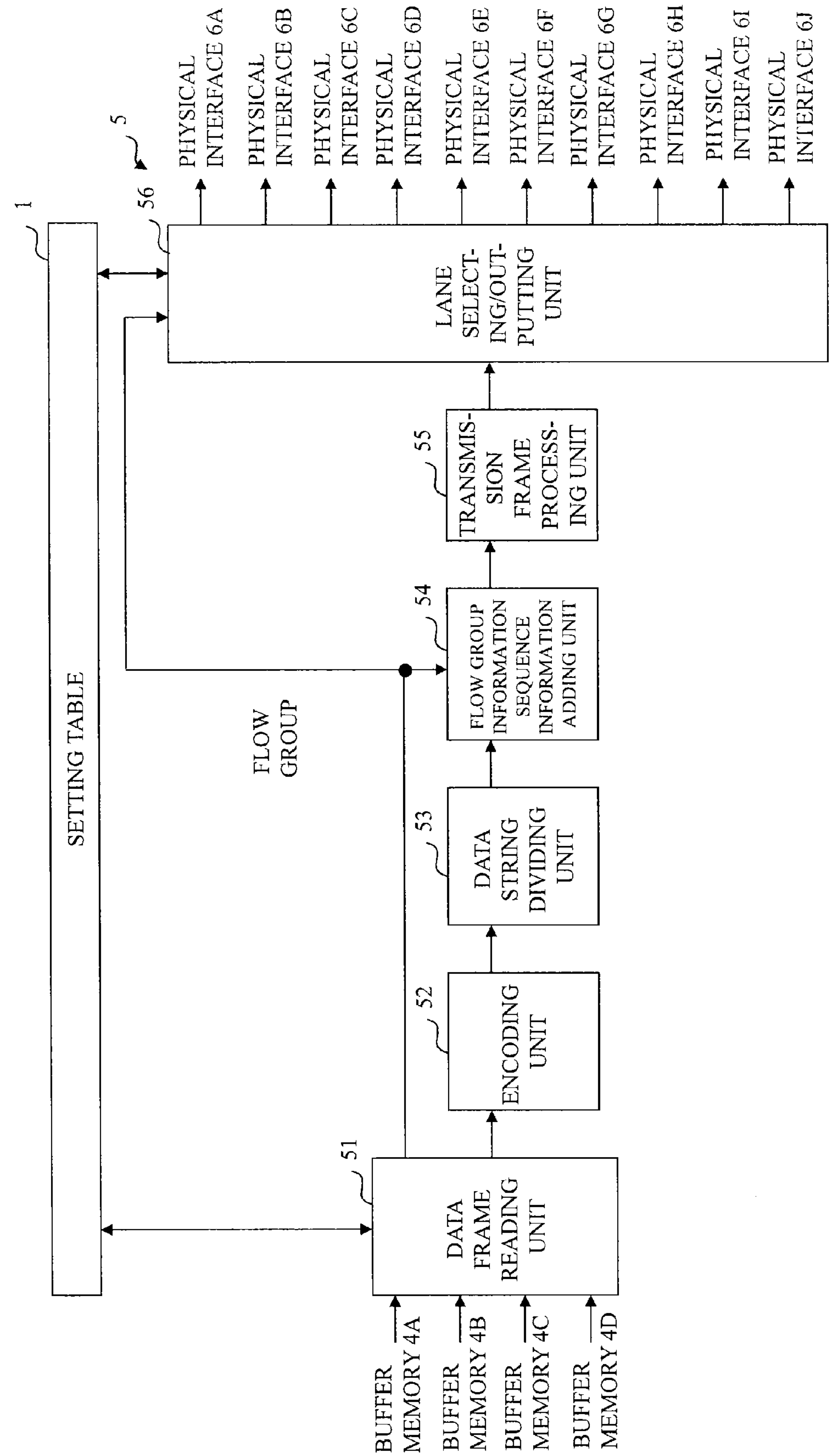
Figures 2, 3, 4, 5, 6, 7, 8:
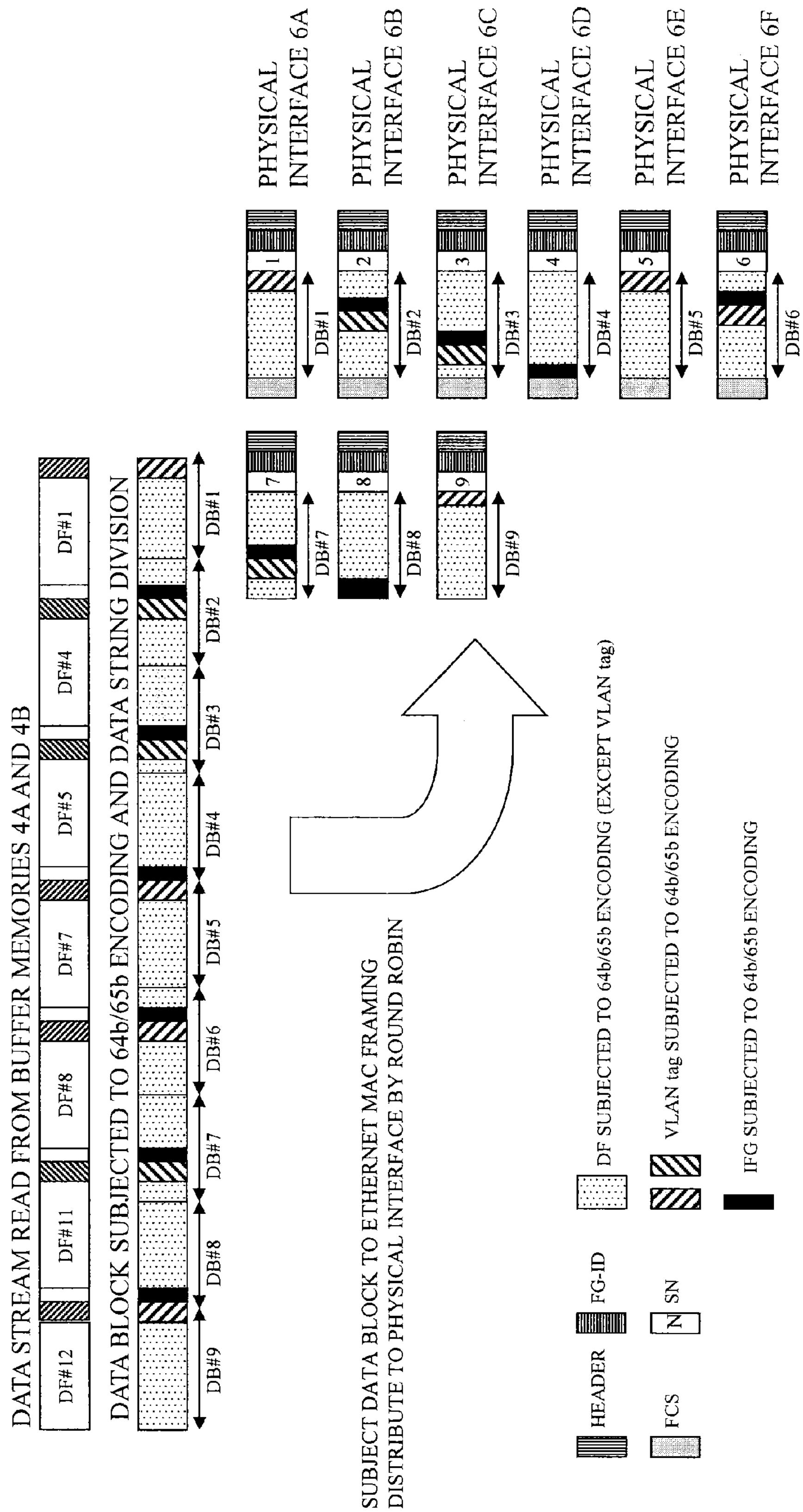
Figures 2, 3, 4, 5, 6, 7, 8, 9:
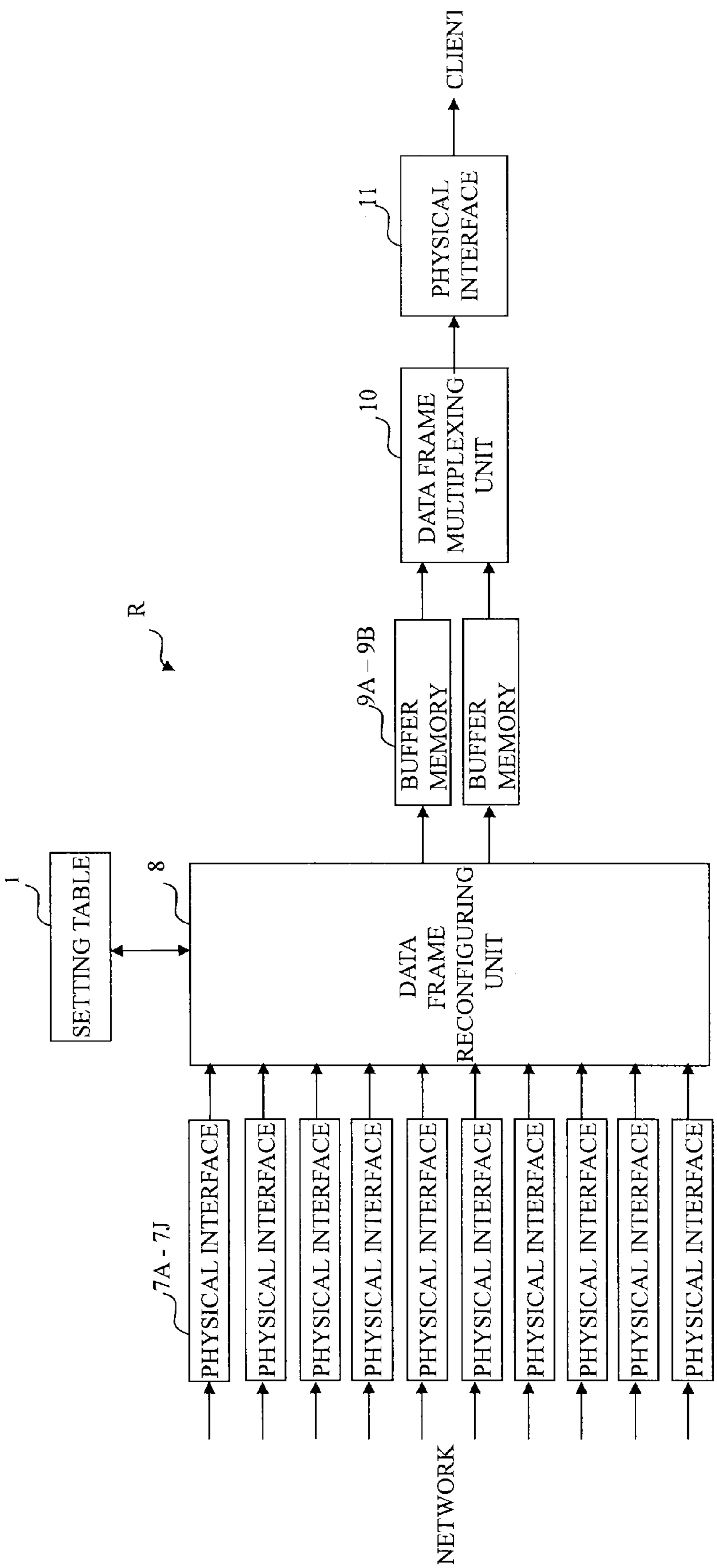

FIG. 7-9 is a diagram illustrating configuration of a lane distributing unit 5.

FIG. 7-10 is a diagram illustrating a configuration example of a reception device in a multilane transmission system device using the present invention.

FIG. 7-11 is a diagram illustrating configuration of an OH decoding unit 11.

FIG. 7-12 is a diagram illustrating an example of operation of a descrambling unit 22.

Eighth Invention

FIG. 8-1 is a diagram illustrating a position of an E-OH in an OTU OH when a fault lane notification is given.

FIG. 8-2 is a diagram illustrating a position of an E-OH in an FA OH when a fault lane notification is given.

FIG. 8-3 is a diagram illustrating an example of a replacement pattern of a head byte in an E-FAS.

FIG. 8-4 is a block diagram illustrating configuration of a multilane transmission device according to a first embodiment of the present invention.

FIG. 8-5 is a diagram illustrating an example of an E-OH format.

FIG. 8-6 is a diagram illustrating E-OH descrambling operation.

FIG. 8-7 is a diagram illustrating a multilane device being performing shrink operation.

FIG. 8-8 is a diagram illustrating an example of an E-OH format according to a second embodiment.

FIG. 8-9 is a diagram illustrating an OTN frame structure.

Figures 2, 3, 4, 5, 6, 7, 8, 9, 10:
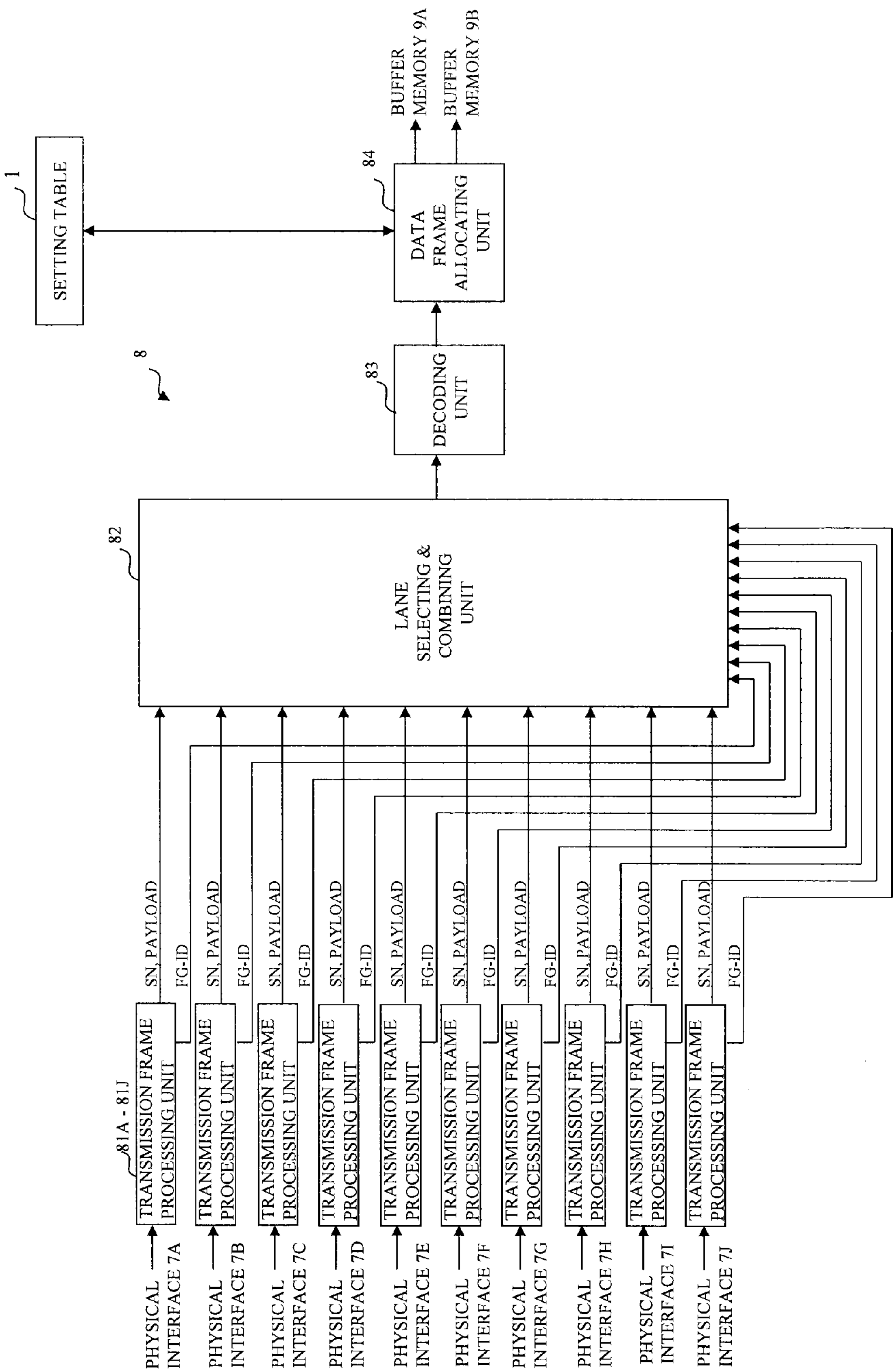

FIG. 8-10 is a diagram illustrating a position of an SM OH in an OTU OH.

Ninth Invention

FIG. 9-1 illustrates an example of a multilane transfer system of the present invention.

FIG. 9-2 is an example of a processing flowchart of a transmission device.

FIG. 9-3 is an example of a processing flowchart of a reception device.

FIG. 9-4 illustrates a configuration example of a multiframe MF.

FIG. 9-5 illustrates an example of a multilane transfer function extension block when the number of virtual lanes is 10.

FIG. 9-6 illustrates an example of a multilane transfer function extension block when the number of virtual lanes is 7.

FIG. 9-7 illustrates an example of the details of a multilane transfer function extension block FIG. 9-8 illustrates an example of the details of a multilane transfer function extension block when 112 or more virtual lanes are used.

FIG. 9-9 illustrates an example of a method of inserting a multilane transfer function extension block when a multiframe is configured.

FIG. 9-10 illustrates an example of a multilane transfer system according to a second embodiment.

Figures 2, 3, 4, 5, 6, 7, 8, 9, 10, 11:
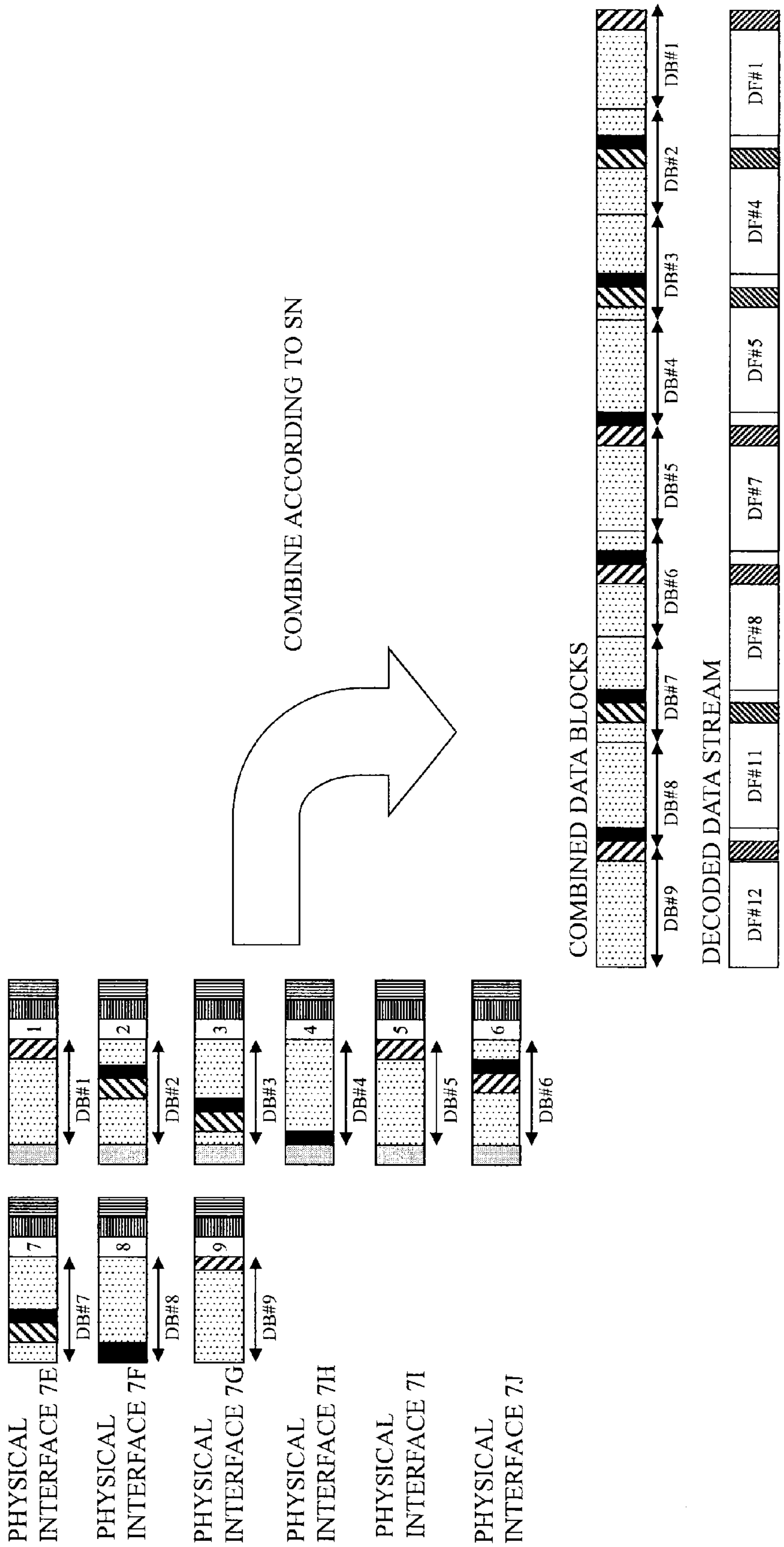
Figures 2, 3, 4, 5, 6, 7, 8, 9, 10, 11, 12:
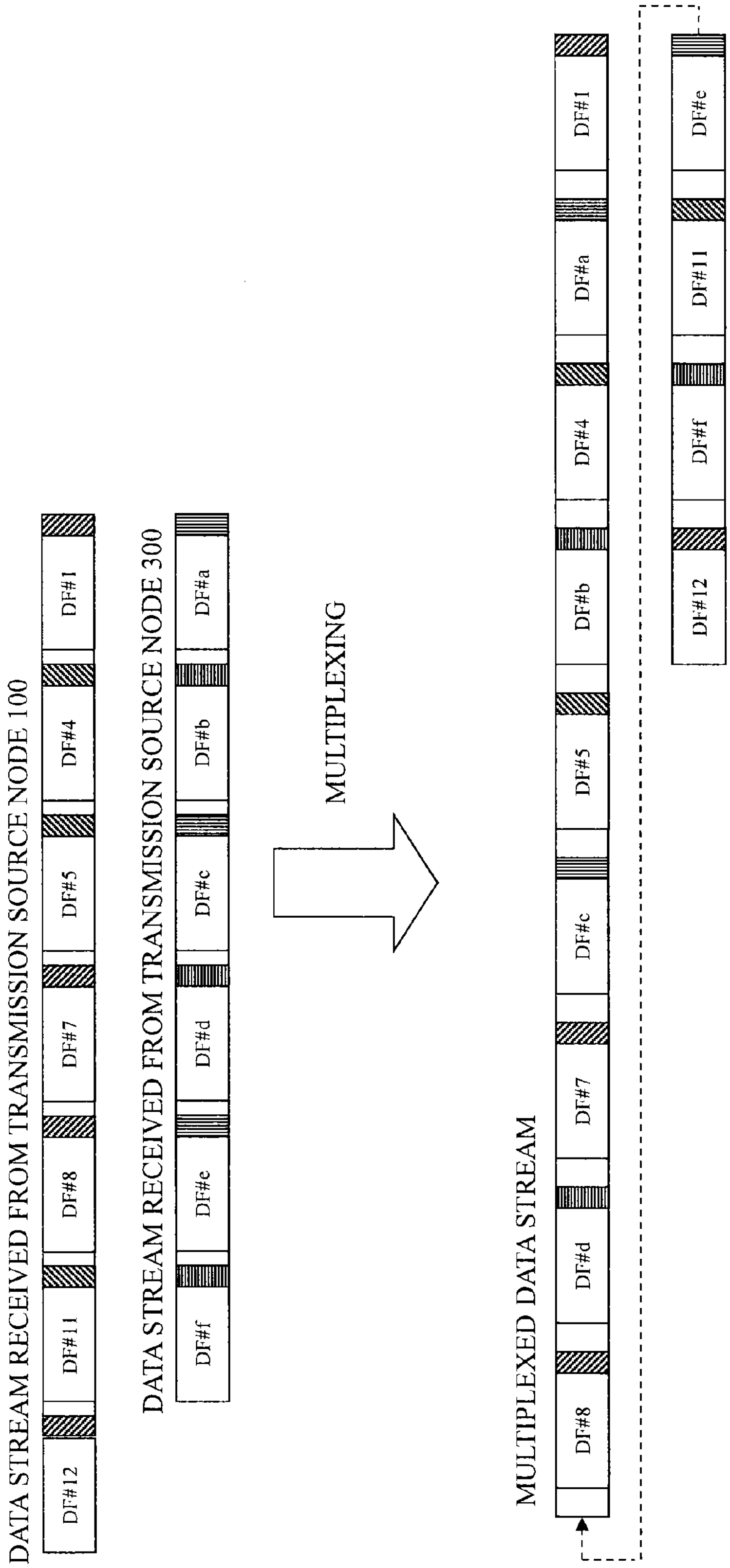
Figures 1, 3:
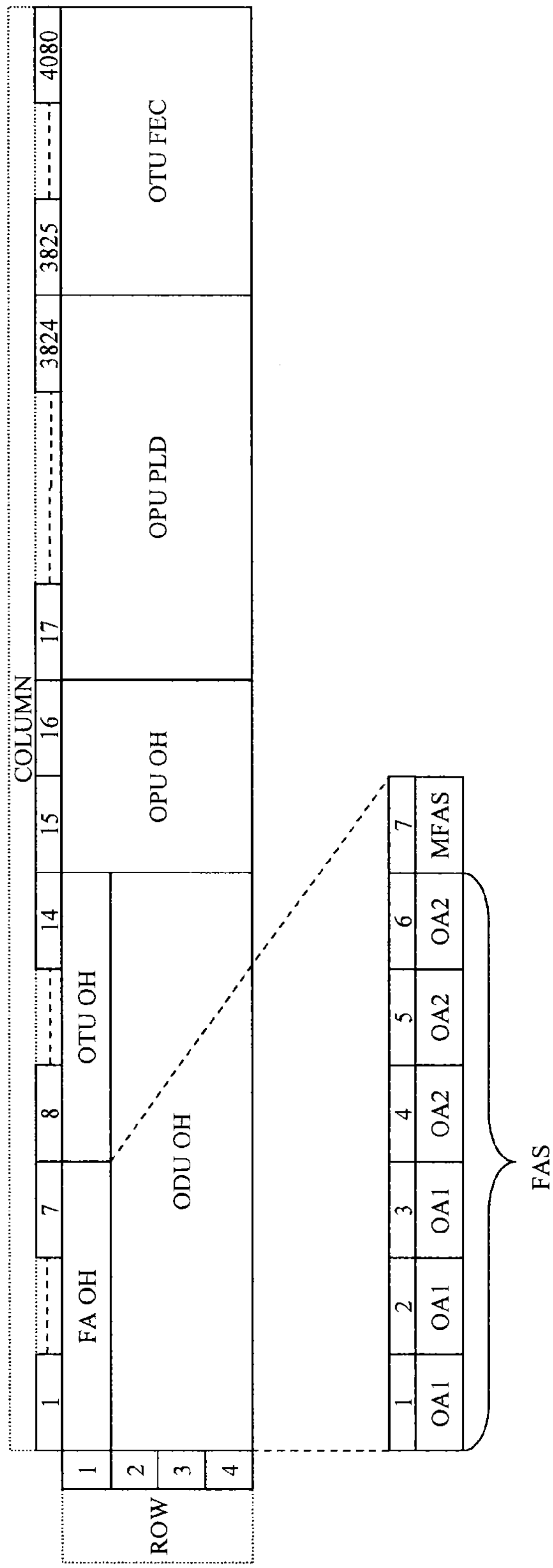
Figures 2, 3:
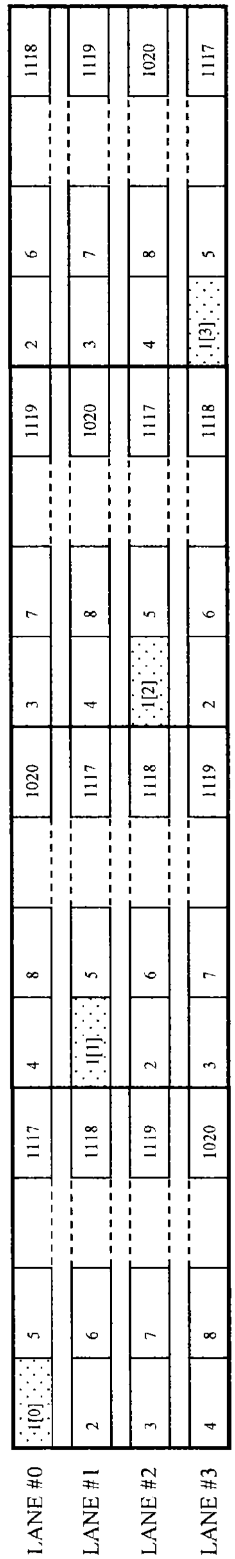
Figure 3:
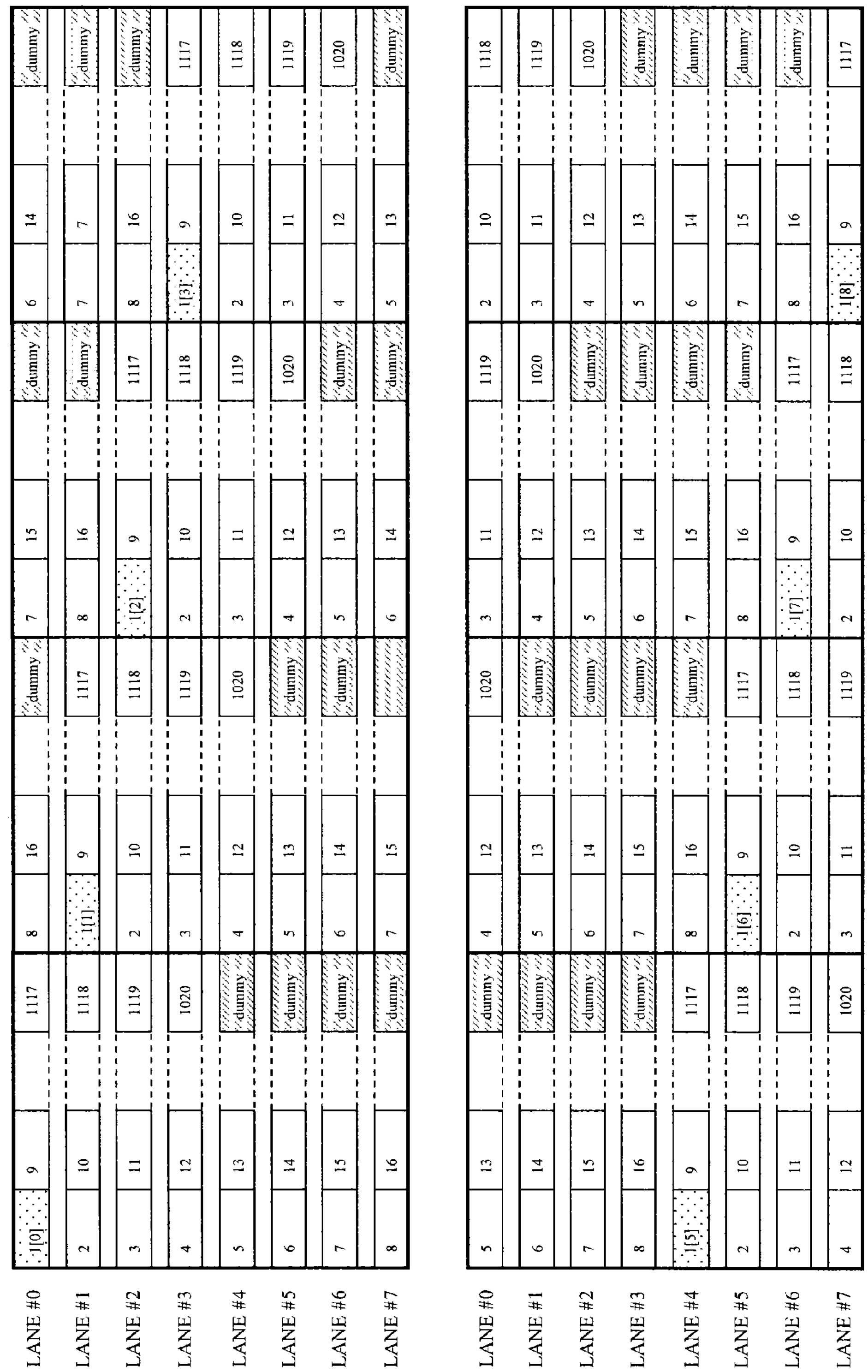
Figures 3, 4:
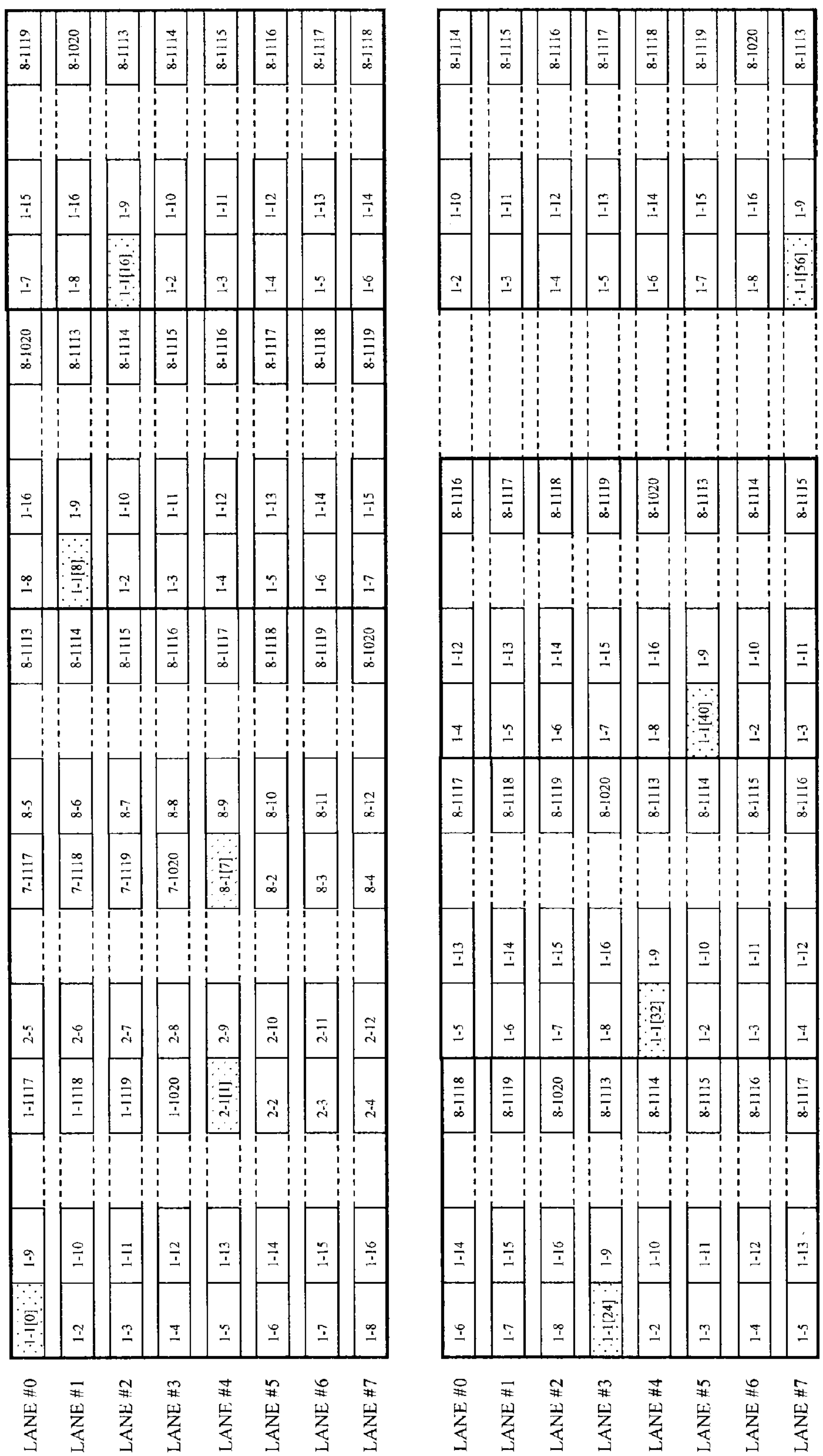
Figures 3, 4, 5:
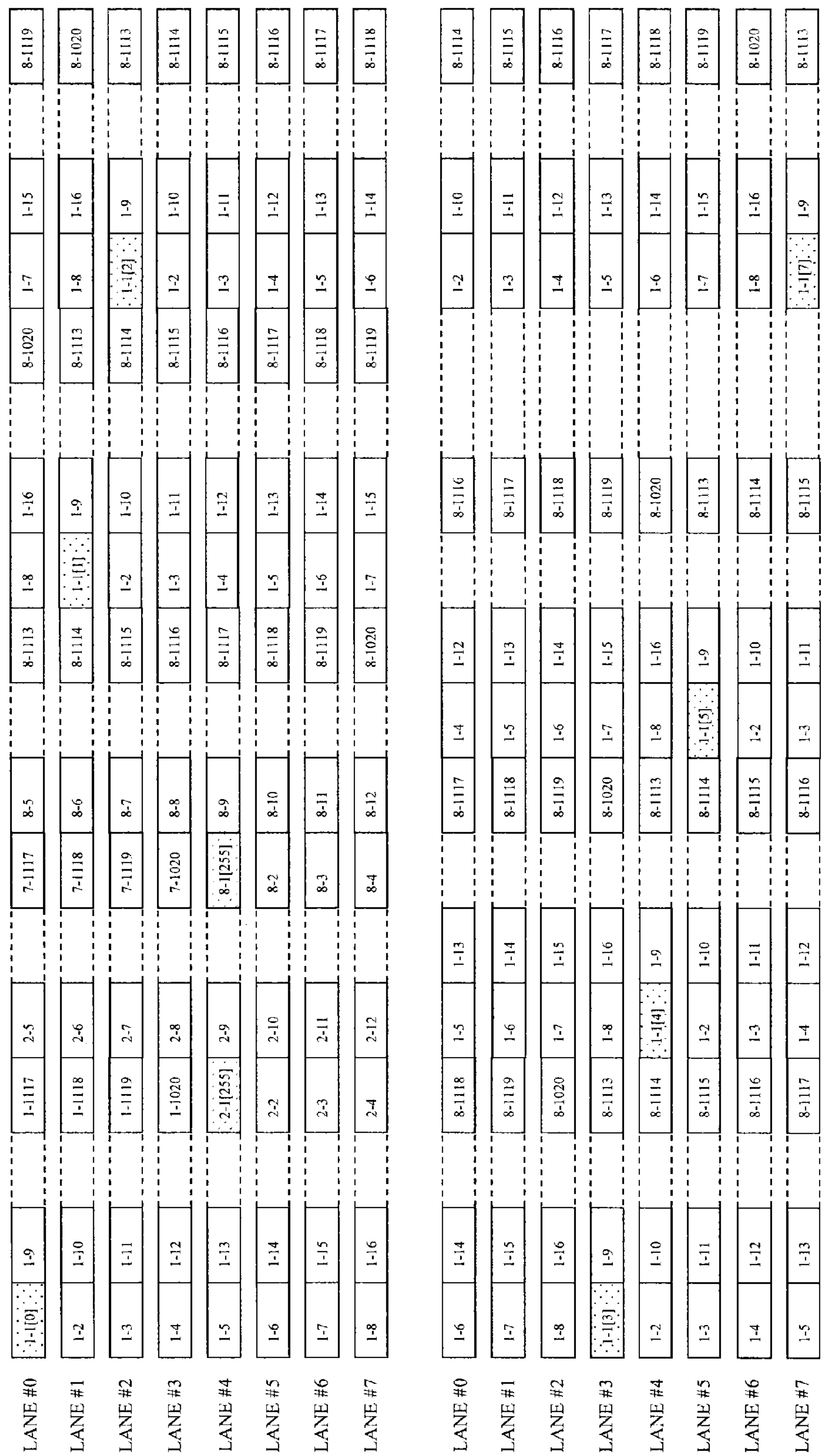
Figures 3, 4, 5, 6:
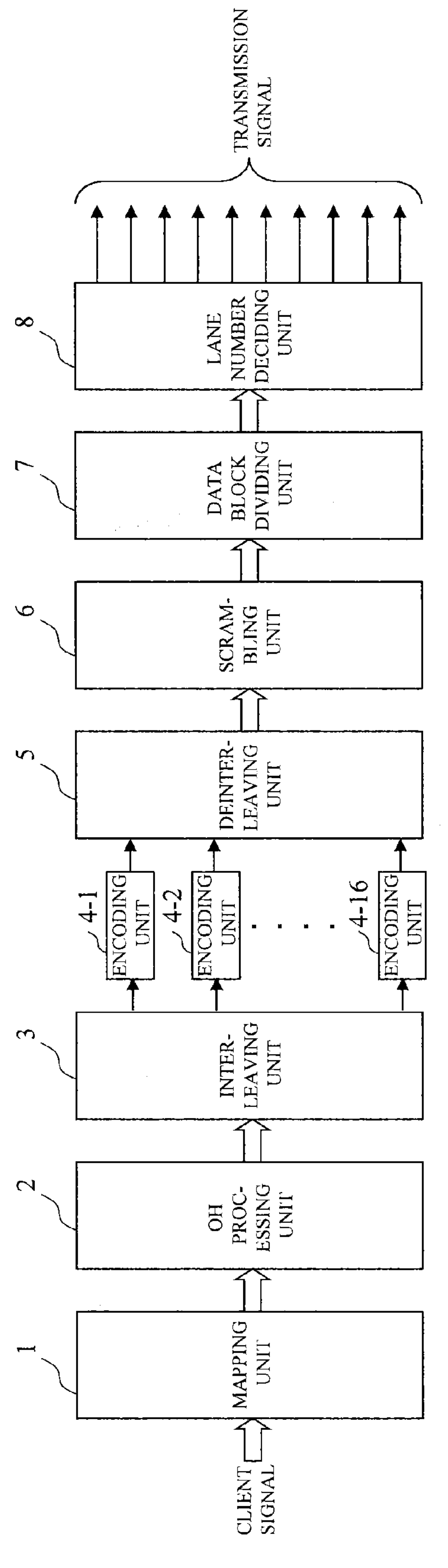
Figures 3, 4, 5, 6, 7:
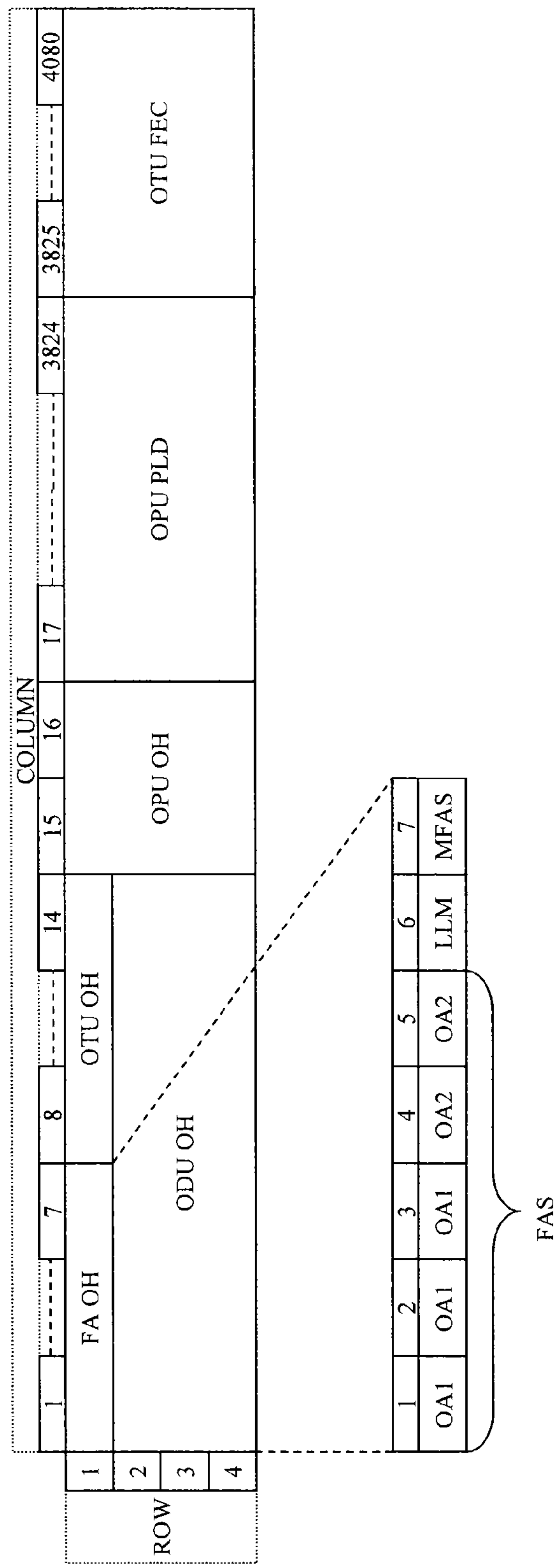
Figures 3, 4, 5, 6, 7, 8:
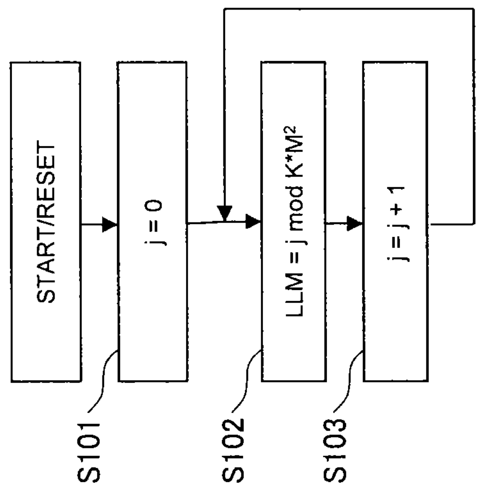
Figures 3, 4, 5, 6, 7, 8, 9:
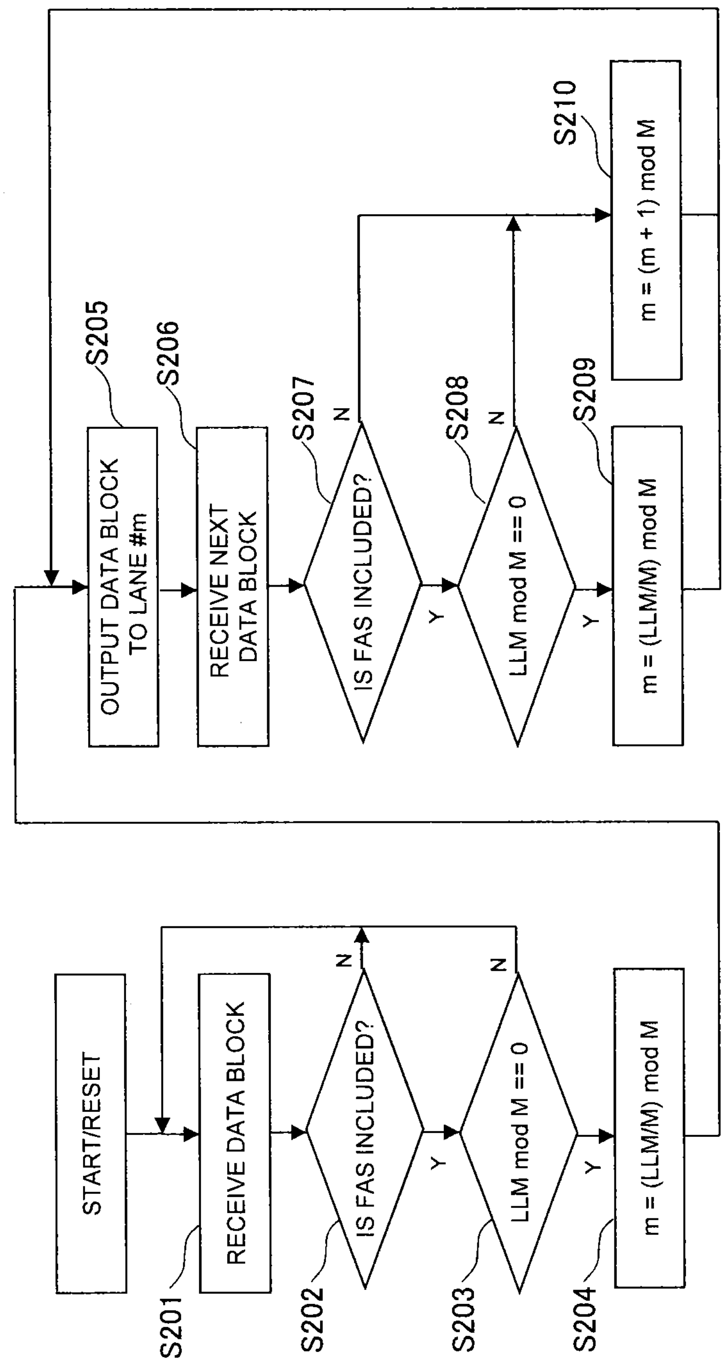
Figures 3, 4, 5, 6, 7, 8, 9, 10:
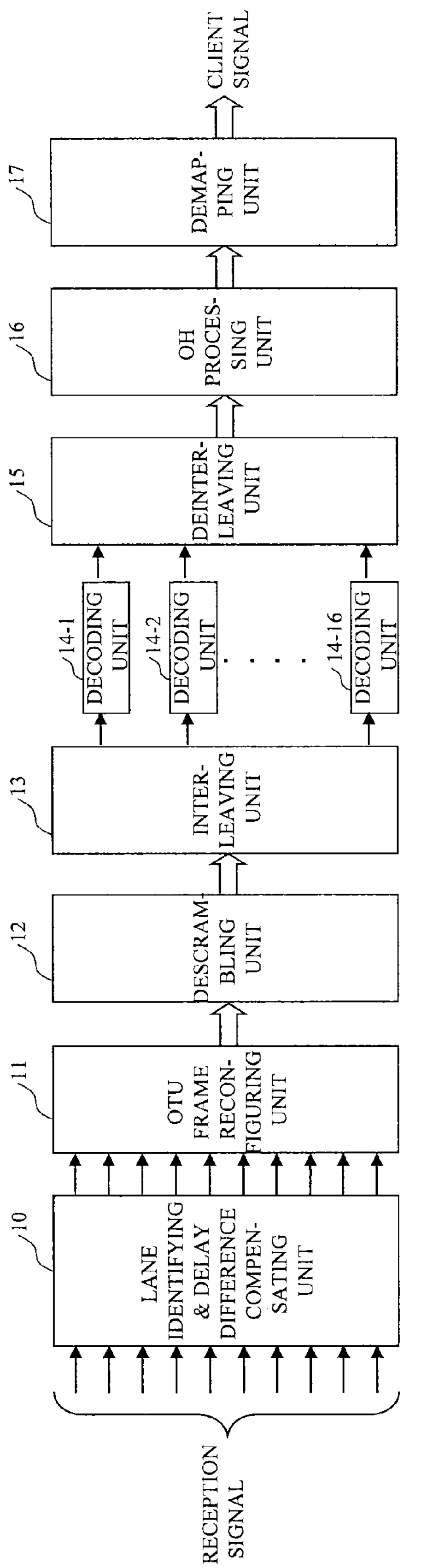
Figures 3, 4, 5, 6, 7, 8, 9, 10, 11, 11A:
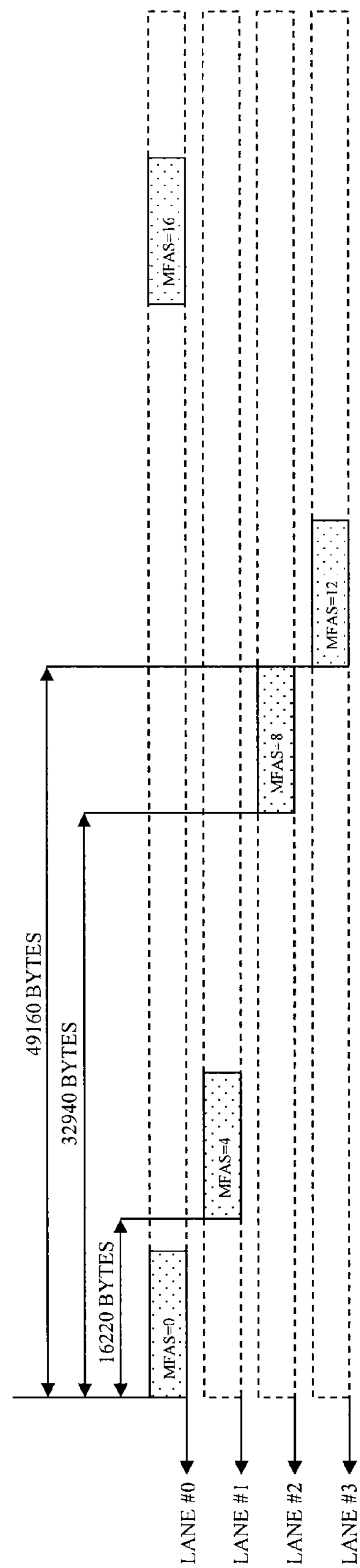
Figures 3, 4, 5, 6, 7, 8, 9, 10, 11, 11B:
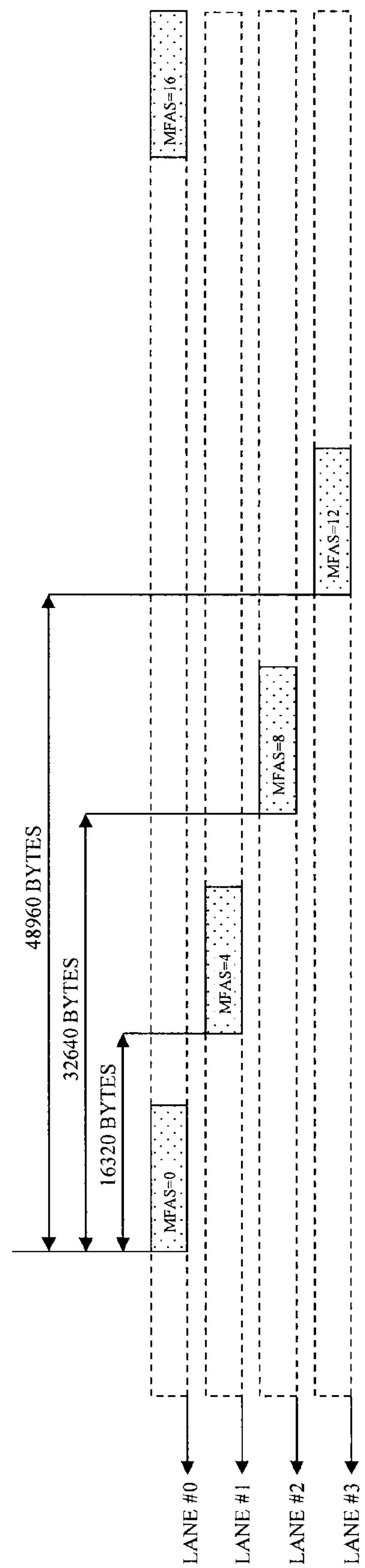
Figures 3, 4, 5, 6, 7, 8, 9, 10, 11, 12:
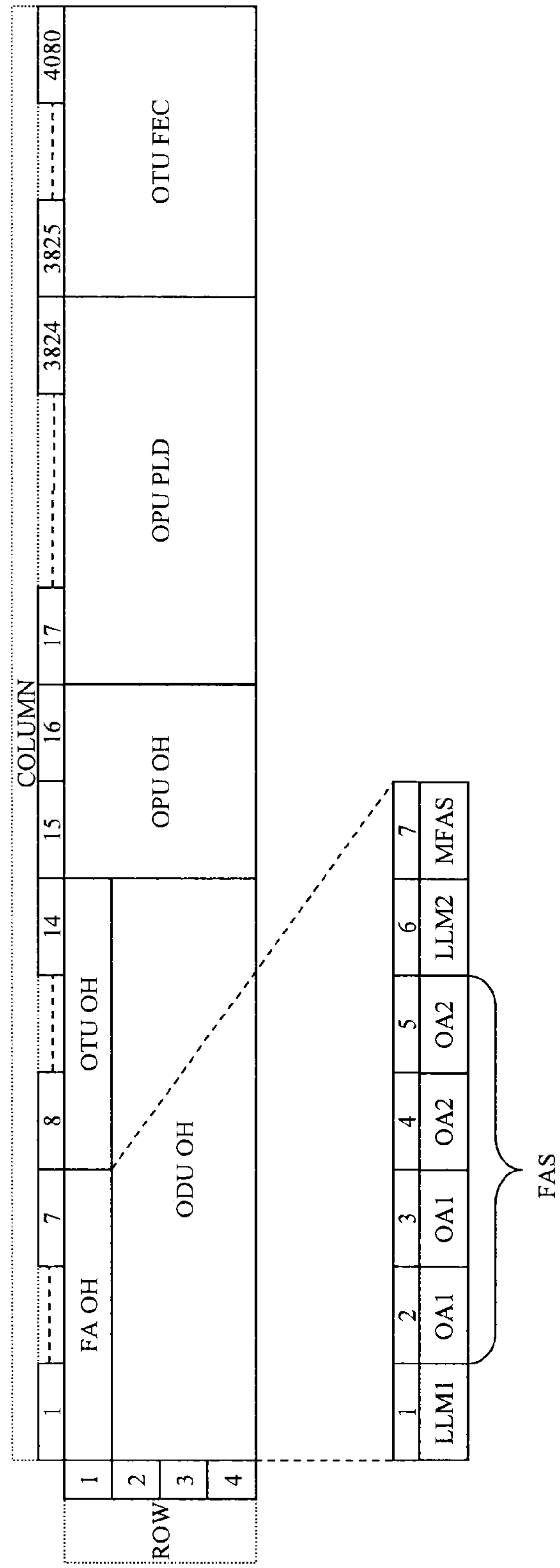
Figures 3, 4, 5, 6, 7, 8, 9, 10, 11, 12, 13:
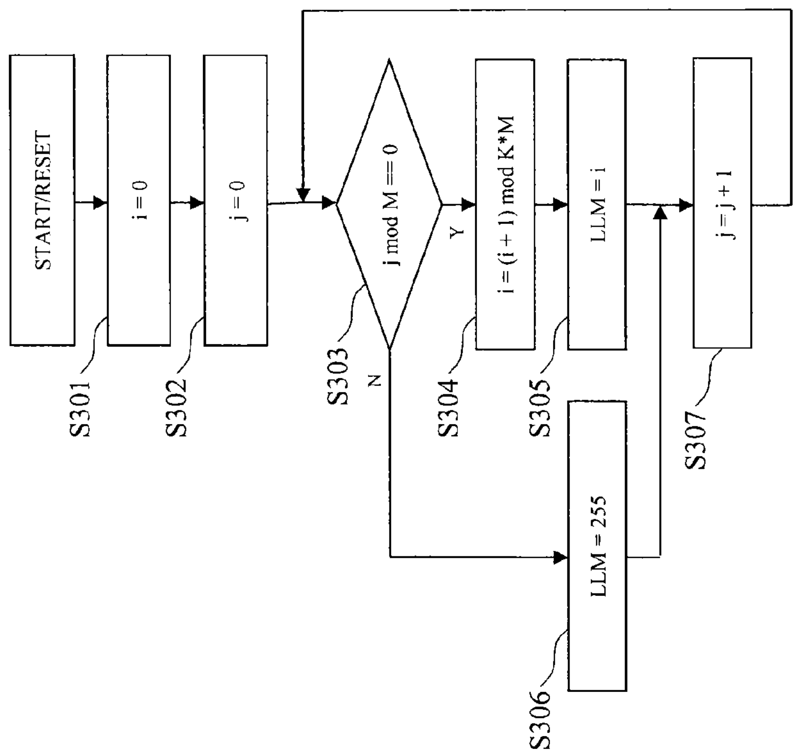
Figures 3, 4, 5, 6, 7, 8, 9, 10, 11, 12, 13, 14:
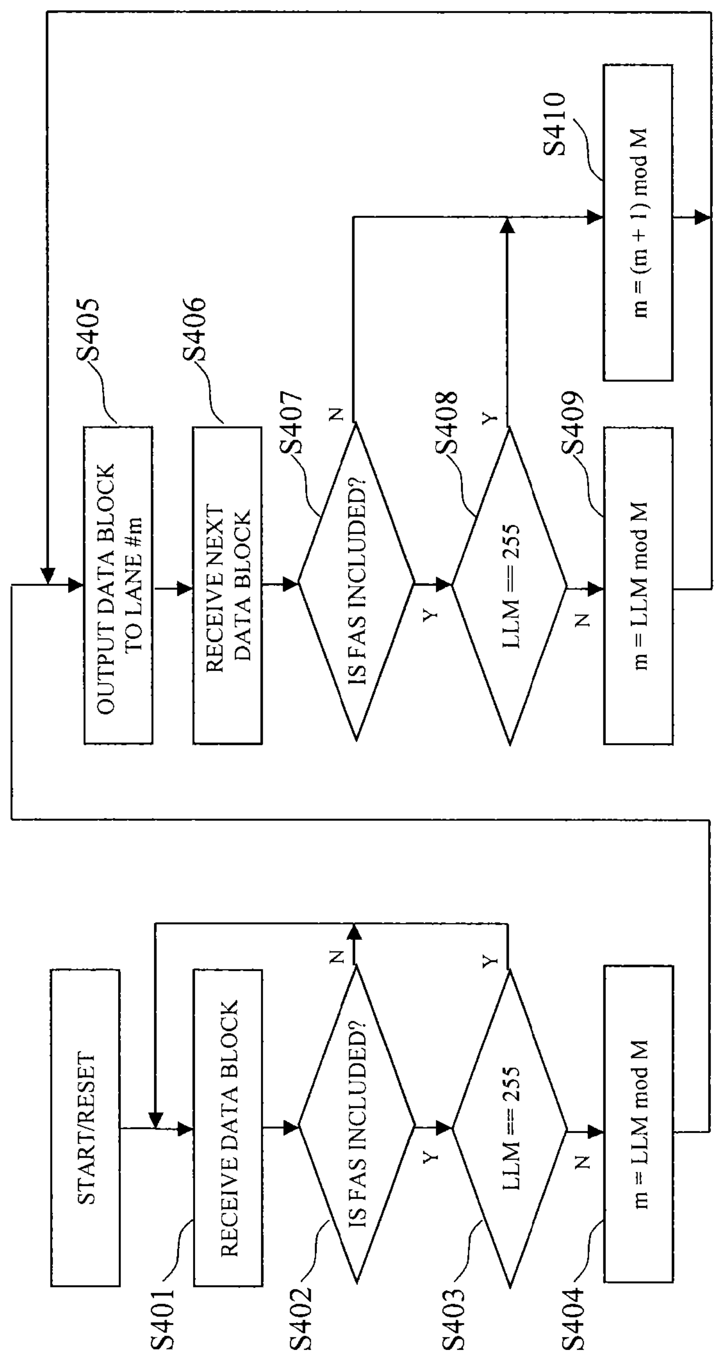
Figures 1, 4:
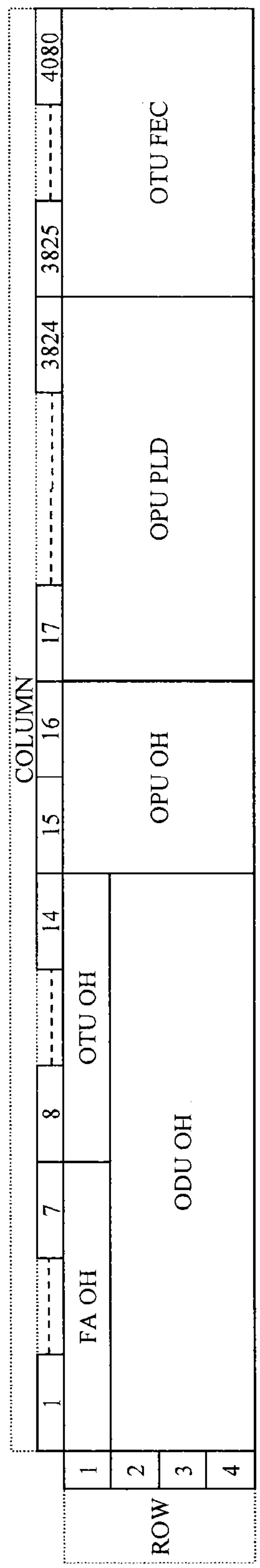
Figures 2, 4:
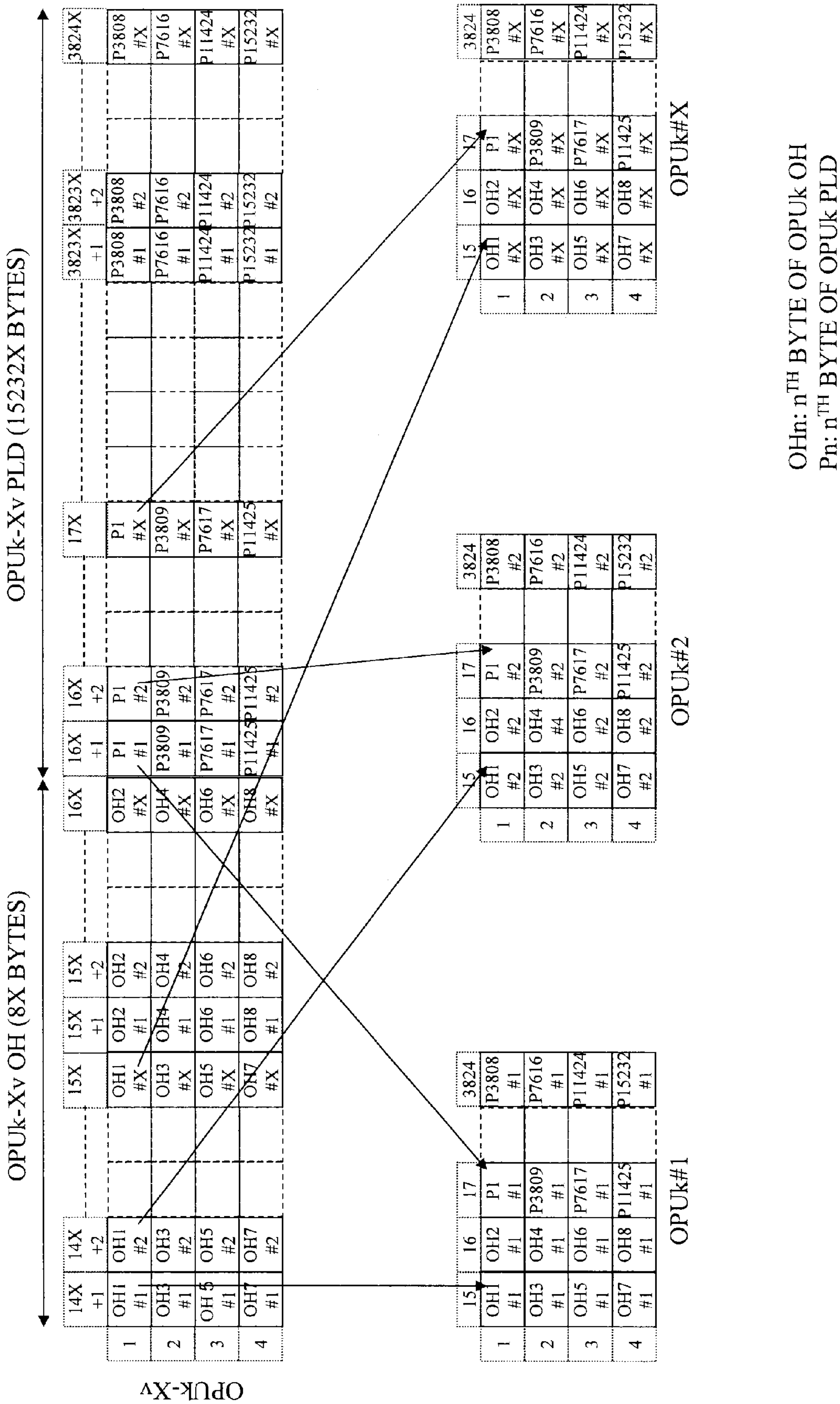
Figures 3, 4:
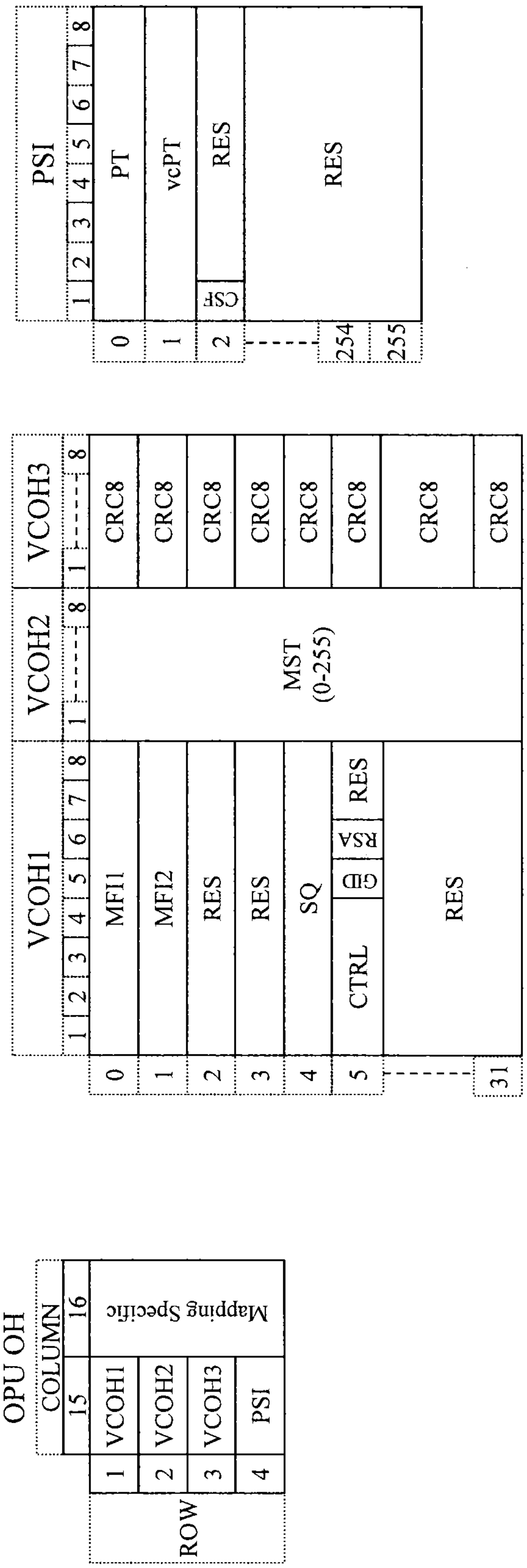
Figure 4:
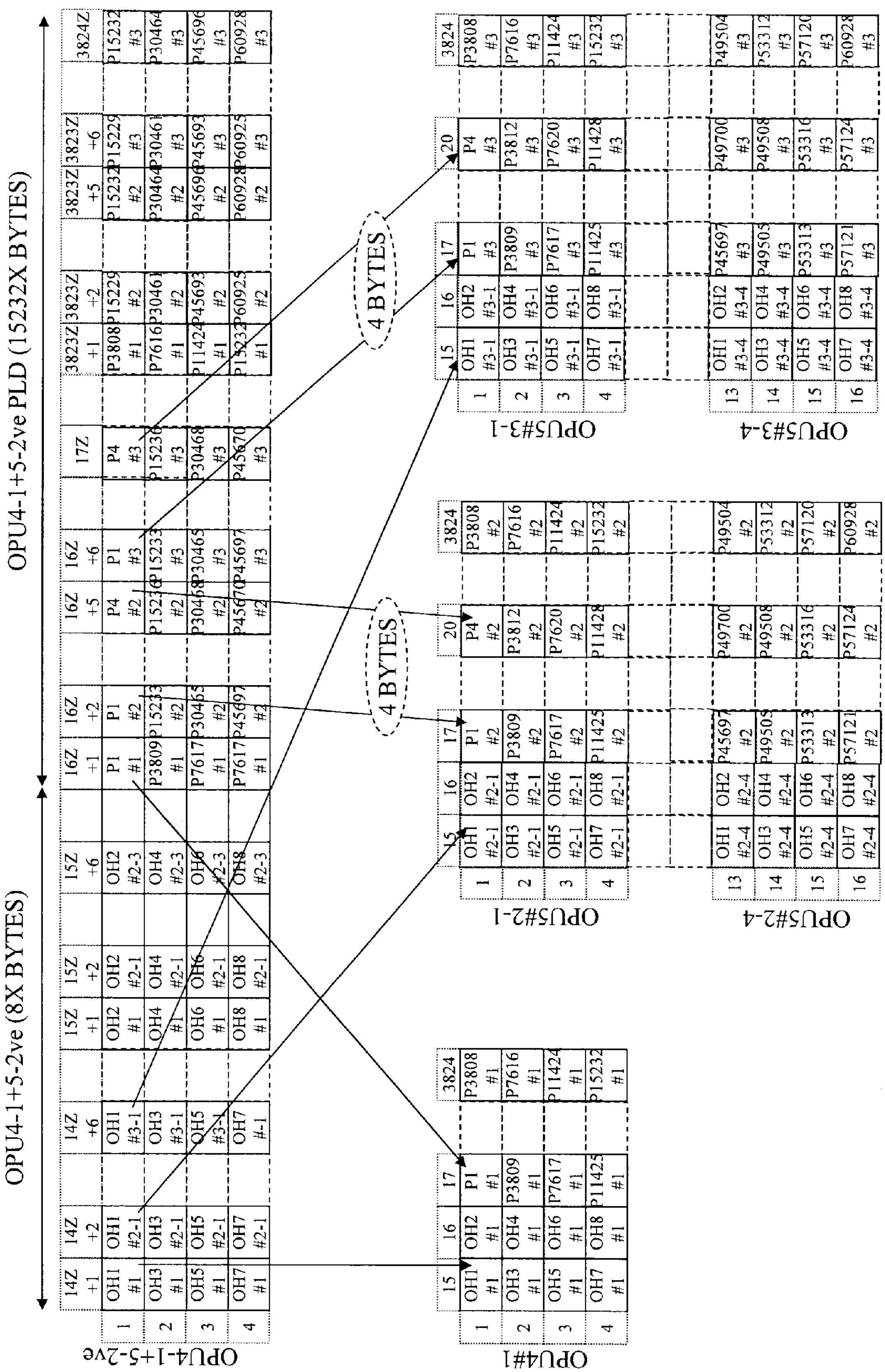
Figures 4, 5:
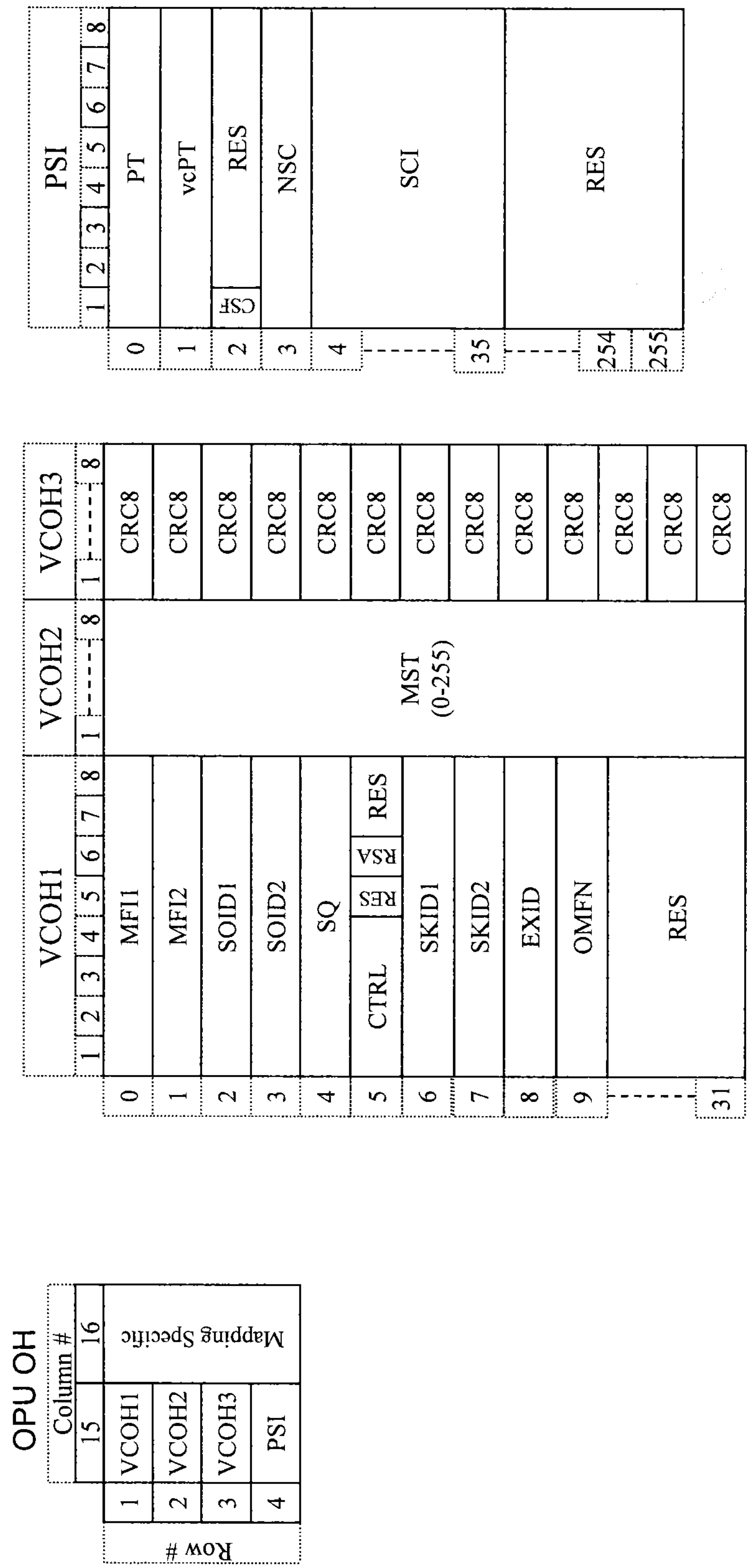
Figures 4, 5, 6:
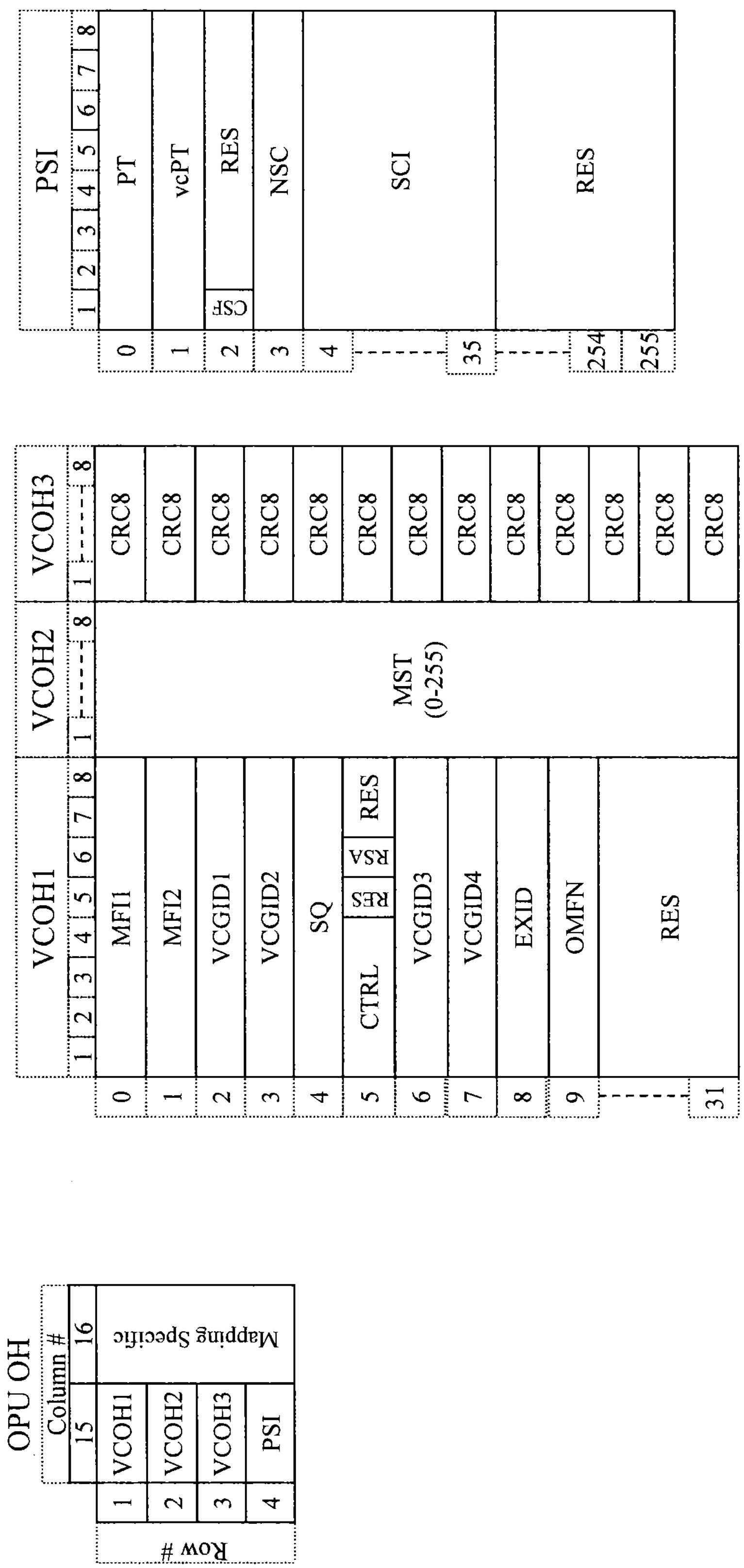
Figures 4, 5, 6, 7:
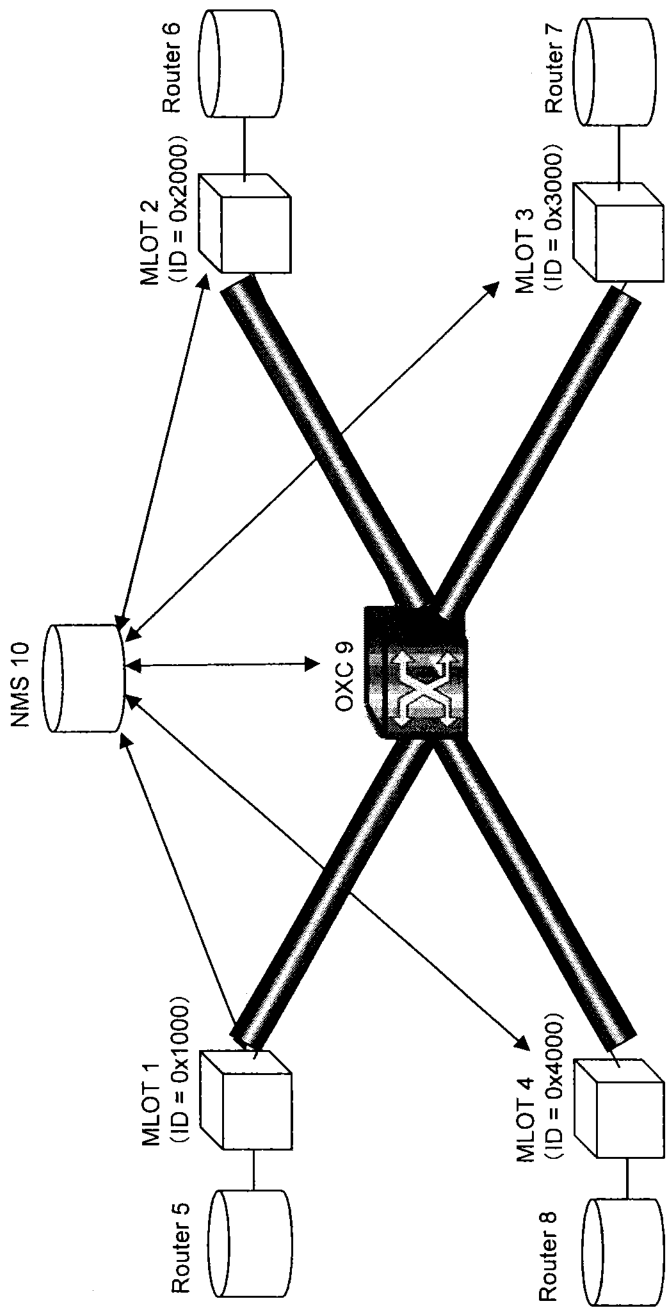
Figures 4, 5, 6, 7, 8:
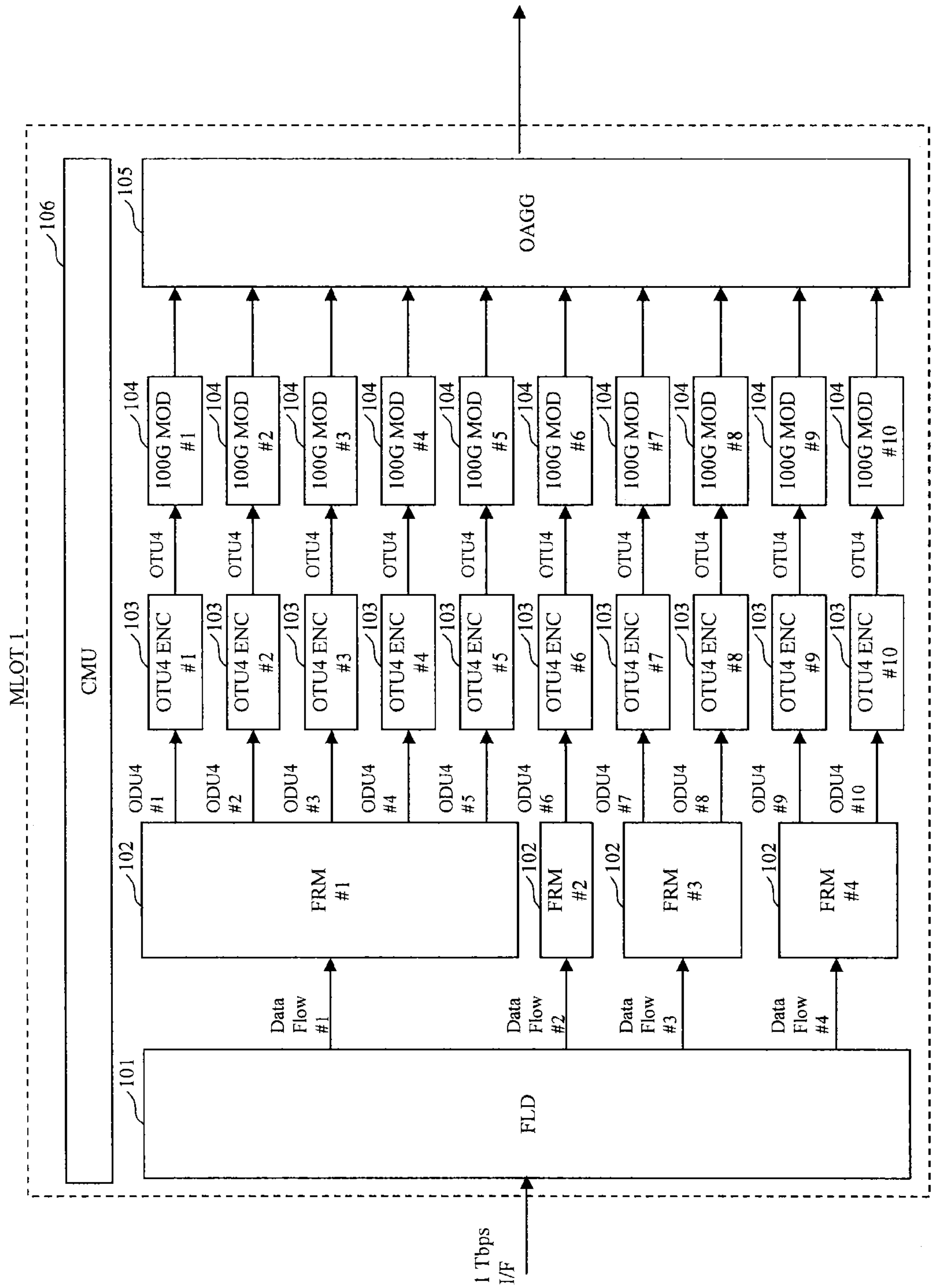
Figures 4, 5, 6, 7, 8, 9:
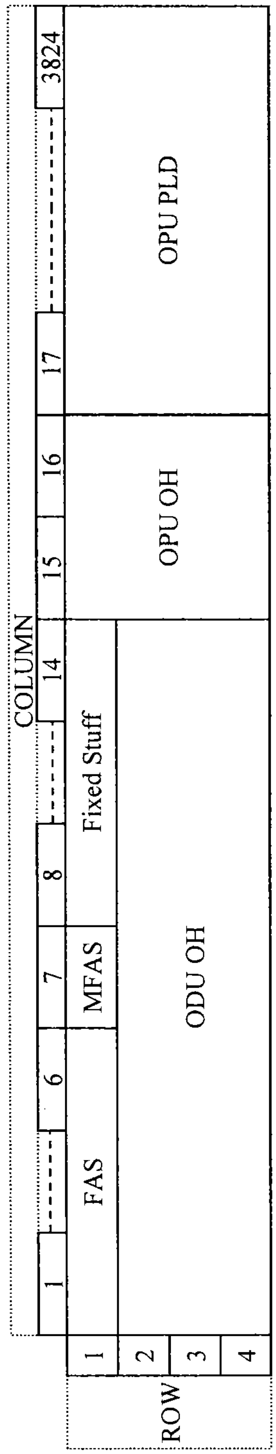
Figures 4, 5, 6, 7, 8, 9, 10:
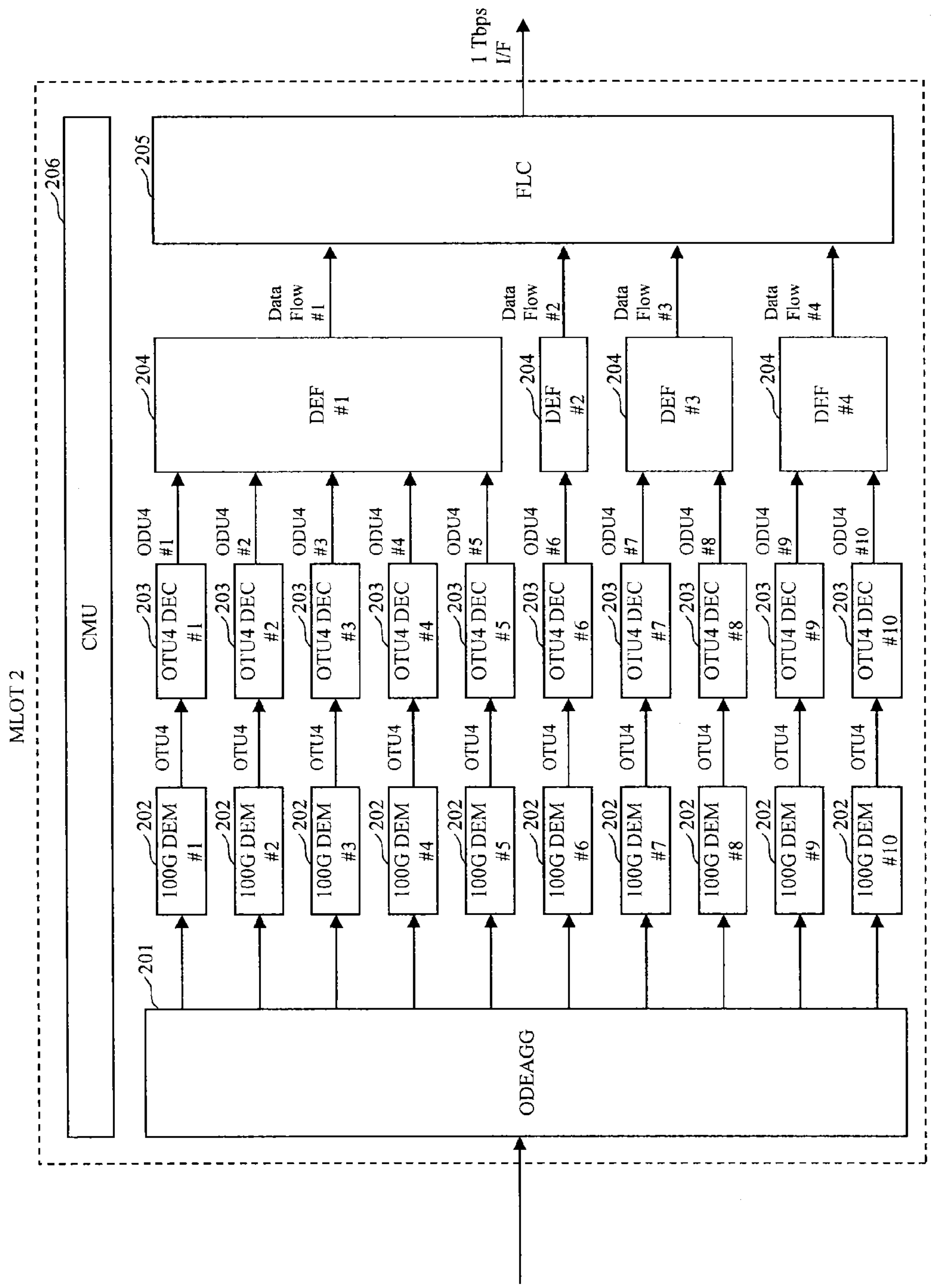
Figures 4, 5, 6, 7, 8, 9, 10, 11:
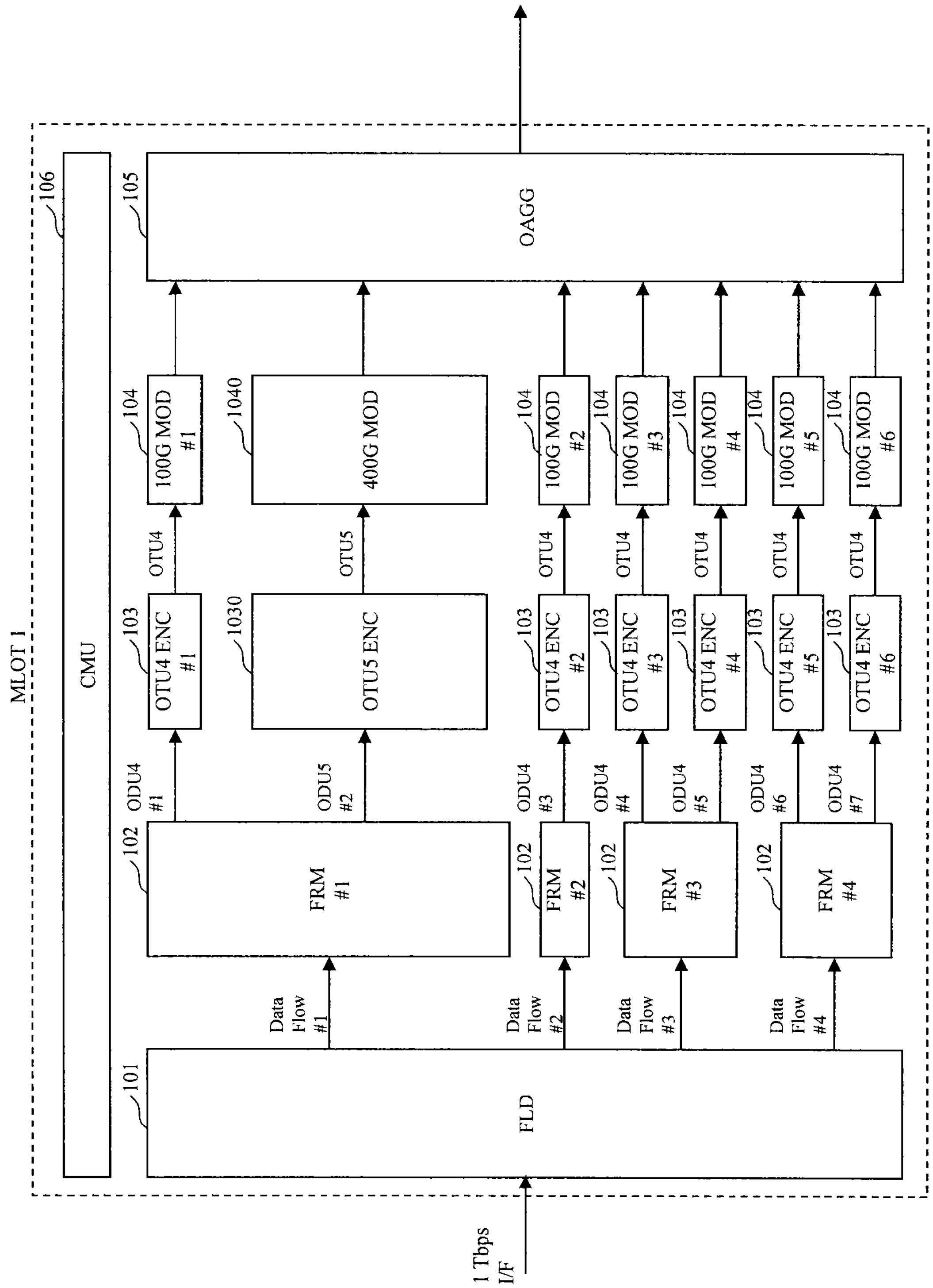
Figures 4, 5, 6, 7, 8, 9, 10, 11, 12:
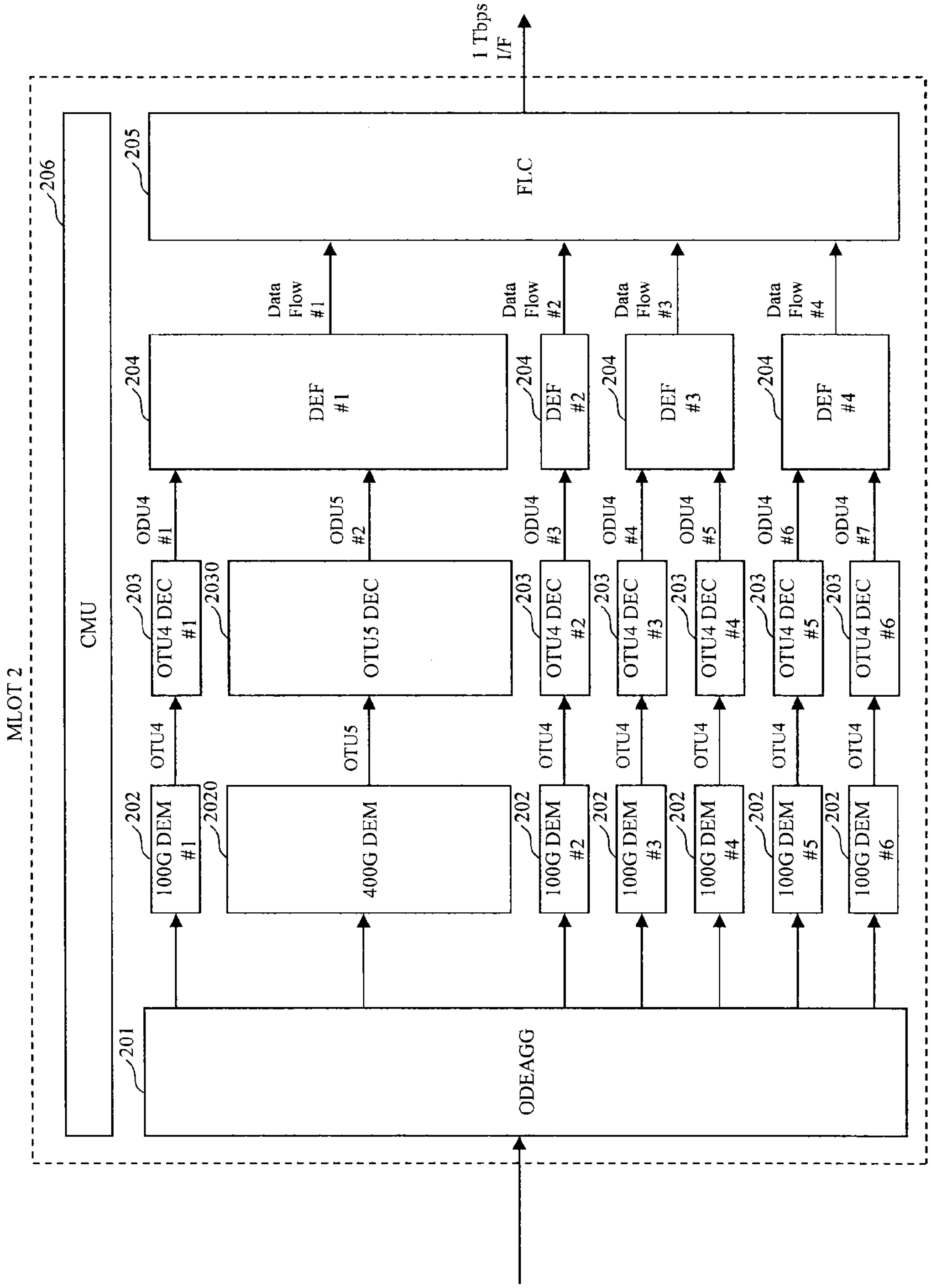
Figures 4, 5, 6, 7, 8, 9, 10, 11, 12, 13:
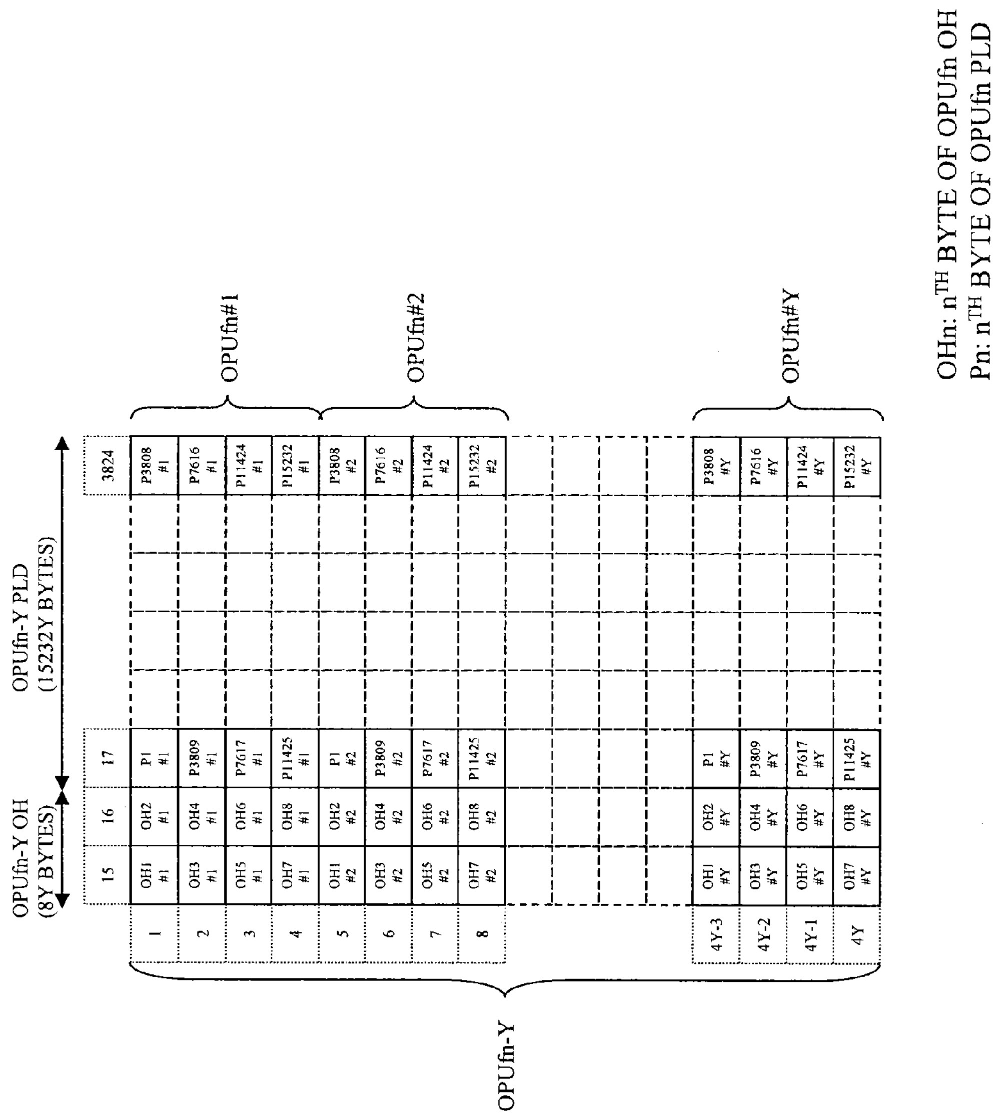
Figures 4, 5, 6, 7, 8, 9, 10, 11, 12, 13, 14:
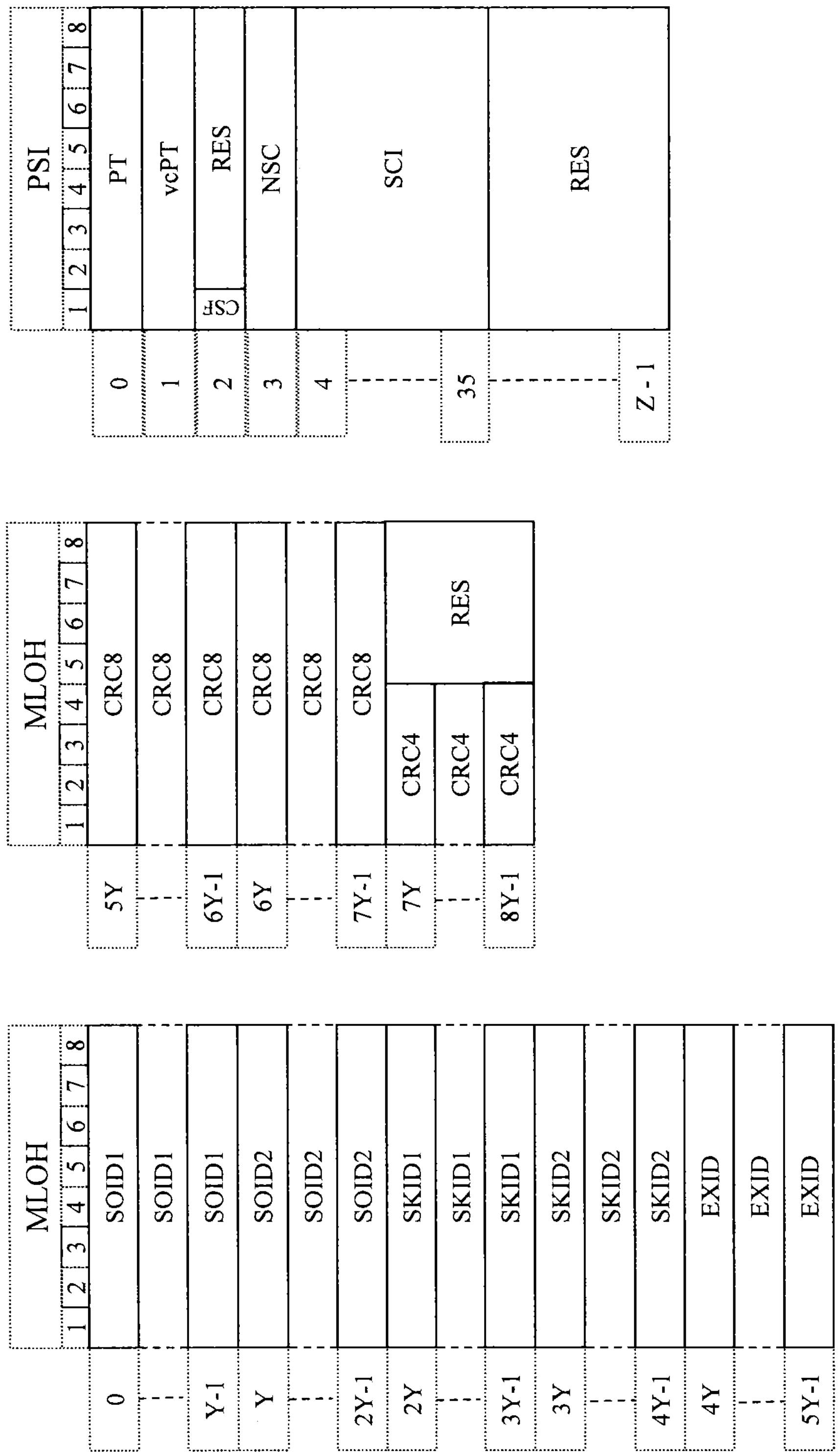
Figures 4, 5, 6, 7, 8, 9, 10, 11, 12, 13, 14, 15:
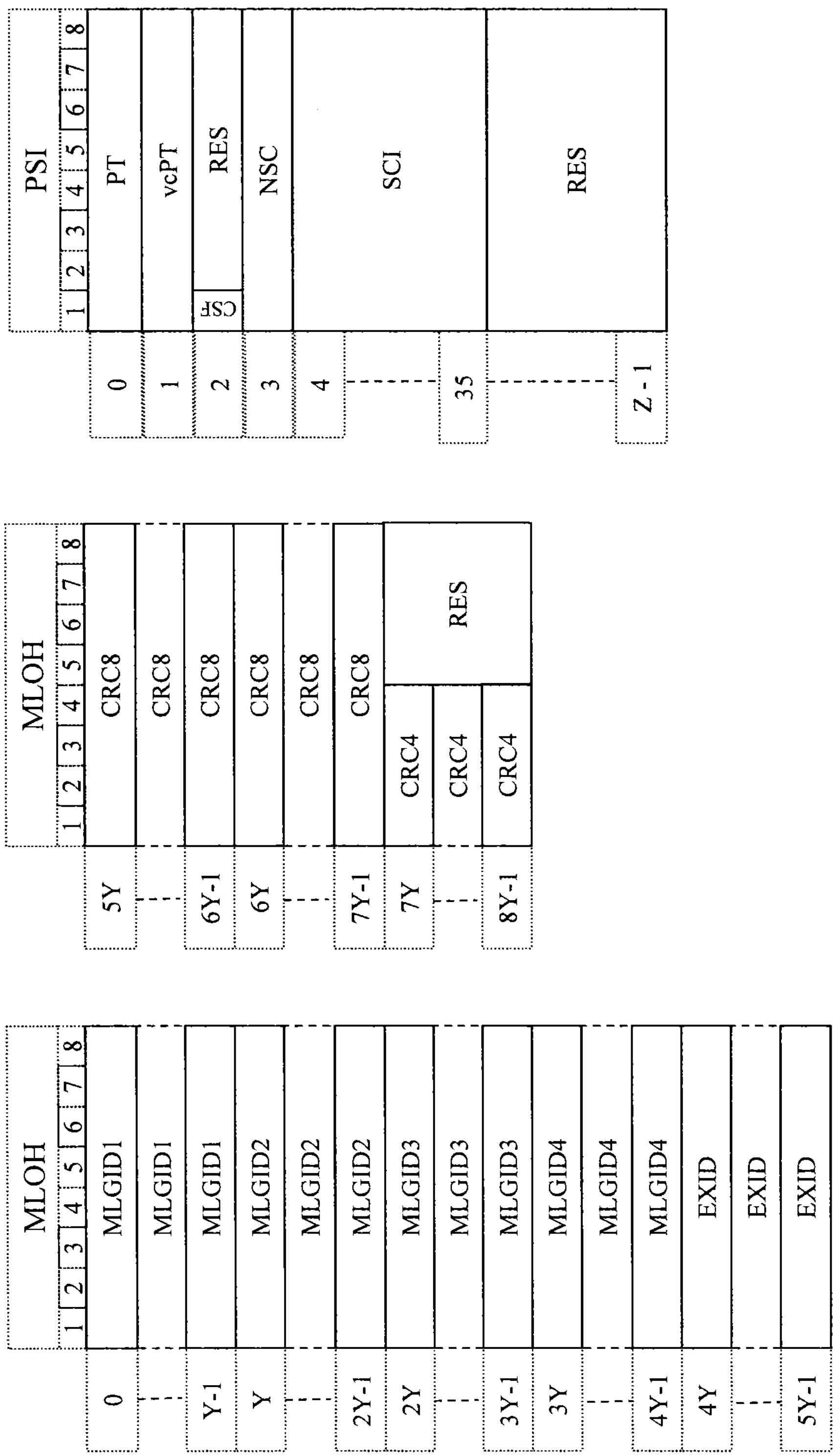
Figures 4, 5, 6, 7, 8, 9, 10, 11, 12, 13, 14, 15, 16, 16A:
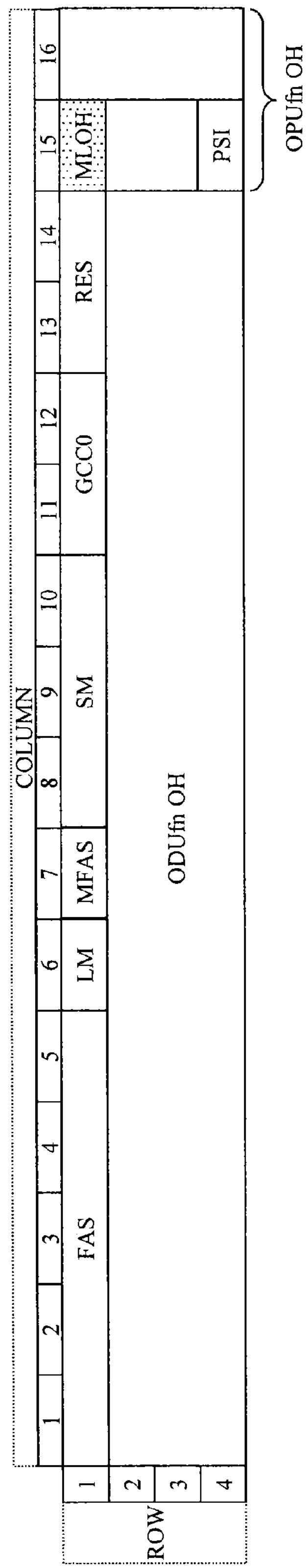
Figures 4, 5, 6, 7, 8, 9, 10, 11, 12, 13, 14, 15, 16, 16B:
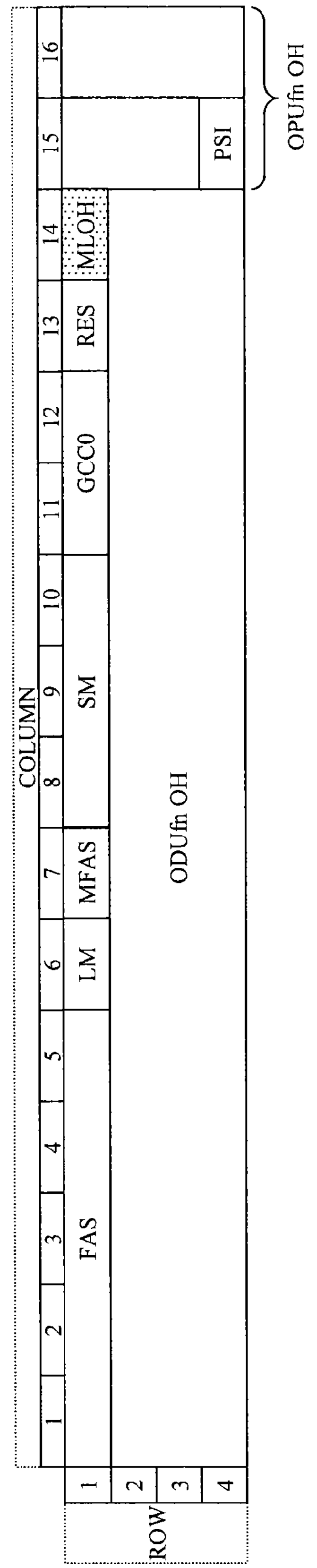
Figures 4, 5, 6, 7, 8, 9, 10, 11, 12, 13, 14, 15, 16, 16C:
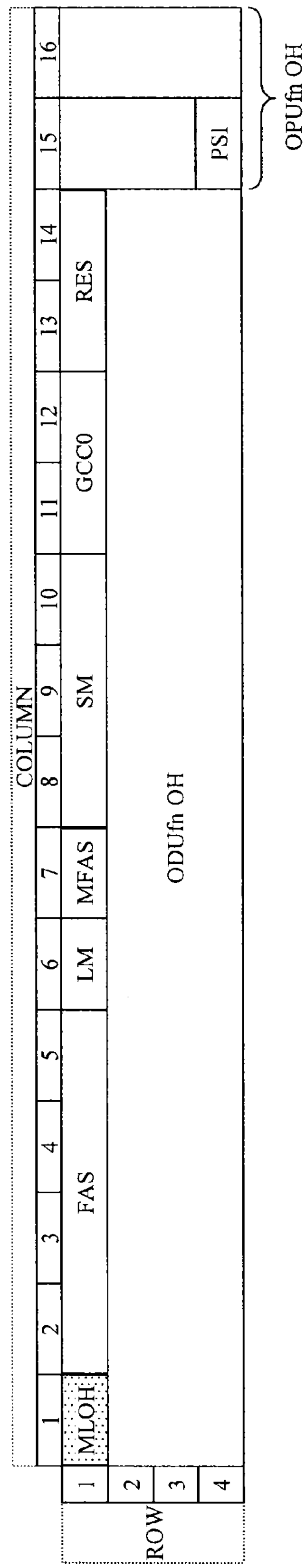
Figures 4, 5, 6, 7, 8, 9, 10, 11, 12, 13, 14, 15, 16, 17:
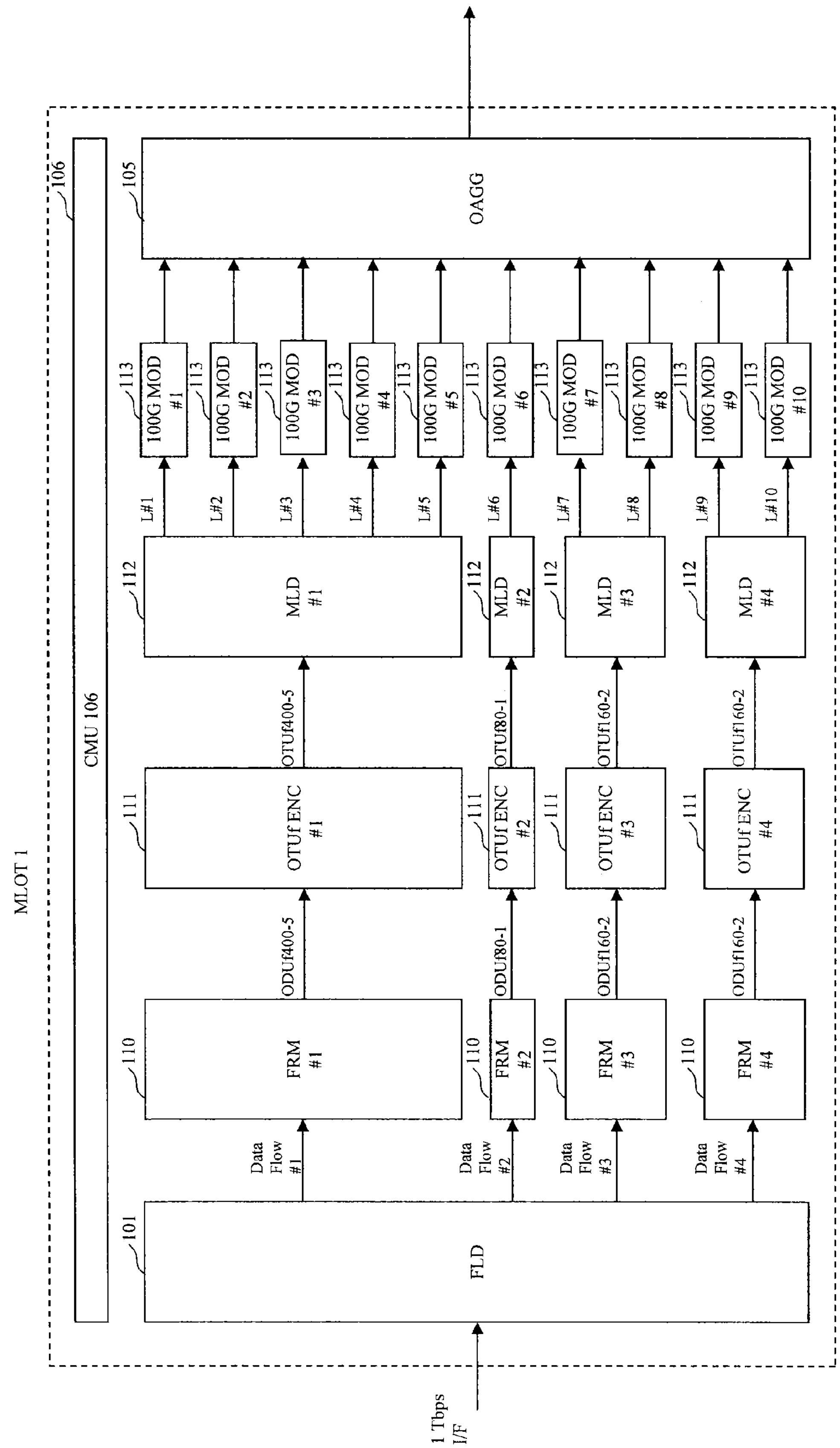
Figures 4, 5, 6, 7, 8, 9, 10, 11, 12, 13, 14, 15, 16, 17, 18, 18A:
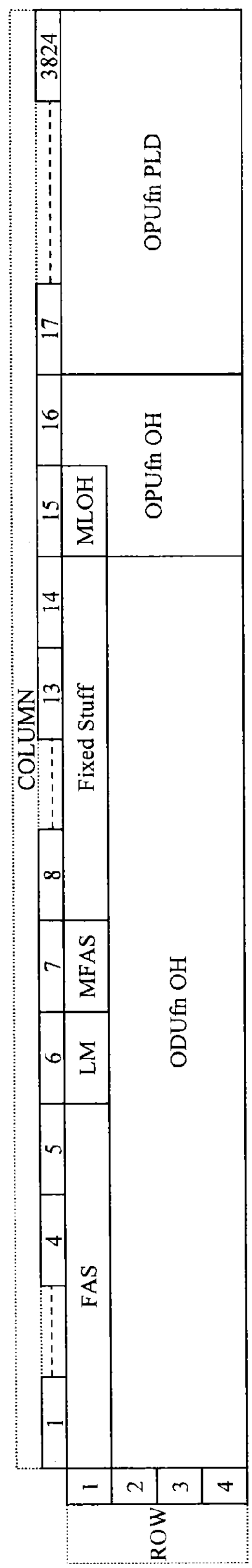
Figures 4, 5, 6, 7, 8, 9, 10, 11, 12, 13, 14, 15, 16, 17, 18, 18B:
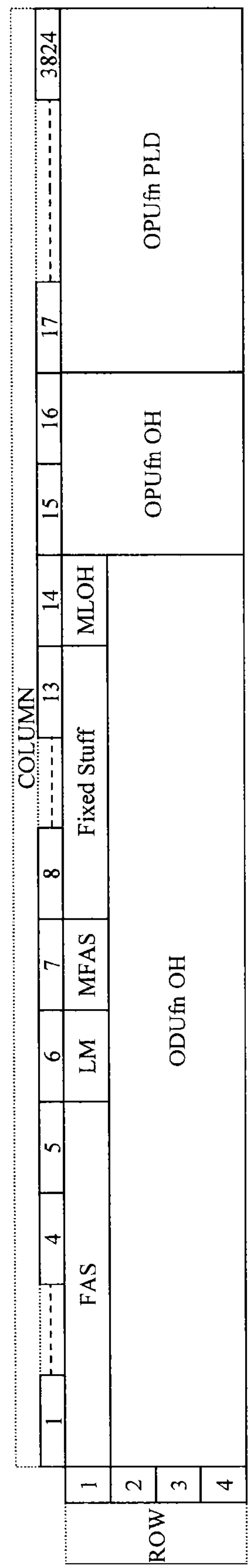
Figures 4, 5, 6, 7, 8, 9, 10, 11, 12, 13, 14, 15, 16, 17, 18, 18C:
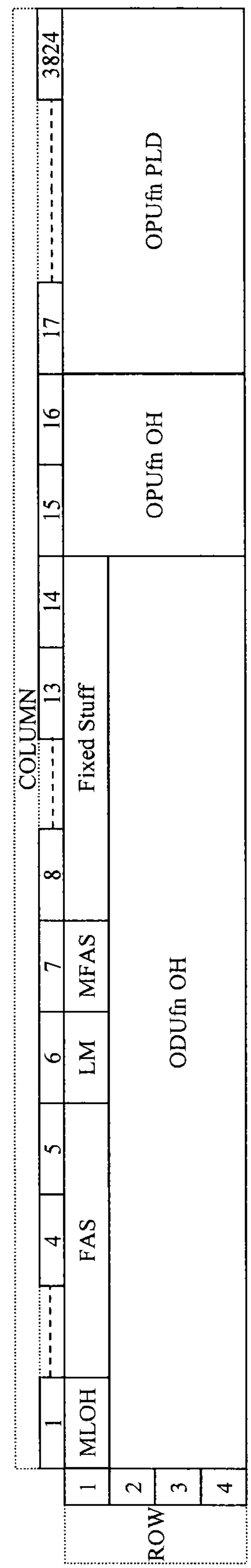
Figures 4, 5, 6, 7, 8, 9, 10, 11, 12, 13, 14, 15, 16, 17, 18, 19:
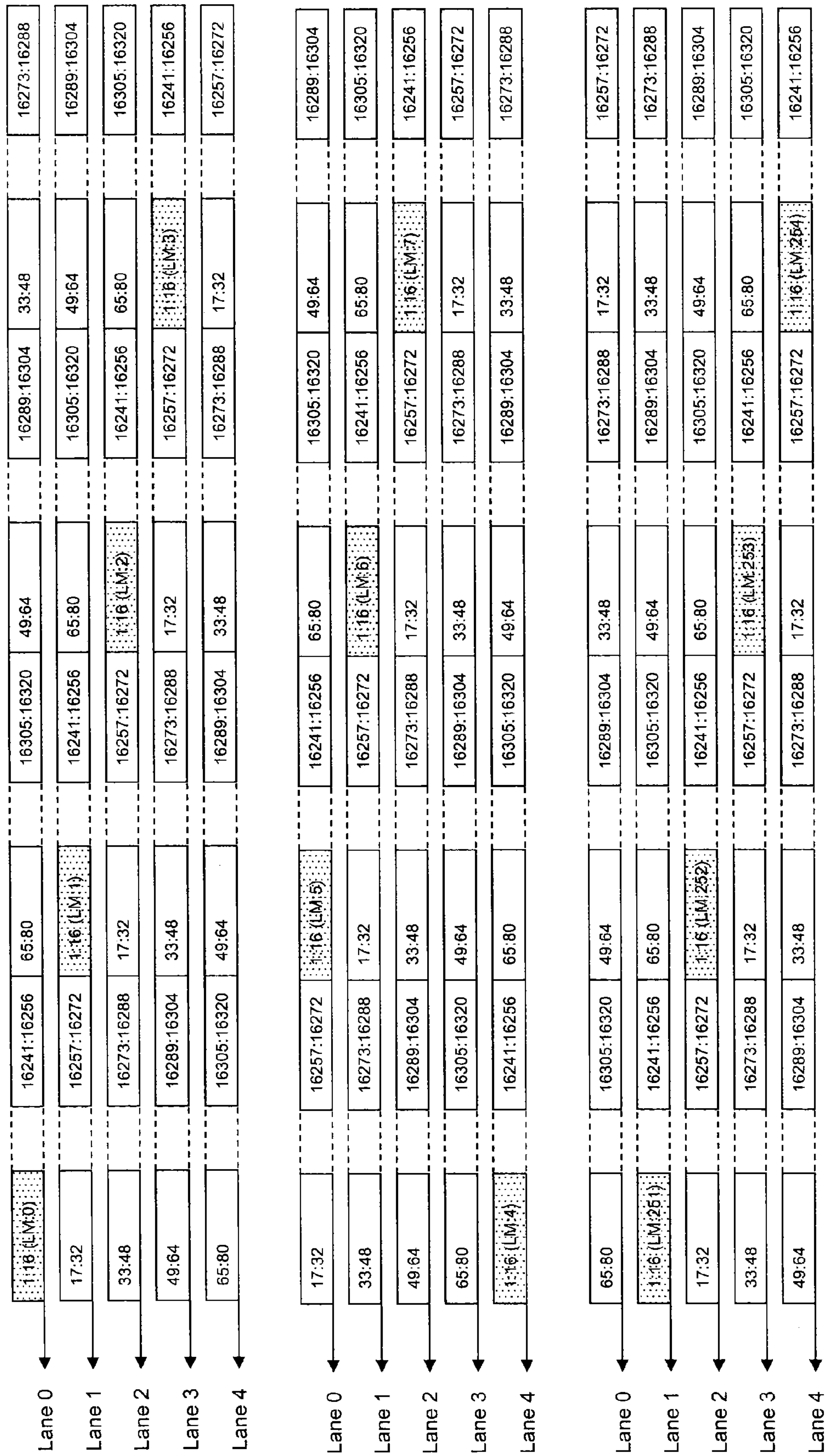
Figures 4, 5, 6, 7, 8, 9, 10, 11, 12, 13, 14, 15, 16, 17, 18, 19, 20:
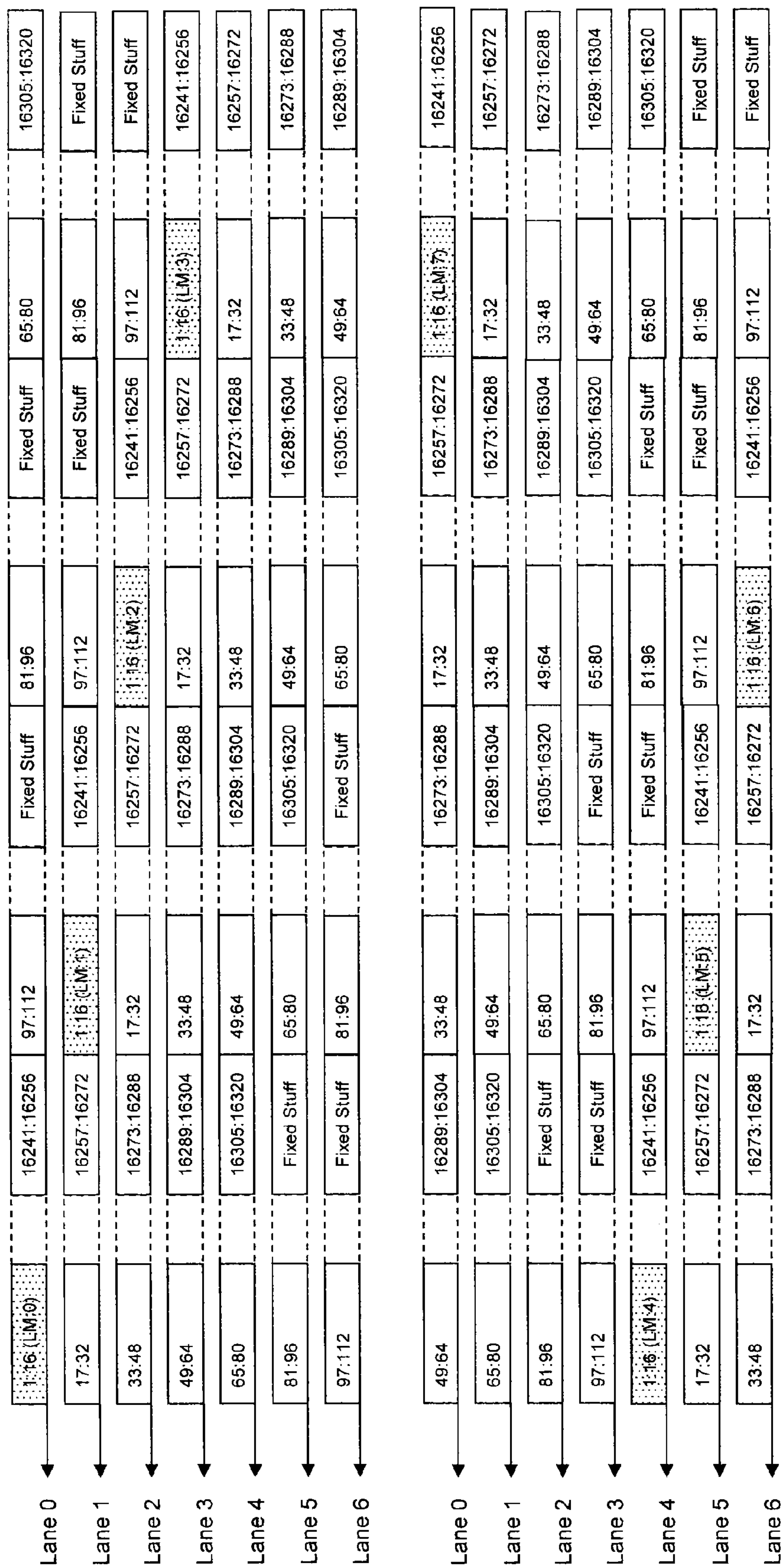
Figures 4, 5, 6, 7, 8, 9, 10, 11, 12, 13, 14, 15, 16, 17, 18, 19, 20, 21:
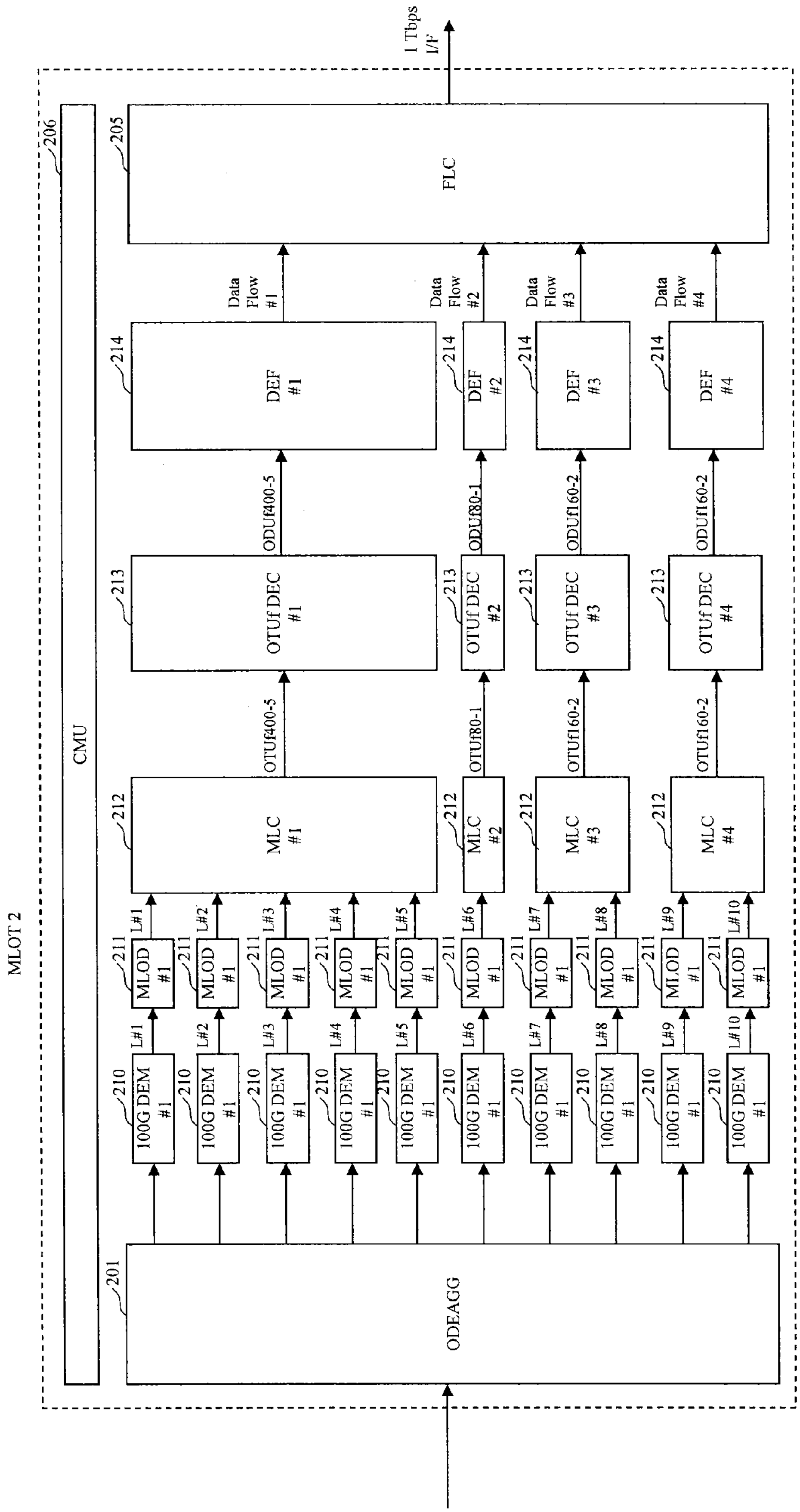
Figures 4, 5, 6, 7, 8, 9, 10, 11, 12, 13, 14, 15, 16, 17, 18, 19, 20, 21, 22, 23:
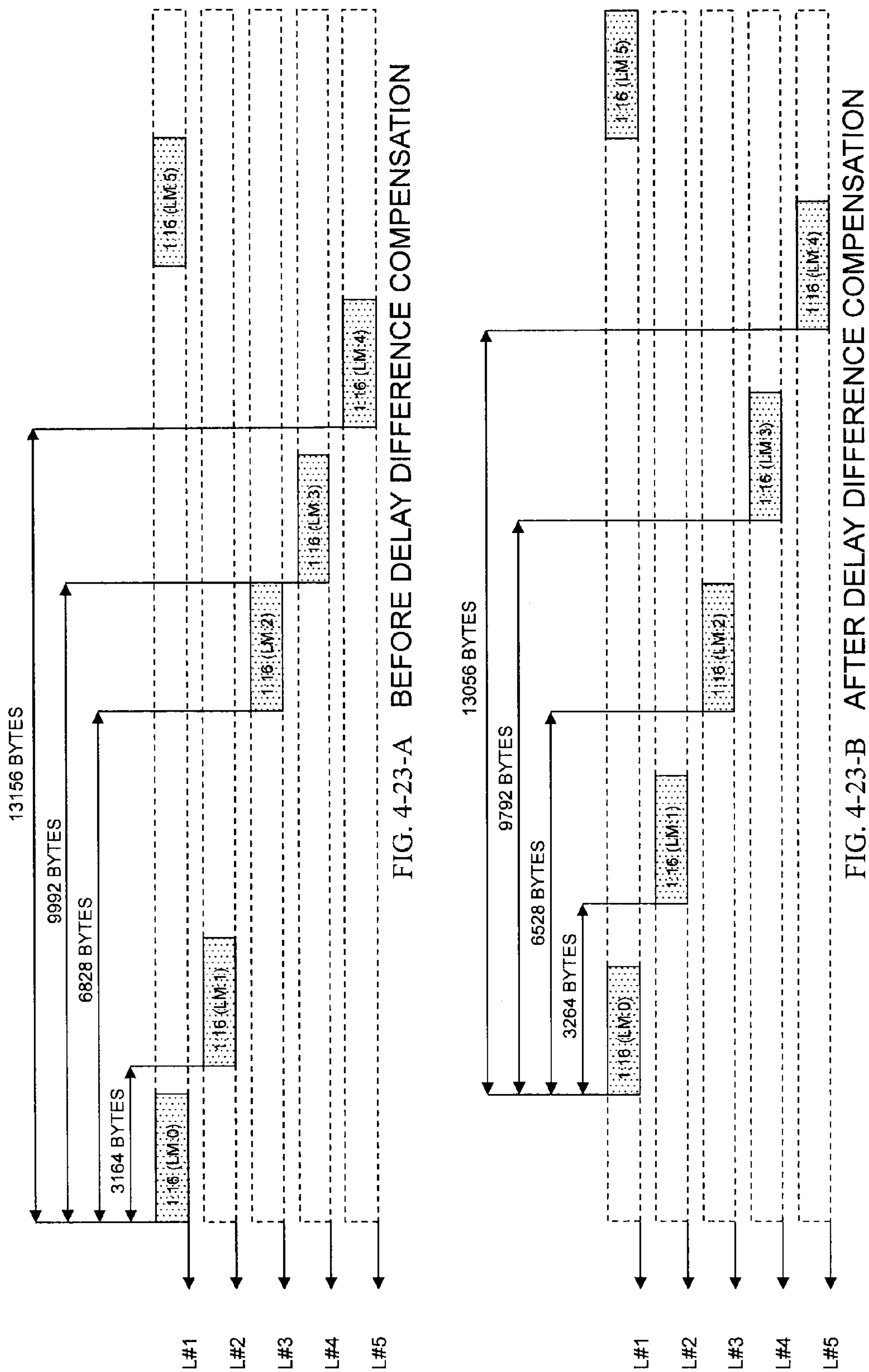
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
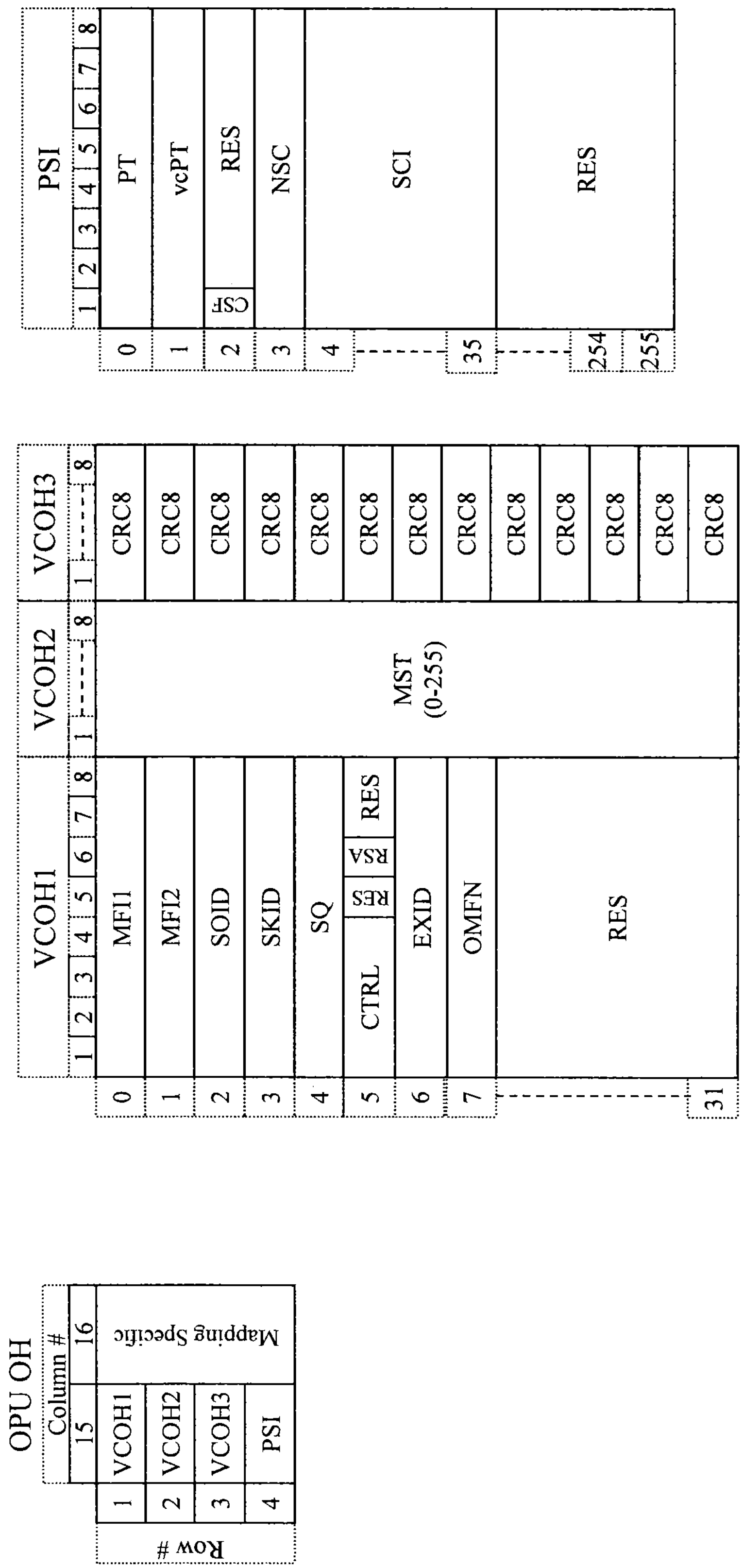
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
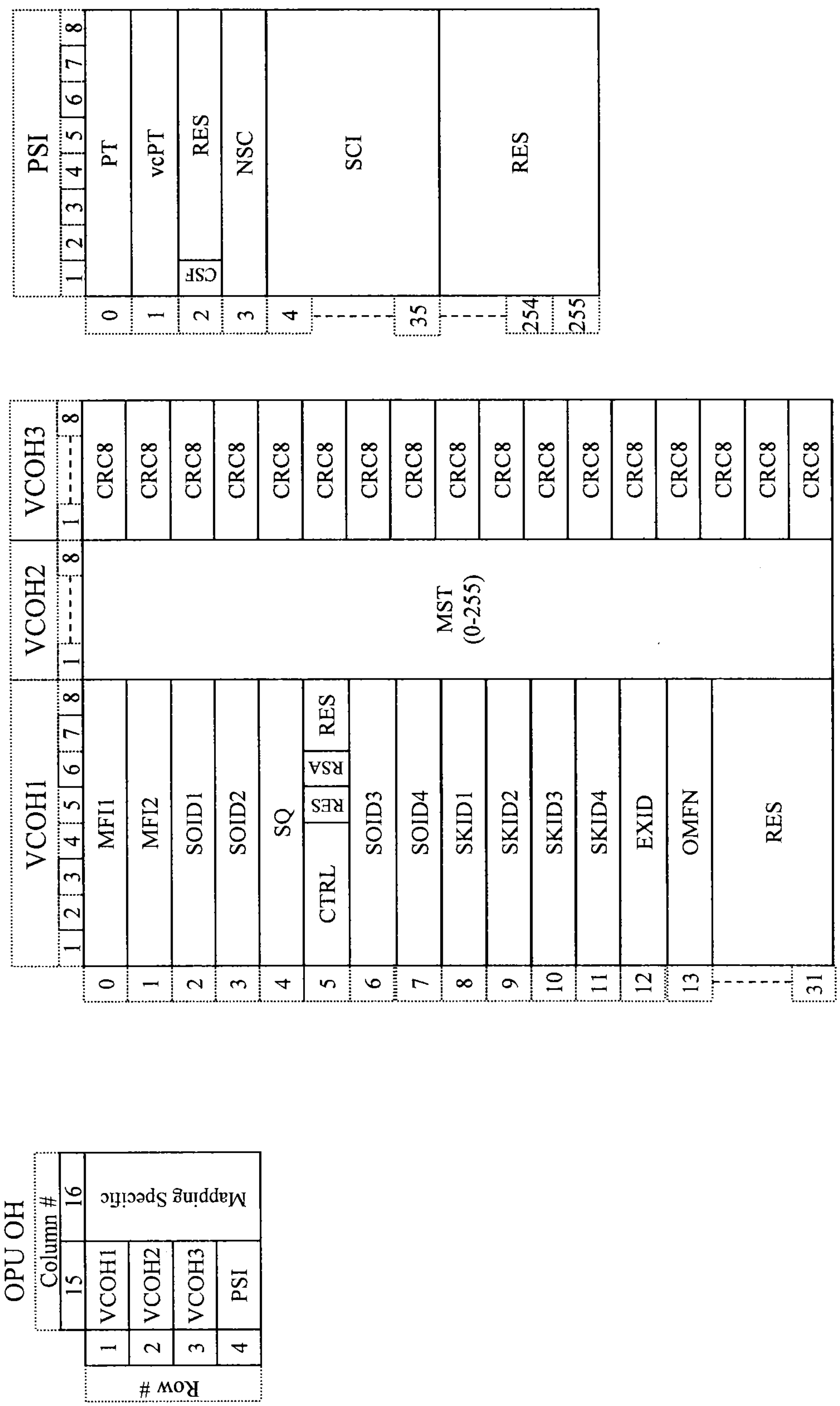
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
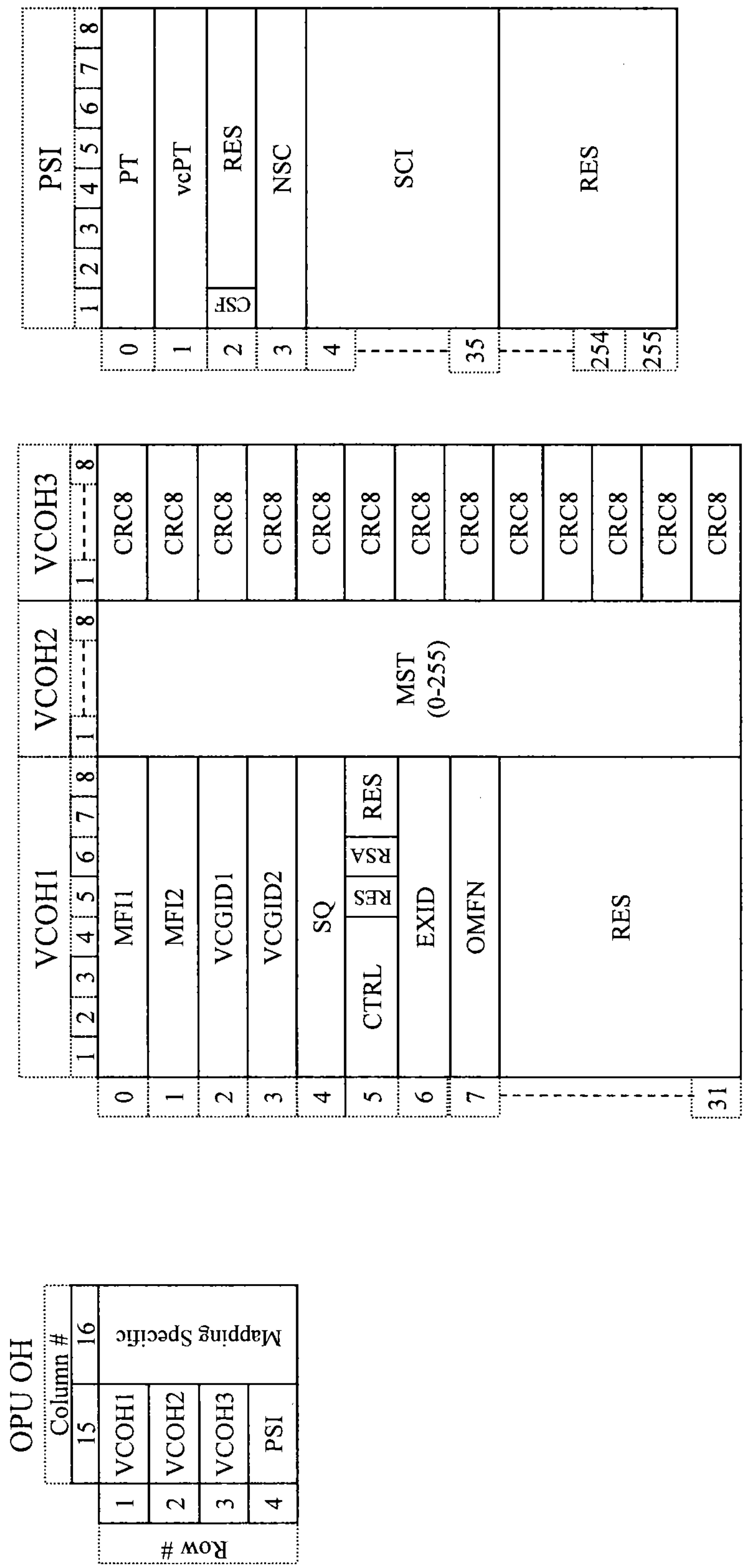
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
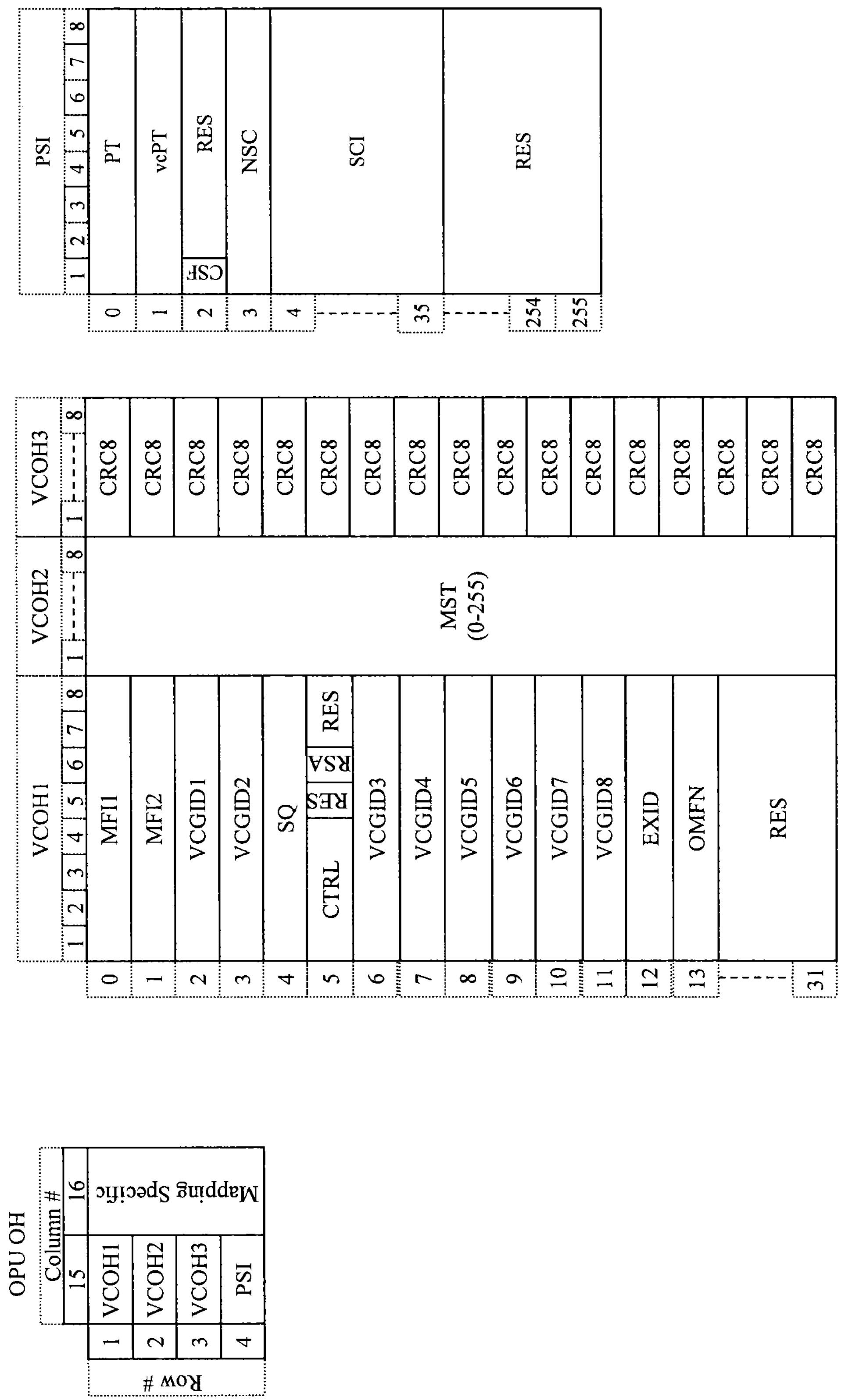
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
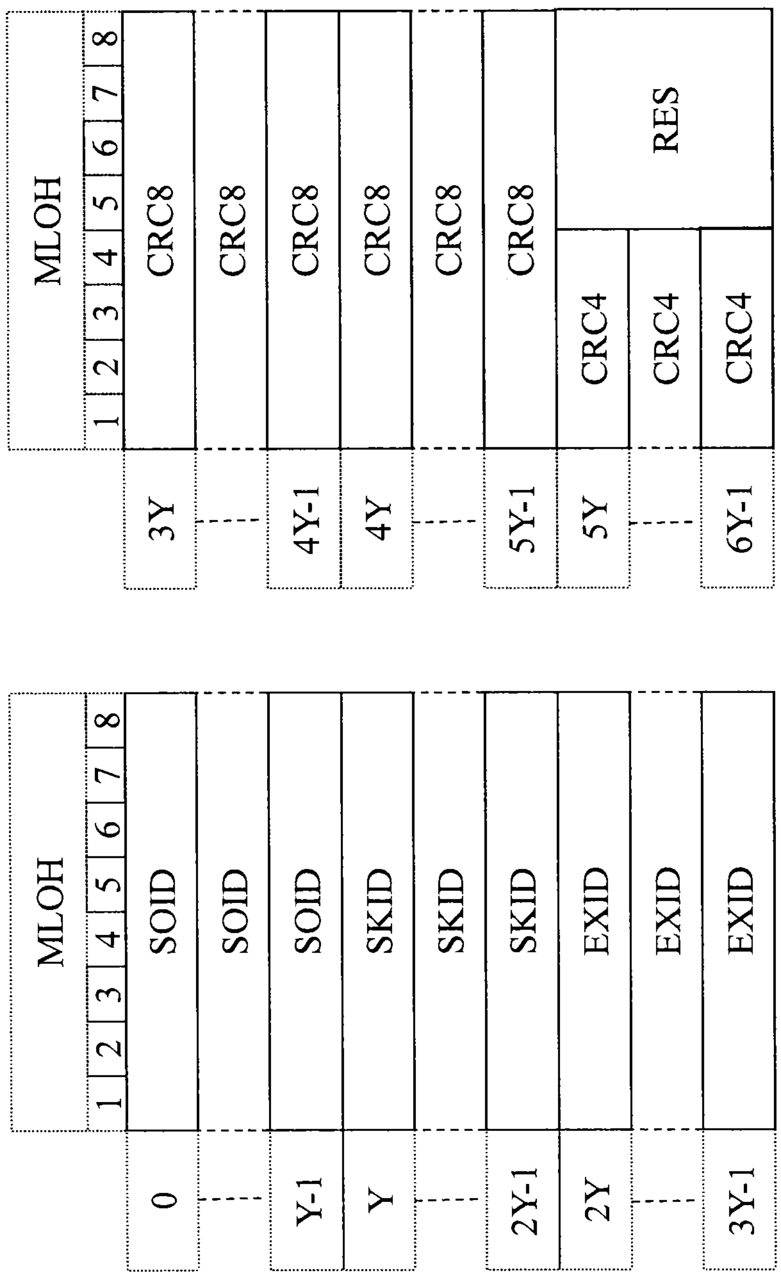
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
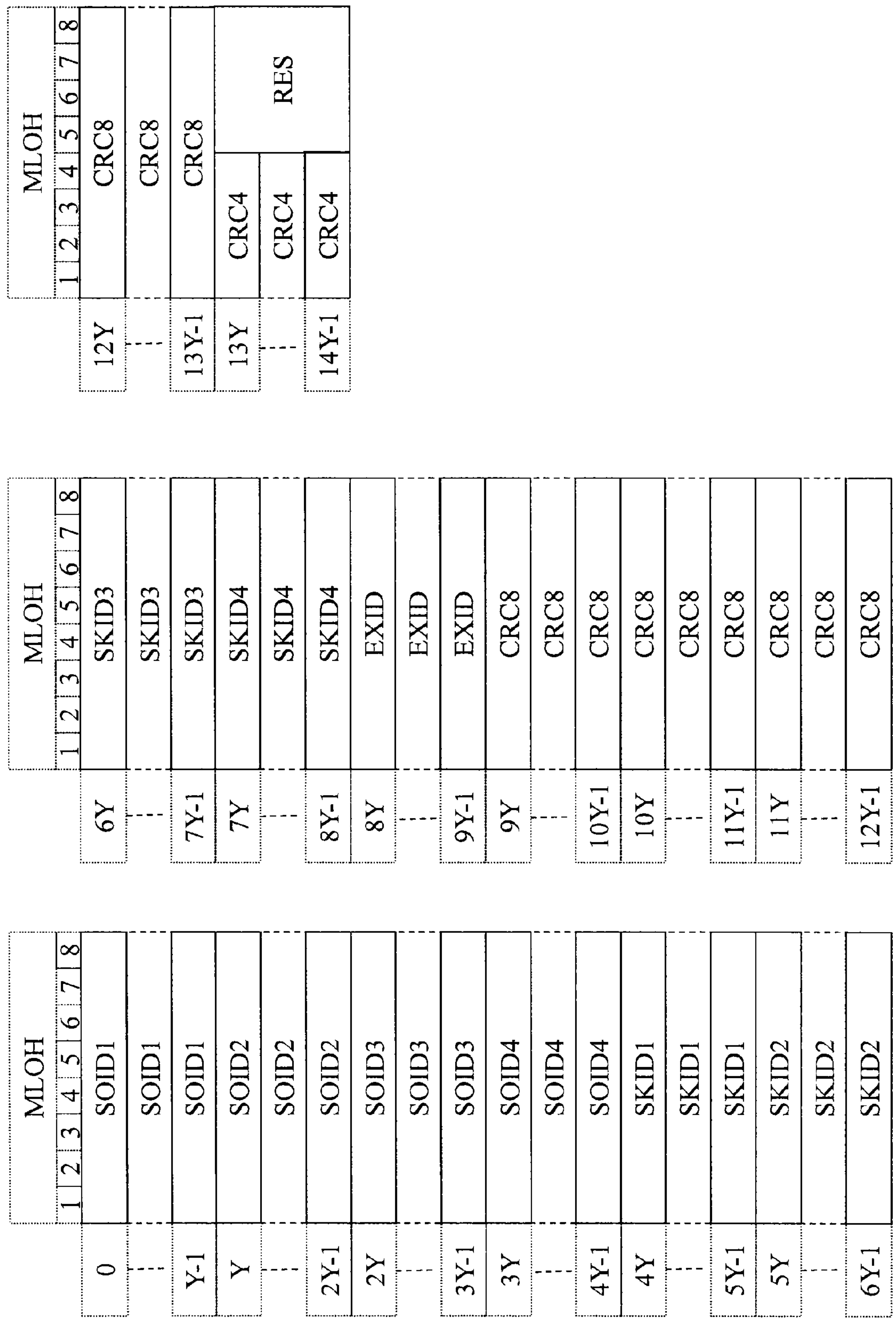
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
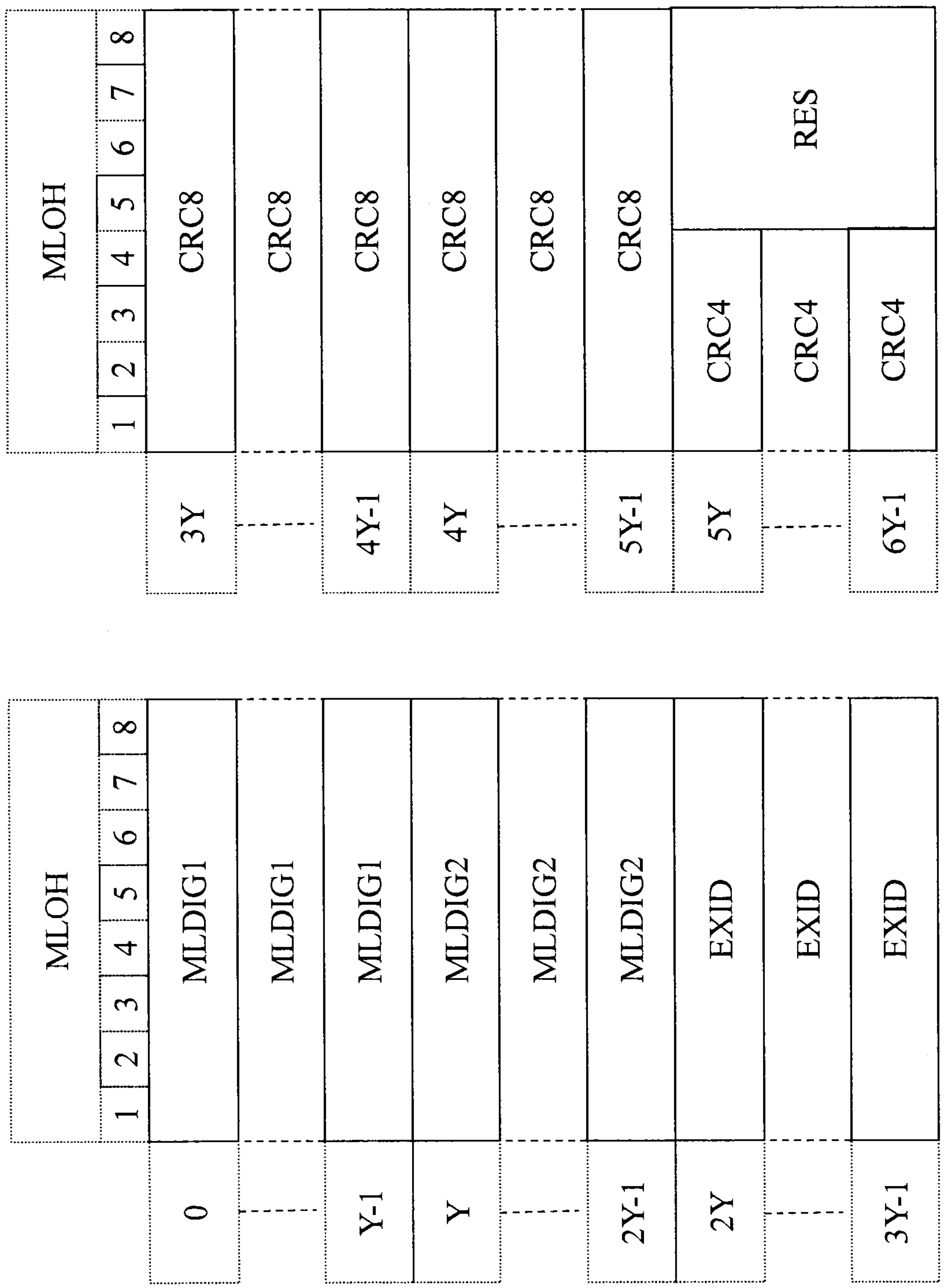
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
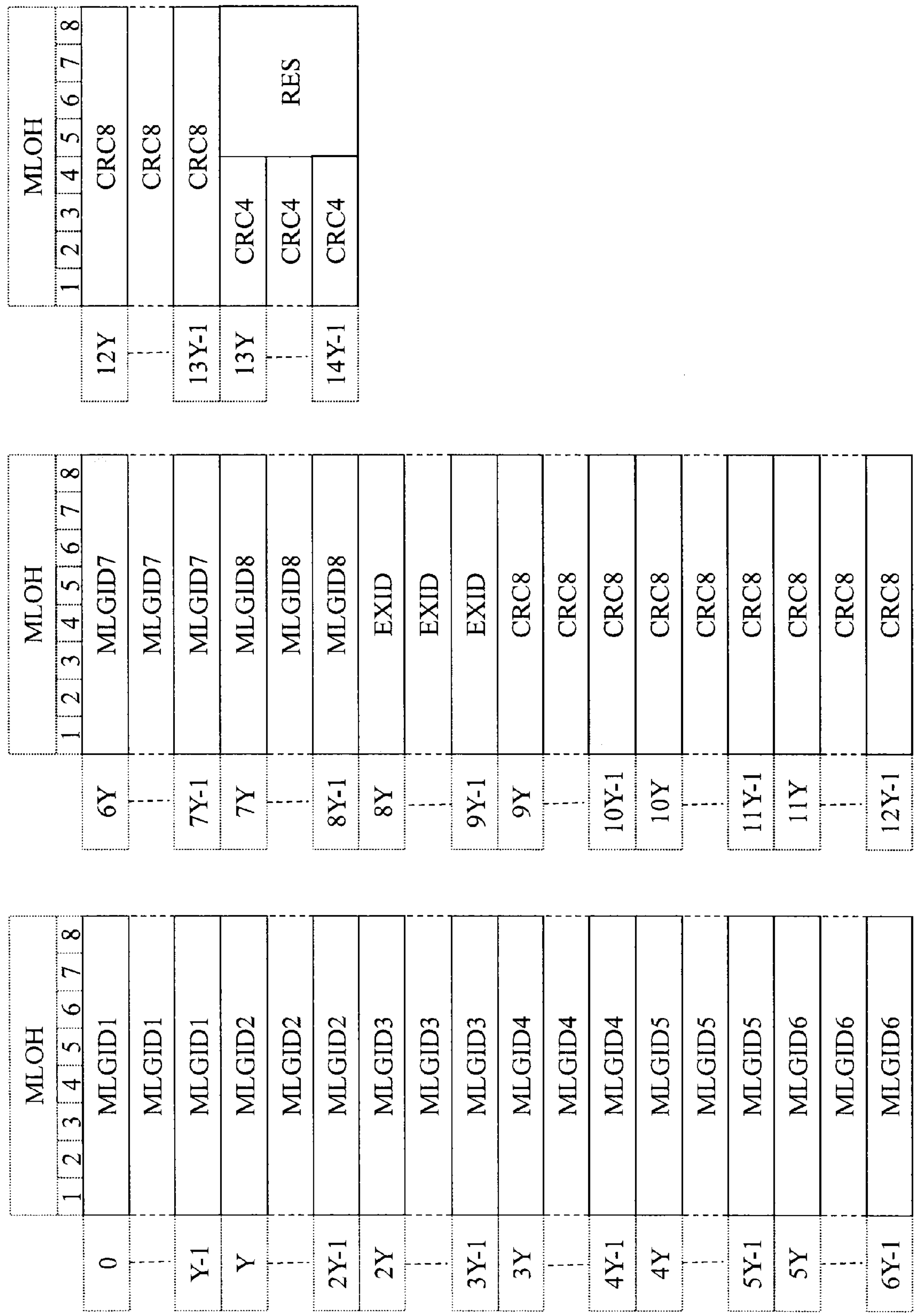
Figures 1, 5:
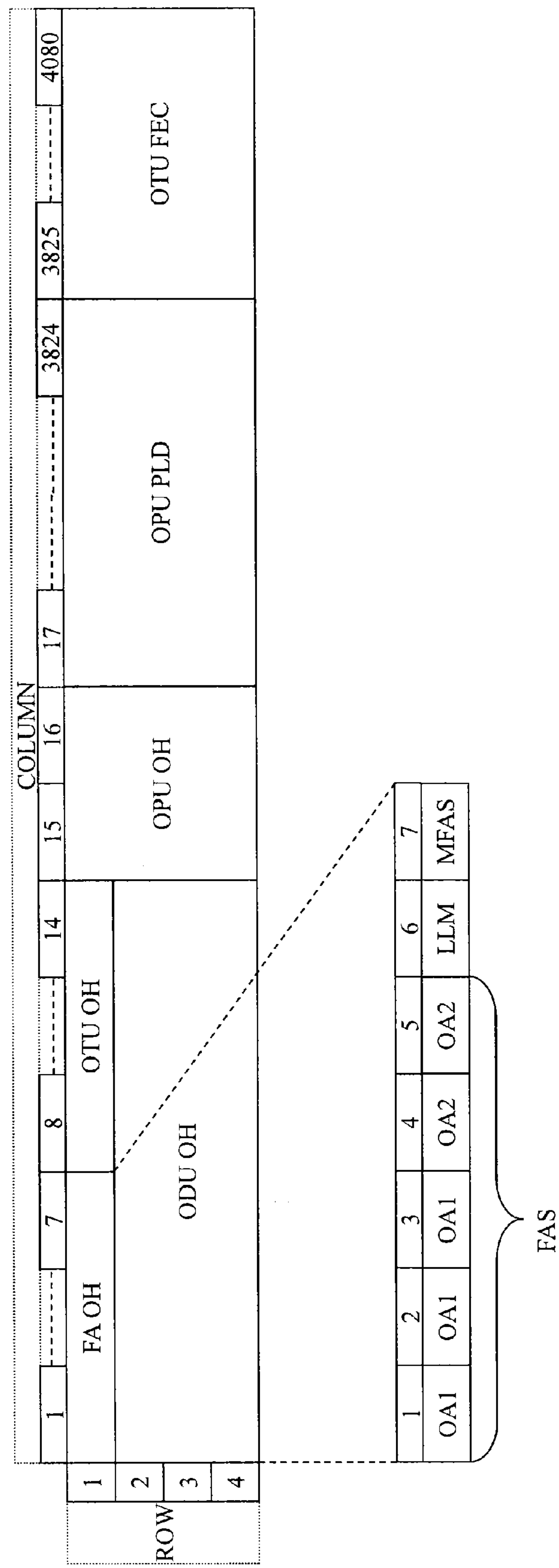
Figures 2, 5:
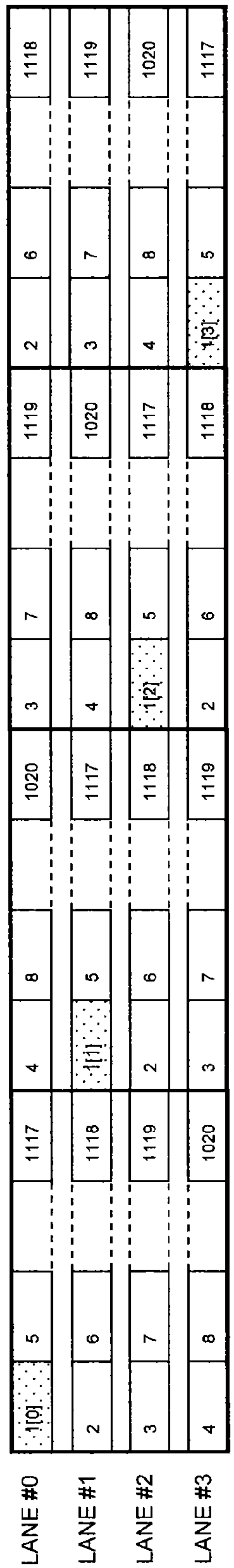
Figures 3, 5:
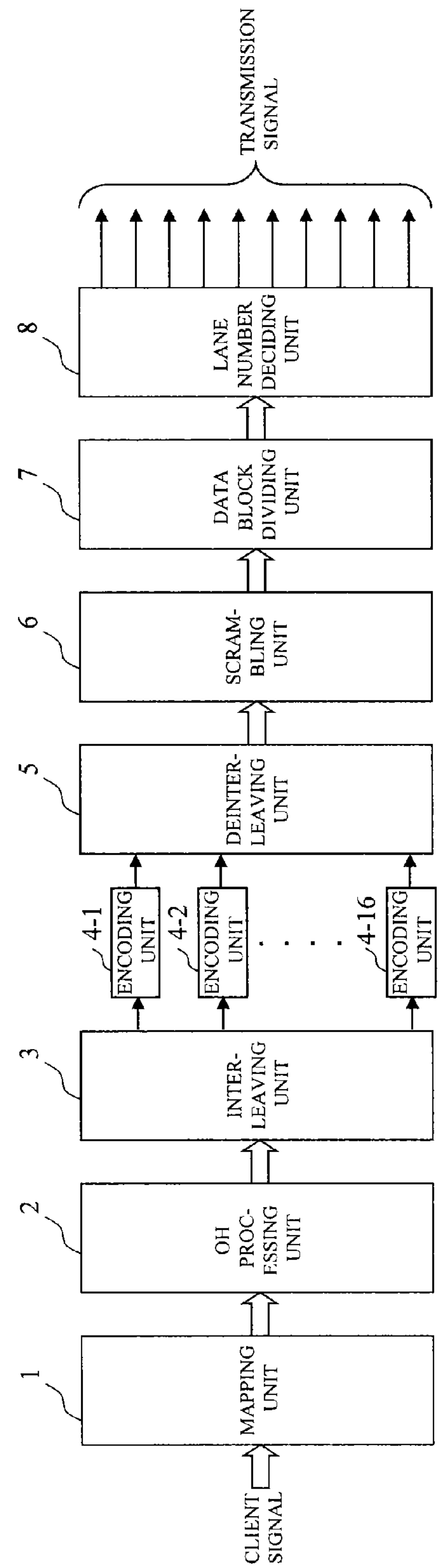
Figures 4, 5:
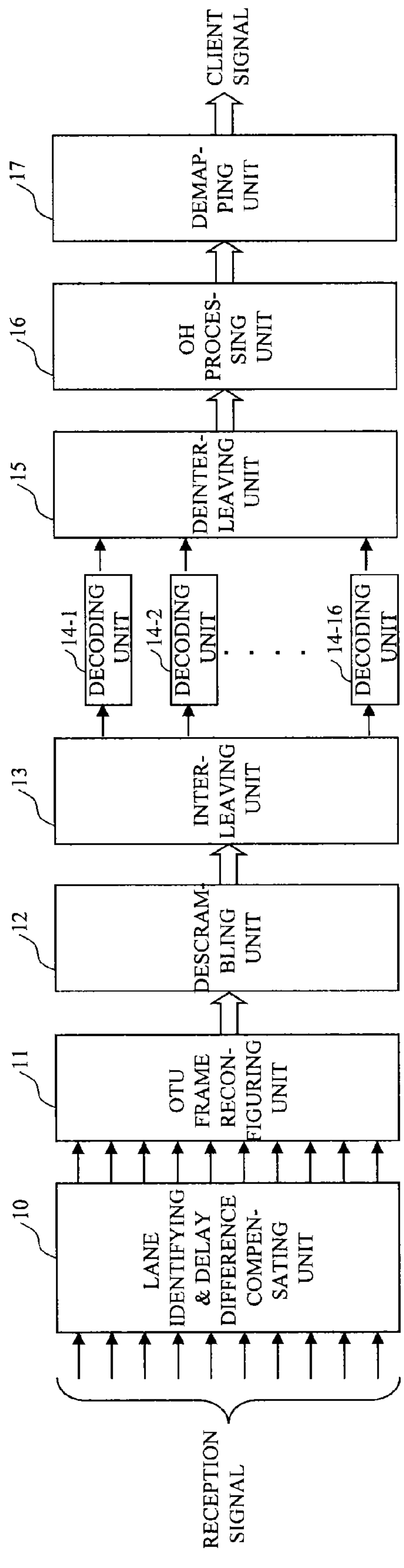
Figure 5:
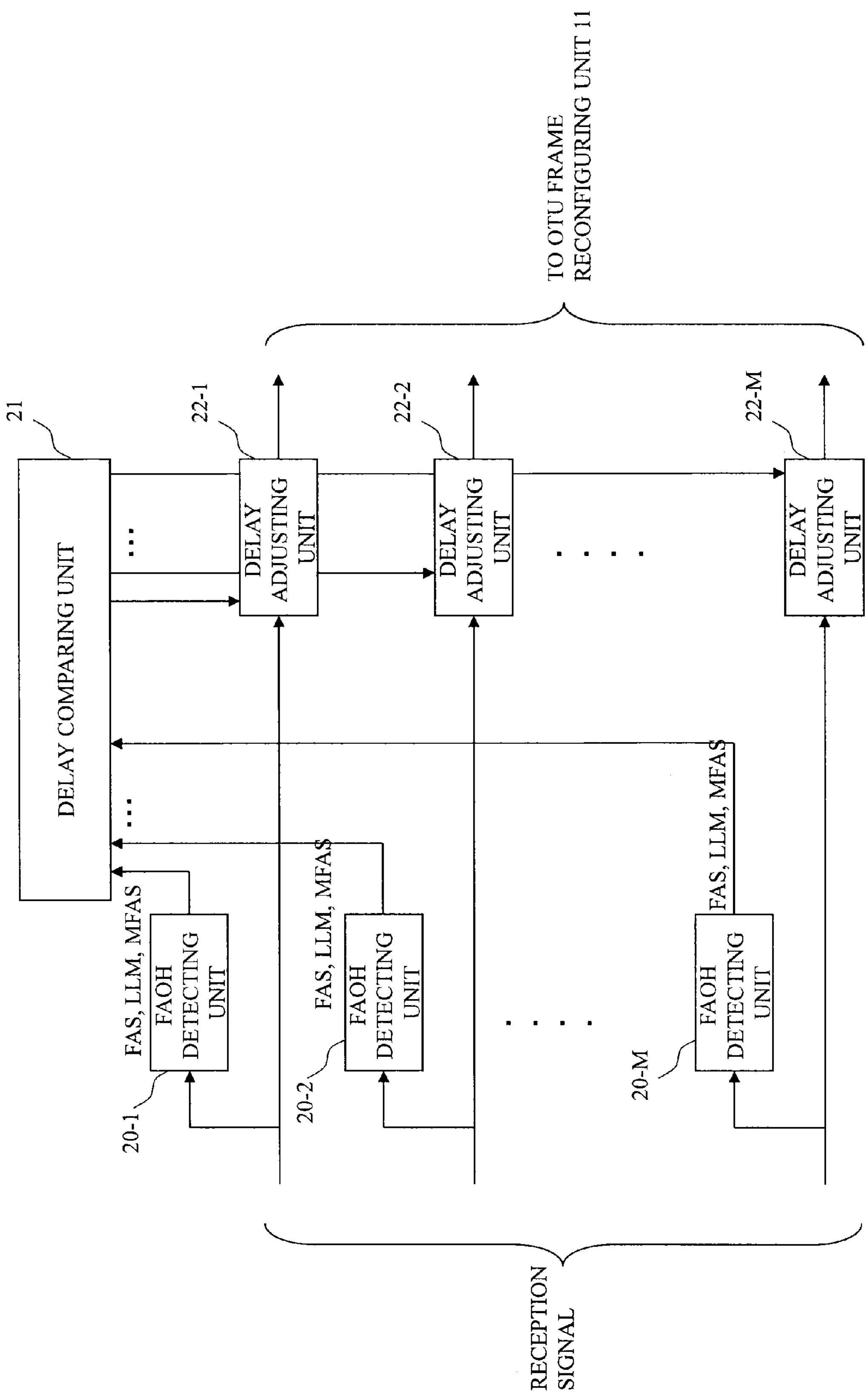
Figures 5, 6, 6A:
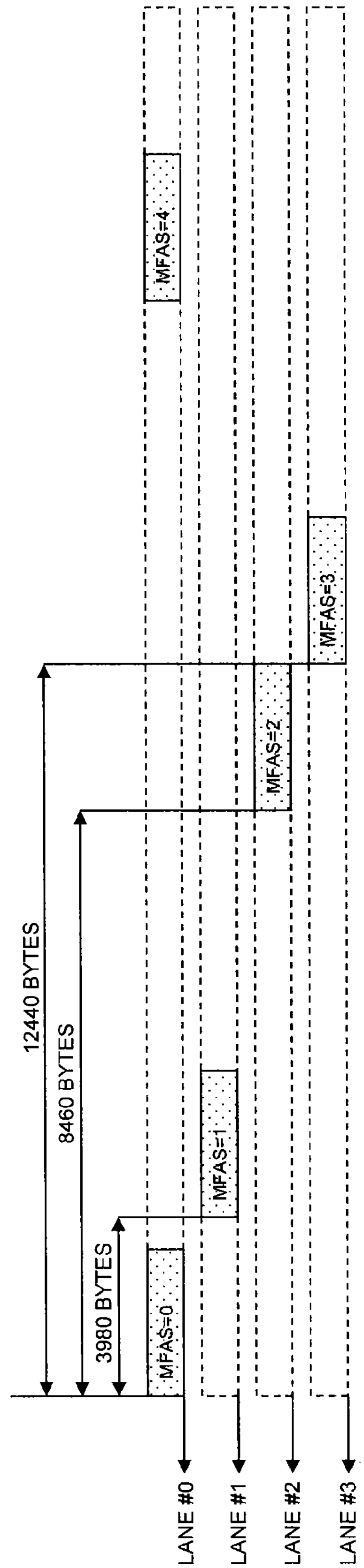
Figures 5, 6, 6B:
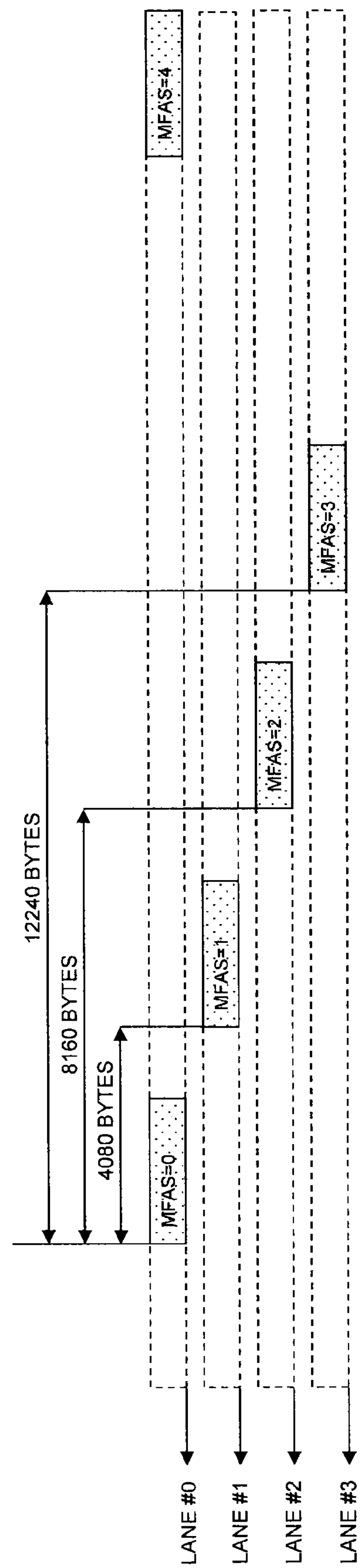
Figures 5, 6, 7:
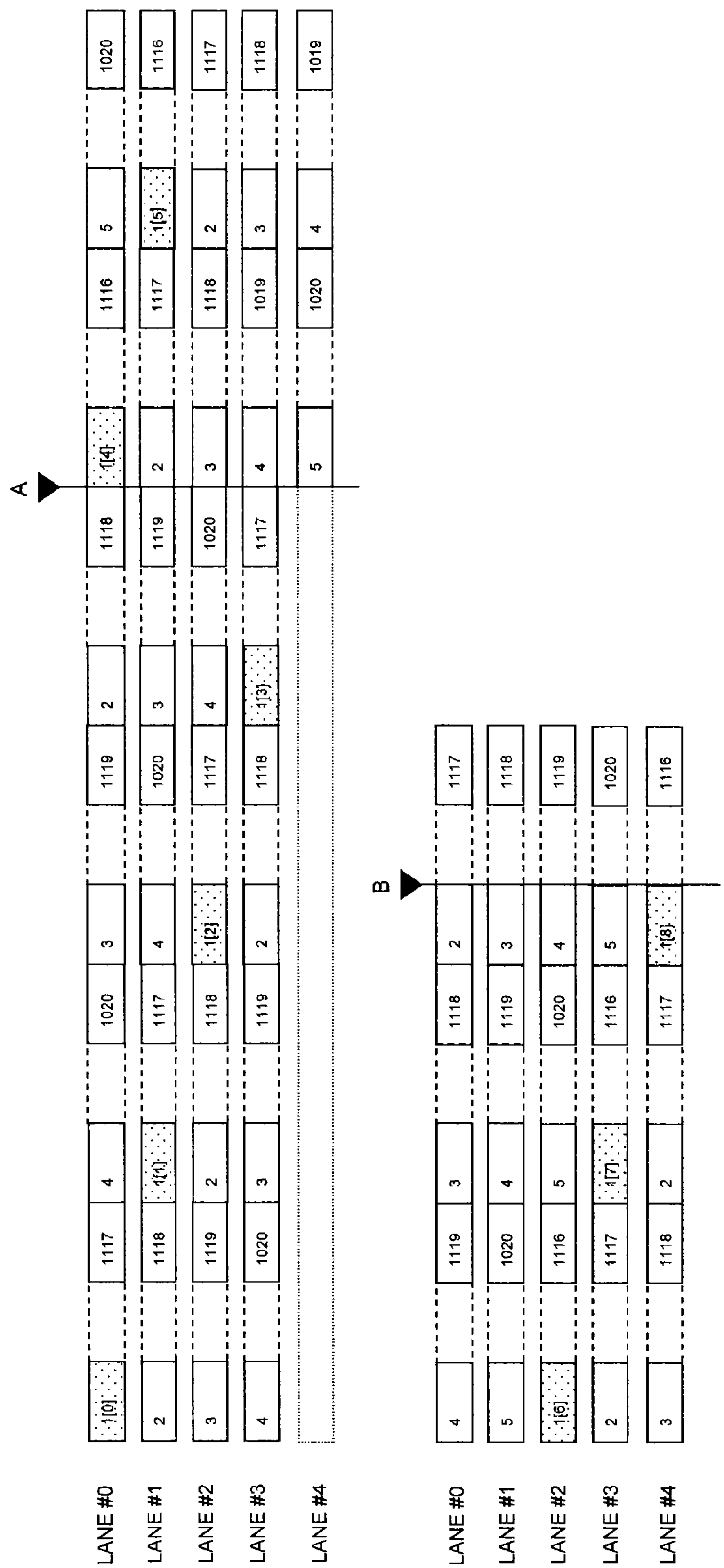
Figures 5, 6, 7, 8:
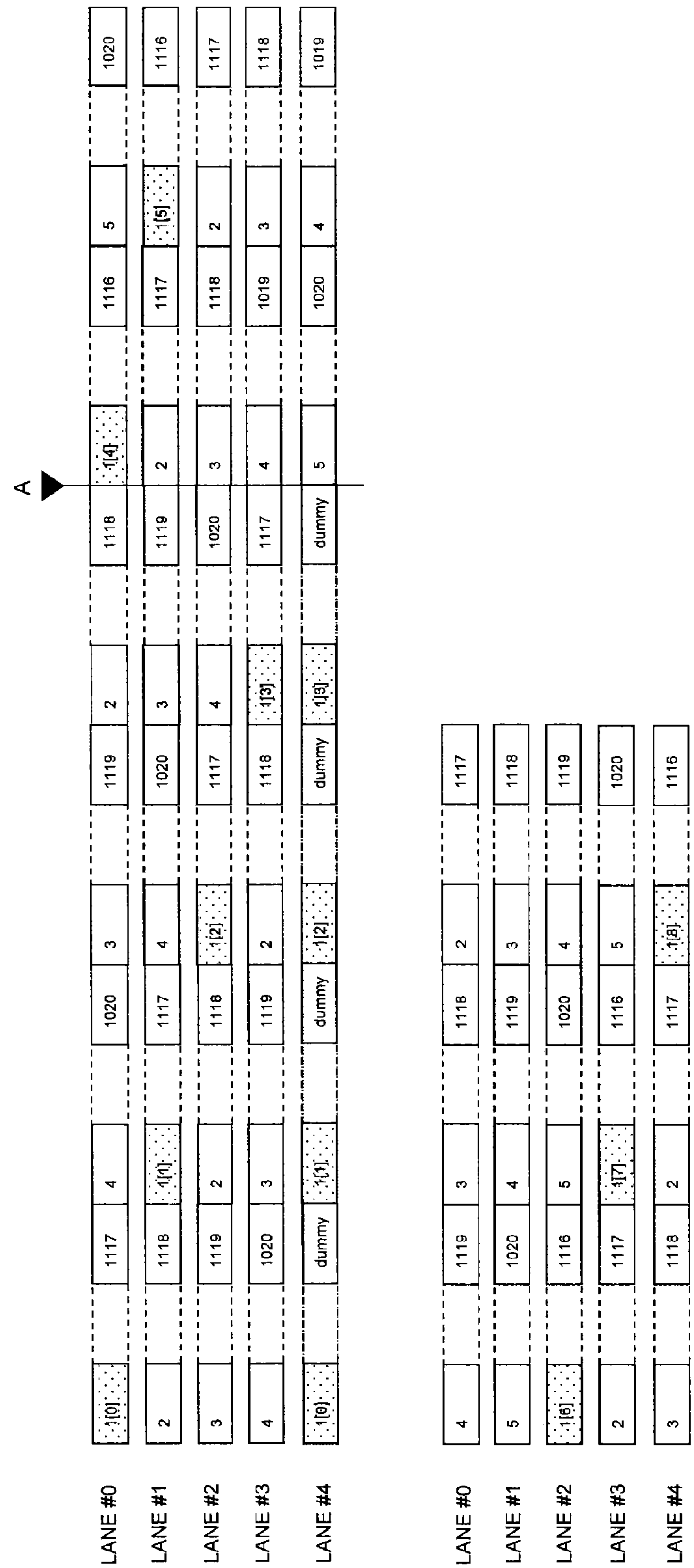
Figures 5, 6, 7, 8, 9, 9A:
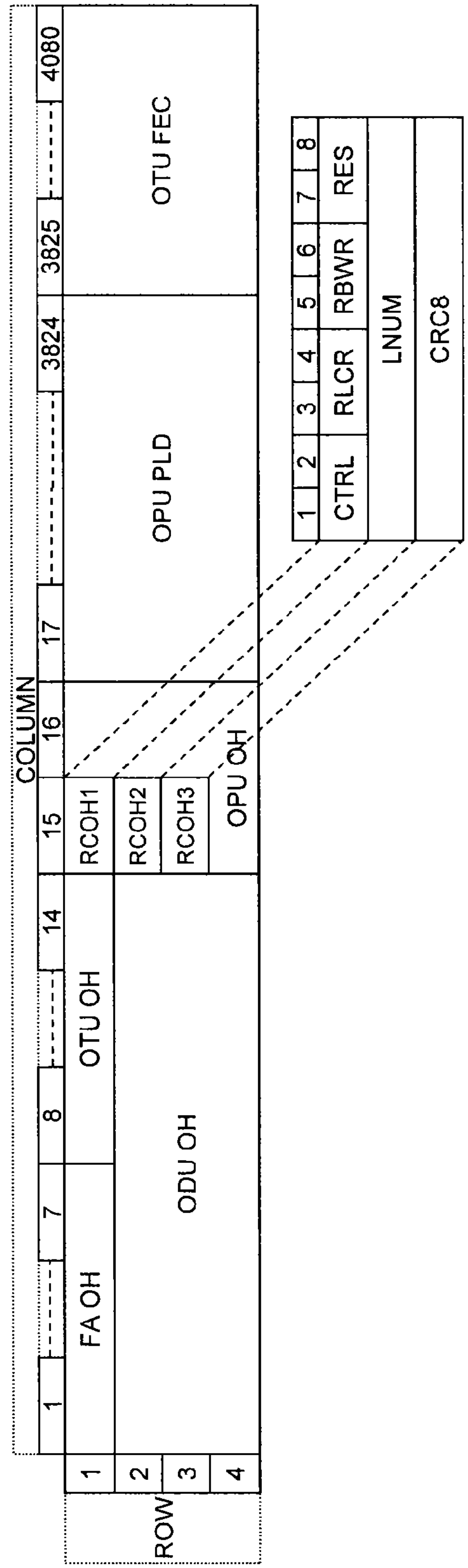
Figures 5, 6, 7, 8, 9, 9B:
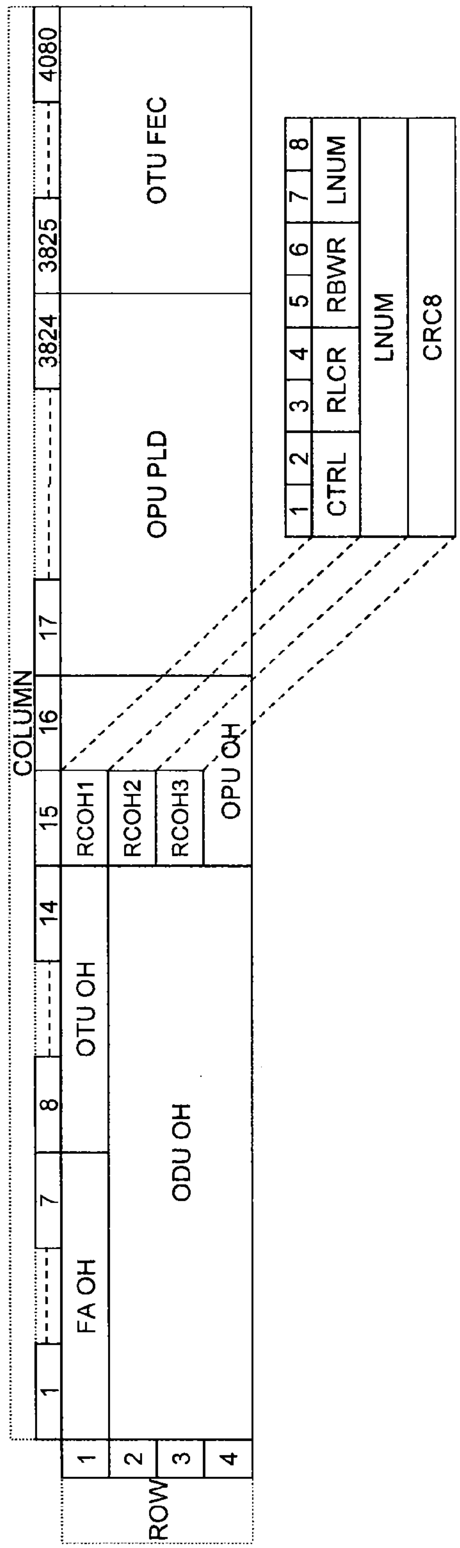
Figures 5, 6, 7, 8, 9, 10:
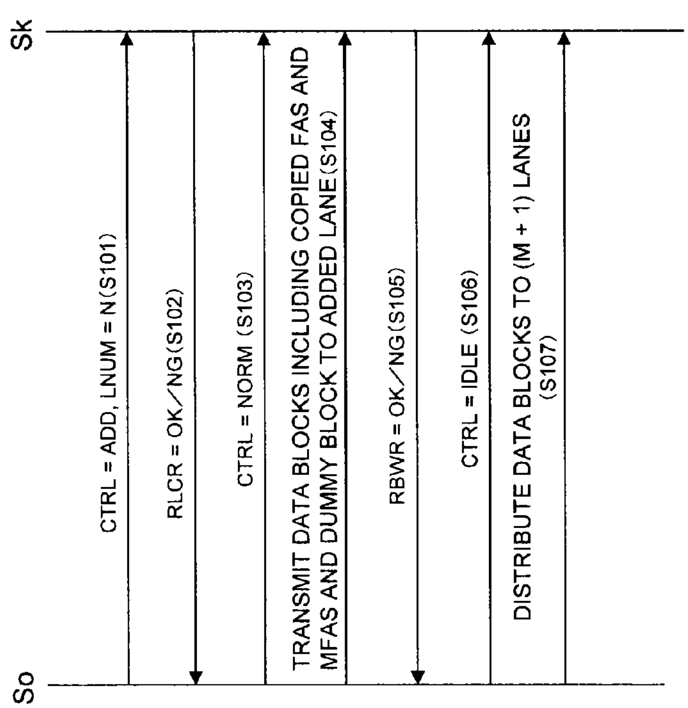
Figures 5, 6, 7, 8, 9, 10, 11:
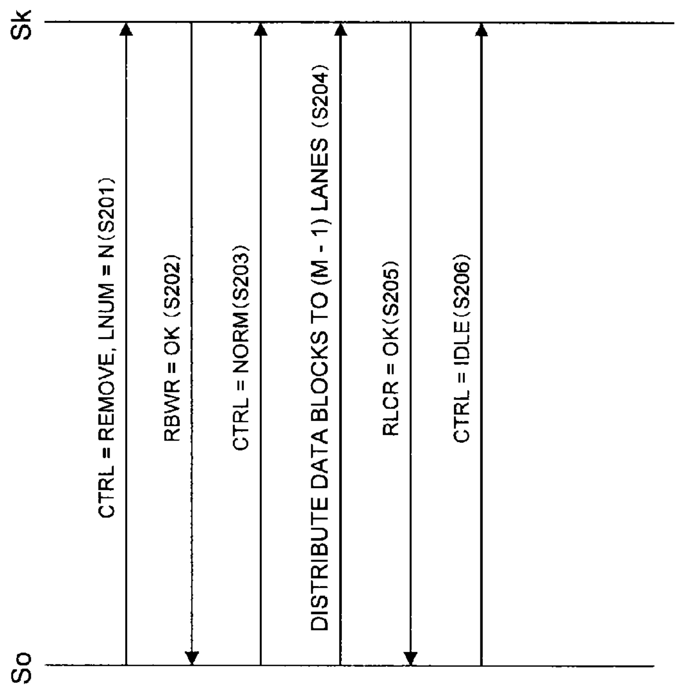
Figures 5, 6, 7, 8, 9, 10, 11, 12:
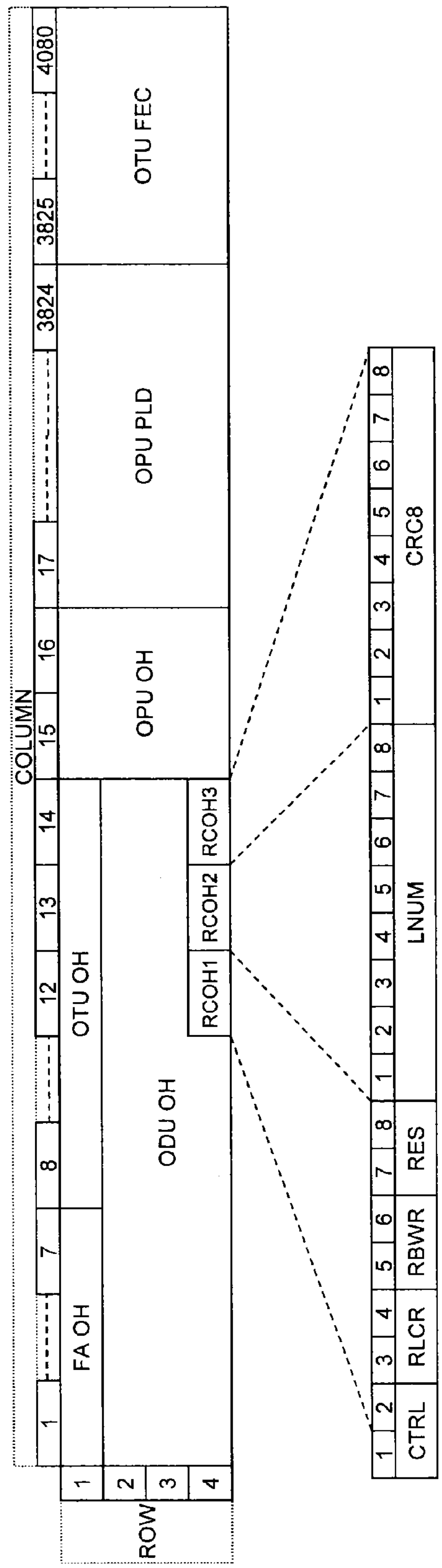
Figures 1, 6:
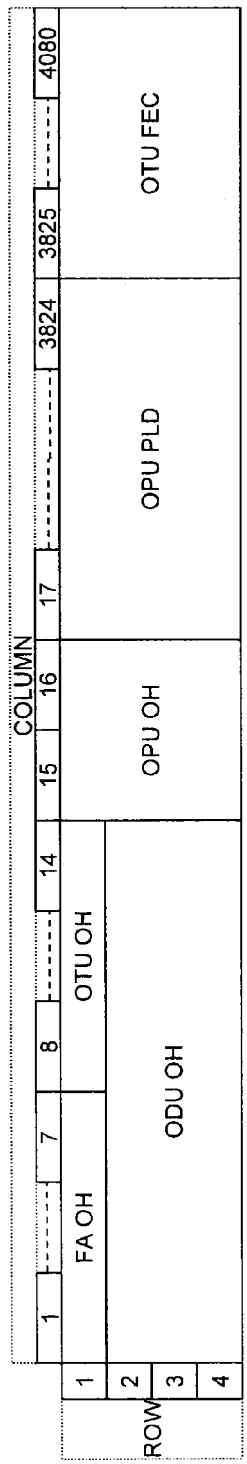
Figures 2, 6:
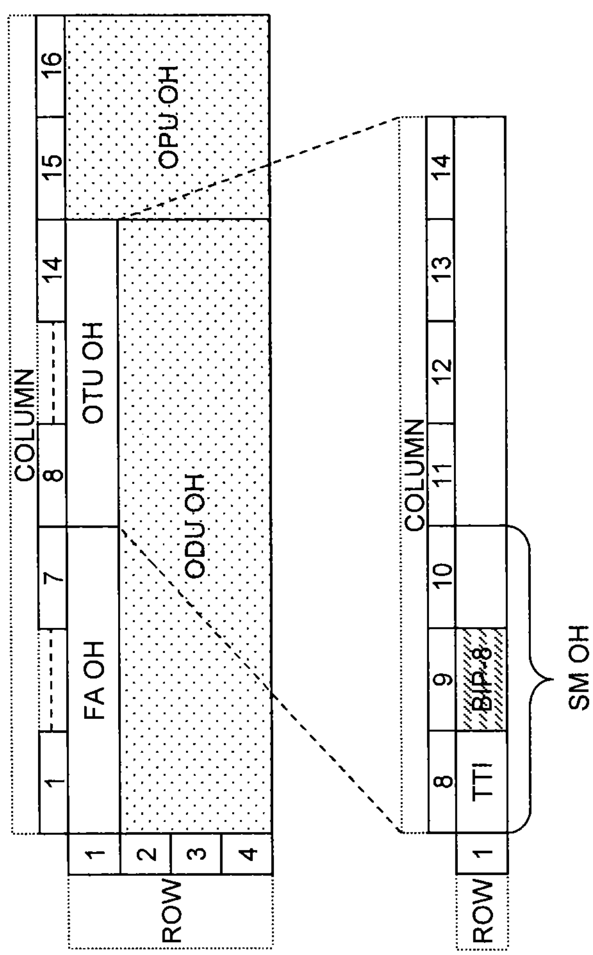
Figures 3, 6:
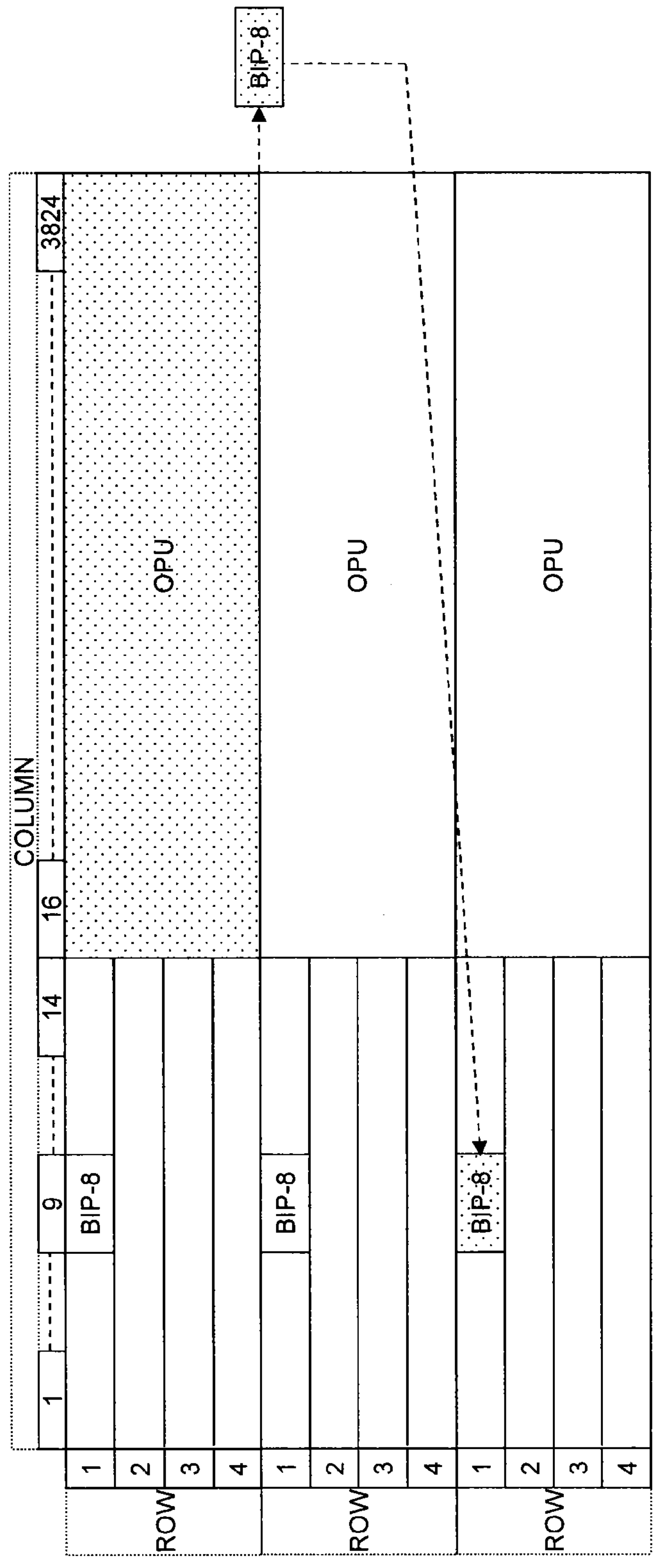
Figures 4, 6:
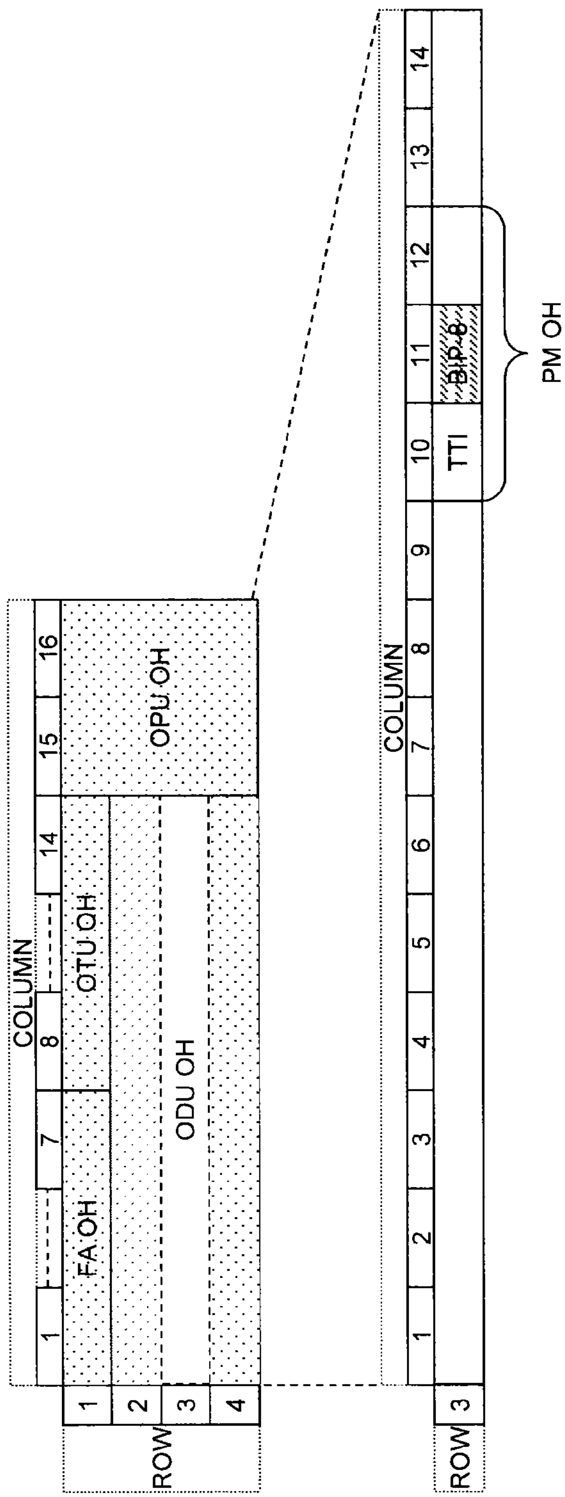
Figures 5, 6:
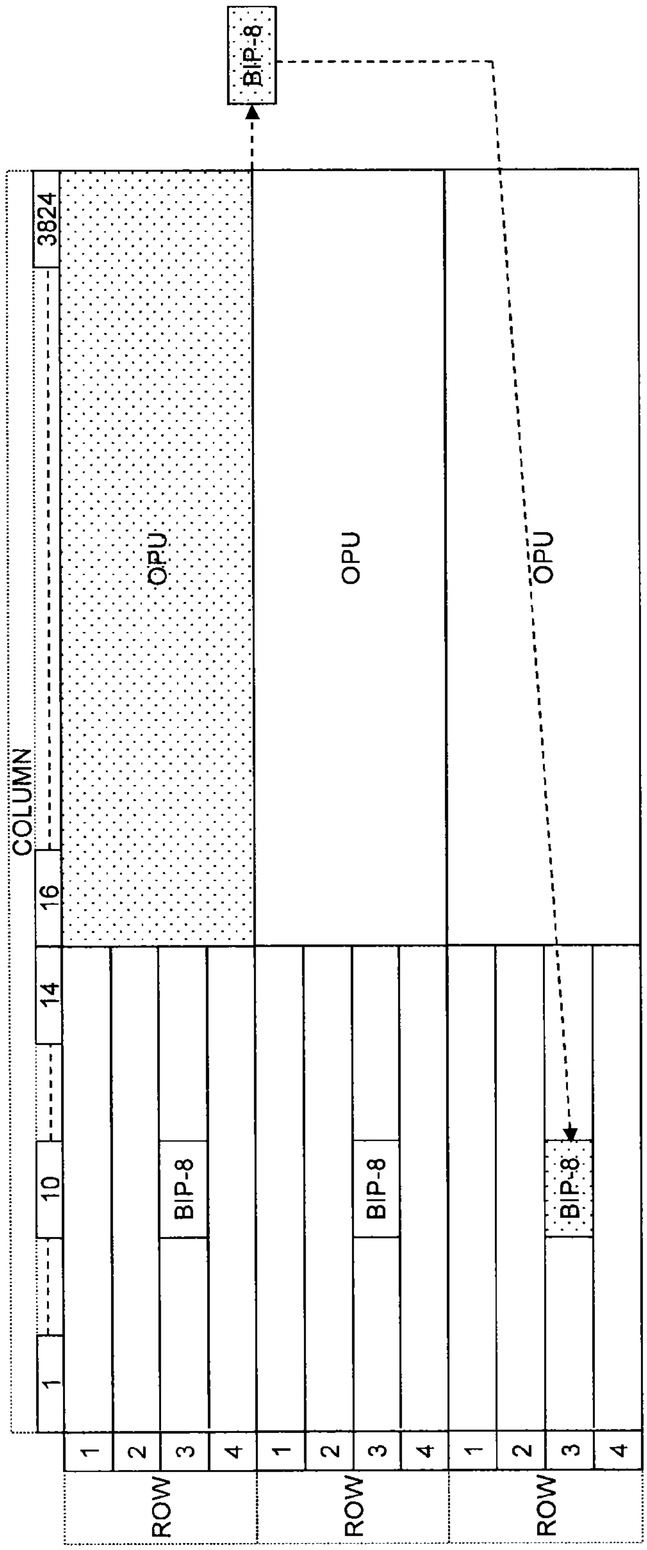
Figures 6, 6A:
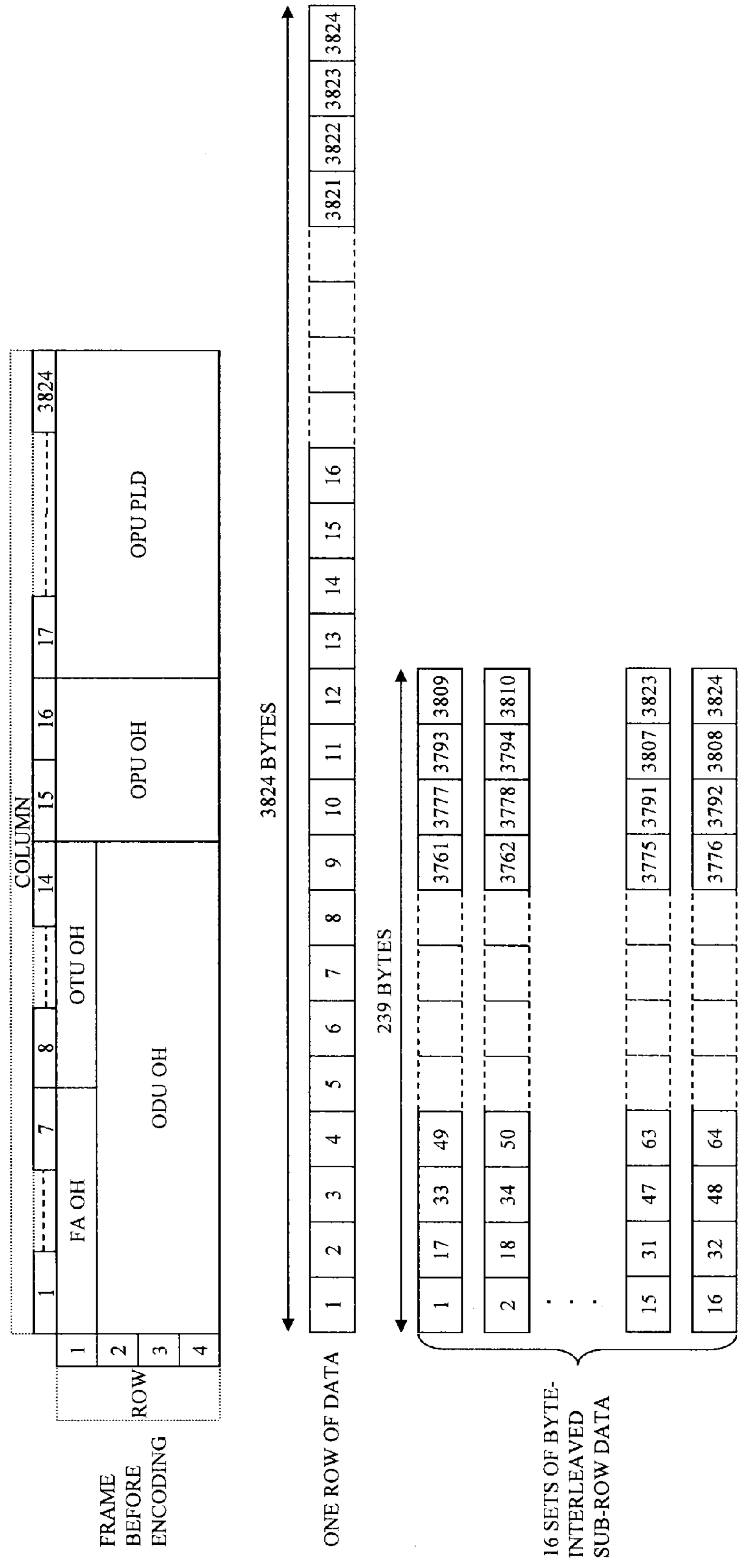
Figures 6, 6B:
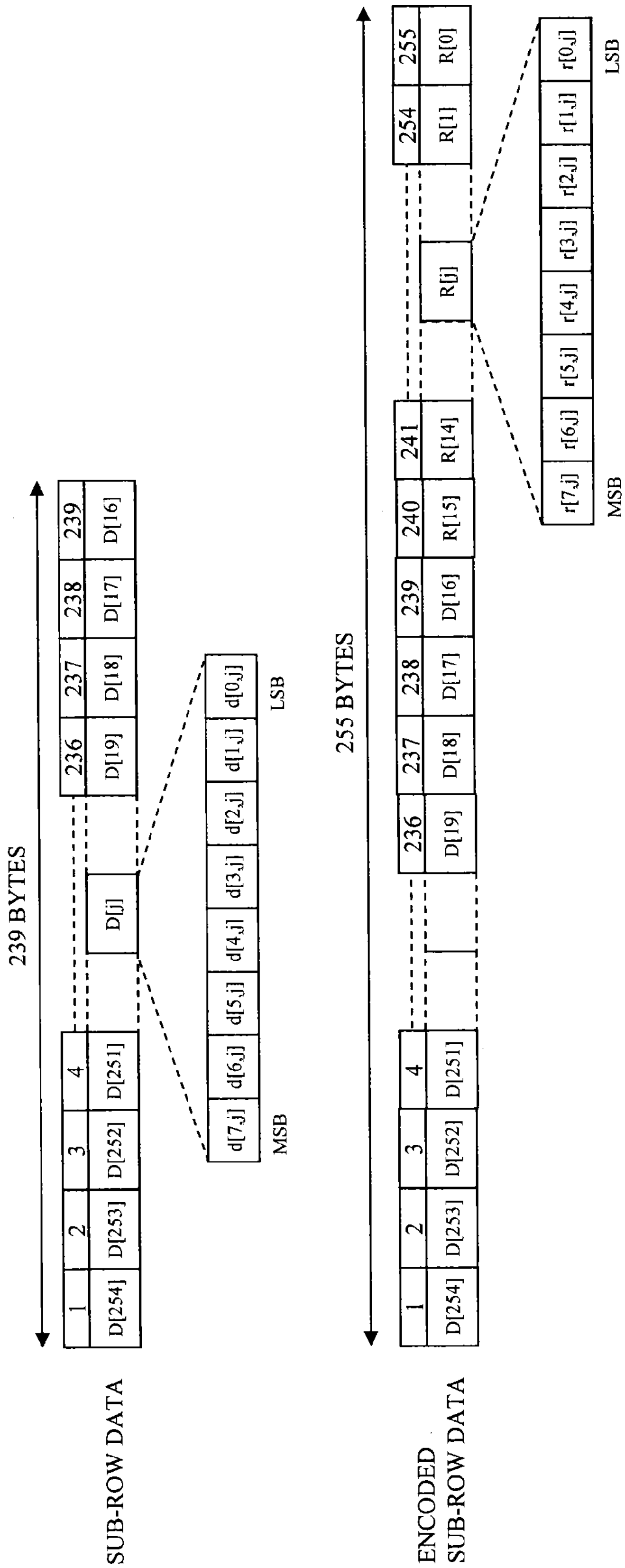
Figures 6, 6C:
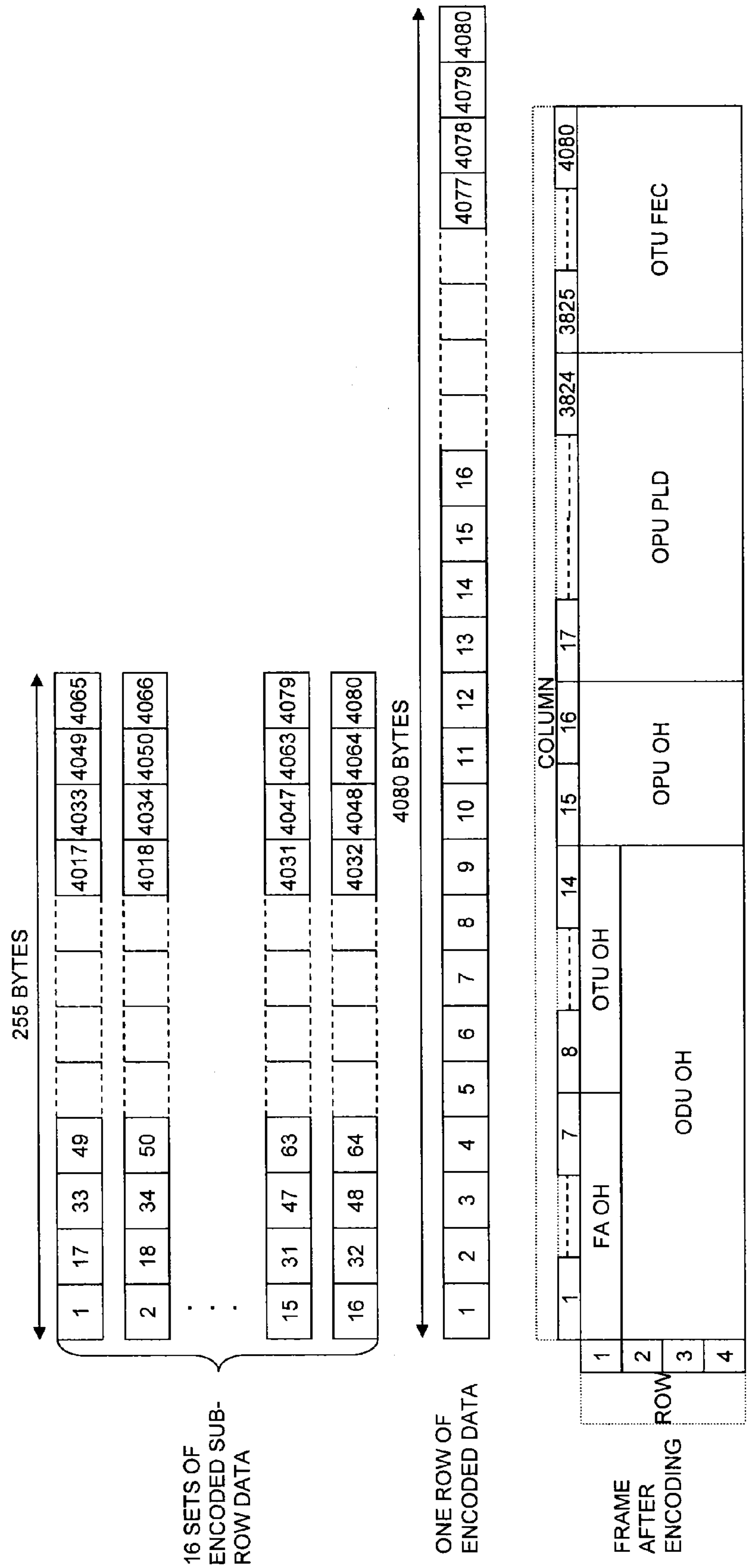
Figures 6, 7, 8, 8A:
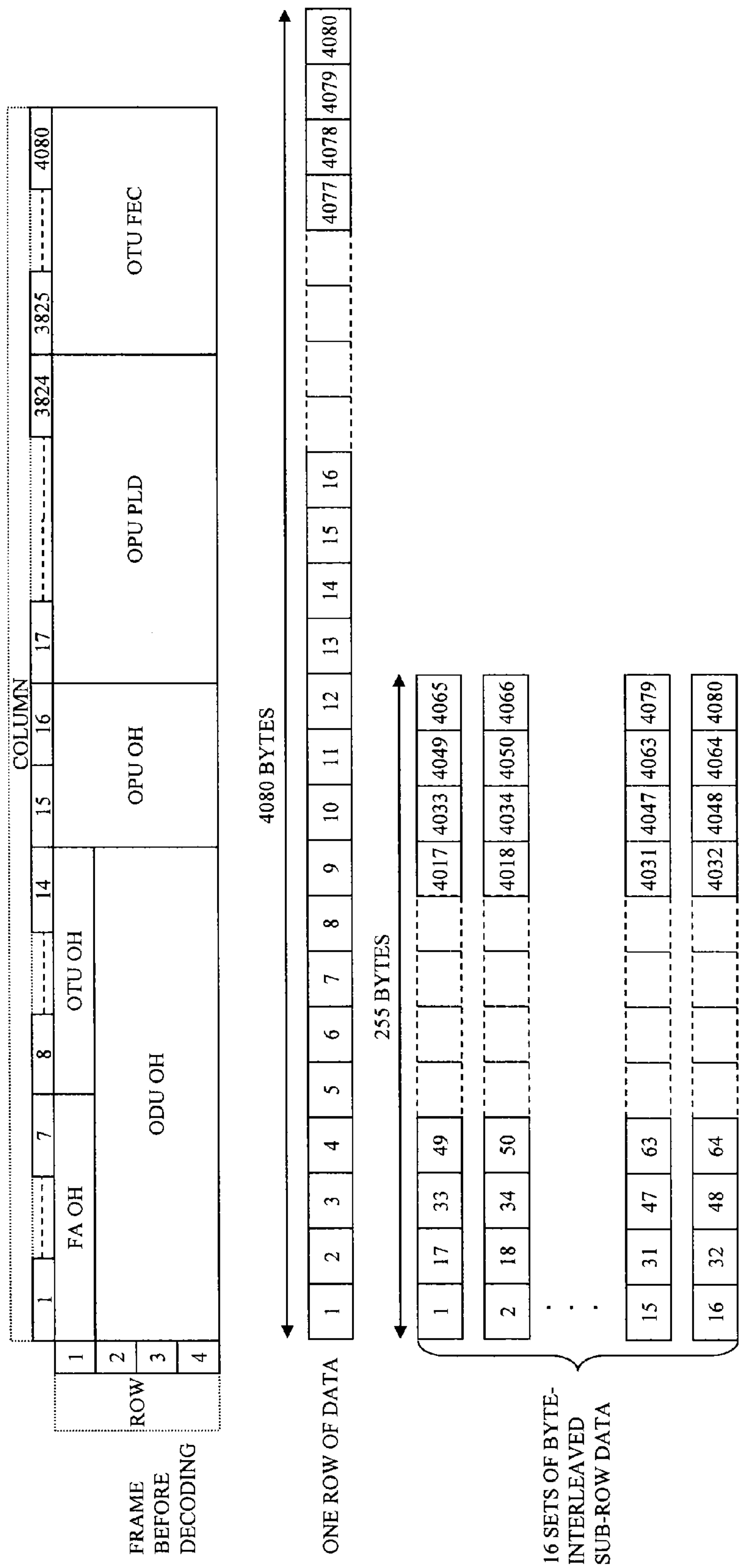
Figures 6, 7, 8, 8B:
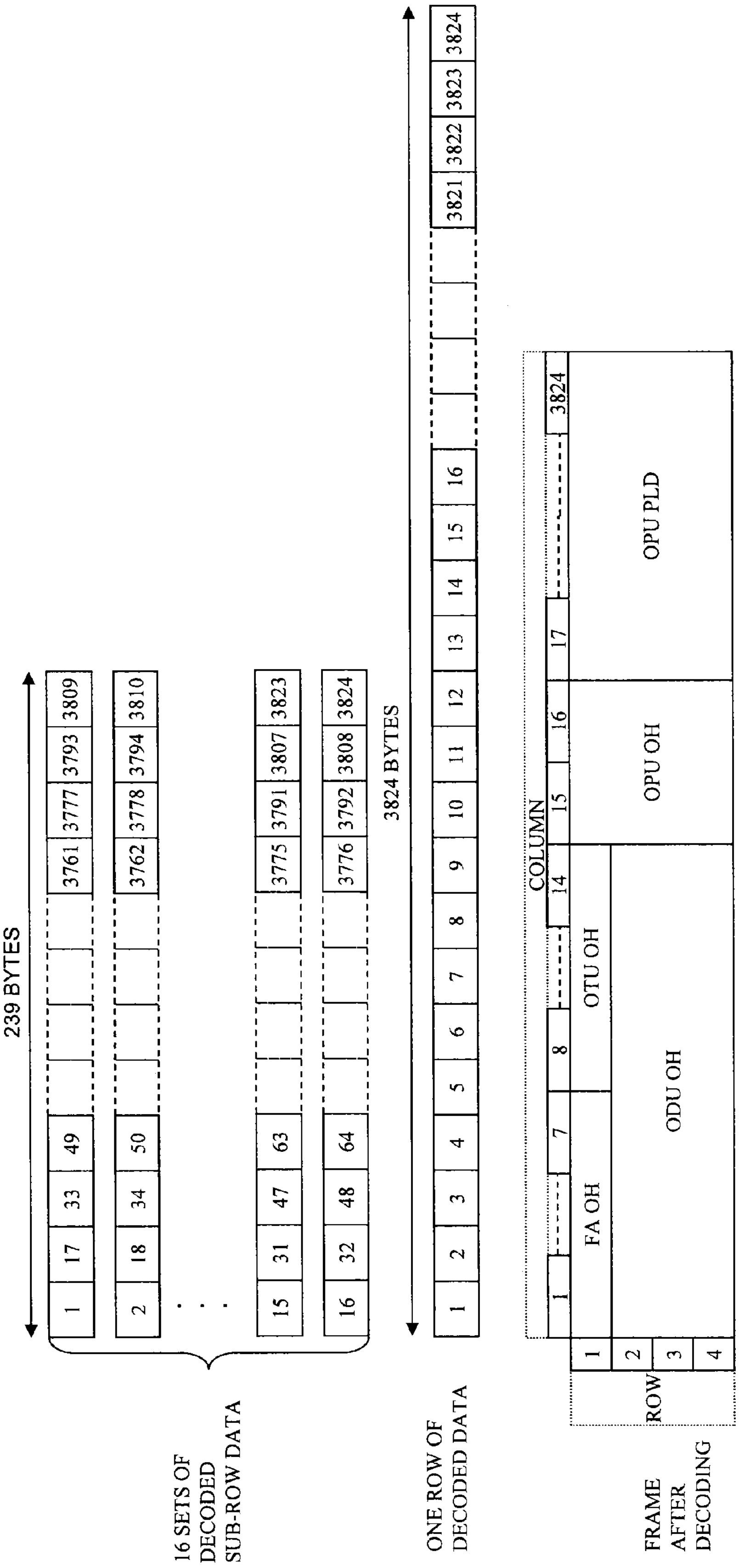
Figures 6, 7, 8, 9:
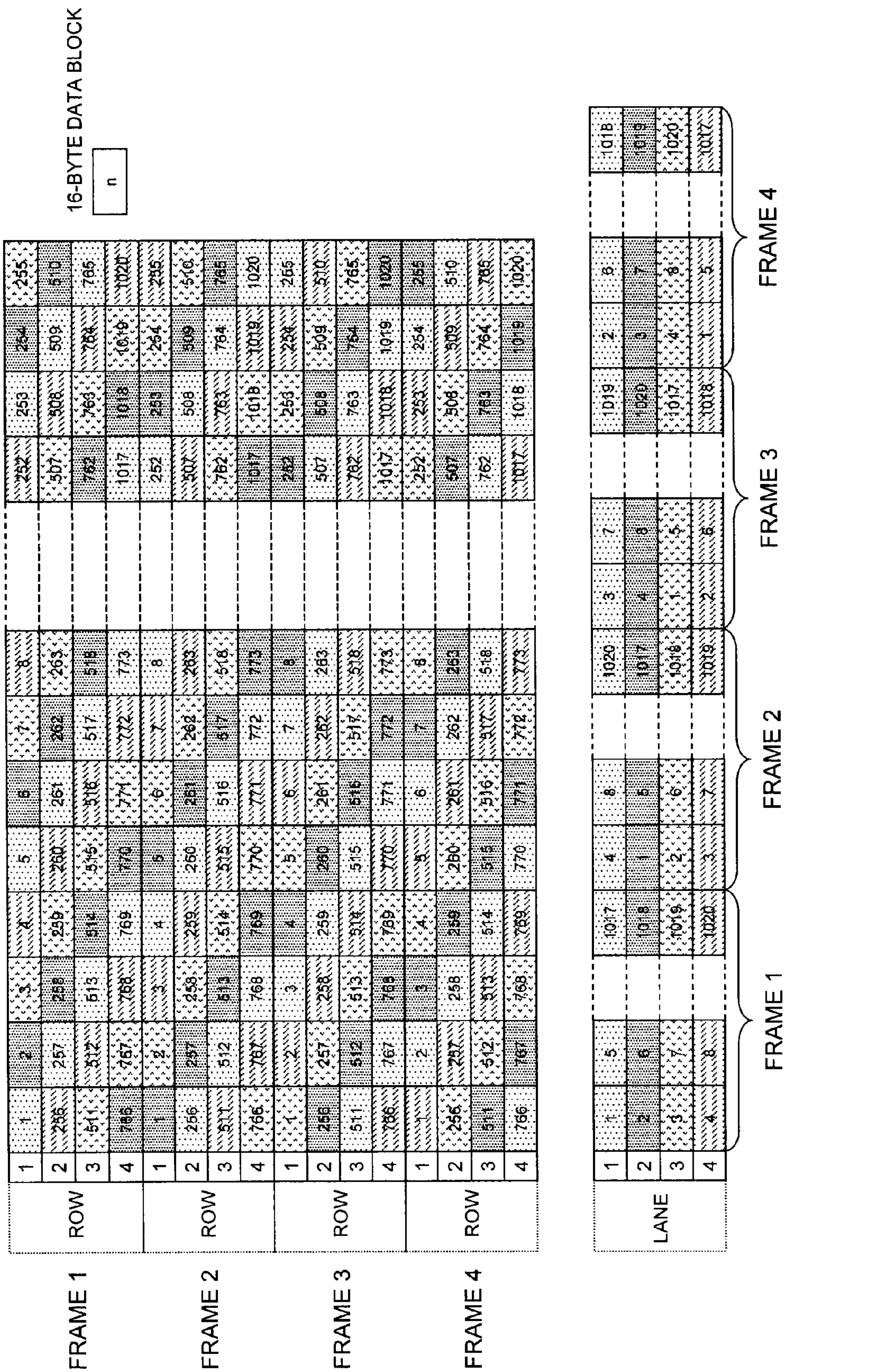
Figures 6, 7, 8, 9, 10:
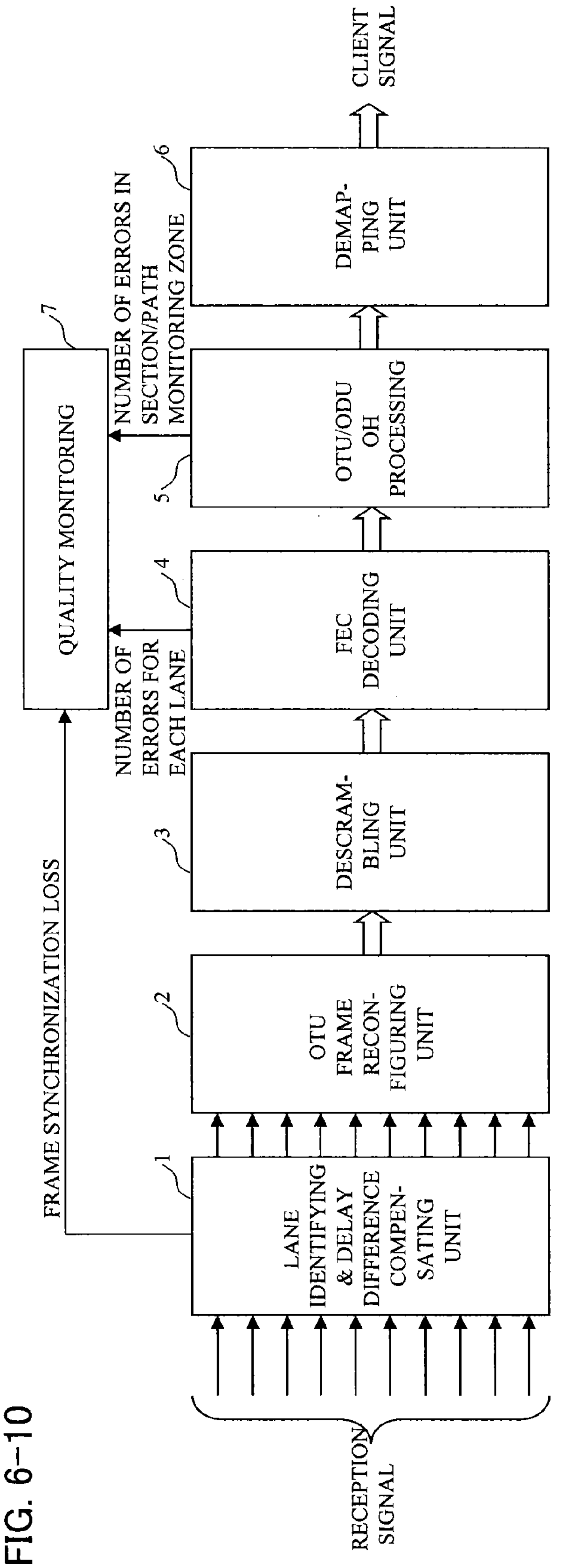
Figures 6, 7, 8, 9, 10, 11:
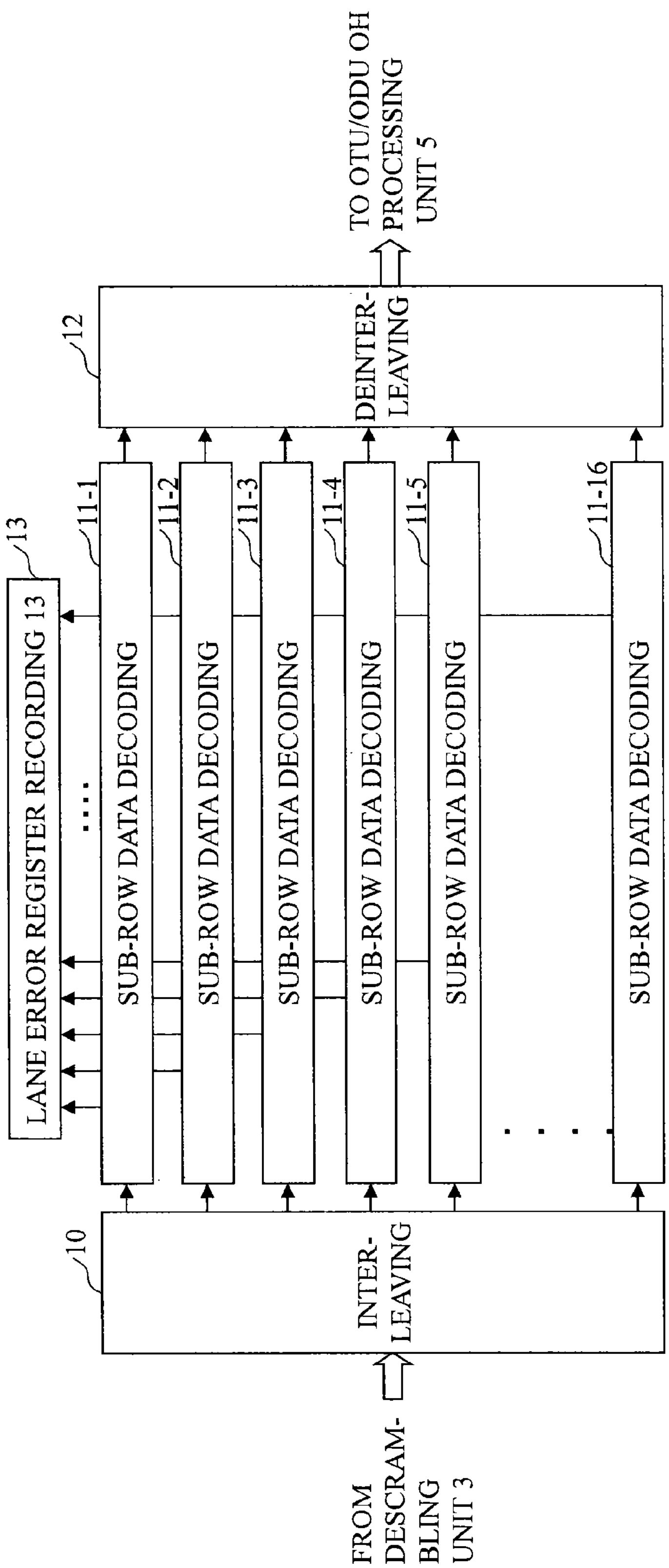
Figures 6, 7, 8, 9, 10, 11, 12:
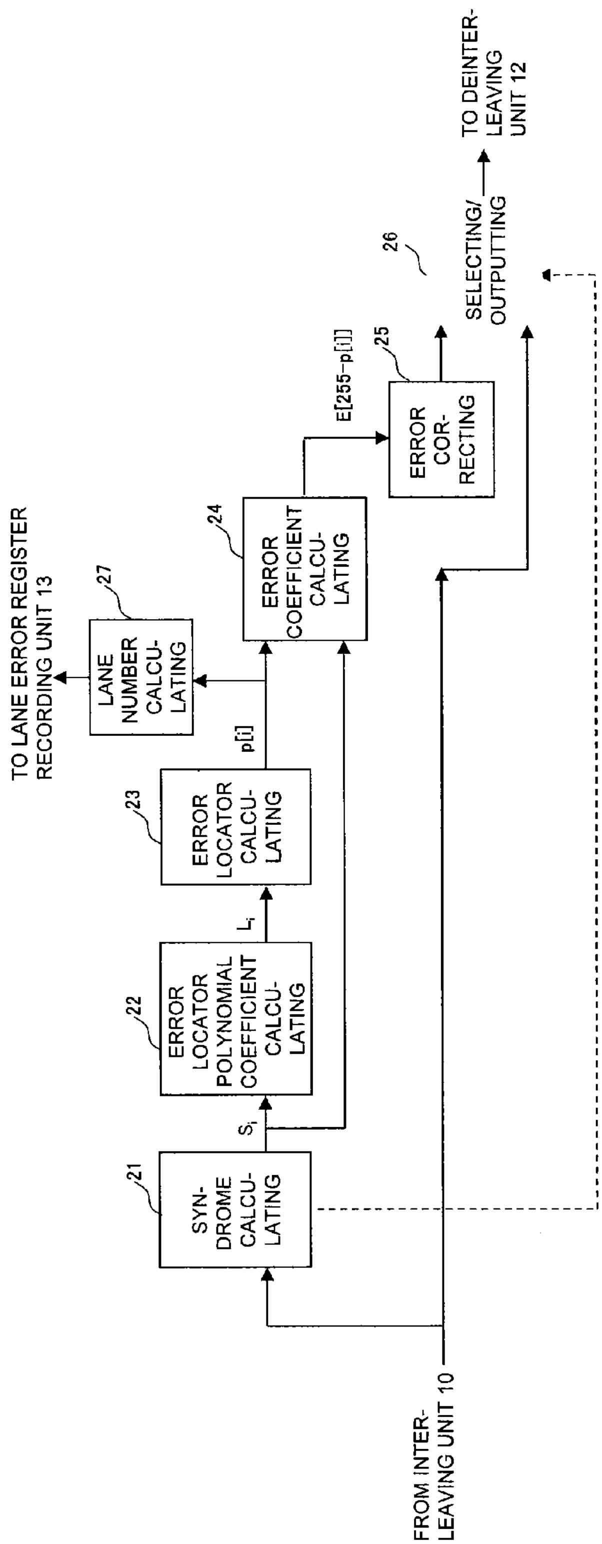
Figures 1, 7:
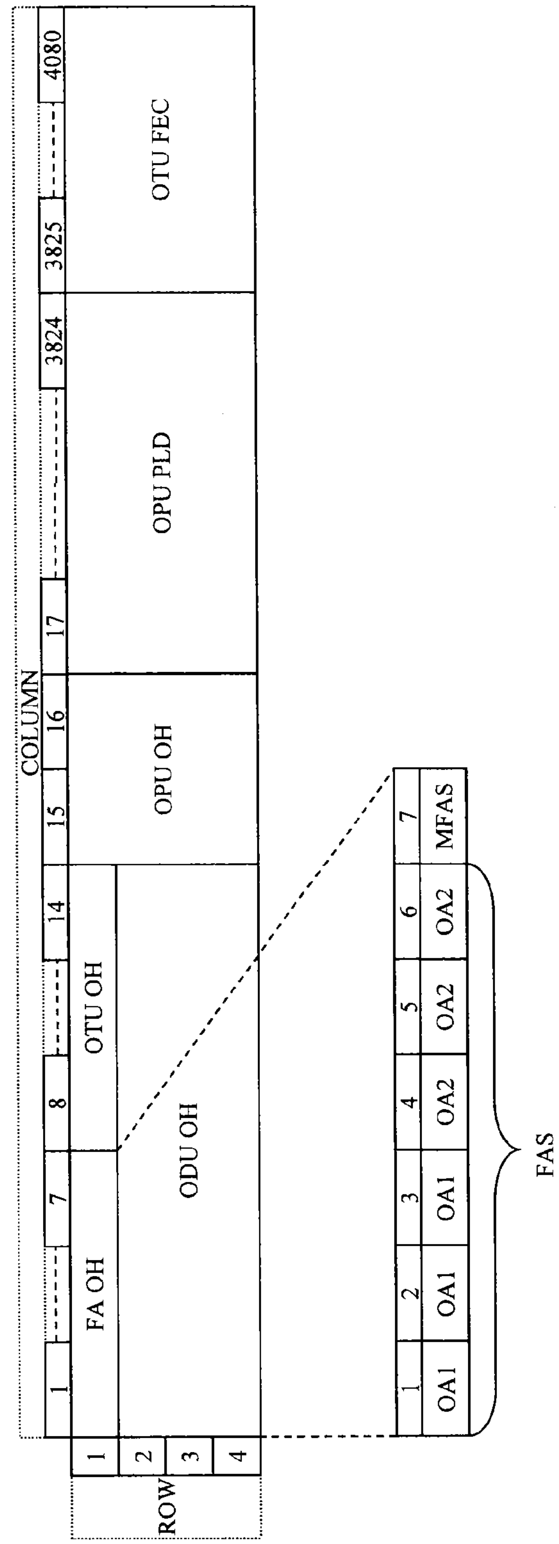
Figures 2, 7:
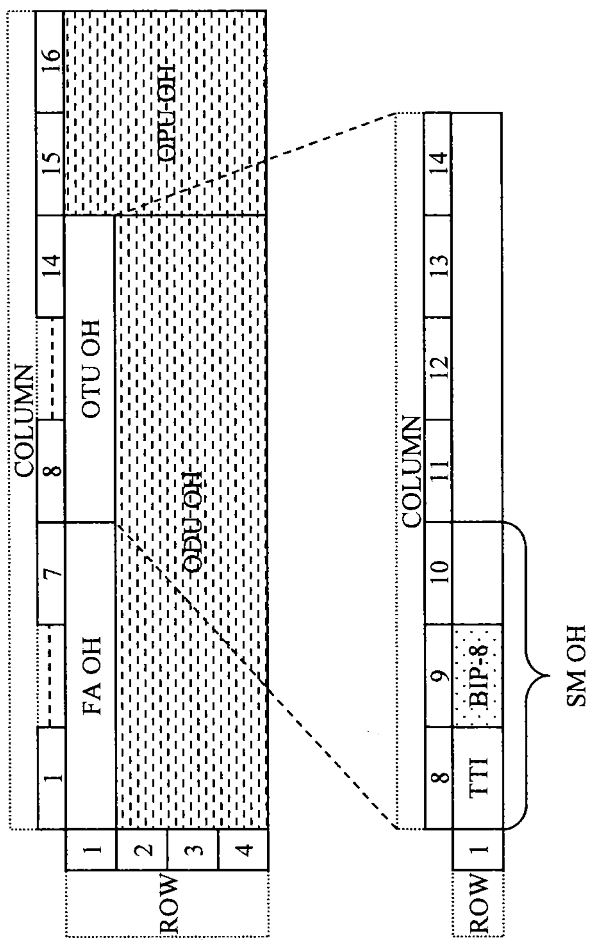
Figures 3, 7:
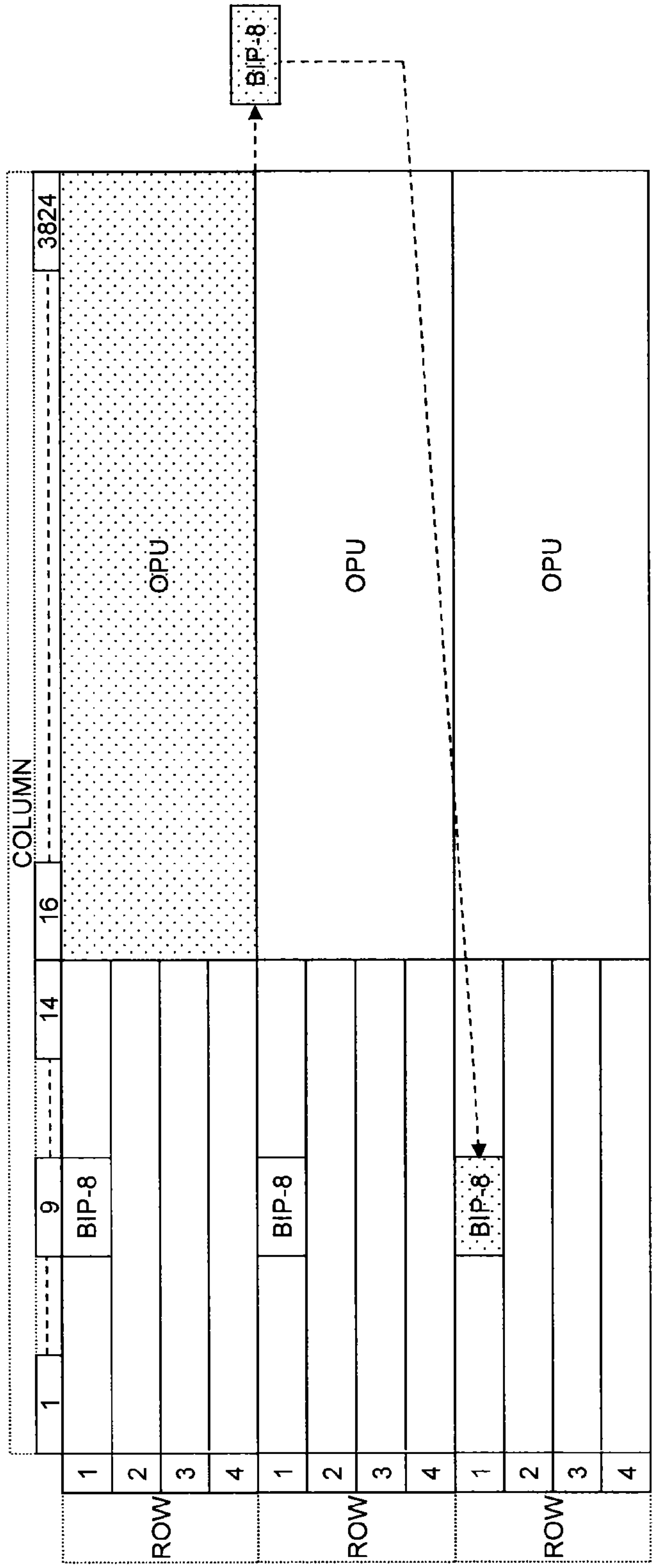
Figures 4, 7:
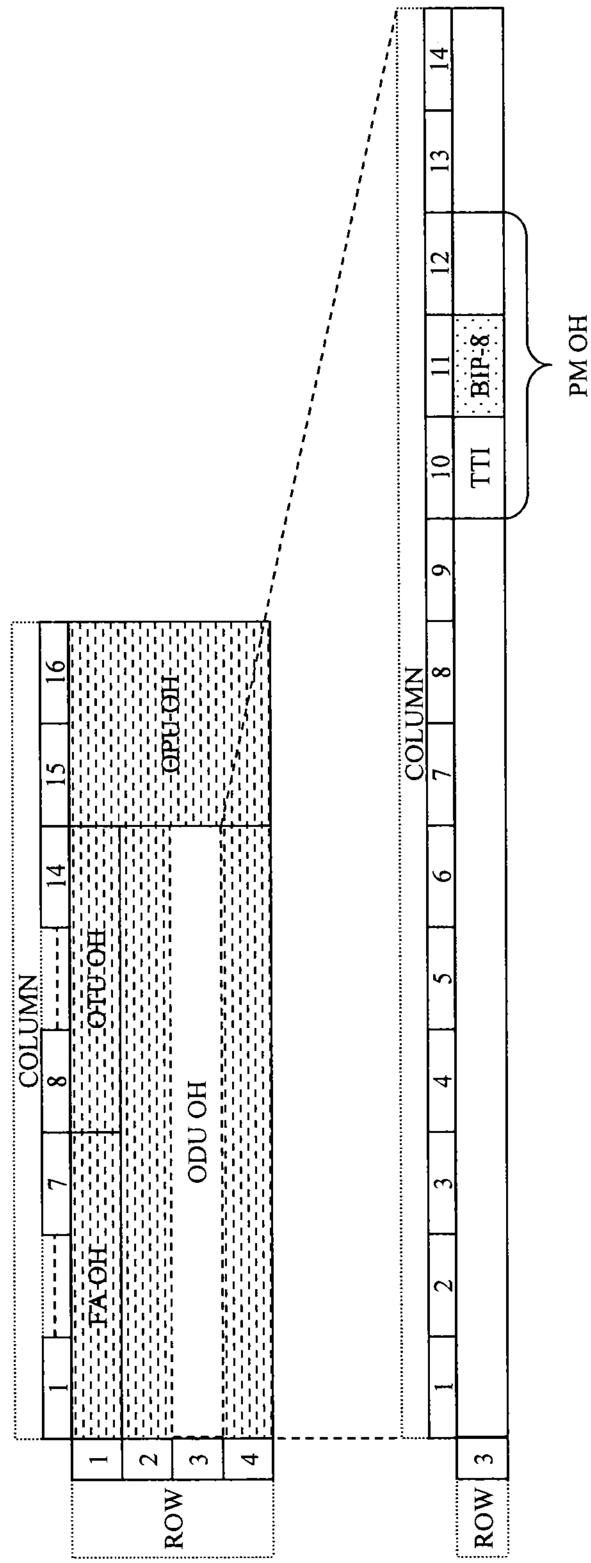
Figures 5, 7:
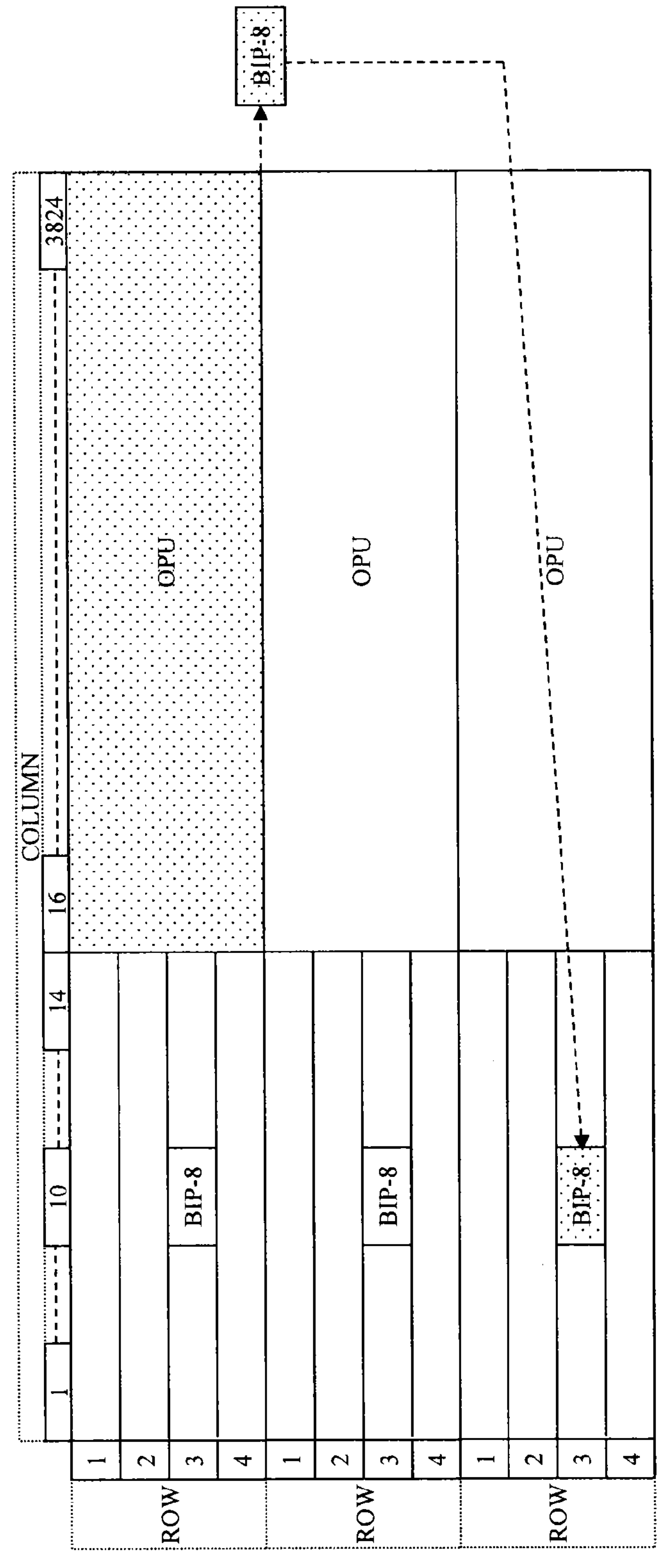
Figures 6, 7:
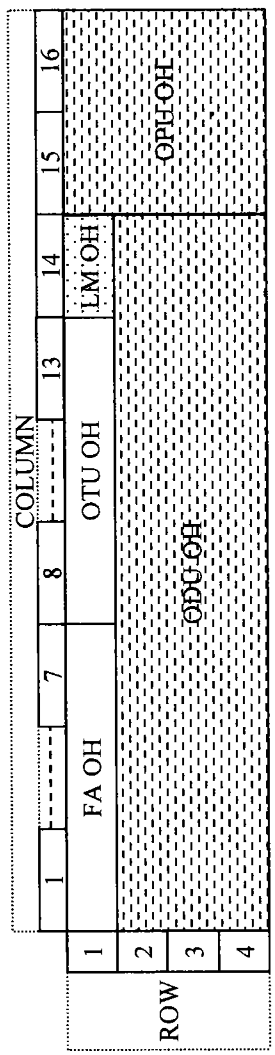
Figure 7:
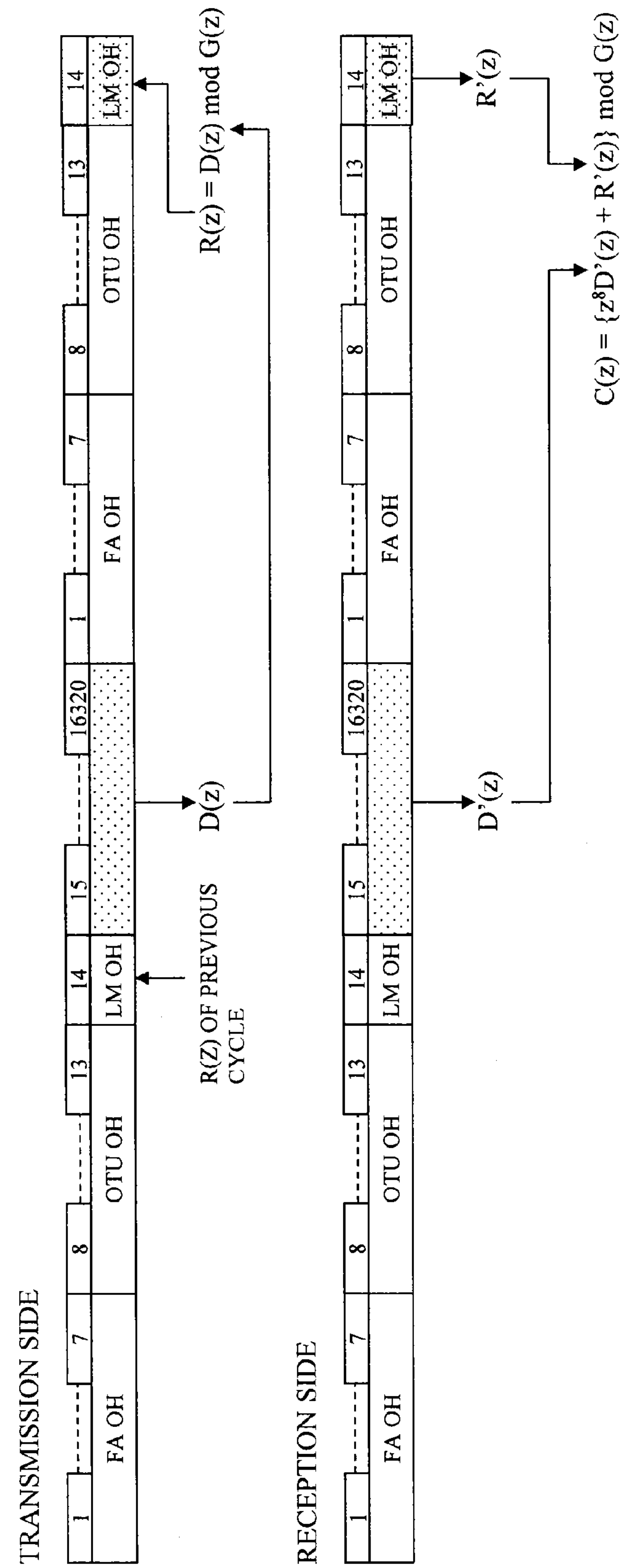
Figures 7, 8:
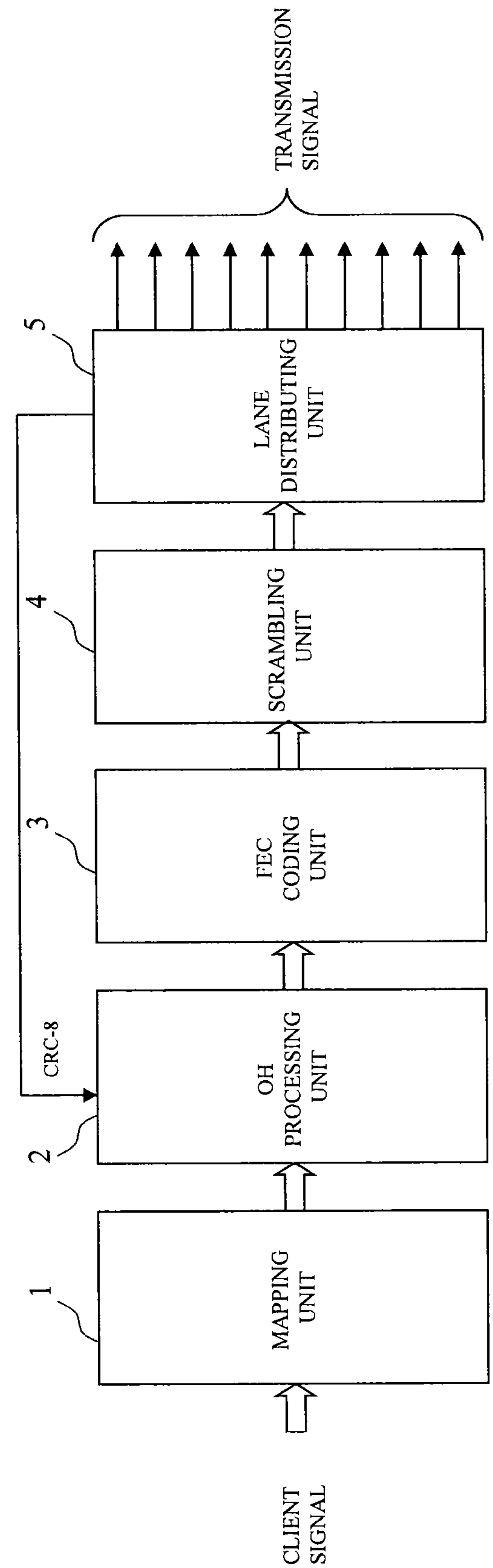
Figures 7, 8, 9:
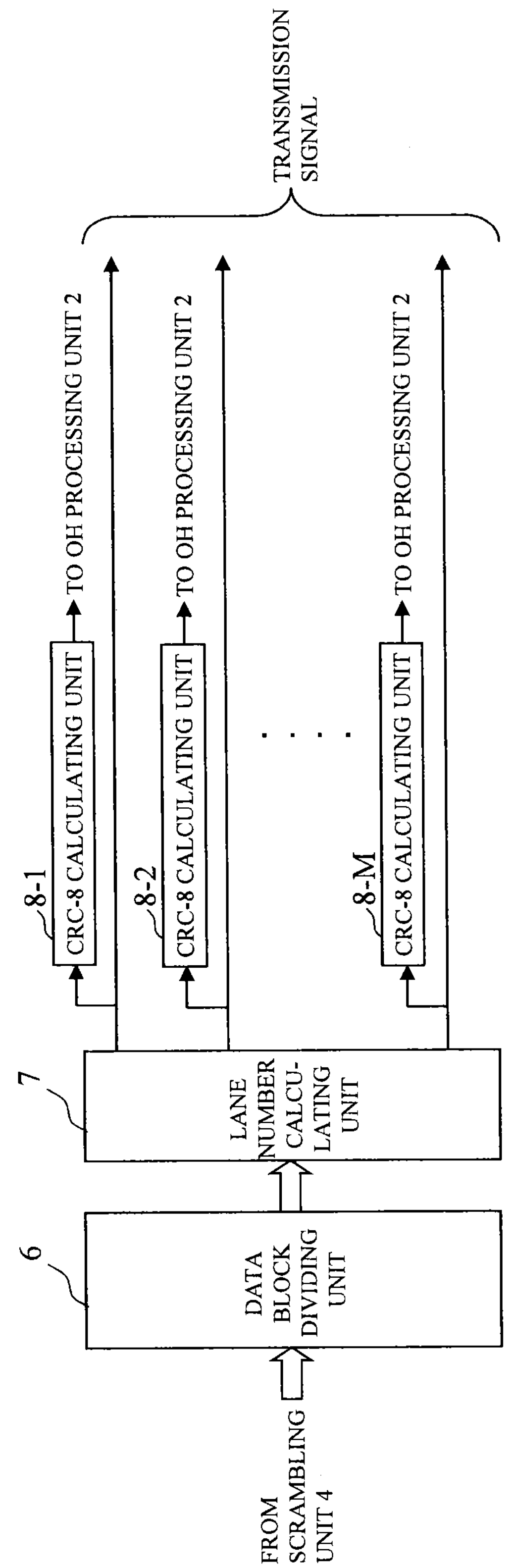
Figures 7, 8, 9, 10:
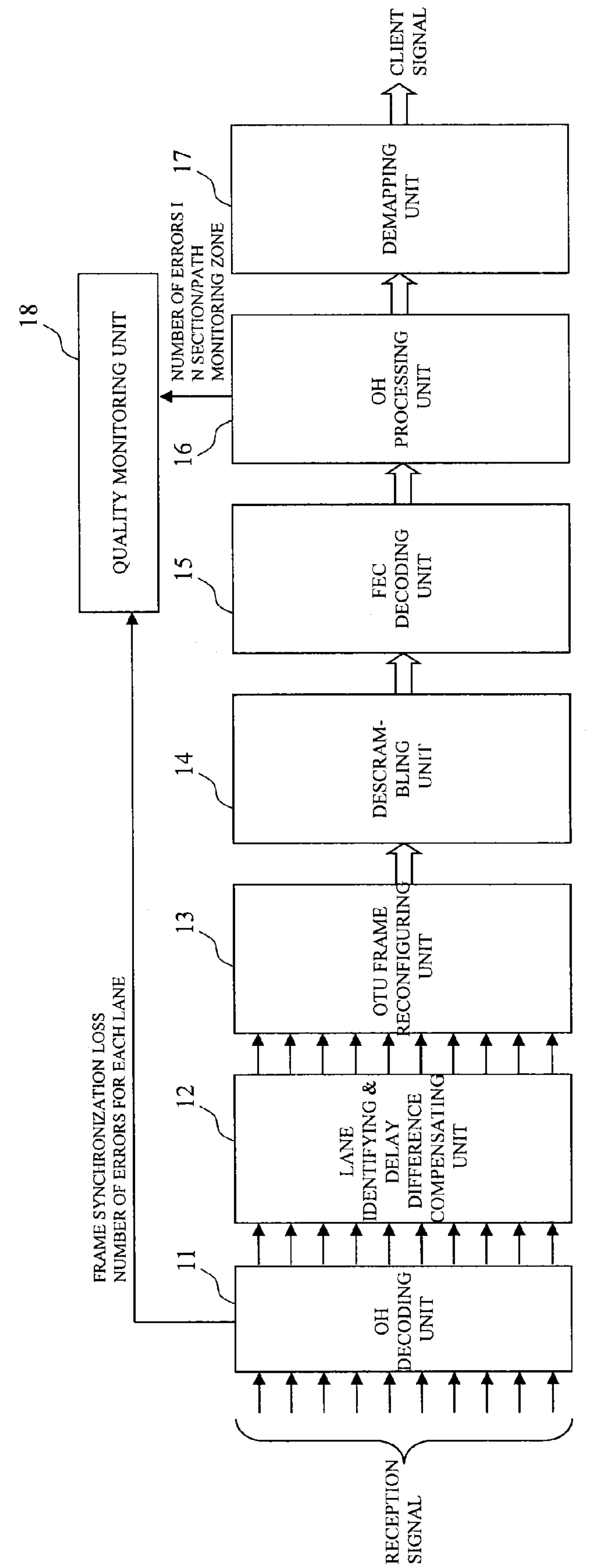
Figures 7, 8, 9, 10, 11:
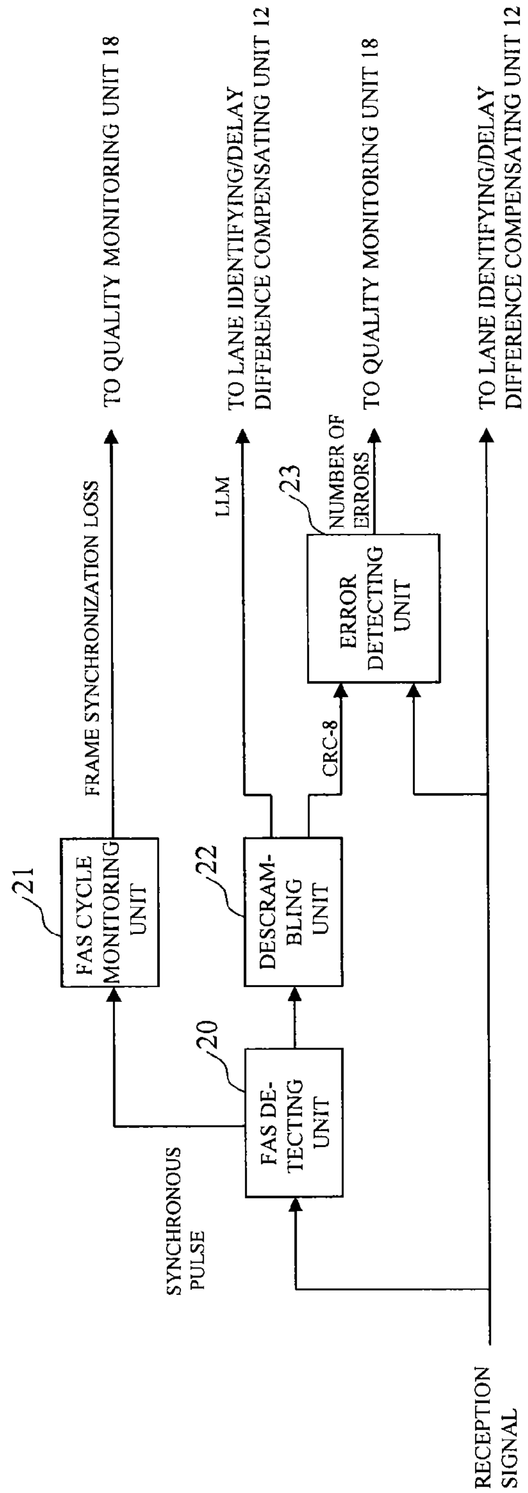
Figures 7, 8, 9, 10, 11, 12:
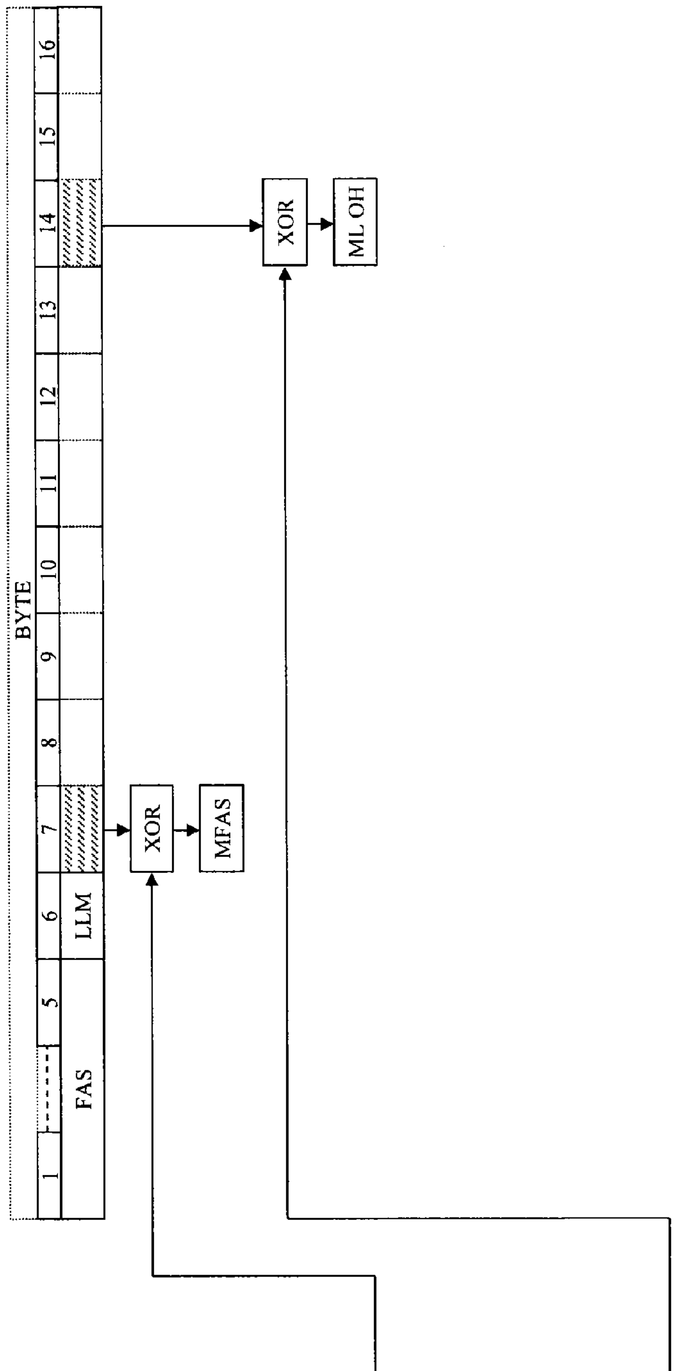
Figures 1, 8:
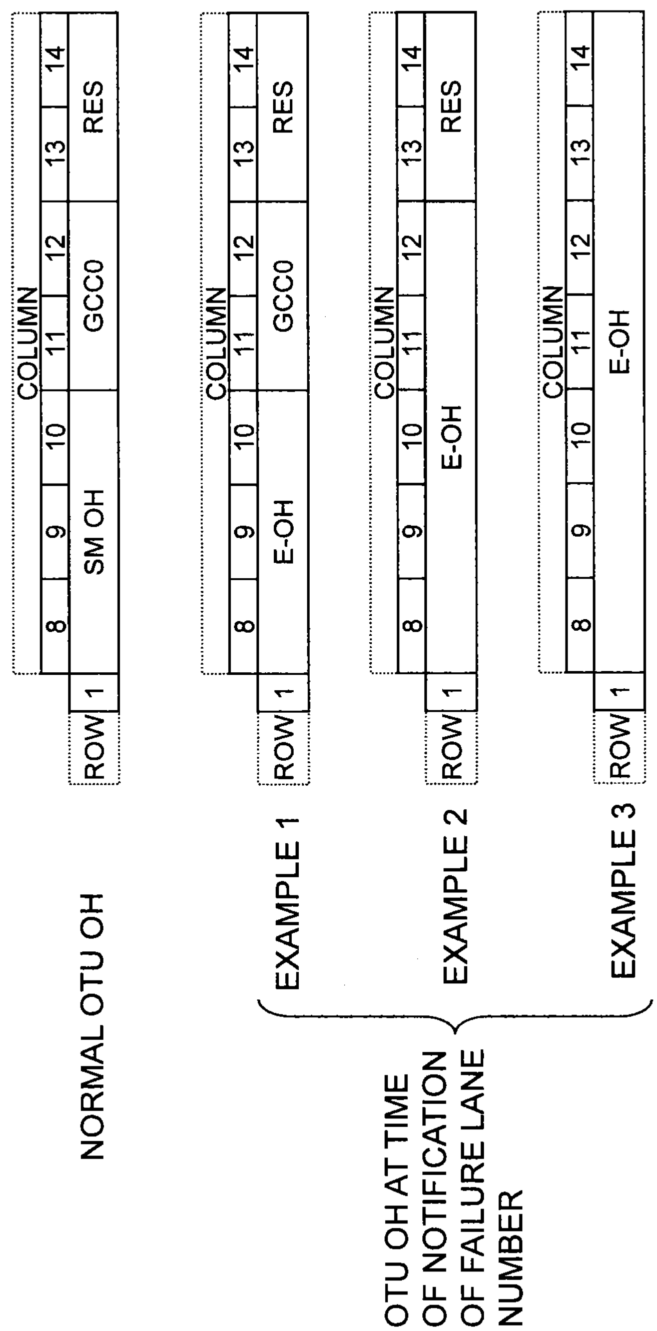
Figures 2, 8:
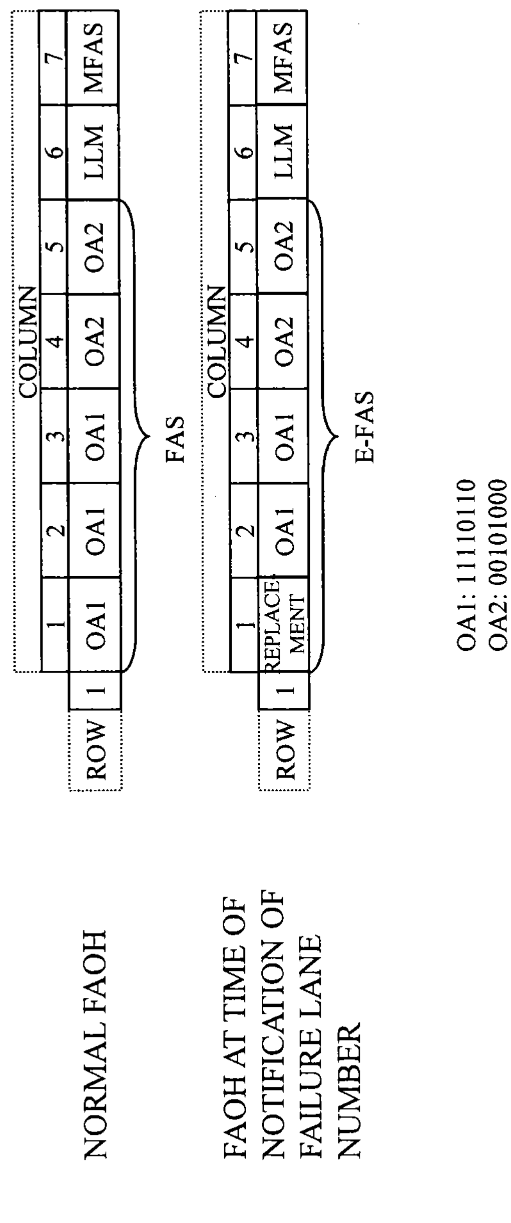
Figures 4, 8:
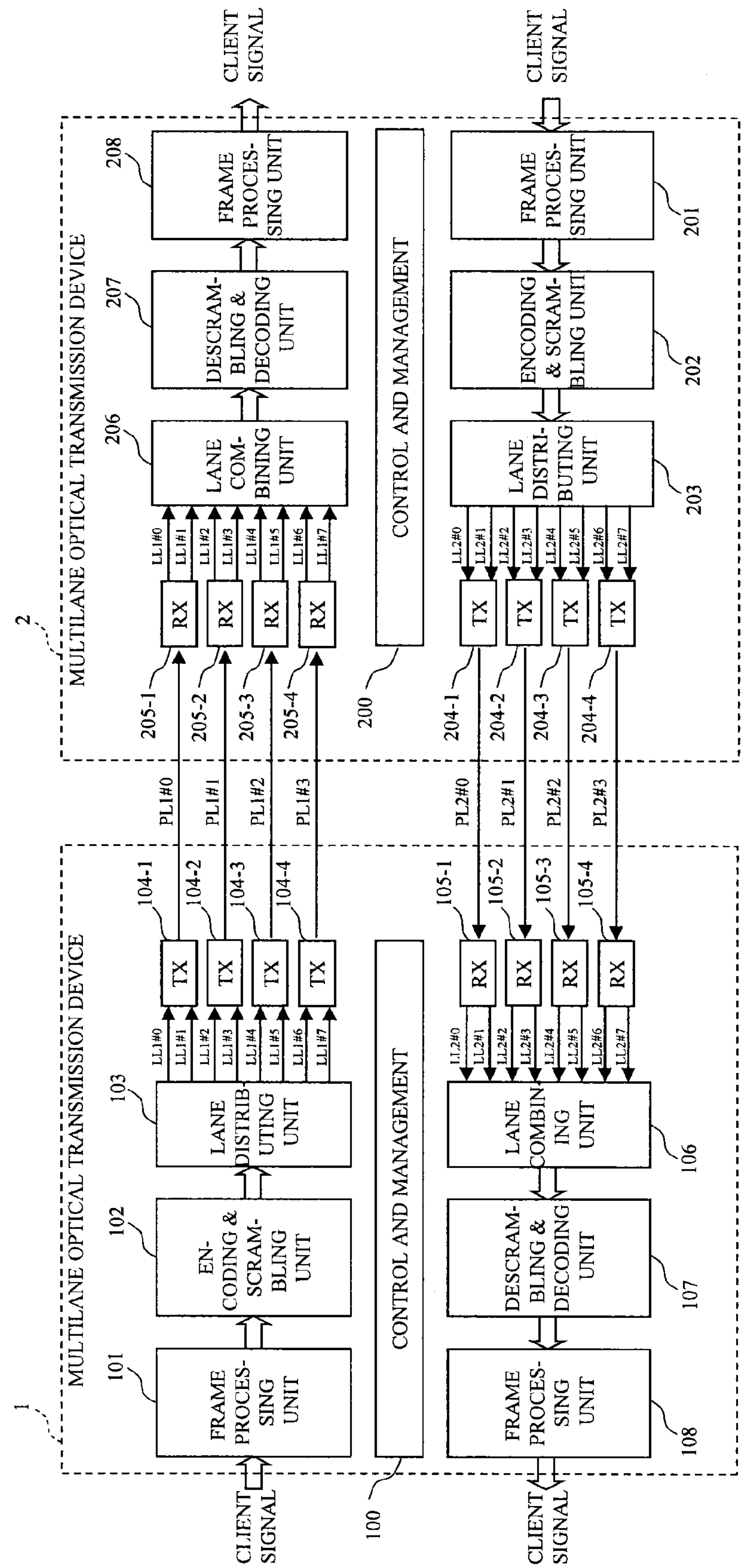
Figures 6, 8:
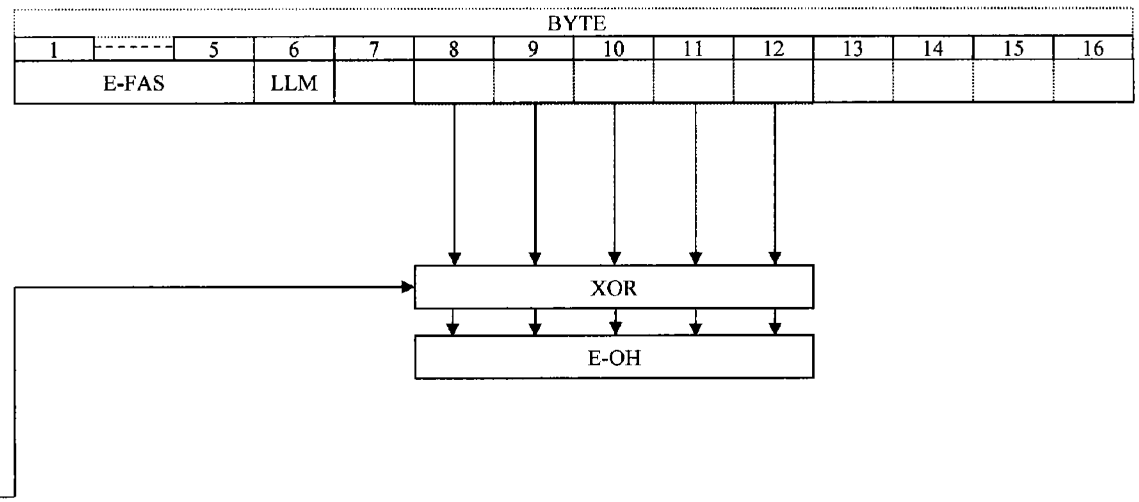
Figures 7, 8:
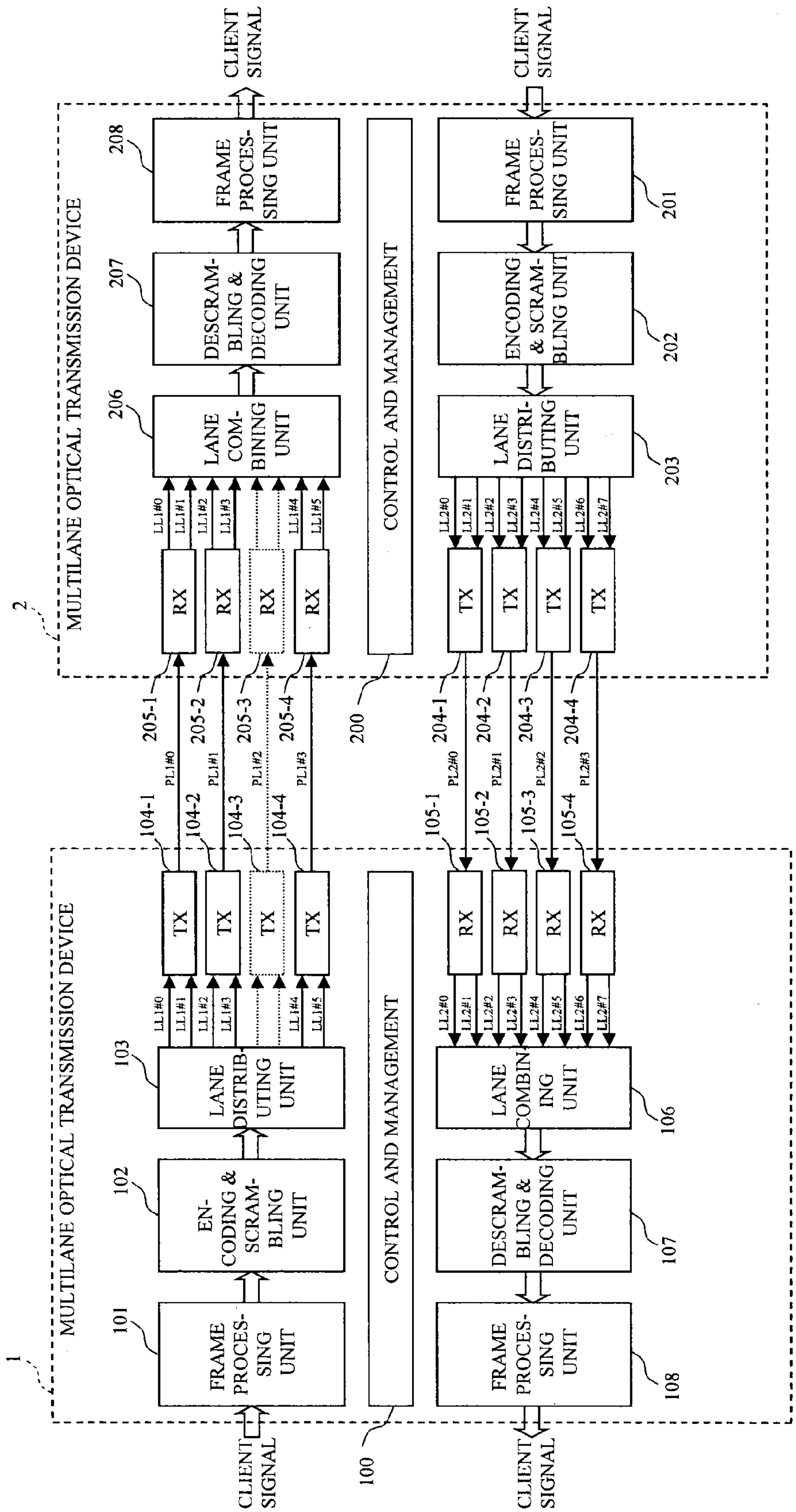
Figures 8, 9:
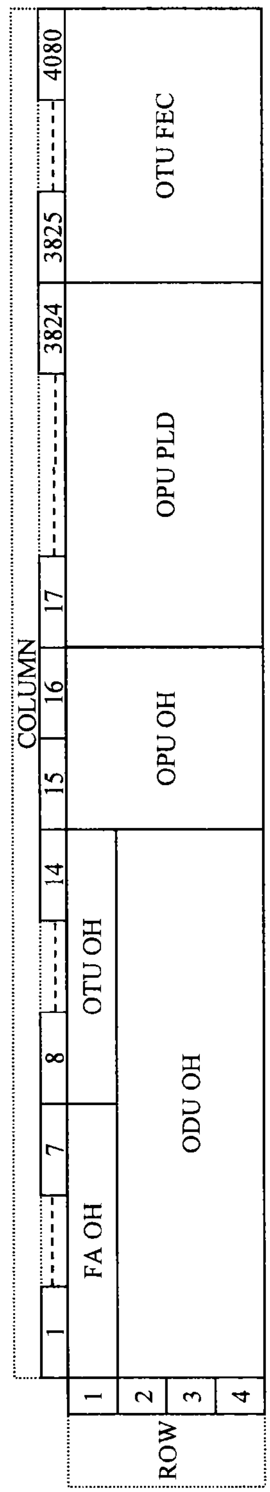
Figures 8, 9, 10:
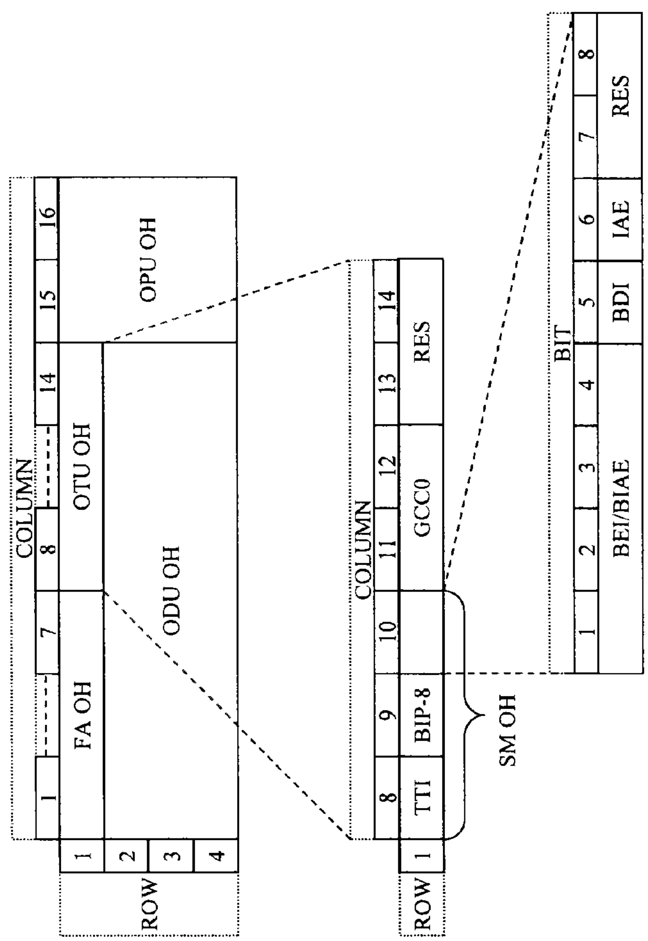
Figures 1, 9:
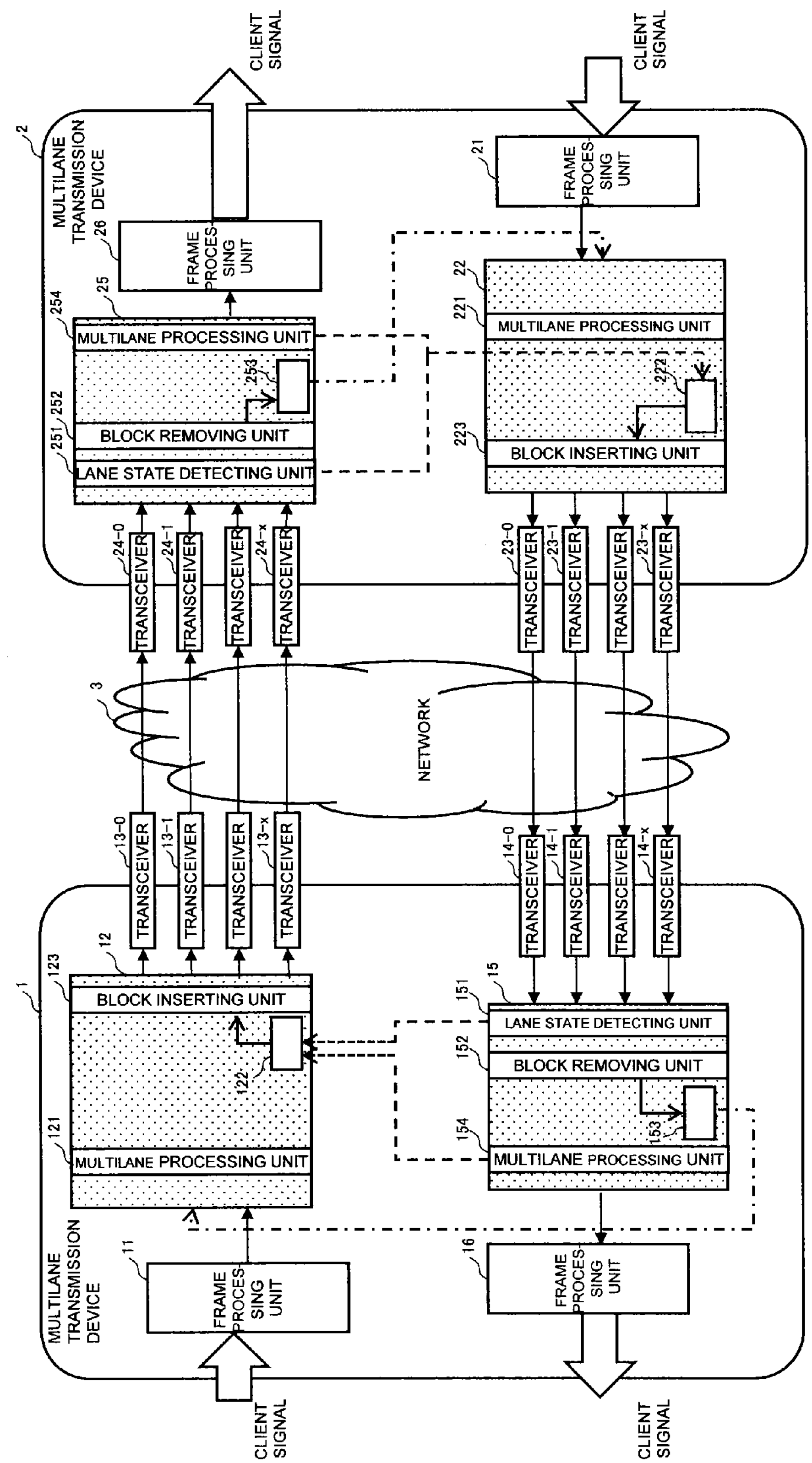
Figures 2, 9:
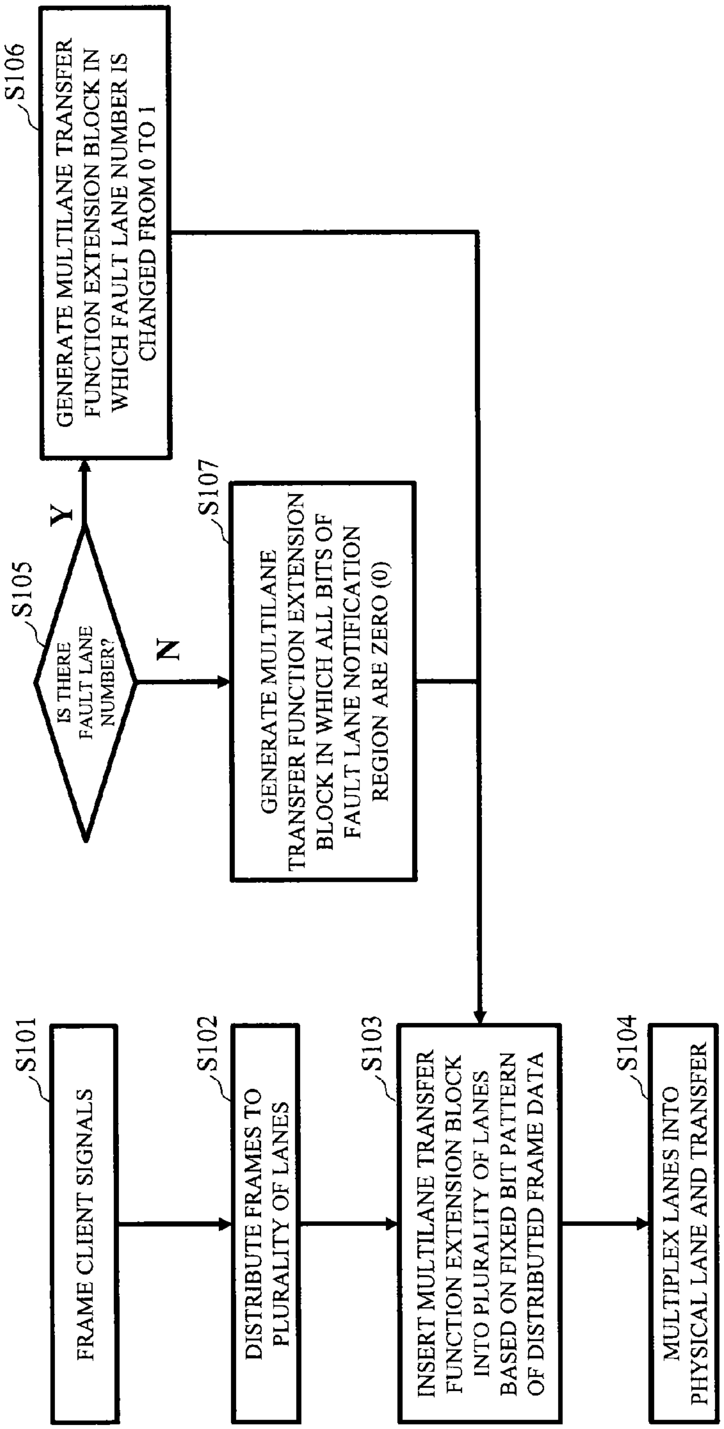
Figures 3, 9:
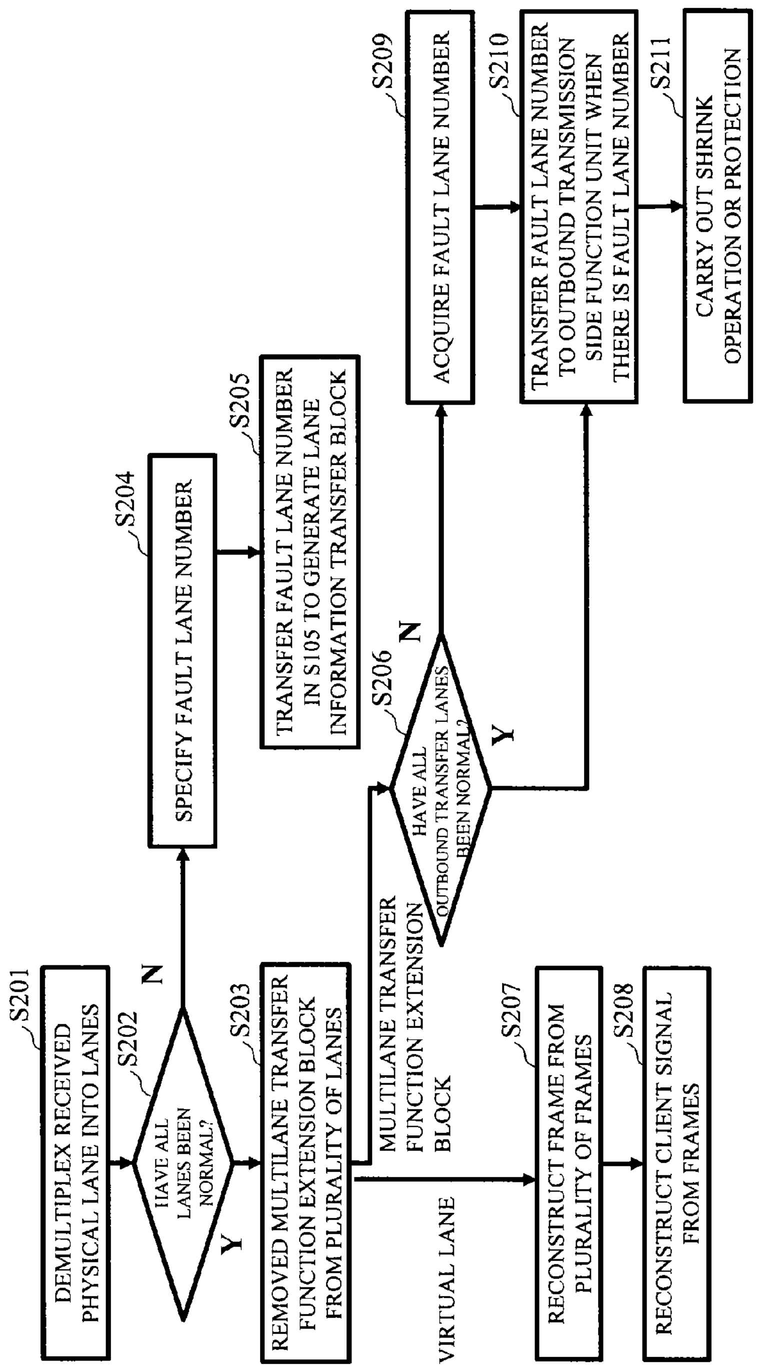
Figures 4, 9:
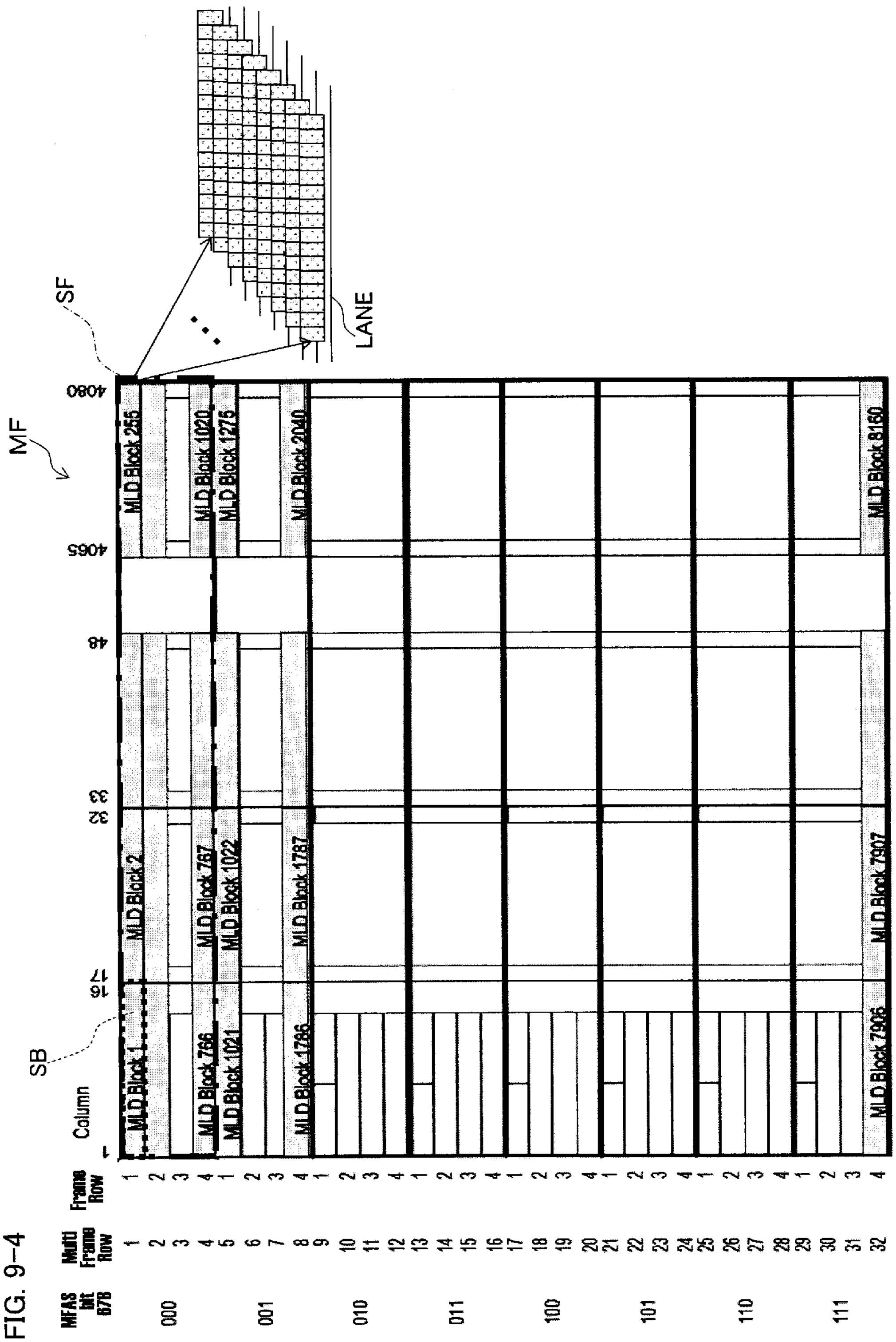
Figures 5, 9:
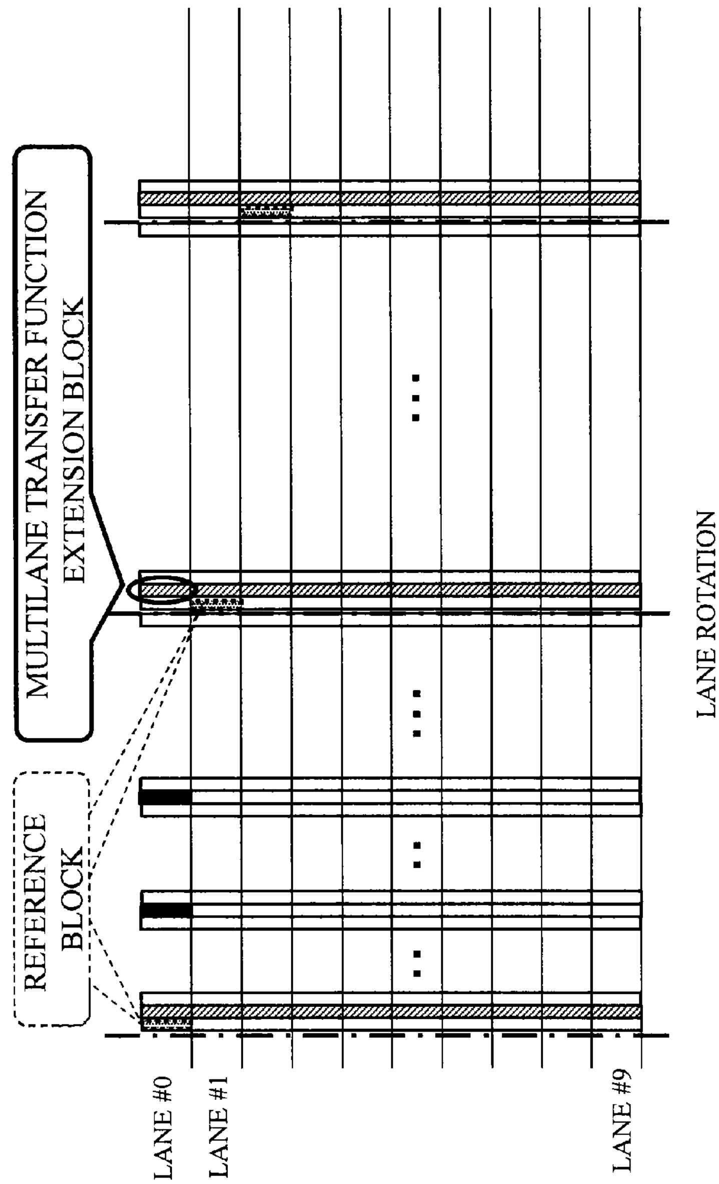
Figures 6, 9:
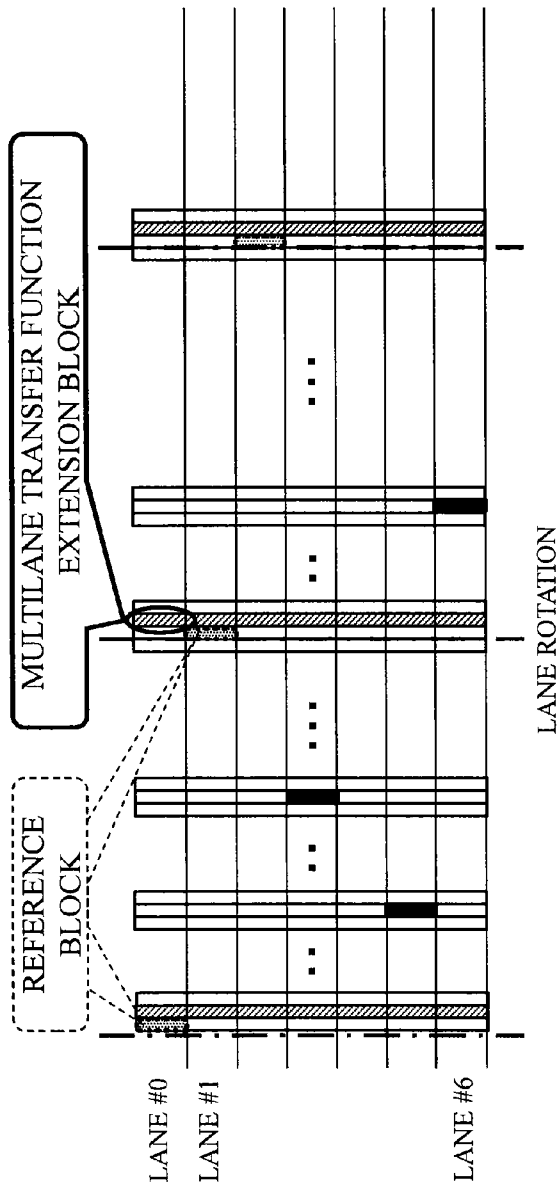
Figures 7, 9:
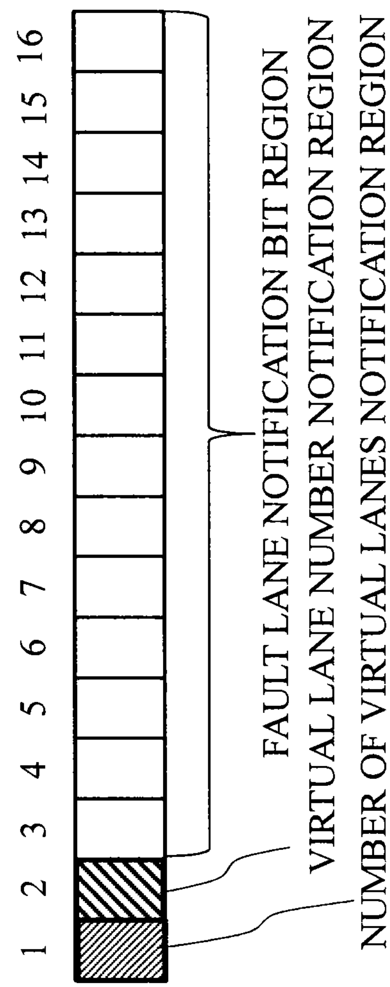
Figures 8, 9:
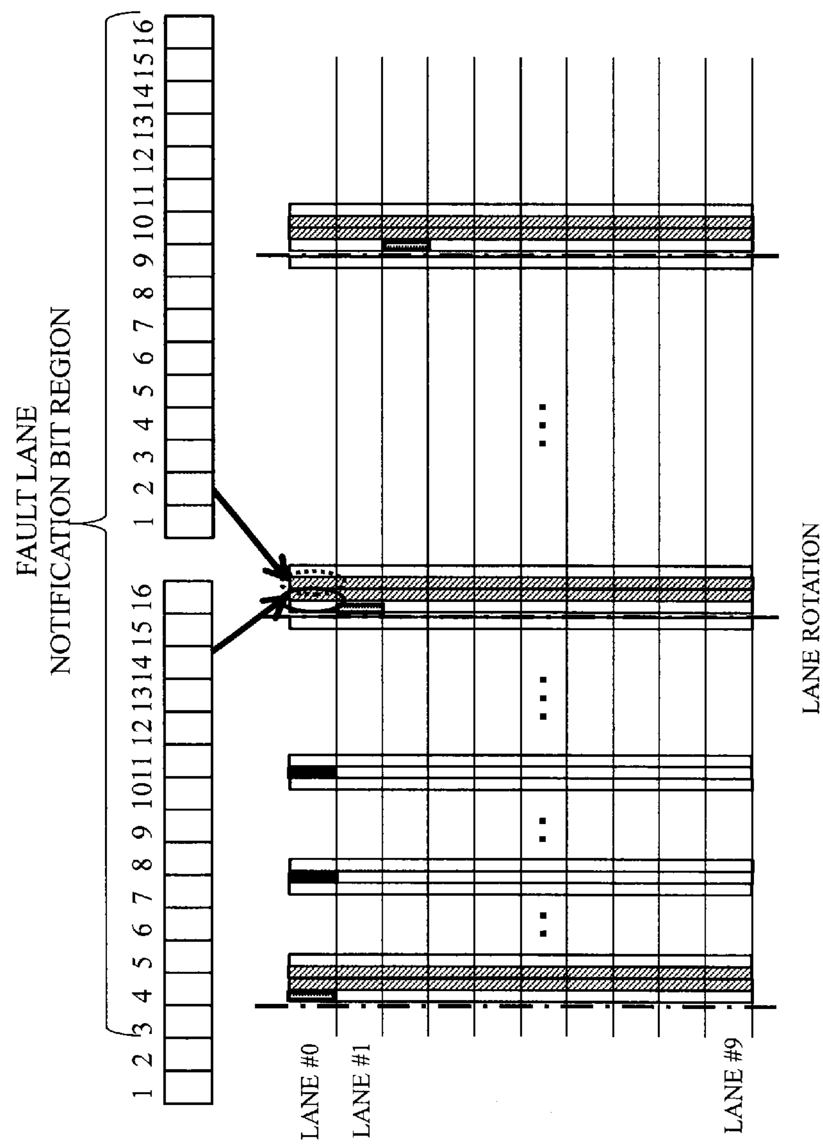
Figure 9:
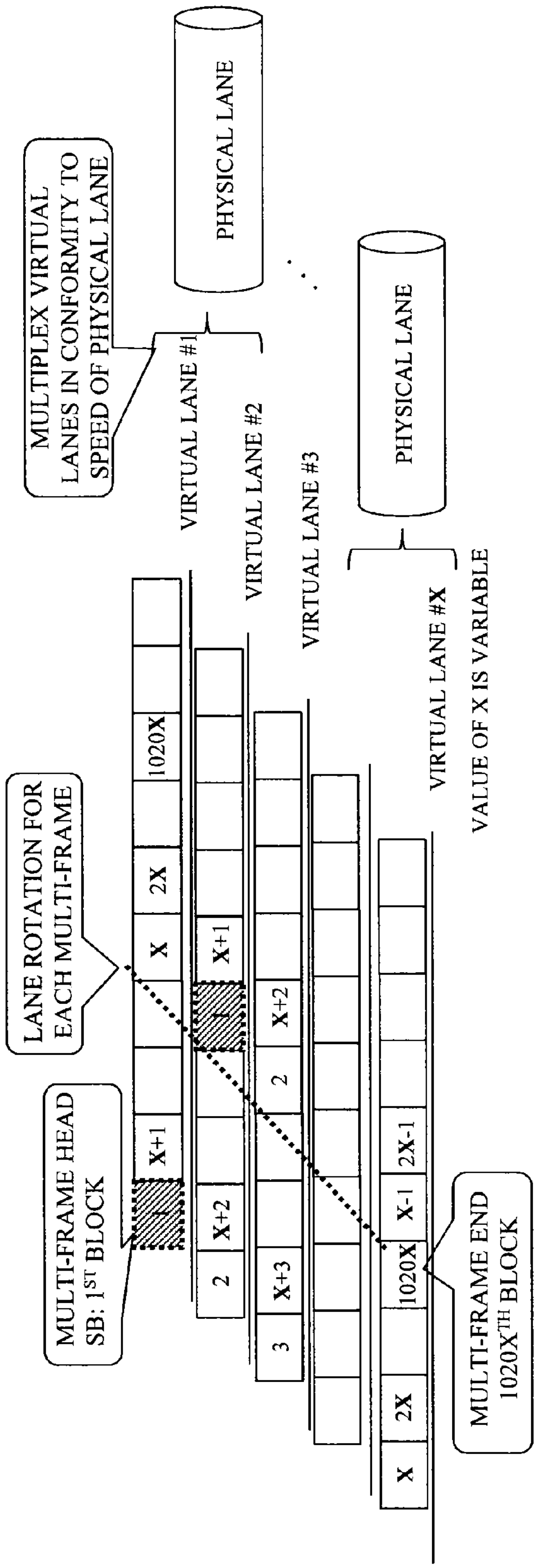
Figures 9, 10:
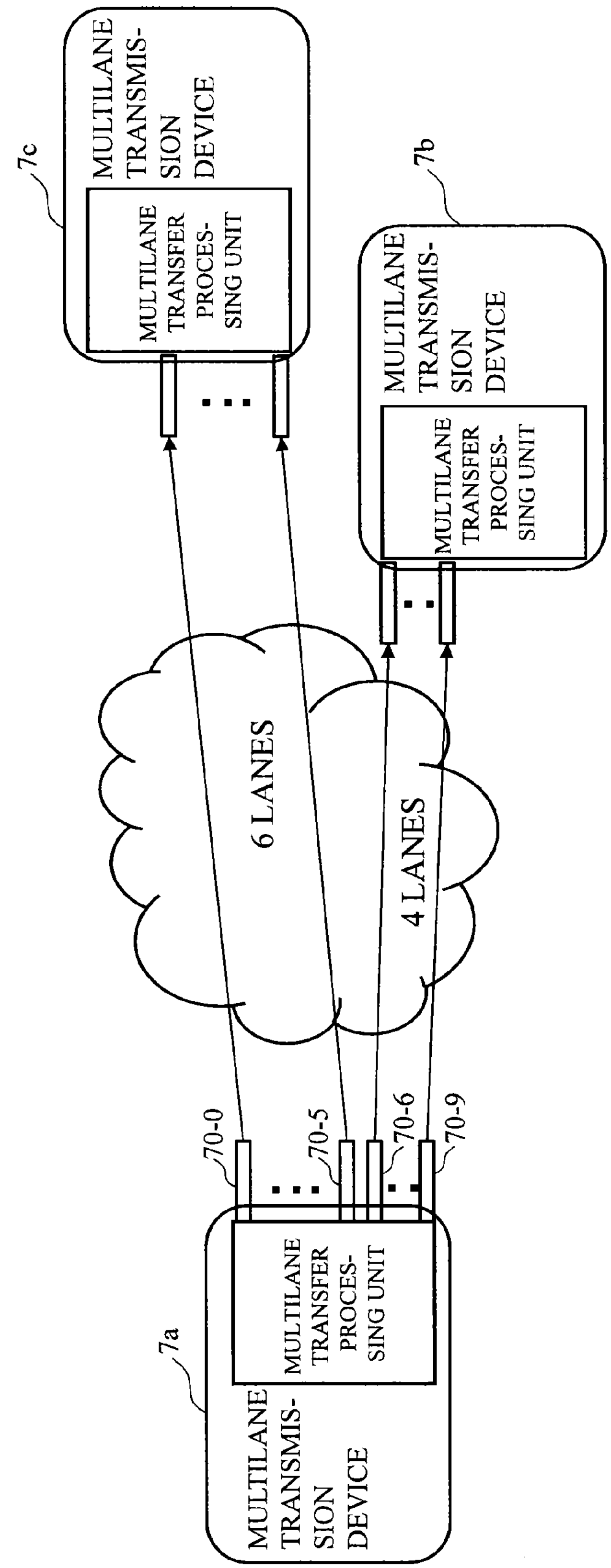
Figures 9, 10, 11:
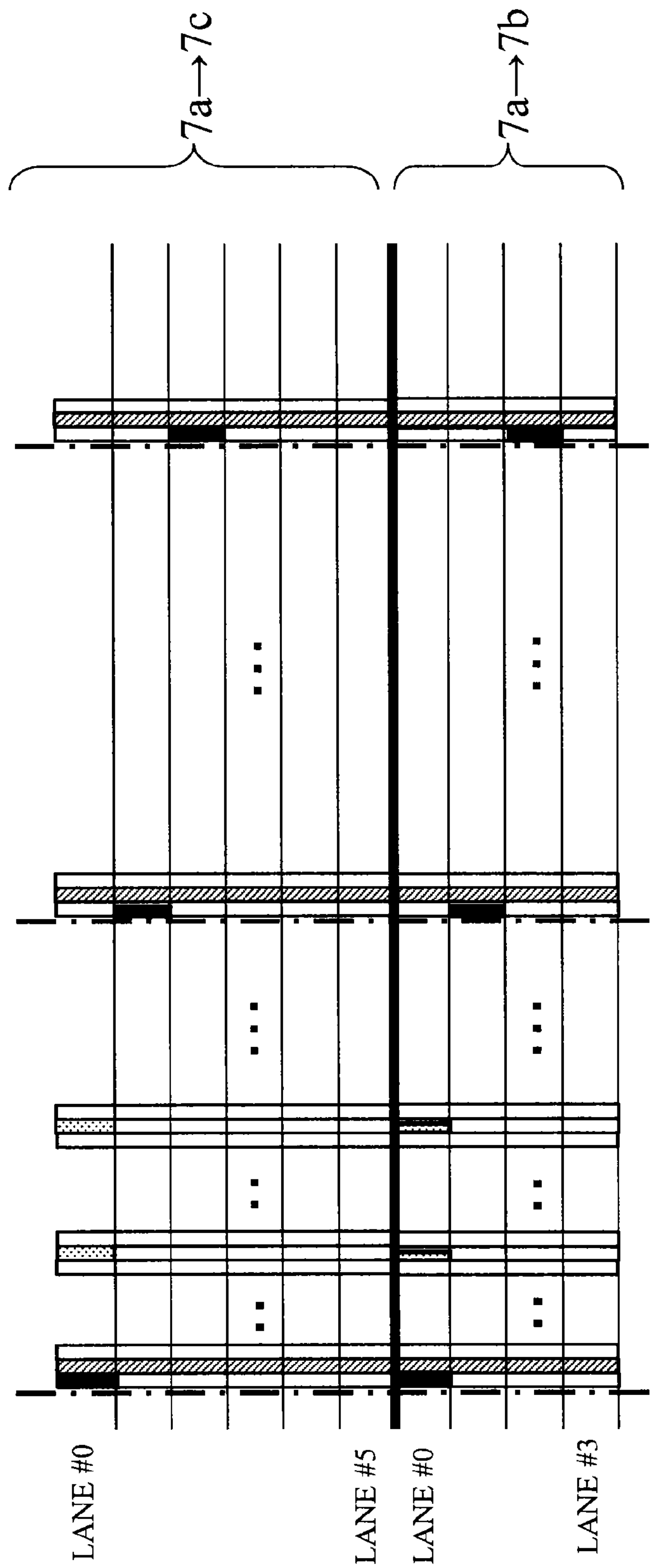
Figures 9, 10, 11, 12:
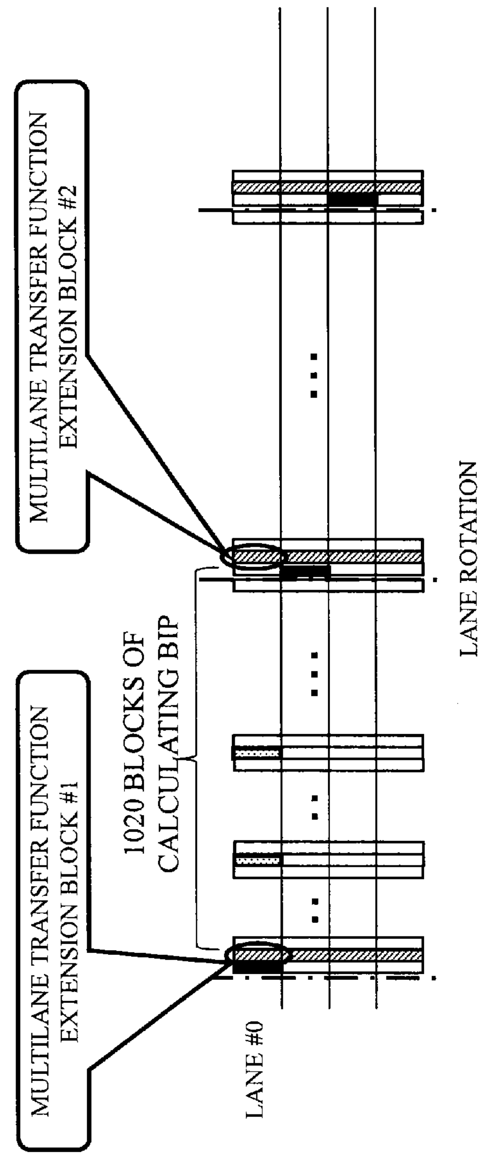
Figures 9, 10, 11, 12, 13:
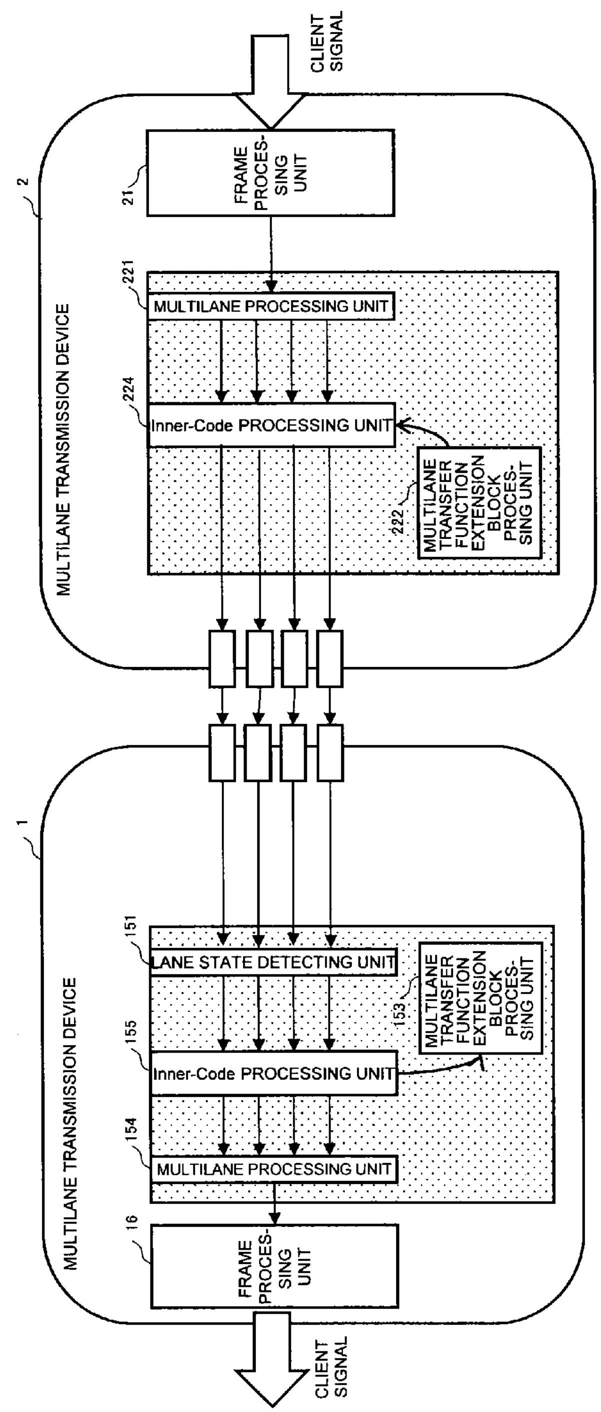
Figures 9, 10, 11, 12, 13, 14:
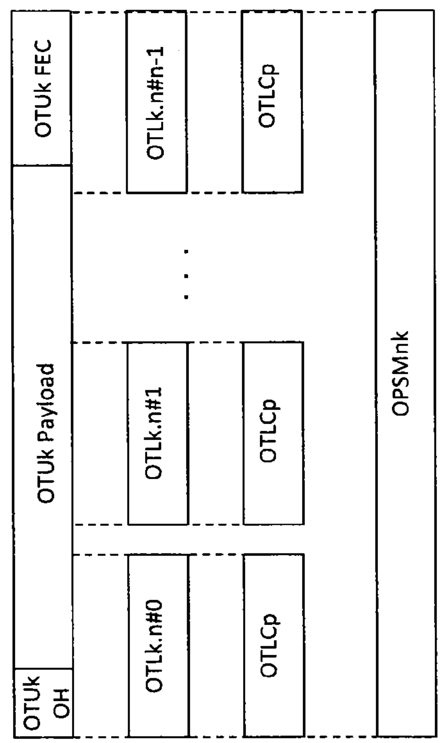

FIG. 9-11 illustrates a state in which a multilane transfer function extension block is inserted into each virtual lane when multilane transfer to a multilane transmission device 7*b* and a multilane transmission device 7*c* is performed.

FIG. 9-12 illustrates an example of a block of calculating a BIP.

FIG. 9-13 illustrates an example of a multilane transfer system according to a sixth embodiment.

FIG. 9-14 illustrates a layer structure of multilane transfer in Non-Patent Literature 9-1.

DESCRIPTION OF EMBODIMENTS

Embodiments of the present invention will be described with reference to the appended drawings. The following embodiments are exemplary embodiments of the present invention, and the present invention is not limited to the following embodiments. Note that, in the present specification and the appended drawings, constituents that are mutually identical are denoted with the same reference numerals.

First Invention

First Embodiment

In a first embodiment, when it copes with a plurality of transmission destinations and a change in a bandwidth of a physical lane that is caused by a change in a modulation scheme or a change in the number of wavelengths, a single framer is used as a necessary framer, and the framer is shared among a plurality of transmission destinations.

FIG. 1-1 illustrates a multilane communication system of the present invention. The multilane communication system includes transmission devices 1-1, 1-2, and 1-3, client devices 2-11 and 2-12 connected to the transmission device 1-1, client devices 2-21 and 2-22 connected to the transmission device 1-2, a client device 2-31 connected to the transmission device 1-3, an optical switch 3-1 connected to the transmission device 1-1, an optical switch 3-2 connected to the transmission device 1-2, an optical switch 3-3 connected to the transmission device 1-3, and a network 4 in which a frame is transferred between the client devices 2 through the optical switches 3-1, 3-2, and 3-3 by using a plurality of physical lanes.

Configuration of a multilane transmission device of the present invention is illustrated in FIG. 1-2 and FIG. 1-3. A multilane transmission device 11 is equipped in each of the transmission devices 1-1, 1-2, and 1-3, and includes client signal allocating units 111-1 and 111-2, buffer memories 112-1 and 112-2, a transfer bandwidth calculating unit 113, shaping units 114-1 and 114-2, and a framer unit 115. The framer unit 115 includes a transport frame generating unit 116 and a virtual lane group generating unit 117.

Configuration of a multilane reception device of the present invention is illustrated in FIG. 1-4. A multilane reception device 12 is equipped in each of the transmission devices 1-1, 1-2, and 1-3, and includes a deframer unit 121 and a client signal allocating unit 124. The deframer unit 121 includes a virtual lane group reconstructing unit 122 and a client signal reconstructing unit 123.

Hereinafter, processing will be described in which the client devices 2-11 and 2-12 transfer a frame to the client devices 2-21 and 2-22 through the transmission devices 1-1 and 1-2 and the optical switches 3-1 and 3-2, and transfer a frame to the client device 2-31 through the transmission devices 1-1 and 1-3 and the optical switches 3-1 and 3-3.

The client signal allocating units 111-1 and 111-2 receive client signals from the client devices 2-11 and 2-12, respectively, and allocate the client signals based on a transmission destination. Specifically, the client signal allocating units 111-1 and 111-2 store the client signals to be directed to the client devices 2-21 and 2-22 in the buffer memory 112-1 and store the client signal to be directed to the client device 2-31 in the buffer memory 112-2 based on a VID (VLAN ID) included in a VLAN (Virtual Local Area Network) tag defined in IEEE802.1Q.

A desired transfer bandwidth of a transport frame to be directed to the client devices 2-21 and 2-22 is assumed to be 30 Gbps, and a desired transfer bandwidth of a transport frame to be directed to the client device 2-31 is assumed to be 20 Gbps. Here, since there is a limit in an optical path capacity to the transmission devices 1-2 and 1-3, the transfer bandwidth to the network 4 cannot always be made equal to the desired transfer bandwidth of the transport frame to be directed to the client device 2.

Here, a transport frame is identical to a variable frame.

The transfer bandwidth calculating unit 113 calculates the transfer bandwidth of the transport frame to be directed to the client devices 2-21 and 2-22 and the transfer bandwidth of the transport frame to be directed to the client device 2-31 based on the optical path capacity to the transmission devices 1-2 and 1-3.

Four physical lanes each of which has a bandwidth of 10 Gbps are connected to the transmission device 1-1 at the network 4 side. Thus, the optical path capacity to the transmission devices 1-2 and 1-3 is: 10 Gbps per lane×4=40 Gbps. Then, the transfer bandwidth calculating unit 113 calculates the transfer bandwidth of the transport frame to be directed to the client devices 2-21 and 2-22 as 30 Gbps, for example, and the transfer bandwidth of the transport frame to be directed to the client device 2-31 as 10 Gbps, for example, so that a sum of the transfer bandwidths of the transport frames to be directed to the client devices 2-21, 2-22, and 2-31 does not exceed the optical path capacity to the transmission devices 1-2 and 1-3.

The shaping unit 114-1 reads the client signal to be directed to the client devices 2-21 and 2-22 from the buffer memory 112-1 while adjusting the reading speed, based on the transfer bandwidth of the transport frame to be directed to the client devices 2-21 and 2-22 calculated by the transfer bandwidth calculating unit 113, and outputs the client signal to the transport frame generating unit 116. Here, while the desired transfer bandwidth of the transport frame to be directed to the client devices 2-21 and 2-22 is 30 Gbps, the transfer bandwidth of the transport frame to be directed to the client devices 2-21 and 2-22 is 30 Gbps, and thus reading is performed at the reading speed equal to the input speed to the buffer memory 112-1.

The shaping unit 114-2 reads the client signal to be directed to the client device 2-31 from the buffer memory 112-2 while adjusting the reading speed, based on the transfer bandwidth of the transport frame to be directed to the client device 2-31 calculated by the transfer bandwidth calculating unit 113, and outputs the client signal to the transport frame generating unit 116. Here, while the desired transfer bandwidth of the transport frame to be directed to the client device 2-31 is 20 Gbps, the transfer bandwidth of the transport frame to be directed to the client device 2-31 is 10 Gbps, and thus reading is performed at the reading speed different from the input speed to the buffer memory 112-2.

The virtual lane group generating unit 117 decides the number of virtual lanes that are necessary for transmission of each transport frame allocated based on each transmission destination by the client signal allocating units 111-1 and 111-2 and that have a constant bandwidth although a bandwidth of a physical lane is variable. As will be described later, a bandwidth per virtual lane may be constant or variable.

Specifically, since a bandwidth per physical lane is 10 Gbps at present, the virtual lane group generating unit 117 uses 1/x times (x is a natural number) of 10 Gbps as a bandwidth per virtual lane. Here, x=1. Meanwhile, the total number of virtual lanes is decided according to the total number of physical lanes and a bandwidth per physical lane so that bandwidths of all virtual lanes become equal to bandwidths of all physical lanes.

The virtual lane group generating unit 117 decides the number of virtual lanes necessary for transmission of the transport frame to be directed to the client devices 2-21 and 2-22, based on the transfer bandwidth of the transport frame to be directed to the client devices 2-21 and 2-22 calculated by the transfer bandwidth calculating unit 113 and a bandwidth per virtual lane.

Here, when before the bandwidth per physical lane is changed, the bandwidth per physical lane is 10 Gbps as described above and the transfer bandwidth of the transport frame to be directed to the client devices 2-21 and 2-22 is 30 Gbps as described above, the number of virtual lanes necessary for transmission of the transport frame to be directed to the client devices 2-21 and 2-22 is decided to be: 30 Gbps/(10 Gbps per lane)=3.

Then, when after the bandwidth per physical lane is changed, the bandwidth per physical lane increases from 10 Gbps to 20 Gbps and the transfer bandwidth of the transport frame to be directed to the client devices 2-21 and 2-22 increases accordingly from 30 Gbps to 60 Gbps, the number of virtual lanes necessary for transmission of the transport frame to be directed to the client devices 2-21 and 2-22 is increased to be: 60 Gbps/(10 Gbps per lane)=6. As described above, even when the bandwidth per physical lane is changed, the bandwidth per virtual lane is not changed, and the number of necessary virtual lanes is changed.

The virtual lane group generating unit 117 decides the number of virtual lanes necessary for transmission of the transport frame to be directed to the client device 2-31, based on the transfer bandwidth of the transport frame to be directed to the client device 2-31 calculated by the transfer bandwidth calculating unit 113 and the bandwidth per virtual lane.

Here, when before the bandwidth per physical lane is changed, the bandwidth per physical lane is 10 Gbps as described above and the transfer bandwidth of the transport frame to be directed to the client device 2-31 is 10 Gbps as described above, the number of virtual lanes necessary for transmission of the transport frame to be directed to the client device 2-31 is decided to be: 10 Gbps/(10 Gbps per lane)=1.

Then, when after the bandwidth per physical lane is changed, the bandwidth per physical lane increases from 10 Gbps to 20 Gbps and the transfer bandwidth of the transport frame to be directed to the client device 2-31 increases accordingly from 10 Gbps to 20 Gbps, the number of virtual lanes necessary for transmission of the transport frame to be directed to the client device 2-31 is increased to be: 20 Gbps/(10 Gbps per lane)=2. As described above, even when the bandwidth per physical lane is changed, the bandwidth per virtual lane is not changed, and the number of necessary virtual lanes is changed.

The transport frame generating unit 116 receives the client signals allocated based on the transmission destinations by the client signal allocating units 111-1 and 111-2 from the shaping units 114-1 and 114-2, allocates the client signals to the virtual lanes whose number has been decided by the virtual lane group generating unit 117, and frames the client signals allocated to the respective virtual lanes as transport frames.

First, processing of the transport frame generating unit 116 before the bandwidth per physical lane is changed will be described with reference to FIG. 1-5, and then processing of the transport frame generating unit 116 after the bandwidth per physical lane is changed will be described with reference to FIG. 1-6.

FIG. 1-5 illustrates configuration of a virtual lane group when the bandwidth per physical lane is 10 Gbps before the bandwidth per physical lane is changed.

The transport frame generating unit 116 allocates the client signal to be directed from the transmission device 1-1 to the transmission device 1-2 to 3 virtual lanes VL0, VL1, and VL2. Specifically, the transport frame generating unit 116 allocates a transport frame F2-0 in the order of the virtual lanes VL0, VL1, and VL2, allocates a transport frame F2-1 in the order of the virtual lanes VL1, VL2, and VL0, allocates a transport frame F2-2 in the order of the virtual lanes VL2, VL0, and VL1, . . . , allocates a transport frame F2-252 in the order of the virtual lanes VL0, VL1, and VL2, allocates a transport frame F2-253 in the order of the virtual lanes VL1, VL2, and VL0, and allocates a transport frame F2-254 in the order of the virtual lane VL2, VL0, and VL1. As described above, the transport frame generating unit 116 performs lane rotation. The 3 virtual lanes VL0, VL1, and VL2 are assumed to be a virtual lane group from the transmission device 1-1 to the transmission device 1-2.

The transport frame generating unit 116 allocates the client signal to be directed from the transmission device 1-1 to the transmission device 1-3 to the one virtual lane VL0. Specifically, the transport frame generating unit 116 allocates transport frames F3-0, F3-1, F3-2, . . . , F3-252, F3-253, and F3-254 to the virtual lane VL0. The one virtual lane VL0 is assumed to be a virtual lane group from the transmission device 1-1 to the transmission device 1-3.

FIG. 1-6 illustrates configuration of a virtual lane group when the bandwidth per physical lane increases from 10 Gbps to 20 Gbps after the bandwidth per physical lane is changed.

The transport frame generating unit 116 allocates the client signal to be directed from the transmission device 1-1 to the transmission device 1-2 to 6 virtual lanes VL0, VL1, VL2, VL3, VL4, and VL5. Specifically, the transport frame generating unit 116 allocates the transport frame F2-0 in the order of the virtual lanes VL0, VL1, VL2, VL3, VL4, and VL5, allocates the transport frame F2-1 in the order of the virtual lane VL1, VL2, VL3, VL4, VL5, and VL0, allocates the transport frame F2-2 in the order of the virtual lane VL2, VL3, VL4, VL5, VL0, and VL1, . . . , allocates the transport frame F2-249 in the order of the virtual lane VL3, VL4, VL5, VL0, VL1, and VL2, allocates the transport frame F2-250 in the order of the virtual lane VL4, VL5, VL0, VL1, VL2, and VL3, and allocates the transport frame F2-251 in the order of the virtual lane VL5, VL0, VL1, VL2, VL3, and VL4. As described above, the transport frame generating unit 116 performs lane rotation. The 6 virtual lanes VL0, VL1, VL2, VL3, VL4, and VL5 are assumed to a virtual lane group from the transmission device 1-1 to the transmission device 1-2.

The transport frame generating unit 116 allocates the client signal to be directed from the transmission device 1-1 to the transmission device 1-3 to the two virtual lanes VL0 and VL1. Specifically, the transport frame generating unit 116 allocates the transport frame F3-0 in the order of the virtual lanes VL0 and VL1, allocates a transport frame F3-1 in the order of the virtual lanes VL1 and VL0, allocates a transport frame F3-2 in the order of the virtual lanes VL0 and VL1, . . . , allocates a transport frame F3-249 in the order of the virtual lanes VL1 and VL0, allocates a transport frame F3-250 in the order of the virtual lanes VL0 and VL1, and allocates a transport frame F3-251 in the order of the virtual lanes VL1 and VL0. As described above, the transport frame generating unit 116 performs lane rotation. The virtual lanes VL0 and VL1 are assumed to a virtual lane group from the transmission device 1-1 to the transmission device 1-3.

Here, as in Non-Patent Literature 1-2, the transport frame generating unit 116 adds a fixed head bit pattern to the head of each transport frame so that the multilane reception device 12 identifies the head of each transport frame. Then, as in Non-Patent Literature 1-2, the transport frame generating unit 116 adds a VLM (Virtual Lane Marker) to the head of each transport frame because the multilane reception device 12 compensates for a skew caused by wavelength dispersion or a path difference among a plurality of virtual lanes included in a virtual lane group. Here, the VLM is 8 bits, and can have a value from 0 as a minimum value to $2^8-1=255$ as a maximum value.

Here, the VLM may be the LLM, and in the present application, the VLM is not distinguished from the LLM.

FIG. 1-5 illustrates a method of adding the VLM when the bandwidth per physical lane is 10 Gbps before the bandwidth per physical lane is changed.

Regarding the virtual lane group from the transmission device 1-1 to the transmission device 1-2, the maximum value of the VLM is set to 254 that is a value obtained by subtracting 1 from a maximum value dividable by 3 that is the number of virtual lanes among values up to 256. For the virtual lane VL0, VLM=0, 3, . . . , and 252 is added to the heads of the transport frames F2-0, F2-3, . . . , and F2-252, respectively. For the virtual lane VL1, VLM=1, . . . , and 253 is added to the heads of the transport frames F2-1, . . . , and F2-253, respectively. For the virtual lane VL2, VLM=2, . . . , 251, and 254 is added to the heads of the transport frames F2-2, . . . , F2-251, and F2-254, respectively. Similarly, VLM=0, 1, . . . , 253, and 254 is repeatedly added to the transport frames F2 subsequent to the transport frames F2 to which VLM=254 is added.

For the virtual lane group from the transmission device 1-1 to the transmission device 1-3, the maximum value of the VLM is set to 255 that is a value obtained by subtracting 1 from a maximum value dividable by 1 that is the number of virtual lanes among values up to 256. For the virtual lane VL0, VLM=0, 1, 2, . . . , 252, 253, and 254 is added to the heads of the transport frames F3-0, F3-1, F3-2, . . . , F3-252, F3-253, and F3-254, respectively. Similarly, VLM=0, 1, . . . , 254, and 255 is repeatedly added to the transport frames F3 subsequent to the transport frames F3 to which VLM=255 is added.

FIG. 1-6 illustrates a method of adding the VLM when the bandwidth per physical lane increases from 10 Gbps to 20 Gbps after the bandwidth per physical lane is changed.

Regarding the virtual lane group from the transmission device 1-1 to the transmission device 1-2, the maximum value of the VLM is set to 251 that is a value obtained by subtracting 1 from a maximum value dividable by 6 that is the number of virtual lanes among values up to 256. For the virtual lane VL0, VLM=0, 6, . . . , and 246 is added to the heads of the transport frames F2-0, F2-6, . . . , and F2-246, respectively. For the virtual lane VL1, VLM=1, . . . , and 247 is added to the heads of the transport frames F2-1, . . . , and F2-247, respectively. For the virtual lane VL2, VLM=2, . . . , and 248 is added to the heads of the transport frames F2-2, . . . , and F2-248, respectively. For the virtual lane VL3, VLM=3, . . . , and 249 is added to the heads of the transport frames F2-3, . . . , and F2-249, respectively. For the virtual lane VL4, VLM=4, . . . , and 250 is added to the heads of the transport frames F2-4, . . . , and F2-250, respectively. For the virtual lane VL5, VLM=2, . . . , 245, and 251 is added to the heads of the transport frames F2-5, . . . , and F2-245, 2-251, respectively. Similarly, VLM=0, 1, . . . , 250, and 251 is repeatedly added to the transport frames F2 subsequent to the transport frames F2 to which VLM=251 is added.

Regarding the virtual lane group from the transmission device 1-1 to the transmission device 1-3, the maximum value of the VLM is set to 255 that is a value obtained by subtracting 1 from a maximum value dividable by 2 that is the number of virtual lanes among values up to 256. For the virtual lane VL0, VLM=0, 2, . . . , 248, and 250 is added to the heads of the transport frames F3-0, F3-2, . . . , F3-248, and F3-250, respectively. For the virtual lane VL1, VLM=1, 3, . . . , 249, and 251 is added to the heads of the transport frames F3-1, F3-3, . . . , F3-249, F3-251, respectively. Similarly, VLM=0, 1, . . . , 254, and 255 is repeatedly added to the transport frames F3 subsequent to the transport frames F3 to which VLM=255 is added.

Meanwhile, there are cases in which the transfer bandwidth of the transport frame to be directed from the transmission device 1-1 to the transmission device 1-2 chronologically changes, and the transfer bandwidth of the transport frame to be directed from the transmission device 1-1 to the transmission device 1-3 chronologically changes as with the number of transport frames generated by the transport frame generating unit 116 in FIG. 1-2 differing from that in FIG. 1-3. Here, the transfer bandwidth of the transport frame to be directed from the transmission device 1-1 to the transmission device 1-2 is assumed to chronologically change such as 30 Gbps (first stage)→20 Gbps (second stage)→0 Gbps (third stage), the transfer bandwidth of the transport frame to be directed from the transmission device 1-1 to the transmission device 1-3 is assumed to chronologically change such as 10 Gbps (first stage)→20 Gbps (second stage)→40 Gbps (third stage), and the bandwidth per virtual lane is assumed to be constant at 10 Gbps. FIG. 1-7 illustrates configuration of a virtual lane group associated with a change in a communication bandwidth between the transmission devices 1.

In a first stage, transport frames F2-1-0, F2-1-1, F2-1-2, F2-1-3, . . . are transmitted from the transmission device 1-1 to the transmission device 1-2, and transport frames F3-1-0, F3-1-1, F3-1-2, F3-1-3, . . . are transmitted from the transmission device 1-1 to the transmission device 1-3. Then, for transfer from the transmission device 1-1 to the transmission device 1-2, 30 Gbps/(10 Gbps per lane)=3 virtual lanes (the virtual lanes VL0, VL1, and VL2) are allocated, and for transfer from the transmission device 1-1 to the transmission device 1-3, 10 Gbps/(10 Gbps per lane)=1 virtual lane (the virtual lane VL0) is allocated.

For the virtual lane VL0 from the transmission device 1-1 to the transmission device 1-2, VLM=0, 3, . . . is added to the heads of the transport frames F2-1-0, F2-1-3, . . . , respectively. For the virtual lane VL1 from the transmission device 1-1 to the transmission device 1-2, VLM=1, . . . is added to the heads of the transport frames F2-1-1, . . . , respectively. For the virtual lane VL2 from the transmission device 1-1 to the transmission device 1-2, VLM=2, . . . is added to the heads of the transport frames F2-1-2, . . . , respectively. For the virtual lane VL0 from the transmission device 1-1 to the transmission device 1-3, VLM=0, 1, 2, 3, . . . is added to the heads of the transport frames F3-1-0, F3-1-1, F3-1-2, F3-1-3, . . . , respectively.

In a second stage, transport frames F2-2-0, F2-2-1, F2-2-2, F2-2-3, . . . are transmitted from the transmission device 1-1 to the transmission device 1-2, and transport frames F3-2-0, F3-2-1, F3-2-2, F3-2-3, . . . are transmitted from the transmission device 1-1 to the transmission device 1-3. Then, for the transfer from the transmission device 1-1 to the transmission device 1-2, 20 Gbps/(10 Gbps per lane)=2 virtual lanes (the virtual lanes VL0 and VL1) are allocated, and for the transfer from the transmission device 1-1 to the transmission device 1-3, 20 Gbps/(10 Gbps per lane)=2 virtual lanes (the virtual lanes VL0 and VL1) are allocated.

For the virtual lane VL0 from the transmission device 1-1 to the transmission device 1-2, VLM=0, 2, . . . is added to the heads of the transport frames F2-2-0, F2-2-2, . . . , respectively. For the virtual lane VL1 from the transmission device 1-1 to the transmission device 1-2, VLM=1, 3, . . . is added to the heads of the transport frames F2-2-1, F2-2-3, . . . , respectively. For the virtual lane VL0 from the transmission device 1-1 to the transmission device 1-3, VLM=0, 2, . . . is added to the heads of the transport frames F3-2-0, F3-2-2, . . . , respectively. For the virtual lane VL1 from the transmission device 1-1 to the transmission device 1-3, VLM=1, 3 . . . is added to the heads of the transport frames F3-2-1, F3-2-3, . . . , respectively.

In a third stage, transport frames F3-3-0, F3-3-1, F3-3-2, F3-3-3, . . . are transmitted from the transmission device 1-1 to the transmission device 1-3. Then, for the transfer from the transmission device 1-1 to the transmission device 1-3, 40 Gbps/(10 Gbps per lane)=4 virtual lanes (the virtual lanes VL0, VL1, VL2, and VL3) are allocated.

For the virtual lane VL0, VLM=0, . . . is added to the heads of the transport frames F3-3-0, . . . , respectively. For the virtual lane VL1, VLM=1, . . . is added to the heads of the transport frames F3-3-1, . . . , respectively. For the virtual lane VL2, VLM=2, . . . is added to the heads of the transport frames F3-3-2, . . . , respectively. For the virtual lane VL3, VLM=3, . . . is added to the heads of the transport frames F3-3-3, . . . , respectively.

Meanwhile, there are cases in which the transfer bandwidth of the client signal to be directed from the transmission device 1-1 to the transmission device 1-2 is the payload capacity of the transport frame F2 or less and the transfer bandwidth of the client signal to be directed from the transmission device 1-1 to the transmission device 1-3 is the payload capacity of the transport frame F3 or less. Here, 3 virtual lanes (the virtual lanes VL0, VL1, and VL2) are allocated for transfer from the transmission device 1-1 to the transmission device 1-3, one virtual lane (the virtual lane VL0) is allocated for transfer from the transmission device 1-1 to the transmission device 1-3, and as in Non-Patent Literature 1-2, the client signal is mapped to the payload of the transport frame F by using a GMP (Generic Mapping Procedure) scheme. FIG. 1-8 illustrates a method of mapping a client signal to a transport frame.

However, a scheme of mapping to the transport frame F in which the payload capacity changes is not limited to the GMP, and, for example, a GFP (Generic Framing Procedure) may be used. In the GMP, client data and stuff are mapped to the payload of the transport frame F, but in the GFP, a GFP frame is mapped. In the GFP, when the frequency of the client signal does not match the frequency of the payload, stuff is collectively inserted. Meanwhile, in the GMP, stuff is inserted at the accuracy higher than in the GFP, and thus a frequency variation in a stuff insertion/extraction processing is smaller than in the GFP. However, since stuff is inserted and extracted at high accuracy, computation complexity is higher than in the GFP.

The payload of the transport frame F is divided on a basis of an arbitrary number of byte block into P_server blocks. The number of blocks to which the client signal is mapped among the P_server blocks is assumed to be: Cm=(F_client/F_server)×(B_server/m), and the number of blocks to which the client signal is not mapped is assumed to be: P_server−Cm=P_server−(F_client/F_server)×(B_server/m). F_client is a bit rate of the client signal, F_server is a bit rate of the transport frame F, B_server is the number of bytes of the payload of the transport frame F, and m is the number of bytes of a block.

When (i×Cm) mod P_server<Cm is satisfied in an $i^{th}$ block among the P_server blocks, the $i^{th}$ block is assumed to be a Data block, and the client signal is mapped to the $i^{th}$ block. When (i×Cm)mod P_server≥Cm is satisfied in an $i^{th}$ block among the P_server blocks, the $i^{th}$ block is assumed to be a Stuff block, and the client signal is not mapped to the $i^{th}$ block.

In the transport frame F2 to be directed from the transmission device 1-1 to the transmission device 1-2, P_server=30 is assumed in proportion to the number (3) of virtual lanes, and Cm=29. Depending on which of the two inequalities is satisfied, a $1^{st}$ block is assumed to be the Stuff block, and $2^{nd}$ to $30^{th}$ blocks are assumed to be the Data blocks.

In the transport frame F3 to be directed from the transmission device 1-1 to the transmission device 1-3, P_server=10 is assumed in proportion to the number (1) of virtual lanes, and Cm=9. Depending on which of the two inequalities is satisfied, a $1^{st}$ block is assumed to be the Stuff block, and $2^{nd}$ to $10^{th}$ blocks are assumed to be the Data blocks.

Regarding the transport frame F2 to be directed from the transmission device 1-1 to the transmission device 1-2, the transport frame generating unit 116 writes the number (3) of virtual lanes, a value of P_server, and a value of Cm in the overhead of the transport frame F2, or transmits the number (3) of virtual lanes, the value of P_server, and the value of Cm through a control frame different from the transport frame F2. Then, the transport frame generating unit 116 further adds an error correction code. Here, the transport frame generating unit 116 may add only the overhead and add the error correction code to an output of the virtual lane group generating unit 117. Further, the transport frame generating unit 116 may add only the overhead without adding the error correction code.

Regarding the transport frame F3 to be directed from the transmission device 1-1 to the transmission device 1-3, the transport frame generating unit 116 writes the number (1) of virtual lanes, a value of P_server, and a value of Cm in the overhead of the transport frame F3, or transmits the number (1) of virtual lanes, the value of P_server, and the value of Cm through a control frame different from the transport frame F3. Then, the transport frame generating unit 116 further adds the error correction code. Here, the transport frame generating unit 116 may add only the overhead and add the error correction code to an output of the virtual lane group generating unit 117. Further, the transport frame generating unit 116 may add only the overhead without adding the error correction code.

The virtual lane group generating unit 117 multiplexes the virtual lanes into a physical lane, and transmits each transport frame framed by the transport frame generating unit 116 by using the physical lane. For example, in the state of FIG. 1-5 before the bandwidth of the physical lane is changed, the virtual lane group generating unit 117 performs transfer on the virtual lane group including the 3 virtual lanes VL0, VL1, and VL2 by using the three physical lanes, and performs transfer on the virtual lane group including the one virtual lane VL0 by using the one physical lane. Then, in the state of FIG. 1-6 after the bandwidth of the physical lane is changed, the virtual lane group generating unit 117 performs transfer on the virtual lane group including the 6 virtual lanes VL0, VL1, VL2, VL3, VL4, and VL5 by using the 3 physical lanes, and performs transfer on the virtual lane group including the 2 virtual lanes VL0 and VL1 by using one physical lane.

Meanwhile, the transport frame generating unit 116 and the virtual lane group generating unit 117 identify the buffer memory 112 from which the input client signals are output and the order in which the input client signals are output and the shaping unit 114 from which the input client signals are output and the order in which the input client signals are output as follows. For example, as an analogy of a switch that performs switching according to time, the identifying may be performed by using a certain type of a time slot such as an arrival time or an arrival cycle of the client signal. Alternatively, as an analogy of a switch that performs switching by using a tag, the identifying may be performed by using a certain type of a tag. Any other method may be used.

The processing in the multilane reception device 12 is operation that is basically opposite to the processing in the multilane transmission device 11. Hereinafter, processing will be described in which the client devices 2-21 and 2-22 receive frames from the client devices 2-11 and 2-12 through the transmission devices 1-1 and 1-2 and the optical switches 3-1 and 3-2. However, processing in which the client device 2-31 receives frames from the client devices 2-11 and 2-12 through the transmission devices 1-1 and 1-3 and the optical switches 3-1 and 3-3 is also similar.

The virtual lane group reconstructing unit 122 acquires the number of virtual lanes that are necessary for reception of each transport frame framed from each client signal allocated based on each transmission destination and that have a constant bandwidth although the bandwidth of the physical lane is variable, receives each transport frame by using the physical lane, and demultiplexes the physical lane into the virtual lanes. As will be described later, the bandwidth per virtual lane may be constant or variable.

Specifically, the virtual lane group reconstructing unit 122 acquires the number of virtual lanes based on the overhead of the transport frame F2 or the control frame different from the transport frame F2, or acquires the number of virtual lanes by dividing the transfer bandwidth of the transport frame from the network 4 by the bandwidth per virtual lane.

Next, the virtual lane group reconstructing unit 122 searches for the fixed head bit pattern and the VLM in each transport frame F2, and identifies the head. Then, the virtual lane group reconstructing unit 122 calculates a virtual lane number as a VLM mod n, based on the number n of virtual lanes and the VLM. Then, the virtual lane group reconstructing unit 122 compensates for a skew caused by wavelength dispersion or a path difference among a plurality of virtual lanes.

A case in which the transport frames F2 illustrated in FIG. 1-5 are transferred from the transmission device 1-1 to the transmission device 1-2 is considered. A virtual lane to which VLM=0, 3, . . . , and 252 is added is determined to be the virtual lane VL0 based on a calculation result of VLM mod 3=0. A virtual lane to which VLM=1, 4, . . . , and 253 is added is determined to be the virtual lane VL1 based on a calculation result of VLM mod 3=1. A virtual lane to which VLM=2, 5, . . . , and 254 is added is determined to be the virtual lane VL2 based on a calculation result of VLM mod 3=2.

When a skew is compensated for among a plurality of virtual lanes, VLM=0 indicating the virtual lane VL0 is added to a certain transport frame F2, VLM=1 indicating the virtual lane VL1 is added to a next transport frame F2, VLM=2 indicating the virtual lane VL2 is added to a next transport frame F2, . . . , VLM=252 indicating the virtual lane VL0 is added to a next transport frame F2, VLM=253 indicating the virtual lane VL1 is added to a next transport frame F2, and VLM=254 indicating the virtual lane VL2 is added to a next transport frame F2. By causing a relation among each transport frame F2, the virtual lane VL, and the VLM to be the above described relation, a skew is compensated for among a plurality of virtual lanes.

The client signal reconstructing unit 123 deframes each transport frame allocated to each virtual lane as each client signal.

Specifically, the client signal reconstructing unit 123 acquires the value of P_server and the value of Cm based on the overhead of the transport frame F2 or the control frame different from the transport frame F2. Then, the client signal reconstructing unit 123 determines in each transport frame F2 whether an $i^{th}$ block is a Data block or a Stuff block, based on a block number i, the value of P_server, and the value of Cm. Then, the client signal reconstructing unit 123 rearranges the Data blocks for each transport frame F2.

A case in which the transport frames F2 illustrated in FIG. 1-8 are transferred from the transmission device 1-1 to the transmission device 1-2 is considered. A $1^{st}$ block is determined to be a Stuff block because (i×Cm) mod P_server≥Cm is satisfied. $2^{nd}$ to $30^{th}$ blocks are determined to be Data blocks because (i×Cm)mod P_server<Cm is satisfied. The $2^{nd}$ to $30^{th}$ blocks are rearranged.

The client signal allocating unit 124 allocates the client signal to the client devices 2-21 and 2-22 based on a MAC (Media Access Control) address included in, for example, an Ethernet (registered trademark) frame.

Meanwhile, frequency synchronization may have been performed or may not have been performed between the transmission devices 1. Here, when frequency synchronization has not been performed between the transmission devices 1, in the transmission device 1 at the reception side, it is necessary to install a buffer memory in order to conform the frequency of the reception signal to the frequency of the transmission signal. However, when frequency synchronization has been performed between the transmission devices 1, in the transmission device 1 at the reception side, the frequency of the reception signal is in conformity to the frequency of the transmission signal, and thus easily manufacturing the transmission device 1 can be realized.

As described above, the multilane transmission device 11 allocates the client signal based on the transmission destination, and, when each client signal is framed into each transport frame, multiplexes a plurality of virtual lanes into a physical lane. Thus, when it copes with a plurality of transmission destinations and a change in a bandwidth of a physical lane that is caused by a change in a modulation scheme or a change in the number of wavelengths, using a single framer as a necessary framer and cause the framer to be shared among a plurality of transmission destinations can be realized.

As described above, the multilane reception device 12 demultiplexes a physical lane into a plurality of physical lanes when each transport frame is deframed into each client signal. Thus, when it copes with a plurality of transmission destinations and a change in a bandwidth of a physical lane that is caused by a change in a modulation scheme or a change in the number of wavelengths, using a single deframer as a necessary deframer and cause the deframer to be shared among a plurality of transmission destinations can be realized.

In the first embodiment, as a transport frame length is constant, a bandwidth per virtual lane is constant, but as a modification, as a transport frame length is variable, a bandwidth of a virtual lane may be variable. While, in the first embodiment, a framer/deframer can correspond to only a single type of bit rate, in the modification, a framer/deframer needs to correspond to two or more types of bit rates, but in both the first embodiment and the modification, a single framer/deframer can be shared among a plurality of transmission destinations.

Second Embodiment

In a second embodiment, when it copes with a plurality of priorities and a change in a bandwidth of a physical lane that is caused by a change in a modulation scheme or a change in the number of wavelengths, a single framer is used as a necessary framer, and the framer is shared among a plurality of priorities.

For example, a priority is determined based on a PCP (Priority Code Point) included in a VLAN tag defined in IEEE802.1Q.

For example, a case in which a flow of high priority and a flow of best effort are transferred from a transmission device 1-1 to a transmission device 1-2 is considered. At this time, a virtual lane group is allocated to each of the flow of high priority from the transmission device 1-1 to the transmission device 1-2 and the flow of best effort from the transmission device 1-1 to the transmission device 1-2.

Thus, in a multilane transmission device 11, when it copes with a plurality of priorities and a change in a bandwidth of a physical lane that is caused by a change in a modulation scheme or a change in the number of wavelengths, using a single framer as a necessary framer and share the framer among a plurality of priorities can be realized. Then, in a multilane reception device 12, when it copes with a plurality of priorities and a change in a bandwidth of a physical lane that is caused by a change in a modulation scheme or a change in the number of wavelengths, using a single deframer as a necessary deframer and share the deframer among a plurality of priorities can be realized.

Third Embodiment

In a third embodiment, when it copes with a plurality of transmission destinations and priorities and a change in a bandwidth of a physical lane that is caused by a change in a modulation scheme or a change in the number of wavelengths, a single framer is used as a necessary framer, and the framer is shared among a plurality of transmission destinations and priorities.

For example, a transmission destination is determined based on a VID included in a VLAN tag defined in IEEE802.1Q. For example, a priority is determined based on a PCP included in a VLAN tag defined in IEEE802.1Q.

For example, a case is considered in which a flow of high priority and a flow of best effort are transferred from a transmission device 1-1 to a transmission device 1-2, and the transmission device 1-1 to a transmission device 1-3. At this time, a virtual lane group is allocated to each of the flow of high priority from the transmission device 1-1 to the transmission device 1-2, the flow of best effort from the transmission device 1-1 to the transmission device 1-2, the flow of high priority from the transmission device 1-1 to the transmission device 1-3, and the flow of best effort from the transmission device 1-1 to the transmission device 1-3.

Thus, in a multilane transmission device 11, when it copes with a plurality of transmission destinations and priorities and a change in a bandwidth of a physical lane that is caused by a change in a modulation scheme or a change in the number of wavelengths, using a single framer as a necessary framer and share the framer among a plurality of transmission destinations and priorities can be realized. Then, in a multilane reception device 12, when it copes with a plurality of transmission destinations and priorities and a change in a bandwidth of a physical lane that is caused by a change in a modulation scheme or a change in the number of wavelengths, using a single deframer as a necessary deframer and share the deframer among a plurality of transmission destinations and priorities can be realized.

Fourth Embodiment

In a multilane transmission device 11, even when at least any of the number of transmission destinations, the number of priority types, and the number of transmission wavelengths has been increased and decreased, a variable capacity transport frame using sufficient hardware resources necessary for transfer is created according to increase and decrease in at least any of the number of transmission destinations, the number of priority types and the number of transmission wavelengths.

In a multilane reception device 12, even when at least any of the number of transmission sources, the number of priority types, and the number of reception wavelengths has increased and decreased, a variable capacity transport frame using sufficient hardware resources necessary for transfer is received according to increase and decrease in at least any of the number of transmission sources, the number of priority types, and the number of reception wavelengths.

In other words, in the multilane transmission device 11, when the client signal is mapped to the transport frame, the number of Data blocks and the number of Stuff blocks illustrated in FIG. 1-8 are adjusted according to increase and decrease in at least any of the number of transmission destinations, the number of priority types, and the number of transmission wavelengths. Then, in the multilane reception device 12, when the client signal is demapped from the transport frame, the number of Data blocks and the number of Stuff blocks illustrated in FIG. 1-8 are adjusted according to increase and decrease in at least any of the number of transmission sources, the number of priority types, and the number of reception wavelengths.

Thus, the multilane transmission device 11 can correspond to increase and decrease in the number of transmission destinations, the number of priority types, and the number of transmission wavelengths. Then, the multilane reception device 12 can correspond to increase and decrease in the number of transmission sources, the number of priority types, and the number of reception wavelengths.

Fifth Embodiment

In the VCAT of Non-Patent Literature 1-2, high-speed frame processing on a high-speed client signal and low-speed frame processing on a low-speed transport frame are necessary.

Then, in a multilane transmission device 11, in addition to the first to fourth embodiments, a capacity for including client signals input by client signal allocating units 111-1 and 111-2 in transport frames transmitted by a virtual lane group generating unit 117 is set such that a communication speed of the transport frames transmitted by the virtual lane group generating unit 117 becomes equal to a communication speed of the client signals input by the client signal allocating units 111-1 and 111-2.

Then, in a multilane reception device 12, in addition to the first to fourth embodiments, a capacity for including client signals deframed by a client signal reconstructing unit 123 in transport frames received by a virtual lane group reconstructing unit 122 is set such that a communication speed of the transport frames received by the virtual lane group reconstructing unit 122 becomes equal to a communication speed of the client signals deframed by the client signal reconstructing unit 123.

In other words, in the multilane transmission device 11, when the client signal is mapped to the transport frame, the number of Data blocks and the number of Stuff blocks illustrated in FIG. 1-8 are adjusted so that the communication speed of the transport frame becomes equal to the communication speed of the client signal. Then, in the multilane reception device 12, when the client signal is demapped from the transport frame, the number of Data blocks and the number of Stuff blocks illustrated in FIG. 1-8 are adjusted so that the communication speed of the transport frame becomes equal to the communication speed of the client signal.

Thus, the multilane transmission device 11 can use a single speed as a necessary frame processing speed when further coping with frames of different communication speeds. Then, the multilane reception device 12 can use a single speed as a necessary deframe processing speed when further coping with frames of different communication speeds.

Second Invention (Multilane Communication System)

FIG. 2-1 illustrates configuration of a multilane communication system of the present invention. The multilane communication system includes multilane communication node devices 100, 200, and 300, a network 400, and a management control system 500. Each of the multilane communication node devices 100, 200, and 300 includes a multilane transmission/reception device as will be described later. The management control system 500 can set in the network 400 a path (an optical path or an electric path) between two of the multilane communication node devices 100, 200, and 300 according to a bandwidth between two of the multilane communication node devices 100, 200, and 300, based on a setting table 1.

In the present embodiment, each of the multilane communication node devices 100, 200, and 300 includes one 100 GE (100 Gbps Ethernet (registered trademark)) interface at a client side, and includes ten 10 GE (10 Gbps Ethernet (registered trademark)) interfaces at the network 400 side. However, the multilane communication node devices 100, 200, and 300 can perform transmission and reception by using arbitrary number of the 10 GE interfaces when the ten 10 GE interfaces or less are installed at the network 400 side.

FIG. 2-2 illustrates configuration of a multilane of the present invention. The number of lanes between two of the multilane communication node devices 100, 200, and 300 can be changed in the network 400 according to a change in a bandwidth between two of the multilane communication node devices 100, 200, and 300.

The multilane communication node device 100 transmits and receives a flow group #1 between the multilane communication node devices 100 and 200 by using a lane group #1 including 6 physical lanes, and transmits and receives a flow group #2 between the multilane communication node devices 100 and 300 by using a lane group #2 including 4 physical lanes.

The multilane communication node device 200 transmits and receives the flow group #1 between the multilane communication node devices 200 and 100 by using a lane group #2 including 6 physical lanes, and transmits and receives a flow group #3 between the multilane communication node devices 200 and 300 by using a lane group #1 including 4 physical lanes.

The multilane communication node device 300 transmits and receives the flow group #2 between the multilane communication node devices 300 and 100 by using a lane group #1 including 4 physical lanes, and transmits and receives the flow group #3 between the multilane communication node devices 300 and 200 by using a lane group #2 including 4 physical lane.

FIG. 2-3 illustrates content of a setting table of the present invention. In the present embodiment, a VLAN (Virtual Local Area Network) tag defined in IEEE802.1Q is used, and a data flow is identified by using a VID (VLAN ID) and a PCP (Priority Code Point) included in the VLAN tag.

The multilane communication node device 100 transmits and receives a flow group #1 having VID=0x0001 to 0x0100, 0x0FFE to and from the multilane communication node device 200 by using a lane group #1 including lanes #1, #2, #3, #4, #5, and #6. Further, the multilane communication node device 100 transmits and receives a flow group #2 having VID=0x0101 to 0x0200, 0x0FFE to and from the multilane communication node device 300 by using a lane group #2 including lanes #7, #8, #9, and #10. Note that, since VID=0x0FFE is for broadcasting, a flow group having VID=0x0FFE is transmitted and received between the multilane communication node devices 200 and 300.

The multilane communication node device 200 transmits and receives the flow group #1 having VID=0x0001 to 0x0100, 0x0FFE to and from the multilane communication node device 100 by using a lane group #2 including lanes #5, #6, #7, #8, #9, and #10. Further, the multilane communication node device 200 transmits and receives a flow group #3 having VID=0x0201 to 0x0300, 0x0FFE to and from the multilane communication node device 300 by using a lane group #1 including lanes #1, #2, #3, and #4. Note that, since VID=0x0FFE is for broadcasting, a flow group having VID=0x0FFE is transmitted and received between the multilane communication node devices 100 and 300.

The multilane communication node device 300 transmits and receives a flow group #2 having VID=0x0101 to 0x0200, 0x0FFE to and from the multilane communication node device 100 by using a lane group #1 including lanes #1, #2, #3, and #4. Further, the multilane communication node device 300 transmits and receives a flow group #3 having VLM=0x0201 to 0x0300, 0x0FFE to and from the multilane communication node device 200 by using a lane group #2 including lanes #5, #6, #7, and #8. Note that, since VLM=0x0FFE is for broadcasting, a flow group having VLM=0x0FFE is transmitted and received between the multilane communication node devices 100 and 200.

(Multilane Transmission Device)

FIG. 2-4 illustrates configuration of a multilane transmission device equipped in the multilane communication node device of the present invention. A multilane transmission device T includes a physical interface 2, a data frame allocating unit 3, buffer memories 4A, 4B, 4C, and 4D, a data stream dividing unit 5, and physical interfaces 6A, 6B, 6C, 6D, 6E, 6F, 6G, 6H, 6I, and 6J.

The multilane transmission device T will be described below in a case in which a data frame is transmitted from the multilane communication node device 100 to the multilane communication node devices 200 and 300. In other words, the multilane transmission device T which will be described below includes the multilane communication node device 100. A case in which a data frame is transmitted between multilane communication node devices of any other combination is similar to the case in which a data frame is transmitted from the multilane communication node device 100 to the multilane communication node devices 200 and 300.

The physical interface 2 demodulates and decodes an input signal from a client side into a CGMII (100G Medium Independent Interface) format, that is, a format including 64-bit data and an 8-bit control signal.

The data frame allocating unit 3 allocates a data frame based on a transmission destination. FIG. 2-5 illustrates configuration of the data frame allocating unit of the present invention. The data frame allocating unit 3 includes a VLAN tag decoding unit 31 and a data frame writing unit 32.

The VLAN tag decoding unit 31 decodes a VID and a PCP from a data frame. The data frame writing unit 32 allocates data frames to the following four types of flows according to the setting table 1, based on the VID and the PCP.

flow #1: VID=0x0001 to 0x0100, 0x0FFE, PCP=7 flow #2: VID=0x0001 to 0x0100, 0x0FFE, PCP=0 to 6 flow #3: VID=0x0101 to 0x0200, 0x0FFE, PCP=7 flow #4: VID=0x0101 to 0x0200, 0x0FFE, PCP=0 to 6

Here, as shown in the setting table 1, the flows #1 and #2 belong to the flow group #1, and the flows #3 and #4 belong to the flow group #2.

FIG. 2-6 illustrates processing of data frame allocation of the present invention. The data frame writing unit 32 receives data frames DF#1, DF#2, DF#3, DF#4, DF#5, DF#6, DF#7, DF#8, DF#9, DF#10, DF#11, and DF#12.

In parallel to the above-described processing of the data frame writing unit 32, the VLAN tag decoding unit 31 decodes VID=0x0100 and PCP=7 in the data frames DF#1, DF#7, DF#8, and DF#12, decodes VID=0x0100 and PCP=0 in the data frames DF#4, DF#5, and DF#11, decodes VID=0x0200 and PCP=7 in the data frames DF#2, DF#6, and DF#10, and decodes VID=0x0200 and PCP=0 in the data frames DF#3, DF#9, and DF#13.

Then, the data frame writing unit 32 allocates the data frames DF#1, DF#7, DF#8, and DF#12 as a flow #1, allocates the data frames DF#4, DF#5, and DF#11 as a flow #2, allocates the data frames DF#2, DF#6, and DF#10 as a flow #3, and allocates the data frames DF#3, DF#9, and DF#13 as a flow #4. Here, the data frame writing unit 32 inserts an IFG (Inter Frame Gap) between the data frames DF in each flow.

The buffer memories 4A, 4B, 4C, and 4D store the flows #1, #2, #3, and #4, respectively. The number of buffer memories 4 and the capacity to be allocated to each buffer memory 4 are dynamically set according to the number of flows and the number of lanes allocated to each flow group. Specifically, since the number of flows is 4, the number of buffer memories 4 is set to 4. Then, the capacity allocated to each buffer memory 4 is set to a capacity obtained by proportionally dividing the whole buffer memory capacity according to a magnitude of a bandwidth of each flow.

The data stream dividing unit 5 divides a data stream as will be described later with reference to FIG. 2-7 and FIG. 2-8. FIG. 2-7 illustrates configuration of the data stream dividing unit of the present invention. FIG. 2-8 illustrates processing of data stream division of the present invention. The data stream dividing unit 5 includes a data frame reading unit 51, an encoding unit 52, a data string dividing unit 53, a flow group information sequence information adding unit 54, a transmission frame processing unit 55, and a lane selecting/outputting unit 56.

The data frame reading unit 51 refers to the setting table 1 to read the data frames of the flow group #1 from the buffer memories 4A and 4B storing the data frames of the flows #1 and #2, respectively. The data frame reading unit 51 refers to the setting table 1 to read the data frames of the flow group #2 from the buffer memories 4C and 4D storing the data frames of the flows #3 and #4, respectively.

Specifically, in FIG. 2-8, the data frame reading unit 51 reads the data frames DF#1, DF#4, DF#5, DF#7, DF#8, DF#11, and DF#12 and VLAN tags and IFGs corresponding to the data frames DF from the buffer memories 4A and 4B. Note that the data frame reading unit 51 also reads the data frames between the multilane communication node devices 100 and 300, similarly to the data frames between the multilane communication node devices 100 and 200.

When reading the data frames of the flow groups #1 and #2, the data frame reading unit 51 performs shaping of adjusting the speed of reading the data frames of the flows #1, #2, #3, and #4 according to the bandwidths allocated to the flow groups #1 and #2. Note that the bandwidth allocated to the flow group #1 is 60 Gbps corresponding to the lanes #1, #2, #3, #4, #5, and #6 as shown in the setting table 1. Further, the bandwidth allocated to the flow group #2 is 40 Gbps corresponding to the lanes #7, #8, #9, and #10 as shown in the setting table 1.

The data frame reading unit 51 refers to the setting table 1 to determine a flow group of the read data frames based on the VID and the PCP of the read VLAN tag, and notifies the flow group information sequence information adding unit 54 and the lane selecting/outputting unit 56 of information of the flow group.

The encoding unit 52 performs 64 b/65 b encoding from the CGMII format on the data frame read by the data frame reading unit 51. In the 64 b/65 b encoding, scrambling is performed on 64-bit data, and a 1-bit flag for identifying whether or not a control code is included is added. The data string dividing unit 53 divides the data frame that has been subjected to the 64 b/65 b encoding of the encoding unit 52 into data blocks having a certain length.

Specifically, in FIG. 2-8, the encoding unit 52 performs the 64 b/65 b encoding on the data frames DF#1, DF#4, DF#5, DF#7, DF#8, DF#11, and DF#12 and the VLAN tags and the IFGs corresponding to the data frames DF. Then, the data string dividing unit 53 divides the data frame that has been subjected to the 64 b/65 b encoding of the encoding unit 52 into data blocks DB#1, DB#2, DB#3, DB#4, DB#5, DB#6, DB#7, DB#8, and DB#9. Note that the encoding unit 52 and the data string dividing unit 53 also performs the 64 b/65 b encoding and the division into data blocks on the data frames between the multilane communication node devices 100 and 300, similarly to the data frames between the multilane communication node devices 100 and 200.

The flow group information sequence information adding unit 54 adds flow group information indicating flow groups corresponding to the transmission source and the transmission destinations and sequence information indicating a sequence of data frames to each data frame allocated based on each transmission destination by the data frame allocating unit 3.

The flow group information is information indicating the flow groups #1 and #2 corresponding to the multilane communication node device 100 serving as the transmission source and the multilane communication node devices 200 and 300 serving as the transmission destinations. The flow group information is, for example, a flow group identifier FG-ID (Flow Group-Identifier) or the like, may be based on a combination of a device ID uniquely defining the multilane communication node device and a flow group number, or may be temporarily derived from the management control system 500. The sequence information is, for example, a sequence number SN (Sequential Number) that is consecutive in each flow group.

Specifically, in FIG. 2-8, the flow group information sequence information adding unit 54 adds the flow group identifier FG-ID and the sequence number SN to the data blocks DB#1, DB#2, DB#3, DB#4, DB#5, DB#6, DB#7, DB#8, and DB#9 based on information of the flow group #1 notified of from the data frame reading unit 51. The sequence numbers SN of 1 to 9 are added to the data blocks DB#1 to DB#9. Note that the flow group information sequence information adding unit 54 also adds the flow group identifier FG-ID and the sequence number SN to the data frames between the multilane communication node devices 100 and 300, similarly to the data frames between the multilane communication node devices 100 and 200.

The transmission frame processing unit 55 converts the data block having the flow group identifier FG-ID and the sequence number SN added thereto by the flow group information sequence information adding unit 54, into a format of a transmission frame. In the present embodiment, 10 GE is used as a network 400 side transfer scheme. As illustrated in FIG. 2-8, the transmission frame processing unit 55 adds a MAC (Media Access Control) header and an FCS (Frame Check Sequence) of the Ethernet (registered trademark) to the data block, and converts the data block into a format of an Ethernet (registered trademark) MAC frame.

The lane selecting/outputting unit 56 transmits each data frame having the respective flow group information and the respective sequence information added thereto by the flow group information sequence information adding unit 54, to each transmission destination by using one or more lanes (the lane groups #1 and #2) corresponding to the respective flow group information (the flow groups #1 and #2).

Specifically, in FIG. 2-8, the lane selecting/outputting unit 56 outputs the data blocks DB#1, DB#2, DB#3, DB#4, DB#5, DB#6, DB#7, DB#8, and DB#9 to the lane group #1 based on the information of the flow group #1 notified of from the data frame reading unit 51 and the correspondence relation of the flow group #1 and the lane group #1 input from the setting table 1.

Then, the lane selecting/outputting unit 56 outputs the data blocks DB#1, DB#2, DB#3, DB#4, DB#5, DB#6, DB#7, DB#8, and DB#9 to the lanes #1, #2, #3, #4, #5, and #6 by a round robin, based on the correspondence relation of the lane group #1 and the lanes #1, #2, #3, #4, #5, and #6 input from the setting table 1.

Note that the lane selecting/outputting unit 56 also performs the outputting of the data blocks DB on the data frames between the multilane communication node devices 100 and 300, similarly to the data frames between the multilane communication node devices 100 and 200.

The physical interfaces 6A, 6B, 6C, 6D, 6E, 6F, 6G, 6H, 6I, and 6J correspond to the lanes #1, #2, #3, #4, #5, #6, #7, #8, #9, and #10, respectively, encode and modulate the data blocks DB, and output the data blocks DB to the network 400 side.

(Multilane Reception Device)

FIG. 2-9 illustrates configuration of a multilane reception device equipped in the multilane communication node device of the present invention. A multilane reception device R includes physical interfaces 7A, 7B, 7C, 7D, 7E, 7F, 7G, 7H, 7I, and 7J, a data frame reconfiguring unit 8, buffer memories 9A and 9B, a data frame multiplexing unit 10, and a physical interface 11.

The multilane reception device R will be described below in a case in which the multilane communication node device 200 receives a data frame from the multilane communication node devices 100 and 300. In other words, the multilane reception device R which will be described below includes the multilane communication node device 200. A case in which a data frame is received between multilane communication node devices of any other combination is similar to the case in which the multilane communication node device 200 receives a data frame from the multilane communication node devices 100 and 300.

The physical interfaces 7A, 7B, 7C, 7D, 7E, 7F, 7G, 7H, 7I, and 7J, as data frame receiving units, receive data frames having flow group information (the flow groups #1 and #3) indicating flow groups corresponding to the transmission sources and the transmission destination and sequence information indicating a sequence of data frames added thereto, from the transmission sources by using one or more lanes (the lane groups #2 and #1) corresponding to the respective flow group information (the flow groups #1 and #3).

The physical interfaces 7A, 7B, 7C, 7D, 7E, 7F, 7G, 7H, 7I, and 7J correspond to the lanes #1, #2, #3, #4, #5, #6, #7, #8, #9, and #10, respectively, receive the data blocks DB from the network 400 side and decode and demodulate the data blocks DB.

The data frame reconfiguring unit 8 rearranges and reconfigures the data frames having the respective flow group information and the respective sequence information added there to, based on the respective sequence information, as will be described with reference to FIG. 2-10 and FIG. 2-11. FIG. 2-10 illustrates configuration of the data frame reconfiguring unit of the present invention. FIG. 2-11 illustrates processing of data frame reconfiguration of the present invention. The data frame reconfiguring unit 8 includes transmission frame processing units 81A, 81B, 81C, 81D, 81E, 81F, 81G, 81H, 81I, and 81J, a lane selecting/combining unit 82, a decoding unit 83, and a data frame allocating unit 84.

The transmission frame processing units 81A, 81B, 81C, 81D, 81E, 81F, 81G, 81H, 81I, and 81J correspond to the physical interfaces 7A, 7B, 7C, 7D, 7E, 7F, 7G, 7H, 7I, and 7J, respectively, take out the payload by removing the MAC header and the FCS from the 10 GE Ethernet (registered trademark) frame, and divide and buffer the flow group identifier FG-ID, the sequence number SN, and the data block DB.

The lane selecting/combining unit 82 reads the flow group identifier FG-ID from the transmission frame processing units 81A, 81B, 81C, 81D, 81E, 81F, 81G, 81H, 81I, and 81J. Then, the lane selecting/combining unit 82 reads the sequence numbers SN and the data blocks DB from the transmission frame processing unit 81 from which the identical flow group identifier FG-ID has been read. Then, the lane selecting/combining unit 82 rearranges and reconfigures the data blocks DB regarding the identical flow group identifier FG-ID, based on the sequence numbers SN.

Specifically, in FIG. 2-11, the lane selecting/combining unit 82 reads the identical flow group identifier FG-ID from the transmission frame processing units 81E, 81F, 81G, 81H, 81I, and 81J. Then, the lane selecting/combining unit 82 reads the sequence numbers SN (1 to 9) and the data blocks DB#1 to DB#9 from the transmission frame processing units 81E, 81F, 81G, 81H, 81I, and 81J from which the identical flow group identifier FG-ID has been read. Then, the lane selecting/combining unit 82 rearranges and reconfigures the data blocks DB#1 to DB#9 regarding the identical flow group identifier FG-ID, based on the sequence numbers SN (1 to 9).

Note that the lane selecting/combining unit 82 also performs the reconfiguration of the data blocks DB on the data frames between the multilane communication node devices 200 and 300, similarly to the data frames between the multilane communication node devices 100 and 200.

The decoding unit 83 decodes the data blocks DB reconfigured by the lane selecting/combining unit 82 from the 64 b/65 b encoding to the CGMII format.

Specifically, in FIG. 2-11, the decoding unit 83 decodes the data blocks DB#1 to DB#9 reconfigured by the lane selecting/combining unit 82 from the 64 b/65 b encoding to the CGMII format, and generates data frames DF#1, DF#4, DF#5, DF#7, DF#8, DF#11, and DF#12 and VLAN tags and IFGs corresponding to the data frames DF.

Note that the decoding unit 83 also performs the decoding of the data blocks DB on the data frames between the multilane communication node devices 200 and 300, similarly to the data frames between the multilane communication node devices 100 and 200.

The data frame allocating unit 84 allocates the data frames DF to the following two types of flow groups according to the setting table 1, based on the VID and the PCP.

flow group #1: VID=0x0001 to 0x0100, 0x0FFE, PCP=7 flow group #1: VID=0x0001 to 0x0100, 0x0FFE, PCP=0 to 6 flow group #3: VID=0x0201 to 0x0300, 0x0FFE, PCP=7 flow group #3: VID=0x0201 to 0x0300, 0x0FFE, PCP=0 to 6

Here, as shown in the setting table 1, the first and second flow groups #1 correspond to the flows #1 and #2, respectively, and the first and second flow groups #3 correspond to the flows #3 and #4, respectively.

The buffer memories 9A and 9B store the flow groups #1 and #3. The number of buffer memories 9 and the capacity to be allocated to each buffer memory 9 are dynamically set according to the number of flow groups and the number of lanes allocated to each flow group. Specifically, since the number of flow groups is 2, the number of buffer memories 9 is set to 2. Then, the capacity to be allocated to each buffer memory 9 is set to a capacity obtained by proportionally dividing the whole buffer memory capacity according to a magnitude of a bandwidth of each flow group.

The data frame multiplexing unit 10 monitors whether or not there is a "frame end" control code of the data frame DF in the buffer memories 9A and 9B. Then, when it is monitored that there is a "frame end" control code of the data frame DF in the buffer memories 9A and 9B, the data frame multiplexing unit 10 reads the data frames DF from the buffer memories 9A and 9B and performs multiplexing on the read data frames as illustrated in FIG. 2-12. Then, the data frame multiplexing unit 10 adjusts the speed, and outputs the data frames to the physical interface 11.

(Effects of Multilane Communication System)

As described above with reference to FIG. 2-4 to FIG. 2-8, the multilane transmission device T adds the flow group information indicating the flow groups corresponding to the transmission source and the transmission destinations and the sequence information indicating the sequence of the data frames to the data frames allocated based on the transmission destinations.

As described above with reference to FIG. 2-9 to FIG. 2-12, the multilane reception device R rearranges and reconfigures the data frames having the flow group information indicating the flow groups corresponding to the transmission sources and the transmission destination and the sequence information indicating the sequence of the data frames added thereto, based on the respective sequence information.

Thus, when data frames are transmitted and received by using a plurality of lanes, the transmission of the data frames destined for a plurality of end nodes can be realized.

Then, since data frames to be directed to an identical transmission destination can be transmitted and received by using a single lane or a plurality of lanes, even when a bandwidth of the data frames to be directed to the identical transmission destination exceeds a bandwidth of the single lane, the plurality of lanes can be used. This contrasts with a case in which in order to properly maintain the sequence of data frames to be directed to an identical transmission destination, the data frames to be directed to the identical transmission destination need to be transmitted and received by using only a single lane, and even when a bandwidth of the data frames to be directed to the identical transmission destination exceeds a bandwidth of the single lane, a plurality of lanes cannot be used.

Here, the data frame reconfiguring unit 8 constantly monitors all the plurality of lanes connected to the multilane reception device R for the data frames DF being received.

In FIG. 2-2, the number of physical lanes from the multilane communication node device 100 to the multilane communication node device 200 is 6, and the number of physical lanes from the multilane communication node device 100 to the multilane communication node device 300 is 4. Here, in view of a situation in which a physical lane is switched, the number of physical lanes from the multilane communication node device 100 to the multilane communication node device 200 is decreased to 5, and the number of physical lanes from the multilane communication node device 100 to the multilane communication node device 300 is increased to 5.

Then, in the multilane communication node device 200, even when the 6 transmission frame processing units 81 are still operating in reception of the data frames DF from the multilane communication node device 100, such a problem does not occur that the data frame DF is lost. However, in the multilane communication node device 300, such a problem that the data frame DF is lost occurs when only the 4 transmission frame processing units 81 are still operating in reception of the data frames DF from the multilane communication node device 100.

However, the lane selecting/combining unit 82 constantly monitors all the transmission frame processing units 81 for the data frame DF being received.

Thus, when data frames are transmitted and received by using a plurality of lanes, prevention of loss of the data frames can be realized without establishing a protection time even when the number of lanes is increased and decreased. This contrasts with a case of preventing loss of data frames by not increasing and decreasing the number of lanes during the transfer of the data frames.

(Modification)

In the present embodiment, the data frame allocating unit 3 allocates the data frames to the flows based on the VID and the PCP of the VLAN tag. Here, as a modification, the data frame allocating unit 3 may allocate the data frames to the flows based on a label and an EXP (Experimental) of a shim header defined in MPLS (Multi-Protocol Label Switching).

In the present embodiment, the lane selecting/outputting unit 56 outputs the data blocks DB to the lanes by the round robin. Here, as a modification, the lane selecting/outputting unit 56 may output the data blocks DB to the lanes by a method other than the round robin.

In the present embodiment, the capacity to be allocated to each buffer memory 4 is set to a capacity obtained by proportionally dividing the whole buffer memory capacity according to a magnitude of a bandwidth of each flow, and the capacity to be allocated to each buffer memory 9 is set to a capacity obtained by proportionally dividing the whole buffer memory capacity according to a magnitude of a bandwidth of each flow group. Here, as a modification, the capacity to be allocated to each buffer memory 4 and each buffer memory 9 may be set by a method other than the above-described proportion division method.

In the present embodiment, the 100 GE physical interface is arranged at the client side, and the 10 GE physical interface is arranged at the network 400 side. Here, as a modification, various forms may be employed such as arranging a 40 GE physical interface at the client side and arranging an OTN (Optical Transport Network) physical interface at the network 400 side.

Third Invention

A multilane transmission method of the present embodiment is a multilane transmission method of dividing a signal of a frame format into data blocks, distributing the data blocks to one or more lanes, and transmitting the data blocks, and in a multilane transmission method, instead of rotating lanes for each frame as in the OTN-MLD of the related art, by executing an identifier writing procedure and a lane rotation procedure, M frames corresponding to the number of lanes are collectively regarded as a variable frame, rotation is performed for each variable frame, and thus even when the number of lanes is not a divisor of 1020, a dummy block is unnecessary.

In the identifier writing procedure, a numerical value increasing or decreasing for each frame is written as a frame identifier, and in the lane rotation procedure, lane rotation is performed when a remainder obtained by dividing the frame identifier by a multiple of M becomes a certain value. FIG. 3-4 illustrates one example of a case in which the number M of lanes is 8, and frames of LLM=0 to 7 are collectively regarded as a variable frame.

Here, the LLM may be a VLM, and the LLM and the VLM are not distinguished from each other in the present application. Further, the variable frame is identical to a transport frame.

In a first variable frame (LLM=0), data blocks are distributed as follows.

lane #0: b=1, 9, 17, . . . , 1109, 1117
lane #1: b=2, 10, 18, . . . , 1110, 1118
lane #2: b=3, 11, 19, . . . , 1111, 1119
lane #3: b=4, 12, 20, . . . , 1112, 1020
lane #4: b=5, 13, 21, . . . , 1113
lane #5: b=6, 14, 12, . . . , 1114
lane #6: b=7, 15, 23, . . . , 1115
lane #7: b=8, 16, 24, . . . , 1116

A second frame (LLM=1) succeeds the first frame as is, and distribution starts with the lane #4. A third frame (LLM=2) succeeds the second frame as is, and distribution starts with the lane #0. In this way, the distribution is performed up to an eighth frame (LLM=7).

In a ninth frame (LLM=8), the lanes are rotated, and the data blocks are distributed as follows:

lane #0: b=8, 16, 24, . . . , 1116
lane #1: b=1, 9, 17, . . . , 1109, 1117
lane #2: b=2, 10, 18, . . . , 1110, 1118
lane #3: b=3, 11, 19, . . . , 1111, 1119
lane #4: b=4, 12, 20, . . . , 1112, 1020
lane #5: b=5, 13, 21, . . . , 1113
lane #6: b=6, 14, 12, . . . , 1114
lane #7: b=7, 15, 23, . . . , 1115

In $10^{th}$ to $16^{th}$ frames (LLM=9 to 15), lane rotation is not performed, and the data blocks are distributed as in the previous frame.

In a $17^{th}$ frame (LLM=16), the lanes are rotated, and the data blocks are distributed as follows:

lane #0: b=7, 15, 23, . . . , 1115
lane #1: b=8, 16, 24, . . . , 1116
lane #2: b=1, 9, 17, . . . , 1109, 1117
lane #3: b=2, 10, 18, . . . , 1110, 1118
lane #4: b=3, 11, 19, . . . , 1111, 1119 lane #5: b=4, 12, 20, . . . , 1112, 1020
lane #6: b=5, 13, 21, . . . , 1113
lane #7: b=6, 14, 12, . . . , 1114

In the same manner, lane rotation is performed in a $24^{th}$ frame (LLM=23), a $32^{nd}$ frame (LLM=31), a $40^{th}$ frame (LLM=39), a $48^{th}$ frame (LLM=47), and a $56^{th}$ frame (LLM=55), and thus the number of lanes can be arbitrarily changed without inserting a dummy block (without increasing a bit rate of a lane).

When M is the number of lanes, K is an integer of 1 or more, the above is generalized as follows.

A value of LLM is sequentially incremented from 0 to $M^2-1$ (or $K*M^2-1$, provided that $K*M^2 \le 256$).

A head of a frame in which LLM mod M=0 is used as a head of a variable frame, and lane rotation is performed. Rotation is not performed in a portion other than the head of the variable frame.

Note that in the example of FIG. 3-4, the frames of LLM=0 to 7 are collectively regarded as the variable frame, but 8 consecutive frames having a frame of an arbitrary LLM as a head, for example, frames of LLM=1 to 8 may be collectively regarded as the variable frame. Further, arbitrary number of 2 or more can be applied to the number M of lanes.

Further, instead of simply incrementing an LLM of each frame, a value indicating that a head is the head of the variable frame may be written in frames corresponding to a multiple of M among frames, and a value indicating that a head is not the head of the variable frame may be written in the remaining frames. For example, as illustrated in FIG. 3-5, a value of the LLM may be incremented on an 8-frame basis (8 is a multiple of the number M of lanes), and LLM=255 may be used in 7 frames in the middle.

This is generalized as follows.

When a sequence of frames is j, a value of the LLM is sequentially incremented from 0 to (M−1) or K*(M−1) when j mod M=0. Provided that $K*M \le 255$;

LLM=255 when j mod M≠0;

A head of a frame in which LLM≠255 is used as a head of a variable frame, and lane rotation is performed. Rotation is not performed in a portion other than the head of the variable frame.

Note that the example has been described in which the value indicating that a head is not the head of the variable frame is 255, but an arbitrary value that is not used as the LLM can be used as the value indicating that a head is not the head of the variable frame.

First Embodiment

FIG. 3-6 illustrates configuration of a transmitting unit of a multilane transmission device of the present invention. The transmitting unit of the multilane transmission device includes a mapping unit 1, an OH processing unit 2, an interleaving unit 3, encoding units 4-1 to 4-16, a deinterleaving unit 5, a scrambling unit 6, a data block dividing unit 7, and a lane number deciding unit 8. Hereinafter, a case in which the number M of lanes is 16 will be described.

The mapping unit 1 maps a client signal to an OPU PLD.

The OH processing unit 2 adds an overhead to an OPU frame. Examples of the overhead include an FA OH, an OTU OH, an LM OH, and an ODU OH.

Here, the OH processing unit 2 functions as an identifier writing function unit, and writes a frame identifier in a predetermined filed of each frame. In the present embodiment, the identifier writing function unit writes a numerical value increasing or decreasing for each frames as the frame identifier.

For example, as illustrated in FIG. 3-7, an LLM is arranged in a $6^{th}$ byte of the FA OH. An FAS including OA1 and OA2 is arranged in $1^{st}$ to $5^{th}$ bytes of the FA OH, and an MFAS is arranged in a $7^{th}$ byte of the FA OH.

As illustrated in FIG. 3-8, when M is the number of lanes, the LLM has a numerical value increasing for each frame from 0 to $K*M^2-1$ (S102). Here, $K*M^2$ is a multiple of $M^2$ that is 256 or less. Note that K=1 may be used.

The interleaving unit 3 performs 16-byte interleaving on a frame of 4 rows×3824 columns in which the overhead is added to the OPU frame for each row (3824 bytes).

The encoding units 4-1 to 4-16 encode byte-interleaved sub-row data (239 bytes), and outputs sub-row data (255 bytes) to which a 16-byte parity check is added.

The deinterleaving unit 5 deinterleaves the encoded sub-row data, and outputs an encoded OTU frame of 4 rows×4080 columns.

The scrambling unit 6 scrambles all regions of the FEC-coded OTU frame of 4 rows×4080 columns except the FAS.

The data block dividing unit 7 divides the scrambled OTU frame into 16-byte data blocks.

The lane number deciding unit 8 decides a lane number, and outputs data blocks of a frame format to the corresponding lane.

Here, the lane number deciding unit 8 functions as a lane rotating function unit, and lane rotation is performed when a remainder obtained by dividing the LLM by a multiple of the number M of lanes is a certain value.

For example, as illustrated in FIG. 3-9, a lane number m (m=0 to M−1) of a lane to which a head data block including the FAS is output is decided by:

m=(LLM/M)mod M when LLM mod M=0

(S202 to S204, S207 to S209).

In the case of the remaining data blocks, when an immediately previous lane number is m', the lane number m is decided by:

m=(m'+1)mod M (S207, S210).

FIG. 3-10 illustrates configuration of a receiving unit of the multilane transmission device. The receiving unit of the multilane transmission device includes a lane identifying & delay difference compensating unit 10, an OTU frame reconfiguring unit 11, a descrambling unit 12, an interleaving unit 13, decoding units 14-1 to 14-16, a deinterleaving unit 15, an OH processing unit 16, and a demapping unit 17.

The lane identifying & delay difference compensating unit 10 finds the head data block including the FAS, and reads the LLM, and when LLM mod M=0, identifies a lane number by m=(LLM/M)mod M.

Further, an MFAS included in the data block is read, and a delay difference is compensated for. Here, FIG. 3-11(*a*) and FIG. 3-11(*b*) illustrate an example of compensating for a delay difference in the case of 4 lanes.

Assuming that a head position of a data block of MFAS=0 received through a lane #0 is a criterion, a head position of a data block of MFAS=4 received through a lane #1, a head position of a data block of MFAS=8 received through a lane #2, a head position of a data block of MFAS=12 received through a lane #3 should be delayed by 16320 bytes, 32640 bytes, and 48960 bytes, respectively. However, since signals of the respective lanes are transmitted through light of different wavelengths, a delay time difference occurs due to influence of dispersion or the like.

Here, when the head positions of the data blocks of MFAS=4, MFAS=8, and MFAS=12 with the head position of the data block of MFAS=0 as the reference are assumed to have been delayed by 16220 bytes, 32940 bytes, and 49160 bytes, respectively, as illustrated in FIG. 3-11(*a*), it is understood that a delay time difference of −100 bytes in the lane #1, a delay time difference of +300 bytes in the lane #2, and a delay time difference of +200 bytes in the lane #3 with respect to an expected delay time respectively. Then, when a delay of 300 bytes in the lane #0, a delay of 400 bytes in, the lane #4 and a delay of 100 bytes in the lane #2 are given respectively, all lanes can be conformed to that has the largest delay as illustrated in FIG. 3-11(*b*).

The OTU frame reconfiguring unit 11 receives the data blocks of the respective lanes which have been subjected to delay time difference compensation, sequentially reads the data blocks of the respective lanes based on the lane numbers identified by the lane identifying & delay difference compensating unit 10, and reconfigures an OTU frame of 4 rows×4080 columns.

The descrambling unit 12 descrambles all regions of the reconfigured OTU frame except the FAS.

The interleaving unit 13 performs 16-byte interleaving on the OTU frame of 4 rows×4080 columns for each row (4080 bytes).

The decoding units 14-1 to 14-16 decode the byte-interleaved sub-row data (255 bytes), and output error-corrected sub-row data (238 bytes).

The deinterleaving unit 15 deinterleaves the decoded sub-row data, and outputs an error-corrected frame of 4 rows×3824 columns.

The OH processing unit 16 outputs an OPU frame in which the overheads such as the FA OH, the OTU OH, the LM OH, and the ODU OH are eliminated from the error-corrected frame of 4 rows×3824 columns.

The demapping unit 17 demaps the client signal from the OPU PLD based on information of the OPU OH, and outputs the client signal.

Note that in the present embodiment has been described in the case in which the number of lanes is 16, but the embodiment is not limited thereto. When the LLM is 17 or more, 1 byte is not enough for the LLM. In this case, when the LLM is extended to 2 bytes as illustrated in FIG. 3-12, corresponding up to 256 lanes can be realized. For example, the LLM is arranged in the $1^{st}$ byte and the $6^{th}$ byte of the FA OH.

Second Embodiment

FIG. 3-6 illustrates configuration of a transmitting unit of a multilane transmission device of the present invention. The configuration of the transmitting unit of the multilane transmission device is the same as in the first embodiment. The present embodiment is different from the first embodiment in the functions of an OH processing unit 2 and a lane number deciding unit 8.

A mapping unit 1 performs maps a client signal to an OPU PLD.

The OH processing unit 2 adds an overhead to an OPU frame. Examples of the overhead include an FA OH, an OTU OH, an LM OH, and an ODU OH.

Here, the OH processing unit 2 functions as an identifier writing function unit, and writes a frame identifier in a predetermined filed of each frame. In the present embodiment, the identifier writing function unit writes a value indicating that a head is a head of a variable frame in frames corresponding to a multiple of M among frames, and writes a value indicating that a head is not the head of the variable frame in the other frames.

For example, as illustrated in FIG. 3-7, an LLM is arranged in a $6^{th}$ byte of the FA OH. As illustrated in FIG. 3-13, when M is the number of lanes, the LLM has a value from 0 to K*(M−1) on an M-frame basis (S303 to S305), and the LLMs of the (M−1) frames therebetween have a value of 255 (0xFF) (S306). Here, K*M is a multiple of M that is 255 or less (K=1 may be used).

Note that the example has been described in which the value indicating that a head is the head of the variable frame is from 0 to K*(M−1), and the value indicating that a head is not the head of the variable frame is 255, but the embodiment is not limited thereto. Particularly, the value indicating that a head is not the head of the variable frame can be a value that is not used as the LLM.

An interleaving unit 3 performs 16-byte interleaving on a frame of 4 rows×3824 columns in which the overhead is added to the OPU frame for each row (3824 bytes).

Encoding units 4-1 to 4-16 encode byte-interleaved sub-row data (239 bytes), and outputs sub-row data (255 bytes) to which a 16-byte parity check is added.

A deinterleaving unit 5 deinterleaves the encoded sub-row data, and outputs an encoded OTU frame of 4 rows×4080 columns.

A scrambling unit 6 scrambles all regions of the FEC-coded OTU frame of 4 rows×4080 columns except an FAS.

A data block dividing unit 7 divides the scrambled OTU frame into 16-byte data blocks.

The lane number deciding unit 8 decides a lane number, and outputs data blocks of a frame format to the corresponding lane.

Here, the lane number deciding unit 8 functions as a lane rotating function unit, and lane rotation is performed when the frame identifier indicates that a head is the head of the variable frame.

For example, as illustrated in FIG. 3-14, a lane number m (m=0 to M−1) of a lane to which a head data block including the FAS is output is decided by:

m=LLM mod M when LLM≠255

(S402 to S404, S407 to S409).

In the case of the other data blocks, when an immediately previous lane number is m', the lane number m is decided by:

m=(m'+1)mod M (S407, S410).

FIG. 3-10 illustrates configuration of a receiving unit of the multilane transmission device. The configuration of the receiving unit of the multilane transmission device is the same as in the first embodiment. The present embodiment is different from the first embodiment in the function of a lane identifying & delay difference compensating unit 10.

The lane identifying & delay difference compensating unit 10 finds the head data block including the FAS, and reads the LLM, and when LLM≠255, a lane number is identified by m=LLM mod M.

Further, an MFAS included in the data block is read, and a delay difference is compensated for. An example of compensating for a delay difference in the case of 4 lanes is as described with reference to FIG. 3-11(*a*) and FIG. 3-11(*b*).

The OTU frame reconfiguring unit 11 receives the data blocks of the respective lanes which have been subjected to delay time difference compensation, sequentially reads the data blocks of the respective lanes based on the lane numbers identified by the lane identifying & delay difference compensating unit 10, and reconfigures an OTU frame of 4 rows×4080 columns.

A descrambling unit 12 descrambles all regions of the reconfigured OTU frame except the FAS.

An interleaving unit 13 performs 16-byte interleaving on the OTU frame of 4 rows×4080 columns for each row (4080 bytes).

Decoding units 14-1 to 14-16 decode the byte-interleaved sub-row data (255 bytes), and output error-corrected sub-row data (238 bytes).

A deinterleaving unit 15 deinterleaves the decoded sub-row data, and outputs an error-corrected frame of 4 rows×3824 columns.

An OH processing unit 16 outputs an OPU frame in which the overheads such as the FA OH, the OTU OH, the LM OH, and the ODU OH are eliminated from the error-corrected frame of 4 rows×3824 columns.

A demapping unit 17 demaps the client signal from the OPU PLD based on information of the OPU OH, and outputs the client signal.

Note that the present embodiment has been described in a case in which the number of lanes is 16, but the embodiment is not limited thereto. When the LLM becomes 256 or more, 1 byte is not enough for the LLM. In this case, when the LLM is extended to 2 bytes as illustrated in FIG. 3-12, corresponding up to 65535 lanes can be realized (in this case, the LLM has a value of 65535 (0xFFFF) when lane rotation is not performed).

Fourth Invention

A multilane optical transport system according to the present embodiment performs a transmission procedure and a reception procedure in an optical transport network in which a data flow is distributed to signals of a plurality of lanes and transmitted from a transmitting unit, and the signals distributed to the plurality of lanes are combined in a receiving unit to reconstruct an original data flow. In the transmission procedure, in order to identify a distribution source, the transmitting unit attaches a unique variable capacity optical path ID for uniquely identifying a variable capacity optical path to a variable capacity management frame. In the reception procedure, the receiving unit classifies signals of the respective lanes based on the variable capacity optical path ID, and compensates for a delay difference.

Here, the variable capacity management frame, the variable frame, and the transport frame are identical to one another.

As an specific example of the variable capacity optical path ID, the following methods are considered.

(1) A unique ID is attached to each piece of multilane optical transport equipment in advance, and a combination of the ID of multilane optical transport equipment at the transmission side and the ID of multilane optical transport equipment at the reception side (alternatively, one in which information related to each service class is added thereto) is used as the variable capacity optical path ID.

(2) A unique ID for each end node is derived from a network management control system when a variable capacity optical path is set between end nodes, and the multilane optical transport equipment at the transmission side and the multilane optical transport equipment at the reception side use the acquired ID for each end node (alternatively, one in which information related to each service class is added thereto) as the variable capacity optical path ID.

As a method of describing a service class of a client signal to be transferred through a variable capacity optical path, it is necessary to be able to describe a plurality of service classes as well as a single service class. For example, when the service class of the client signal is described in an EXP (Experimental Use) field of the shim header of the MPLS (Multi-Protocol Label Switching), the EXP is 3 bits, and the maximum number of service class types becomes: $2^3=8$.

Then, 8 bits are allocated to a service class identification field, and the service class is described in a bitmap format. For example, when a client signal of EXP=0x06 to 0x07 is transferred, the class identification field: 0b11000000 is used, and when a client signal of EXP=0x00 to 0x03 is multiplexed, the service class identification field: 0b00001111 is used.

A case in which a variable capacity management frame is divided into transport frames having different speeds, for example, an OPU4 (100 Gbps) and an OPU5 (400 Gbps) is considered. Since 4 OPU5 frames are transferred within a time in which one OPU4 frame is transferred, when the PLD of the variable capacity management frame is divided into an OPU4 PLD and an OPU5 PLD, it is necessary to distribute one byte to the former and distribute 4 bytes to the latter. These "1" and "4" are written in the overhead, this information is also used in combining into the variable capacity management frame, 1 byte from the OPU4 PLD and 4 bytes from the OPU5 PLD are combined into the PLD of the variable capacity management frame, and thus an original variable capacity management frame is reconfigured.

The invention according to the present embodiment solves the problems of the VCAT (Virtual Concatenation) and the OTUflex by the following combination.

(1) In the invention according to the present embodiment, an individual variable capacity optical path is identified and classified through a set of multi-frames by using an SOID and an SKID (alternatively, a VCGID or an MLGID) and an EXID which are included in frames or data blocks divided into a plurality of lanes. As a result, it is realized to solve such a problem that in the VCAT and the LCAS (Link capacity adjustment scheme) of the related art, a large capacity memory for holding 15 sets of multi-frames that become necessary in order to obtain a 15-bit GID for identifying a VCG, and latency associated with the holding increase.

For example, in the case of the VCAT of the related art, since 16320 bytes are required as the length of an OTU frame, and a memory for 256 frames×15 is required, a necessary memory per lane is 62668800 bytes, and when the speed per lane is assumed to be 111.8 Gbps comparable to an OTU4, the latency is about 4.48 msec. Meanwhile, in the case of the present invention, since 32 frames suffice, a necessary memory per lane becomes 522240 bytes, and the latency can be reduced to up to 37.4 μsec.

(2) The invention according to the present embodiment configures a management unit by using an OMFN (OPU Multiframe Number) to virtually combine OPUs of different speeds. Use of an OMFN that explicitly indicates a speed difference between OPUks makes it possible to reconfigure directly with OPUks of different speeds, instead of reconfiguring after dividing into logical lanes of the same speed as with the OTUflex. As a result, the problem of using OPUks of different speeds can be solved.

(3) The invention according to the present embodiment transfers information related to a service class of a data flow through a set of multi-frames by using an NSC (Number of Service Class) and an SCI (Service Class Indicator). By describing the service class of the client signal, it becomes possible to perform processing such as reducing a capacity of an optical path of a low service class and allocating the capacity to an optical path of a high service class when overall optical wavelength resources are deficient. As a result, the problem of describing the service class of the client signal carried through the variable capacity optical path can be solved.

The invention according the present embodiment, through a combination of (1), (2), and (3), can know a bundled end node or a bundled service class through a lane itself without using OPUks of different speeds.

First Embodiment

OPUk1-X1+k2-X2ve is defined, assuming that a variable capacity management frame is configured by virtually coupling X1 OPUk1s and X2 OPUk2s (here, ve indicates an extended VCAT).

For example, OPU4-1+5-2ve is illustrated in FIG. 4-4. OPU4-1+5-2ve includes OPU4-1+5-2ve OH and OPU4-1+5-2ve PLD, OPU4-1+5-2ve OH is arranged in $(14X+1)^{th}$ to $16X^{th}$ columns, and OPU4-1+5-2ve PLD is arranged in $(16Z+1)^{th}$ to $3824Z^{th}$ columns. Here, Z=X1+4*X2=9. OPU4-1+5-2ve OH is distributed to each of OPU4 #1 OH, OPU5 #2 OH, and OPU5 #3 OH on 1-byte basis. Further, OPU4-1+5-2ve PLD is distributed to OPU4 #1 PLD on 1-byte basis, and distributed to each of OPU5 #2 PLD and OPU5 #3 PLD on 4-byte basis. 256 OPU4-1+5-2ves configure a set of multi-frames, and a frame position in the multi-frame is identified by an MFAS arranged in a $7^{th}$ byte of an FA OH.

FIG. 4-5 illustrates an individual OPUk OH configuring OPUk1-X1+k2-X2ve OH. A VCOH and the PSI are arranged in a $15^{th}$ column, and information (for example, stuff control information) according to a mapping format of a client signal is included in a $16^{th}$ column.

The VCOHs are arranged in $1^{st}$ to $3^{rd}$ rows of the $15^{th}$ column, and denoted as VCOH1, VCOH2, and VCOH3, respectively. The VCOHs have 96 bytes (3 bytes×32), and content of the VCOH is as follows (5 bits [0 to 31] of $4^{th}$ to $8^{th}$ bits of the MFAS are assumed to be indices of VCOH1 to VCOH3).

MFI is arranged in VCOH1[0] and VCOH1[1]. The MFI can be used similarly to the MFI in the VCAT/LCAS of the related art.

An SOID (Source Identifier) is arranged in VCOH1[2] and VCOH1[3]. A $1^{st}$ bit of VCOH1[2] is assumed to be an MSB (Most Significant Bit), and an $8^{th}$ bit of VCOH1[3] is assumed to be an LSB (Least Significant Bit). The SOID is an ID attached to multilane optical transport equipment serving as a starting point of a VCG, and is used for identification of a VCG in combination with an SKID and an EXID which will be described later.

SQ is arranged in VCOH1[4]. The SQ can be used similarly to the SQ in the VCAT/LCAS of the related art.

CTRL is arranged in $1^{st}$ to $4^{th}$ bits of VCOH1[5]. The CTRL can be used similarly to the CTRL in the VCAT/LCAS of the related art.

A $5^{th}$ bit of VCOH1[5] is a spare region (it may be used as the GID in order to maintain compatibility with the VCAT/LCAS of the related art).

The RSA is arranged in a $6^{th}$ bit of VCOH1[5]. The RSA can be used similarly to the RSA in the VCAT/LCAS of the related art.

$7^{th}$ and $8^{th}$ bits of VCOH1[5] are spare regions.

An SKID (Sink Identifier) is arranged in VCOH1[6] and VCOH1[7]. A $1^{st}$ bit of VCOH1[6] is assumed to be the MSB, and an $8^{th}$ bit of VCOH1[7] is assumed to be the LSB. The SKID is an ID attached to multilane optical transport equipment serving as an ending point of a VCG, and is used for identification of a VCG in combination with the SOID described above and an EXID which will be described later. A manner of allocating 2 bytes to each of the SOID and the SKID as described above can be applied to a network in which the number of pieces of multilane optical transport equipment is 65536 or less.

An EXID (Extended Identifier) is arranged in VCOH1[8]. A $1^{st}$ bit of VCOH1[8] is assumed to be the MSB, and an $8^{th}$ bit of VCOH1[8] is assumed to be the LSB. The EXID is an ID added in order to set a plurality of VCGs through which, for example, client signals of different service classes are transferred between the identical end nodes, and used for identification of a VCG in combination with the SOID and the SKID.

An OMFN (OPU Multiframe Number) is arranged in VCOH1[9]. (OMFN+1) indicates the number of OPUks under the identical SQ. When OPU4-1+5-2ve illustrated in FIG. 4-4 is taken for example, the following is obtained:

OPU4 #1: SQ=0, OMFN=0

OPU5 #2: SQ=1, OMFN=3

OPU5 #3: SQ=2, OMFN=3

When OPUk1-X1+k2-X2ve PLD is distributed to OPUk1 PLD and OPUk2 PLD or when OPUk1 PLD and OPUk2 PLD are virtually combined to OPUk1-X1+k2-X2ve PLD, the distribution or the combination is also performed on a (OMFN+1) byte-basis. Note that when only a transport frame of the same speed is constantly used, an OMFN field is unnecessary.

VCOH1[10] to VCOH1[31] are spare regions.

The MST is arranged in VCOH2[0] to VCOH2[31]. The MST can be used similarly to the MST in the VCAT/LCAS of the related art.

The CRC is arranged in VCOH3[0] to VCOH3[31]. The CRC can be used similarly to the CRC in the VCAT/LCAS of the related art.

As above, the VCOHs are repeated 8 times in a set of multi-frames.

The PSI is arranged in the $4^{th}$ row of the $15^{th}$ column. The PSI is 256 bytes, and content of the PSI is as follows (8 bits [0 to 255] of the MFAS are assumed to be indices of the PSI).

A PT is arranged in PSI[0]. The PT can be used similarly to the PT in the OTN of the related art.

A vcPT is arranged in PSI[1]. The vcPT can be used similarly to the vcPT in the VCAT of the related art.

A CSF (Client Signal Fail) is arranged in a $1^{st}$ bit of PSI[2]. The CSF can be used similarly to the CSF in the OTN of the related art.

An NSC (Number of Service Class) is arranged in PSI[3]. A $1^{st}$ bit is assumed to be the MSB, and an $8^{th}$ bit is assumed to be the LSB. A value of the NSC indicates (maximum number−1) of service classes transferred through the payload. For example, when the EXP field of the shim header of the MPLS is used for describing the service class of the client signal, the EXP can describe 8 types of service classes in 3 bits. In this case, NSC=0x07. Further, when the PCP (Priority Code Point) field of the VLAN tag defined in IEEE802.1Q is used, 8 types of service classes can also be described in 3 bits, and thus NSC=0x07.

An SCI (Service Class Indicator) is arranged in PSI[4] to PSI[35]. The number of bits to be actually used depends on the NSC. For example, when NSC=0x07, only 8 bits of PSI[4] are used. Further, when NSC=0xFF, a total of 256 bits from PSI[4] to PSI[35] are used. The SCI is described in a bitmap format, a $1^{st}$ bit of PSI[4] is allocated to a service class of the highest priority, and the remaining bits are sequentially allocated to service classes of a low priority. For example, when a client signal of EXP=0x06 to 0x07 is transferred, SCI=0b11000000, and when a client signal of EXP=0x00 to 0x03 is transferred, SCI=0b00001111. Note that PSI[5] to PSI[35] are assumed to be all zero (0). When NSC=0x00, a difference in a service class is assumed to be ignored, and PSI[4] to PSI[35] are assumed to be all zero (0).

$2^{nd}$ to $8^{th}$ bits of PSI[2] and PSI[36] to PSI[255] are spare regions.

FIG. 4-38 illustrates another example of an individual OPUk OH. Items that are not particularly mentioned are the same as in FIG. 4-5.

The SOID is arranged in VCOH1[2]. A $1^{st}$ bit of VCOH1[2] is assumed to be the MSB, and an $8^{th}$ bit of VCOH1[2] is assumed to be the LSB.

The SKID is arranged in VCOH1[3]. A $1^{st}$ bit of VCOH1[3] is assumed to be the MSB, and an $8^{th}$ bit of VCOH1[3] is assumed to be the LSB. A manner of allocating 1 byte to each of the SOID and the SKID as described above can be applied to a relatively small-scaled network in which the number of pieces of multilane optical transport equipment is 256 or less.

The EXID is arranged in VCOH1[6]. A $1^{st}$ bit of VCOH1[6] is assumed to be the MSB, and an $8^{th}$ bit of VCOH1[6] is assumed to be the LSB.

The OMFN is arranged in VCOH1[7]. When only transport frames of the same speed are constantly used, the OMFN field is unnecessary.

VCOH1[8] to VCOH1[31] are spare regions.

FIG. 4-39 illustrates another example of an individual OPUk OH. Items that are not particularly mentioned are the same as in FIG. 4-5.

The SOID is arranged in VCOH1[2], VCOH1[3], VCOH1[6], and VCOH1[7]. A $1^{st}$ bit of VCOH1[2] is assumed to be the MSB, and an $8^{th}$ bit of VCOH1[7] is assumed to be the LSB.

The SKID is arranged in VCOH1[8], VCOH1[9], VCOH1[10], and VCOH1[11]. A $1^{st}$ bit of VCOH1[8] is assumed to be the MSB, and an $8^{th}$ bit of VCOH1[11] is assumed to be the LSB. A manner of allocating 4 bytes to each of the SOID and the SKID as described above can be applied to a large-scaled network in which the number of pieces of multilane optical transport equipment is up to 4294967296.

The EXID is arranged in VCOH1[12]. A $1^{st}$ bit of VCOH1[6] is assumed to be the MSB, and an $8^{th}$ bit of VCOH1[6] is assumed to be the LSB.

The OMFN is arranged in VCOH1[13]. When only transport frames of the same speed are constantly used, the OMFN field is unnecessary.

VCOH1[8] to VCOH1[31] are spare regions.

FIG. 4-7 illustrates configuration of a network using multilane optical transport equipment (MLOT). An MLOT 1 (ID=0x1000), an MLOT 2 (ID=0x2000), an MLOT 3 (ID=0x3000), and an MLOT 4 (ID=0x4000) are connected to a router 5, a router 6, a router 7, and a router 8, respectively, through 1 Tbps interfaces, and transfer traffic between routers by using a variable capacity optical path. An optical signal from each MLOT is transferred to a destination MLOT by an optical cross-connect switch (OXC) 9 (an actual transfer network includes a plurality of OXCs or a plurality of OADMs (Optical Add-Drop Multiplexer), but for simplicity, FIG. 4-7, one OXC is illustrated). These devices are managed and controlled by a network management system (NMS) 10.

FIG. 4-8 illustrates a configuration example of a transmitting unit of the MLOT. A flow distributor (FLD) 101 has a function of allocating a client signal input from an external router through the lTbps interface to a data flow depending on a destination and a service class. The FLD 101 has policing and shaping functions as well, and adjusts the allocated data flow to have a predefined rate. Here, the client signals are assumed to be allocated to 4 types of data flows illustrated in FIG. 4-24.

Data flows #1 to #4 are mapped to OPU4-5ve PLD, OPU4-1ve PLD, OPU4-2ve PLD, and OPU4-2ve PLD through framers (FRMs) 102 #1 to #4, respectively. This is not fixed and can be changed according to a bandwidth allocated to each data flow (for example, when the data flows are 500 Gbps, 100 Gbps, 200 Gbps, and 200 Gbps, the data flows are mapped to OPU4-5ve PLD, OPU4-1ve PLD, OPU4-2ve PLD, and OPU4-2ve PLD, but when the data flows are changed to 600 Gbps, 100 Gbps, 100 Gbps, and 200 Gbps, the data flows are mapped to OPU4-6ve PLD, OPU4-1ve PLD, OPU4-1ve PLD, and OPU4-2ve PLD). The individual OPU4s are input to OTU4 encoders (ENCs) 103 #1 to #10 in a format of an extended ODU (FIG. 4-9) in which an FA OH (an FAS and an MFAS), a fixed stuff, and an ODU4 OH are added to the 1 to $14^{th}$ columns. Here, values of main items of the OPU4 OH are given in FIG. 4-25.

The OTU4 ENCs 103 #1 to #10 insert the OTU4 OH into a fixed stuff region of the extended ODU4, perform FEC coding, add redundancy bits as OTU4 FEC, and scramble all regions other than the FAS and output resultant data in a format of OTU4.

100G modulators (MODs) 104 #1 to #10 convert the OTU4s output from the OTU4 ENC 103 #1 to #10 into 100 Gbps optical signals. An optical aggregator (OAGG) 105 multiplexes the optical signals, and sends out the multiplexed signal.

A control and management unit (CMU) 106 controls and monitors the respective blocks described above.

FIG. 4-10 illustrates configuration of a receiving unit of the MLOT. An optical deaggregator (ODEAGG) 201 demultiplexes a received optical signal. 100G demodulators (DEMs) 202 #1 to #10 receive the demultiplexed optical signals, and demodulate OTU4s.

OTU4 decoders (DECs) 203 #1 to #10 descramble the OTU4 frames entirely, perform FEC decoding to correct bit errors that have occurred during transmission, and read OPU4 OHs. Here, when main items of OPU4 OHs are assumed to have values as illustrated in FIG. 4-28, OPU4s can be classified into 4 types of VCGs as follows:

OPU4s #1 to #5 are classified into a VCG of (SOID=0x1000, SKID=0x2000, EXID=0x00)

OPU4 #6 is classified into a VCG of (SOID=0x1000, SKID=0x2000, EXID=0x01)

OPU4s #7 to #8 are classified into a VCG of (SOID=0x3000, SKID=0x2000, EXID=0x00)

OPU4s #9 to #10 are classified into a VCG of (SOID=0x4000, SKID=0x2000, EXID=0x00).

The extended ODU4s are grouped for each VCG and input to deframers (DEFs) 204 #1 to #4. The DEF 204 #1 measures a delay time difference of the OPU4s based on the MFAS of the extended ODU4 and the MFI of the OPU4 OH. Assuming that the MFAS and the MFI have been as illustrated in FIG. 4-31, it is understood that OPU4 #3 is the last, OPU4 #1 is earlier than OPU4 #3 by 4 frames, OPU4 #2 is earlier than OPU4 #3 by 7 frames, OPU4 #4 is earlier than OPU4 #3 by 9 frames, and OPU4 #5 is earlier than OPU4 #3 by 1 frame. The DEF 204 #1 delays OPU4 #1 by 4 frames, OPU4 #2 by 7 frames, OPU4 #4 by 9 frames, and OPU4 #5 by 1 frame, compensates for a delay time difference of OPU4s #1 to #5, then reconfigures OPU4-5ve by virtually coupling OPU4s #1 to #5 according to the SQ and the OMFN, and demaps a client signal from OPU4-5ve PLD. The DEFs 204 #2 to #4 similarly demap client signals from OPU4-1ve PLD, OPU4-2ve PLD, and OPU4-2ve PLD, respectively. Further, service class information for each data flow can be obtained by reading the NSC and the SCI from OPU4-5ve OH, OPU4-1ve OH, OPU4-2ve OH, and OPU4-2ve OH.

The data flows #1 to #4 of the client signals output from the DEFs 204 #1 to #4 are combined by a flow combiner (FLC) 205 and output to a 1 Tbps interface. Here, 4 types of data flows illustrated in FIG. 4-33 are assumed to be combined.

A control circuit 206 controls and monitors the respective blocks described above.

Second Embodiment

An example of a case in which OTUs of different speeds are used will be described below. Configuration of a network is the same as in the first embodiment (FIG. 4-7).

FIG. 4-11 illustrates a configuration example of a transmitting unit of an MLOT. An FLD 101 has a function of allocating a client signal input from an external router through a 1 Tbps interface to a data flow depending on a destination and a service class. The FLD 101 has policing and shaping functions as well, and adjusts the allocated data flow to have a predefined rate. Here, the client signals are assumed to be allocated to 4 types of data flows illustrated in FIG. 4-24, similarly to the first embodiment.

Data of data flows #1 to #4 is mapped to OPU4-1+5-1ve PLD, OPU4-1ve PLD, OPU4-2ve PLD, OPU4-2ve PLD through FRMs 102 #1 to #4, respectively. This is not fixed and can be changed according to a bandwidth allocated to each data flow (for example, when the data flows are 500 Gbps, 100 Gbps, 200 Gbps, and 200 Gbps, the data flows are mapped to OPU4-1+5-1ve PLD, OPU4-1ve PLD, OPU4-2ve PLD, and OPU4-2ve PLD, but when the data flows are changed to 600 Gbps, 100 Gbps, 100 Gbps, and 200 Gbps, the data flows are mapped to OPU4-2+5-1ve PLD, OPU4-1ve PLD, OPU4-1ve PLD, and OPU4-2ve PLD). The individual OPU4/5s are input to OTU4 ENCs 103 #1 to #6 and an OTU5 ENC 1030 in a format of an extended ODU4/5. Here, values of main items of the OPU4/5 OH are given in FIG. 4-27.

The OTU4 ENC 103 #1 to #6 and the OTU5 ENC 1030 insert the OTU4/5 OH into a fixed stuff region of the extended ODU4/5, perform FEC coding, add redundancy bits to OTU4/5 FEC, and scramble all regions other than the FAS and output resultant data in a format of OTU4/5.

100G MODs 104 #1 to #6 convert the OTU4s output from the OTU4 ENC 103 #1 to #6 into 100 Gbps optical signals. A 400G MOD 1040 converts the OTU5 output from the OTU5 ENC 1030 into a 400 Gbps optical signal. An OAGG 105 multiplexes the optical signals, and sends out the multiplexed signal.

A CMU 106 controls and monitors the respective blocks described above.

FIG. 4-12 illustrates configuration of a receiving unit of the MLOT. An ODEAGG 201 demultiplexes a received optical signal. 100G DEMs 202 #1 to #6 receive the demultiplexed 100 Gbps optical signals, and demodulate OTU4s. A 400G DEM 2020 receives the demultiplexed 400 Gbps optical signal, and demodulates an OTU5.

OTU4 DECs 203 #1 to #6 and an OTU5 DEC 2030 descramble the OTU4/5 frames entirely, perform FEC decoding to correct bit errors that have occurred during transmission, and read OPU4/5 OHs. Here, when main items of OPU4/5 OHs are assumed to have values as illustrated in FIG. 4-29, OPU4/5s can be classified into 4 types of VCGs as follows:

OPU4 #1 and OPU5 #2 are classified into a VCG of (SOID=0x1000, SKID=0x2000, EXID=0x00)

OPU4 #3 is classified into a VCG of (SOID=0x1000, SKID=0x2000, EXID=0x01)

OPU4s #4 to #5 are classified into a VCG of (SOID=0x3000, SKID=0x2000, EXID=0x00)

OPU4s #6 to #7 are classified into a VCG of (SOID=0x4000, SKID=0x2000, EXID=0x00).

The extended ODU4/5s are grouped for each VCG and input to DEFs 204 #1 to #4. The DEF 204 #1 measures a delay time difference of the OPU4/5s based on the MFAS of the extended ODU4/5 and the MFI of the OPU4/5 OH. Assuming that the MFAS and the MFI have been as illustrated in FIG. 4-32, it is understood that OPU4 #1 is the last, OPU5 #2 is earlier than OPU4 #1 by 3 frames. The deframer 204 #1 delays OPU5 #2 by 3 frames, compensates for a delay time difference of OPU4 #1 and OPU5 #2, then reconfigures OPU4-1+5-1ve by virtually coupling OPU4 #1 and OPU5 #2 according to the SQ and the OMFN, and demaps a client signal from OPU4-1+5-1ve PLD. The DEFs 204 #2 to #4 similarly demap client signals from OPU4-1ve PLD, OPU4-2ve PLD, and OPU4-2ve PLD, respectively. Further, service class information for each data flow can be obtained by reading the NSC and the SCI from OPU4-1+5-1ve OH, OPU4-1ve OH, OPU4-2ve OH, and OPU4-2ve OH.

The data flows #1 to #4 of the client signals output from the DEFs 204 #1 to #4 are combined by an FLC 205 and output to a 1 Tbps interface. Here, 4 types of data flows illustrated in FIG. 4-33 are assumed to be combined, similarly to the first embodiment.

A control circuit 206 controls and monitors the respective blocks described above.

Third Embodiment

FIG. 4-6 illustrates an example in which a VCG identification information setting method is different.

VCOHs are arranged in $1^{st}$ to $3^{rd}$ rows of $15^{th}$ column, and denoted as VCOH1, VCOH2, and VCOH3. The VCOHs are 96 bytes (3 bytes×32), and content of the VCOH is as follows (indices of the VCOH1 to VCOH3 are indicated by 5 bits [0 to 31] of $4^{th}$ to $8^{th}$ bits of an MFAS).

MFI is arranged in VCOH1[0] and VCOH1[1] (the same as in the first embodiment).

A VCGID (Virtual Concatenation Group Identifier) is arranged in VCOH1[2], VCOH1[3], VCOH1[6] and VCOH1[7]. A $1^{st}$ bit of VCOH1[2] is assumed to be an MSB, and an $8^{th}$ bit of VCOH1[7] is assumed to be an LSB. The VCGID is an ID uniquely attached from an NMS 10 on a combination of a starting point and an ending point of a VCG, and is used for identification of a VCG in combination with an EXID which will be described later. A manner of allocating 4 bytes to the VCGID as described above can be applied to a network in which the number of pieces of multilane optical transport equipment is 65536 or less. A manner of attaching the VCGID from the NMS 10 has an effect of being also applicable in a case in which an ID is not fixedly attached to multilane optical transport equipment.

SQ is arranged in VCOH1[4]. The SQ can be used similarly to the SQ in the VCAT/LCAS of the related art (the same as in the first embodiment).

CTRL is arranged in $1^{st}$ to $4^{th}$ bits of VCOH1[5] (the same as in the first embodiment).

A $5^{th}$ bit of VCOH1[5] is a spare region (the same as in the first embodiment).

The RSA is arranged in a $6^{th}$ bit of VCOH1[5] (the same as in the first embodiment).

$7^{th}$ and $8^{th}$ bits of VCOH1[5] are spare regions (the same as in the first embodiment).

An EXID (Extended Identifier) is arranged in VCOH1[8]. A $1^{st}$ bit of VCOH1[8] is assumed to be the MSB, and an $8^{th}$ bit of VCOH1[8] is assumed to be the LSB. The EXID is an ID added in order to set a plurality of VCGs through which, for example, client signals of different service classes are transferred between identical end nodes, and used for identification of a VCG in combination with the VCGID.

An OMFN is arranged in VCOH1[9] (the same as in the first embodiment). When only transport frames of the same speed are constantly used, an OMFN field is unnecessary.

VCOH1[10] to VCOH1[31] are spare regions (the same as in the first embodiment).

The MST is arranged in VCOH2[0] to VCOH2[31] (the same as in the first embodiment).

The CRC is arranged in VCOH3[0] to VCOH3[31] (the same as in the first embodiment).

As above, the VCOHs are repeated 8 times in a set of multi-frames (the same as in the first embodiment).

The PSI is arranged in the $4^{th}$ row of the $15^{th}$ column (the same as in the first embodiment).

FIG. 4-40 illustrates another example of an individual OPUk OH. Items that are not particularly mentioned are the same as in FIG. 4-6.

The VCGID is arranged in VCOH1[2] and VCOH1[3]. A $1^{st}$ bit of VCOH1[2] is assumed to be the MSB, and an $8^{th}$ bit of VCOH1[3] is assumed to be the LSB. A manner of allocating 2 bytes to the VCGID as described above can be applied to a relatively small-scaled network in which the number of pieces of multilane optical transport equipment is 256 or less.

The EXID is arranged in VCOH1[6]. A $1^{st}$ bit of VCOH1 [6] is assumed to be the MSB, and an $8^{th}$ bit of VCOH1[6] is assumed to be the LSB.

The OMFN is arranged in VCOH1[7]. When only transport frames of the same speed are constantly used, the OMFN field is unnecessary.

VCOH1[8] to VCOH1[31] are spare regions.

FIG. 4-41 illustrates another example of an individual OPUk OH. Items that are not particularly mentioned are the same as in FIG. 4-6.

The VCGID is arranged in VCOH1[2], VCOH1[3], VCOH1[6], VCOH1[7], VCOH1[8], VCOH1[9], VCOH1 [10], and VCOH1[11]. A $1^{st}$ bit of VCOH1[2] is assumed to be the MSB, and an $8^{th}$ bit of VCOH1[11] is assumed to be the LSB. A manner of allocating 8 bytes to the VCGID as described above can be applied to a large-scaled network in which the number of pieces of multilane optical transport equipment is up to 4294967296.

The EXID is arranged in VCOH1[12]. A $1^{st}$ bit of VCOH1 [12] is assumed to be the MSB, and an $8^{th}$ bit of VCOH1[12] is assumed to be the LSB.

The OMFN is arranged in VCOH1[13]. When only transport frames of the same speed are constantly used, the OMFN field is unnecessary.

VCOH1[8] to VCOH1[31] are spare regions.

Configuration of a network is the same as in the first embodiment (FIG. 4-7).

FIG. 4-8 illustrates configuration of a transmitting unit of an MLOT (the same as in the first embodiment). A FLD 101 has a function of allocating a client signal input from an external router through a ITbps interface to a data flow, depending on a destination and a service class. The FLD 101 has policing and shaping functions as well, and adjusts the allocated data flow to have a predefined rate. Here, the client signals are assumed to be allocated to 4 types of data flows illustrated in FIG. 4-24, similarly to the first embodiment.

Data of data flows #1 to #4 is mapped to OPU4-5ve PLD, OPU4-1ve PLD, OPU4-2ve PLD, and OPU4-2ve PLD through FRMs 102 #1 to #4, respectively. This is not fixed and can be changed according to a bandwidth allocated to each data flow. The individual OPU4s are input to the OTU4 ENCs 103 #1 to #10 in a format of an extended ODU (FIG. 4-9). Here, values of main items of the OPU4 OH are given in FIG. 4-27.

The OTU4 ENCs 103 #1 to #10 insert the OTU4 OH into a fixed stuff field of the extended ODU4, perform FEC coding, add redundancy bits as OTU4 FEC, and scramble all regions other than the FAS, and output resultant data in a format of OTU4.

100G MODs 104 #1 to #10 convert the OTU4s output from the OTU4 ENC 103 #1 to #10 into 100 Gbps optical signals. An OAGG 105 multiplexes the optical signals, and sends out the multiplexed signal.

A CMU 106 controls and monitors the respective blocks described above.

FIG. 4-10 illustrates configuration of a receiving unit of the MLOT (the same as in the first embodiment). An ODEAGG 201 demultiplexes a received optical signal. 100G DEMs 202#1 to #10 receive the demultiplexed optical signals, and demodulate OTU4s.

OTU4 DECs 203 #1 to #10 descramble the OTU4 frames entirely, perform FEC decoding to correct bit errors that have occurred during transmission, and read OPU4 OHs. Here, when main items of OPU4 OHs are assumed to have values as illustrated in FIG. 4-30, OPU4s can be classified into 4 types of VCGs as follows:

OPU4s #1 to #5 are classified into a VCG of (VCGID=0x00001000, EXID=0x00)

OPU4 #6 is classified into a VCG of (VCGID=0x00001000, EXID=0x01)

OPU4s #7 to #8 are classified into a VCG of (VCGID=0x00004000, EXID=0x00)

OPU4s #9 to #10 are classified into a VCG of (VCGID=0x00005000, EXID=0x00).

The extended ODU4s are grouped for each VCG and input to DEFs 204 #1 to #4. The DEF 204 #1 measures delay time difference of the OPU4s based on the MFAS of the extended ODU4 and the MFI of the OPU4 OH. Assuming that the MFAS and the MFI have been as illustrated in FIG. 4-31 (the same as in the first embodiment), it is understood that OPU4 #3 is the last, OPU4 #1 is earlier than OPU4 #3 by 4 frames, OPU4 #2 is earlier than OPU4 #3 by 7 frames, OPU4 #4 is earlier than OPU4 #3 by 9 frames, and OPU4 #5 is earlier than OPU4 #3 by 1 frame. The DEF 204 #1 delays OPU4 #1 by 4 frames, OPU4 #2 by 7 frames, OPU4 #4 by 9 frames, and OPU4 #5 by 1 frame, compensates for a delay time difference of OPU4s #1 to #5, then reconfigures OPU4-5ve by virtually coupling OPU4s #1 to #5 according to the SQ, and demaps a client signal from OPU4-5ve PLD. The DEFs 204 #2 to #4 similarly demap client signals from OPU4-1ve PLD, OPU4-2ve PLD, and OPU4-2ve PLD, respectively. Further, service class information for each data flow can be obtained by reading the NSC and the SCI from OPU4-5ve OH, OPU4-1ve OH, OPU4-2ve OH, and OPU4-2ve OH.

The data flows #1 to #4 of the client signals output from the DEFs 204 #1 to #4 are combined by an FLC 205 and output to the 1 Tbps interface. Here, 4 types of data flows illustrated in FIG. 4-33 are assumed to be combined, similarly to the first embodiment.

A control circuit 206 controls and monitors the respective blocks described above. Further, the VCGID is acquired from the NMS 10.

Fourth Embodiment

An example using an OTUflex will be described below. In the case of the OTUflex, frames other than existing OPUk/ODUk/OTUk are used and thus denoted as OPUfn/ODUfn/OTUfn. A suffix f means using in the OTUflex (however, it does not mean that an ODUflex is included as a client signal). Further, a suffix n indicates a speed in a unit of 1.25 Gbps. For example, when n=80, the speed becomes 100 Gbps, and when n=320, the speed becomes 400 Gbps. The variable capacity management frame includes Y OPUfns and is denoted as OPUfn-Y. The OTUfn-Y is distributed to Y lanes and transferred. FIG. 4-13 illustrates a relation between an OPUfn-Y frame and an OPUfn frame. Z OPUfn frames (a maximum value of 256 or less among multiples of Y is assumed to be Z) configure a set of multi-frames, and a frame position in the multi-frame is identified with an LLM (Logical Lane Marker) arranged in a $6^{th}$ byte of an FA OH.

Here, the variable capacity management frame is identical to the variable frame.

FIG. 4-14 illustrates an MLOH (Multilane OverHead) and the PSI used in the OTUflex.

The MLOH includes information for identifying an MLG (Multilane Group) (8 bits [0 to Z−1] of an LLM are assumed to be an index of the MLOH).

A SOID is arranged in MLOH[0] and MLOH[Y]. A $1^{st}$ bit of MLOH[0] is assumed to be an MSB, and an $8^{th}$ bit of MLOH[Y] is assumed to be an LSB. The SOID is an ID attached to an MLOT serving as a starting point of an MLG, and is used for identification of the MLG in combination with an SKID and an EXID which will be described later. When Y≥2, the same value as in MLOH[0] is copied to MLOH[1] to MLOH[Y−1], and the same value as in MLOH[Y] is copied to MLOH[Y+1] to MLOH[2Y−1]. Note that the SOID may be set independently from an SAPI (Source Access Point Identifier) in the TTI (Trail Trace Identifier) of an OTU OH or may have a hash value generated from the SAPI unless it overlaps others.

An SKID is arranged in MLOH[2Y] and MLOH[3Y]. A $1^{st}$ bit of MLOH[2Y] is assumed to be the MSB, and an $8^{th}$ bit of MLOH[3Y] is assumed to be the LSB. The SKID is an ID attached to an MLOT serving as an ending point of the MLG, and is used for identification of the MLG in combination with the SOID described above and an EXID which will be described later. When Y≥2, the same value as in MLOH[3Y] is copied to MLOH[2Y+1] to MLOH[3Y−1], and the same value as in MLOH[4Y] is copied to MLOH[3Y+1] to MLOH[4Y−1]. Note that the SKID may be set independently from a DAPI (Destination Access Point Identifier) in the TTI of the OTU OH or may have a hash value generated from the DAPI unless it overlaps others. A manner of allocating 2 bytes to each of the SOID and the SKID as described above can be applied to a network in which the number of pieces of multilane optical transport equipment is 65536 or less.

An EXID is arranged in MLOH[4Y]. A 1st bit of MLOH[4Y] is assumed to be the MSB, and an 8th bit of MLOH[4Y] is assumed to be the LSB. The EXID is an ID added in order to set a plurality of MLGs through which, for example, client signals of different service classes are transferred between the identical end nodes, and used for identification of an MLG in combination with the SOID and the SKID. When Y≥2, the same value as in MLOH[4Y] is copied to MLOH[4Y+1] to MLOH[5Y−1].

The CRC is arranged in MLOH[5Y], MLOH[6Y], and 1st to 4th bits of MLOH[7Y]. MLOH[5Y] is used for performing error detection on the SOID, MLOH[6Y] is used for performing error detection on the SKID, and the 1st to 4th bits of MLOH[7Y] are used for performing error detection on the EXID. When Y≥2, the same value as in MLOH[5Y] is copied to MLOH[5Y+1] to MLOH[6Y−1], the same value as in MLOH[6Y] is copied to MLOH[6Y+1] to MLOH[7Y−1], and the same value as in the 1st to 4th bits of MLOH[5Y] is copied to the 1st to 4th bits of MLOH[7Y+1] to MLOH[8Y−1].

5th to 8th bits of MLOH[7Y] to MLOH[8Y−1] are spare regions.

The PSI is arranged in a 4th row of a 15th column. The PSI is 256 bytes, and content of the PSI is the same as in the first embodiment (however, 8 bits [0 to Z−1] of an LLM rather than an MFAS is assumed to be an index of the PSI).

FIG. 4-42 illustrates another example of the MLOH. Items that are not particularly mentioned are the same as in FIG. 4-14.

The SOID is arranged in MLOH[0]. A 1st bit of MLOH[0] is assumed to be the MSB, and an 8th bit of MLOH[0] is assumed to be the LSB. When Y≥2, the same value as in MLOH[0] is copied to MLOH[1] to MLOH[Y−1].

The SKID is arranged in MLOH[Y]. A 1st bit of MLOH[Y] is assumed to be the MSB, and an 8th bit of MLOH[Y] is assumed to be the LSB. When Y≥2, the same value as in MLOH[Y] is copied to MLOH[Y+1] to MLOH[2Y−1]. A manner of allocating 1 byte to each of the SOID and the SKID as described above can be applied to a relatively small-scaled network in which the number of pieces of multilane optical transport equipment is 256 or less.

The EXID is arranged in MLOH[2Y]. A 1st bit of MLOH[2Y] is assumed to be the MSB, and an 8th bit of MLOH[2Y] is assumed to be the LSB. When Y≥2, the same value as in MLOH[2Y] is copied to MLOH[2Y+1] to MLOH[3Y−1].

The CRC is arranged in MLOH[3Y], MLOH[4Y], and 1st to 4th bits of MLOH[5Y]. MLOH[3Y] is used for performing error detection on the SOID, MLOH[4Y] is used for performing error detection on the SKID, and the 1st to 4th bits of MLOH[5Y] are used for performing error detection on the EXID. When Y≥2, the same value as in MLOH[3Y] is copied to MLOH[3Y+1] to MLOH[4Y−1], the same value as in MLOH[4Y] is copied to MLOH[4Y+1] to MLOH[5Y−1], and the same value as in the 1st to 4th bits of MLOH[5Y] is copied to the 1st to 4th bits of MLOH[5Y+1] to MLOH[6Y−1].

FIG. 4-43 illustrates another example of the MLOH. Items that are not particularly mentioned are the same as in FIG. 4-14.

The SOID is arranged in MLOH[0], MLOH[Y], MLOH[2Y], and MLOH[3Y]. A 1st bit of MLOH[0] is assumed to be the MSB, and an 8th bit of MLOH[3Y] is assumed to be the LSB. When Y≥2, the same value as in MLOH[0] is copied to MLOH[1] to MLOH[Y−1], the same value as in MLOH[Y] is copied to MLOH[Y+1] to MLOH[2Y−1], the same value as in MLOH[2Y] is copied to MLOH[2Y+1] to MLOH[3Y−1], and the same value as in MLOH[3Y] is copied to MLOH[3Y+1] to MLOH[4Y−1].

The SKID is arranged in MLOH[4Y], MLOH[5Y], MLOH[6Y], and MLOH[7Y]. A 1st bit of MLOH[4Y] is assumed to be the MSB, and an 8th bit of MLOH[7Y] is assumed to be the LSB. When Y≥2, the same value as in MLOH[4Y] is copied to MLOH[4Y+1] to MLOH[5Y−1], the same value as in MLOH[5Y] is copied to MLOH[5Y+1] to MLOH[6Y−1], the same value as in MLOH[6Y] is copied to MLOH[6Y+1] to MLOH[7Y−1], and the same value as in MLOH[7Y] is copied to MLOH[7Y+1] to MLOH[8Y−1]. A manner of allocating 4 bytes to each of the SOID and the SKID as described above can be applied to a large-scaled network in which the number of pieces of multilane optical transport equipment is up to 4294967296.

The EXID is arranged in MLOH[8Y]. A 1st bit of MLOH[8Y] is assumed to be the MSB, and an 8th bit of MLOH[8Y] is assumed to be the LSB. When Y≥2, the same value as in MLOH[8Y] is copied to MLOH[8Y+1] to MLOH[9Y−1].

The CRC is arranged in MLOH[9Y], MLOH[10Y], MLOH[11Y], MLOH[12Y], and 1st to 4th bits of MLOH[13Y]. MLOH[9Y] is used for performing error detection on SOID1 and SOID2, MLOH[10Y] is used for performing error detection on SOID3 and SOID4, MLOH[11Y] is used for performing error detection on SKID1 and SKID2, MLOH[12Y] is used for performing error detection on SKID3 and SKID4, and the 1st to 4th bits of MLOH[13Y] are used for performing error detection on the EXID. When Y≥2, the same value as in MLOH[9Y] is copied to MLOH[9Y+1] to MLOH[10Y−1], the same value as in MLOH[10Y] is copied to MLOH[10Y+1] to MLOH[11Y−1], the same value as in MLOH[11Y] is copied to MLOH[11Y+1] to MLOH[12Y−1], the same value as in MLOH[12Y] is copied to MLOH[12Y+1] to MLOH[13Y−1], and the same value as in the 1st to 4th bits of MLOH[13Y] are copied to the 1st to 4th bits of MLOH[13Y+1] to MLOH[14Y−1].

As illustrated in FIG. 4-16, there are several options in arrangement of the MLOH. An option (a) is a case in which the MLOH is arranged in a head (a 1st row of a 15th column) of an OPUfn OH. An option (b) is a case in which the MLOH is arranged in a spare region (a 1st row of a 13th column or a 14th column) of an OTUfn OH. An option (c) is a case in which the MLOH is arranged in a 1st byte (a 1st row of a 1st column) of an FA OH. The option (b) or (c) can be used when a head (a 1st row of a 15th column) of the OPUfn OH is allocated to mapping information of a client signal. The option (c) is an unscramble region, and thus descrambling is unnecessary at the time of reception.

Thereafter, Configuration of a network is the same as in the first embodiment (FIG. 4-7).

FIG. 4-17 illustrates a configuration example of a transmitting unit of an MLOT. An FLD 101 has a function of allocating a client signal input from an external router through a 1 Tbps interface to a data flow depending on a destination and a service class. The FLD 101 has policing and shaping functions as well, and adjusts the allocated data flow to have a predefined rate. Here, the client signals are assumed to be allocated to 4 types of data flows illustrated in FIG. 4-24, similarly to the first embodiment.

Data of data flows #1 to #4 is mapped to OPUf400-5 PLD, OPUf80-1 PLD, OPUf160-2 PLD, and OPUf160-2 PLD through FRMs 110#1 to #4, respectively. This is not fixed and can be changed according to a bandwidth allocated to each data flow. The individual OPUfns are input to flexible OTU encoders (OTUf ENCs) 111 #1 to #4 in a format of an extended ODUfn ((a) to (c) of FIG. 4-18) in which an FA OH (an FAS and an MFAS), a fixed stuff, and an ODUfn OH are added to the 1 to 14$^{th}$ columns.

The OTUf ENCs 111 #1 to #4 insert the OTUfn OH into a fixed stuff region of the extended ODUfn, perform FEC coding, add redundancy bits to OTUfn FEC, and scramble all regions other than the FAS, and output resultant data.

Multilane distributors (MLDs) 112 #1 to #4 distribute OTUfn-Y to a plurality of lanes. FIG. 4-19 illustrates an example in which OTUf400-5 is distributed to 5 lanes. One frame of OTUf400 has 16320 bytes, but this frame is divided into 1020 data blocks on a 16-byte basis. A first data block (1$^{th}$ to 16$^{th}$ bytes) including the FAS, the LLM, and the MLOH is distributed to a lane 1, a second data block (17$^{th}$ to 32$^{nd}$ bytes) is distributed to a lane 2, a third data block (33$^{rd}$ to 48$^{th}$ bytes) is distributed to a lane 3, a fourth data block (49$^{th}$ to 64$^{th}$ bytes) is distributed to a lane 4, and a fifth data block (65$^{th}$ to 80$^{th}$ bytes) is distributed to a lane 5. Thereafter, similarly, distribution to each lane is repeated by a round robin up to a 1020$^{th}$ data block (16305$^{th\ to}$ 16320$^{th}$ bytes). In a second frame, rotation is performed on one lane, and then the first data block (1$^{st}$ to 16$^{th}$ bytes) is distributed to the lane 2, the second data block (17$^{th}$ to 32$^{nd}$ bytes) is distributed to the lane 3, the third data block (33$^{rd}$ to 48$^{th}$ bytes) is distributed to the lane 4, the fourth data block (49$^{th}$ to 64$^{th}$ bytes) is distributed to the lane 5, and the fifth data block (65$^{th}$ to 80$^{th}$ bytes) is distributed to the lane 1. In a third frame, rotation is further performed on one lane, and then the first data block (1$^{st}$ to 16$^{th}$ bytes) is distributed to the lane 3, the second data block (17$^{th}$ to 32$^{nd}$ byte) is distributed to the lane 4, the third data block (33$^{rd}$ to 48$^{th}$ bytes) is distributed to the lane 5, the fourth data block (49$^{th}$ to 64$^{th}$ byte) is distributed to the lane 1, and the fifth data block (65$^{th}$ to 80$^{th}$ byte) is distributed to the lane 2. By repeating the rotation as described above, the first data block including the FAS, the LLM, and the MLOH is equally distributed to each lane. Here, values of main items of the MLOH distributed to each lane are given as illustrated in FIG. 4-34.

Note that FIG. 4-20 illustrates a case in which the number of data blocks is 1020 but not divisible by the number of lanes (OTUf560-7). In this case, since the number of lanes is 7, a fixed stuff of 32 bytes corresponding to 7−(1020 mod 7)=2 data blocks is inserted after each frame.

100G MODs 113 #1 to #10 convert signals of L#1 to L#10 output from the MLDs 112 #1 to #4 into 100 Gbps optical signals. An OAGG 105 multiplexes the optical signals, and sends out the multiplexed signal.

A CMU 106 controls and monitors the respective blocks described above.

FIG. 4-21 illustrates configuration of a receiving unit of the MLOT. An ODEAGG 201 demultiplexes a received optical signal. 100G DEMs 210 #1 to #10 receive the demultiplexed 100 Gbps optical signals, and demodulate the signals of L#1 to L#10.

Multilane overhead detectors (MLODs) 211 #1 to #10 read the SOID, the SKID, and the EXID from the respective lanes. The procedure is as follows. The MLODs 211 #1 to #10 first detect the FAS for each lane. Next, the positions of the LLM and the MLOH are decided with the position of the FAS as an origin. Here, the LLM is not scrambled similarly to the FAS and thus can be directly read. The MLOH arranged in the 5$^{th}$ byte of the FA OH is not scrambled and thus can be directly read, but when the MLOH is arranged in (a) a head of the OPUfn OH or (b) a spare region of the OPUfn OH, the MLOH needs to be descrambled and then read. This mechanism is illustrated in FIG. 4-22. A scramble pattern of the OTN is generated by a generator polynomial 1+x+x3+x12+x16 (Non-Patent Literature 4-1: 11.2). The MLOH is descrambled by performing an exclusive OR operation on the scramble pattern and an OPUfn OH or a corresponding byte of an OTUfn OH in units of bits. Further, a lane number is determined by calculating LLM mod Y, and content (the SOID, the SKID, the EXID, and each CRC) of the MLOH is read by assuming the LLM as an index.

Here, when the main items of the MLOH are assumed to have values as illustrated in FIG. 4-36, the lanes can be classified into 4 types of MLGs as follows:

L#1 to L#5 are classified into an MLG of (SOID=0x1000, SKID=0x2000, EXID=0x00)

L#6 is classified into an MLG of (SOID=0x1000, SKID=0x2000, EXID=0x01)

L#7 to L#8 are classified into an MLG of (SOID=0x3000, SKID=0x2000, EXID=0x00)

L#9 to L#10 are classified into an MLG of (SOID=0x4000, SKID=0x2000, EXID=0x00)

L#1 to L#10 are grouped for each MLG and input to multilane combiner (MLCs) 212 #1 to #4. The MLC 212 #1 measures delay time differences of L#1 to L#5 based on the FAS and the LLM. In the case of OTUf400-5, since the delay time difference is: 16320/5=3264 bytes, assuming that a head of a data block including LLM=0 is a reference, a head of a data block including LLM=1 should be delayed by 3264 bytes, a head of a data block including LLM=2 is delayed by 6528 bytes, a head of a data block including LLM=3 is delayed by 9792 bytes, and a head of a data block including LLM=4 is delayed by 13056 bytes. However, since optical signals of different wavelengths are transferred through the respective lanes, a delay time difference occurs due to influence of dispersion or the like. Here, assuming that a result of delay time differences of L#1 to L#5 measured by the MLC 212 #1 is (a) of FIG. 4-23 and a delay time of L#1 is a reference, it is understood that a delay time of L#2 is smaller by 100 bytes, a delay time of L#3 is larger by 300 bytes, a delay time of L#4 is larger by 200 bytes, and a delay time of L#5 is larger by 100 bytes. By giving a delay time of 300 bytes, a delay time of 400 bytes, a delay time of 100 bytes, and a delay time of 200 bytes to L#1, L#2, L#4, and L#5 so as to conform to L#3 that has the largest delay amount in these lanes, the delay time differences are compensated for as illustrated in (b) of FIG. 4-23. The MLC 212 #1 combines the data blocks of L#1 to L#5 whose delay time differences have been compensated for to reconstruct OTUf400-5. The MLCs 212 #2 to #4 reconstruct OTUf80-1, OTUf160-2, and OTUf160-2 in a similar manner.

Flexible OTU decoders (OTUf DECs) 213 #1 to #4 descramble the reconstructed OTUfn frames entirely, perform FEC decoding, and correct bit errors that have occurred during transmission.

DEFs 214 #1 to #4 demap client signals from OPUf400-5 PLD, OPU4-1ve PLD, OTUf160-2 PLD, and OTUf160-2 PLD, respectively. Further, service class information for each data flow can be obtained by reading the NSC and the SCI from OPUf400-5 OH, OPU4-1ve OH, OTUf160-2 OH, and OTUf160-2 OH.

The data flows #1 to #4 of the client signals output from the DEFs 204 #1 to #4 are combined by an FLC 205 and output to the 1 Tbps interface. Here, 4 types of data flows illustrated in FIG. 4-33 are assumed to be combined, similarly to the first embodiment.

A control circuit 206 controls and monitors the respective blocks described above.

Fifth Embodiment

An example in which an MLG identification information setting method is different will be described below.

FIG. 4-15 illustrates an MLOH and the PSI used in an OTUflex.

The MLOH includes information for identifying an MLG (8 bits [0 to Z−1] of an LLM are assumed to be an index of the MLOH).

The MLGID is arranged in MLOH[0], MLOH[2Y], MLOH[3Y], and MLOH[3Y]. A 1$^{st}$ bit of MLOH[0] is assumed to be an MSB, and an 8$^{th}$ bit of MLOH[3Y] is assumed to be an LSB. The MLGID is an ID uniquely attached from an NMS 10 on a combination of a starting point and an ending point of an MLG, and is used for identification of the MLG in combination with an EXID which will be described later. When Y≥2, the same value as in MLOH[0] is copied to the MLOH[1] to the MLOH[Y−1], the same value as in MLOH[Y] is copied to MLOH[Y+1] to MLOH[2Y−1], the same value as in MLOH[2Y] is copied to MLOH[2Y+1] to MLOH[3Y−1], and the same value as in MLOH[3Y] is copied to MLOH[3Y+1] to MLOH[4Y−1]. A manner of allocating 4 bytes to the MLGID as described above can be applied to a network in which the number of pieces of multilane optical transport equipment is 65536 or less. There is an effect capable of applying a manner of attaching the MLGID from the NMS 10 has an effect of being also applicable in a case in which an ID is not fixedly attached to multilane optical transport equipment.

An EXID is arranged in MLOH[4Y]. A 1$^{st}$ bit of MLOH [4Y] is assumed to be the MSB, and an 8$^{th}$ bit of MLOH[4Y] is assumed to be the LSB. The EXID is an ID added in order to set a plurality of MLGs through which, for example, client signals of different service classes are transferred between identical end nodes, and is used for identification of an MLG in combination with the MLGID. When Y≥2, the same value as in MLOH[4Y] is copied to MLOH[4Y+1] to MLOH[5Y−1].

The CRC is arranged in MLOH[5Y], MLOH[6Y], and 1$^{st}$ to 4$^{th}$ bits of MLOH[7Y]. MLOH[5Y] is used for performing error detection on MLGID1 and MLGID2, MLOH[6Y] is used for performing error detection on MLGID3 and MLGID4, and the 1$^{st}$ to 4$^{th}$ bits of MLOH[7Y] are used for performing error detection on the EXID. When Y≥2, the same value as in MLOH[5Y] is copied to MLOH[5Y+1] to MLOH[6Y−1], the same value as in MLOH[6Y] is copied to MLOH[6Y+1] to MLOH[7Y−1], and the same value as in the 1$^{st}$ to 4$^{th}$ bits of MLOH[5Y] is copied to the 1$^{st}$ to 4$^{th}$ bits of MLOH[7Y+1] to MLOH[8Y−1].

5$^{th}$ to 8$^{th}$ bits of MLOH[7Y] to MLOH[8Y−1] are spare regions.

The PSI is arranged in a 4$^{th}$ row of a 15$^{th}$ column. The PSI is 256 bytes, and content of the PSI is the same as in the fourth embodiment.

FIG. 4-44 illustrates another example of an MLOH.

Items that are not particularly mentioned are the same as in FIG. 4-15.

The MLGID is arranged in MLOH[0] and MLOH[Y]. A 1$^{st}$ bit of MLOH[0] is assumed to be the MSB, and an 8$^{th}$ bit of MLOH[Y] is assumed to be the LSB. When Y≥2, the same value as in MLOH[0] is copied to MLOH[1] to MLOH[Y−1], and the same value as in MLOH[Y] is copied to MLOH[Y+1] to MLOH[2Y−1]. A manner of allocating 2 bytes to the MLGID as described above can be applied to a relatively small-scaled network in which the number of pieces of multilane optical transport equipment is 256 or less.

The EXID is arranged in MLOH[2Y]. A 1$^{st}$ bit of MLOH [2Y] is assumed to be the MSB, and an 8$^{th}$ bit of MLOH[2Y] is assumed to be the LSB. When Y≥2, the same value as in MLOH[2Y] is copied to MLOH[2Y+1] to MLOH[3Y−1].

The CRC is arranged in MLOH[3Y], the MLOH[4Y], and 1$^{st}$ to 4$^{th}$ bits of MLOH[5Y]. MLOH[3Y] and MLOH[4Y] is used for performing error detection on the MLGID, and the 1$^{st}$ to 4$^{th}$ bits of MLOH[5Y] are used for performing error detection on the EXID. When Y≥2, the same value as in MLOH[3Y] is copied to MLOH[3Y+1] to MLOH[4Y−1], the same value as in MLOH[4Y] is copied to MLOH[4Y+1] to MLOH[5Y−1], and the same value as in the 1$^{st}$ to 4$^{th}$ bits of MLOH[5Y] is copied to the 1$^{st}$ to 4$^{th}$ bits of MLOH[5Y+1] to MLOH[6Y−1].

FIG. 4-45 illustrates another example of an MLOH. Items that are not particularly mentioned are the same as in FIG. 4-15.

The MLGID is arranged in MLOH[0], MLOH[Y], MLOH[2Y], MLOH[3Y], MLOH[4Y], MLOH[5Y], MLOH[6Y], and MLOH[7Y]. A 1$^{st}$ bit of MLOH[0] is assumed to be the MSB, and an 8$^{th}$ bit of MLOH[7Y] is assumed to be the LSB. When Y≥2, the same value as in MLOH[0] is copied to MLOH[1] to the MLOH[Y−1], the same value as in MLOH[Y] is copied to MLOH[Y+1] to MLOH[2Y−1], the same value as in MLOH[2Y] is copied to MLOH[2Y+1] to MLOH[3Y−1], the same value as in MLOH[3Y] is copied to MLOH[3Y+1] to MLOH[4Y−1], the same value as in MLOH[4Y] is copied to MLOH[4Y+1] to MLOH[5Y−1], the same value as in MLOH[5Y] is copied to MLOH[5Y+1] to MLOH[6Y−1], the same value as in MLOH[6Y] is copied to MLOH[6Y+1] to MLOH[7Y−1], and the same value as in MLOH[7Y] is copied to MLOH [7Y+1] to MLOH[8Y−1]. A manner of allocating 8 bytes to the MLGID as described above can be applied to a large-scaled network in which the number of pieces of multilane optical transport equipment is up to 4294967296.

The EXID is arranged in MLOH[8Y]. A 1$^{st}$ bit of MLOH [8Y] is assumed to be the MSB, and an 8$^{th}$ bit of MLOH[8Y] is assumed to be the LSB. When Y≥2, the same value as in MLOH[8Y] is copied to MLOH[8Y+1] to MLOH[9Y−1].

The CRC is arranged in MLOH[9Y], MLOH[10Y], MLOH[11Y], MLOH[12Y], and 1$^{st}$ to 4$^{th}$ bits of MLOH [13Y]. MLOH[9Y] is used for performing error detection on MLGID1 and MLGID2, MLOH[10Y] is used for performing error detection on MLGID3 and MLGID4, MLOH[11Y] is used for performing error detection on MLGID5 and MLGID6, MLOH[12Y] is used for performing error detection on MLGID7 and MLGID8, and the 1$^{st}$ to 4$^{th}$ bits of MLOH[13Y] are used for performing error detection on the EXID. When Y≥2, the same value as in MLOH[9Y] is copied to MLOH[9Y+1] to MLOH[10Y−1], the same value as in MLOH[10Y] is copied to MLOH[10Y+1] to MLOH [11Y−1], the same value as in MLOH[11Y] is copied to MLOH[11Y+1] to MLOH[12Y−1], the same value as in MLOH[12Y] is copied to MLOH[12Y+1] to MLOH[13Y−1], and the same value as in the 1$^{st}$ to 4$^{th}$ bits of MLOH[13Y] is copied to the 1$^{st}$ to 4$^{th}$ bits of MLOH[13Y+1] to MLOH [14Y−1].

As illustrated in FIG. 4-16, there are several options in arrangement of the MLOH (the same as in the fourth embodiment).

Thereafter, Configuration of a network is the same as in the first embodiment (FIG. 4-7).

FIG. 4-17 illustrates a configuration example of a transmitting unit of an MLOT (the same as in the fourth embodiment). An FLD 101 has a function of allocating a client signal input from an external router through a 1 Tbps interface to a data flow depending on a destination and a service class. The FLD 101 has policing and shaping functions as well, and adjusts the allocated data flow to have a predefined rate. Here, the client signals are assumed to be allocated to 4 types of data flows illustrated in FIG. 4-24, similarly to the first embodiment.

Data of data flows #1 to #4 is mapped to OPUf400-5 PLD, OPUf80-1 PLD, OPUf160-2 PLD, and OPUf160-2 PLD through FRMs 110#1 to #4, respectively. This is not fixed and can be changed according to a bandwidth allocated to each data flow. The individual OPUfns are input to OTUf ENCs 111 #1 to #4 in a format of an extended ODUfn ((a) to (c) of FIG. 4-18) in which an FA OH (an FAS and an MFAS), a fixed stuff, and an ODUfn OH are added to the 1 to 14$^{th}$ columns.

The OTUf ENCs 111 #1 to #4 insert the OTUfn OH into a fixed stuff field of the extended ODUfn, perform FEC coding, add redundancy bits toOTUfn FEC, scramble all regions other than the FAS, and output resultant data.

MLDs 112 #1 to #4 distribute OTUfn-Y to a plurality of lanes. FIG. 4-19 illustrates an example in which OTUf400-5 is distributed to 5 lanes (the same as in the fourth embodiment). Here, values of main items of the MLOH distributed to each lane are given in FIG. 4-35.

100G MODs 113 #1 to #10 convert signals of L#1 to L#10 output from the MLDs 112 #1 to #4 into 100 Gbps optical signals. An OAGG 105 multiplexes the optical signals, and sends out the multiplexed signal.

A CMU 106 controls and monitors the respective blocks described above.

FIG. 4-21 illustrates configuration of a receiving unit of the MLOT (the same as in the fourth embodiment). An ODEAGG 201 demultiplexes a received optical signal. 100G DEMs 210 #1 to #10 receive the demultiplexed 100 Gbps optical signals, and demodulate the signals of L#1 to L#10.

Multilane overhead detectors 211 #1 to #10 read the MLGID and the EXID from the respective lanes. The sequence is as follows. The Multilane overhead detectors 211 #1 to #10 first detect the FAS for each lane. Then, the positions of the LLM and the MLOH are decided with the position of the FAS as an origin. Here, the LLM is not scrambled similarly to the FAS and thus can be directly read. The MLOH arranged in the 5$^{th}$ byte of the FA OH is not scrambled and thus can be directly read, but when the MLOH is arranged in (a) a head of an OPUfn OH or (b) a spare region of the OPUfn OH, the MLOH needs to be descrambled and then read. This mechanism is illustrated in FIG. 4-22. Further, a lane number is determined by calculating LLM mod Y, and content (the MLGID, the EXID, and each CRC) of the MLOH is read by assuming the LLM as an index.

Here, when the main items of the MLOH are assumed to have values as illustrated in FIG. 4-37, the lanes can be classified into 4 types of MLGs as follows:

L#1 to L#5 are classified into an MLG of (MLGID=0x00001000, EXID=0x00)

L#6 is classified into an MLG of (MLGID=0x00001000, EXID=0x01)

L#7 to L#8 are classified into an MLG of (MLGID=0x00004000, EXID=0x00)

L#9 to L#10 are classified into an MLG of (MLGID=0x00005000, EXID=0x00)

L#1 to L#10 are grouped for each MLG and input to MLCs 212 #1 to #4. The MLC 212 #1 measures and compensates for delay time differences of L#1 to L#5 based on the FAS and the LLM (FIG. 4-23). Further, the MLC 212 #1 combines the data blocks of L#1 to L#5 whose delay time differences have been compensated for to reconstruct OTUf400-5. The MLCs 212 #2 to #4 reconstruct OTUf80-1, OTUf160-2, and OTUf160-2, respectively, in a similar manner.

OTUf DECs 213 #1 to #4 descramble the reconstructed OTUfn frames entirely, perform FEC decoding, and correct bit errors that have occurred during transmission.

DEFs 214 #1 to #4 demap client signals from OPUf400-5 PLD, OPU4-1ve PLD, OTUf160-2 PLD, and OTUf160-2 PLD, respectively. Further, service class information for each data flow can be obtained by reading an NSC and an SCI from OPUf400-5 OH, OPU4-1ve OH, OTUf160-2 OH, and OTUf160-2 OH.

The data flows #1 to #4 of the client signals output from the DEFs 214 #1 to #4 are combined by an FLC 205 and output to the 1 Tbps interface. Here, 4 types of data flows illustrated in FIG. 4-33 are assumed to be combined, similarly to the first embodiment.

A control circuit 206 controls and monitors the respective blocks described above. Further, the MLGID is acquired from the NMS 10.

The size and the written position of the identification information described in the present embodiment is an example, and as long as the SOID (Source Identifier)+the SKID (Sink Identifier)+the EXID (Extended Identifier), the VCGID (Virtual Concatenation Group Identifier), and the MLGID (Multilane Group Identifier) are used and particularly in the extended OTUflex these are included in the same 16-bit data block as the FAS (Frame Alignment Signal), the size and the written position may be appropriately changed, for example, according to the expected network size or the number of service classes.

Fifth Invention

When the number of lanes is increased, the problem can be solved by measuring a delay in advance. A multilane transmission system of the present embodiment is a multilane transmission system in which a signal of a frame format is divided into data blocks, and the data blocks are distributed to one or more lanes and transmitted from a transmission device to a reception device, wherein the transmission device includes a data block copying function unit that executes a new lane output procedure and a new lane output function unit, and the reception device includes a synchronization pattern reading function unit that executes a new lane delay compensation procedure and a new lane delay compensating function unit.

FIG. 5-8 illustrates an example of a transmission frame according to the present embodiment.

In the new lane output procedure, in the transmission device, the data block copying function unit copies data blocks including an FAS and an MFAS in existing lanes #0 to #3, and the new lane output function unit transmits the copy to a new lane #4 at the same time as the FASs of the existing lanes #0 to #3 (inserts a dummy block between the data blocks including the FAS). The FAS is used as a frame synchronization pattern, and the MFAS is used as a frame number.

In the new lane delay compensation procedure, in the reception device, the synchronization pattern reading function unit reads the FAS and the frame number of the existing lanes #0 to #3 and the FAS and the MFAS in the new lane #4, and the new lane delay compensating function unit compares the delay time differences of the FASs having the identical MFAS, and when the delay time of the new lane #4 is shorter than the delay time of the existing lanes #0 to #3, adds the difference to the new lane #4. Further, when the delay time of the new lane #4 is longer than the delay time of the existing lanes #0 to #3, the difference is shorter than the existing lanes #0 to #3.

When the transmission device has configuration illustrated in FIG. 5-3, a data block dividing unit 7 includes the data block copying function unit, and a lane number deciding unit 8 includes the new lane output function unit. When the reception device has configuration illustrated in FIG. 5-4, a lane identifying & delay difference compensating unit 10 includes the synchronization pattern reading function unit and the new lane delay compensating function unit.

First Embodiment

In the present embodiment, a transmitting unit includes an overhead generating function unit, and an RCOH (Resize Control OverHead) is defined and used for transmission and reception of a message for a bandwidth change. The RCOH is an overhead of a signal of a frame format including change lane information indicating a lane that is increased or decreased together with control information of increasing or decreasing the number of lanes, and is generated by the overhead generating function unit.

FIG. 5-9(*a*) illustrates an example of the RCOH.

The RCOH is arranged in $15^{th}$ columns of $1^{st}$ to $3_{rd}$ rows in an OPU OH. The RCOH has the following sub fields.

CTRL (Control) is arranged in $1^{st}$ and $2^{nd}$ bits of RCOH1. The following control messages are transmitted from a source to a sink.

00 (IDLE): it indicates that bandwidth change operation is completed and the next bandwidth change operation does not start yet.

01 (ADD): it indicates that a bandwidth is to be increased.

10 (REMOVE): it indicates that a bandwidth is to be decreased.

11 (NORM): it indicates that bandwidth change operation is being performed.

An LNUM (Lane Number) is arranged in $1^{st}$ and $8^{th}$ bits of RCOH2. A $1^{st}$ bit is assumed to be the MSB, and an $8^{th}$ bit is assumed to be the LSB. The LNUM is used together with the CTRL=ADD/DELETE, a number of the number of logical lanes to be increased or decreased is transmitted from a source to a sink. When the speed of a logical lane is assumed to be 5 Gbps and a maximum bandwidth is assumed to be 1 Tbps, the number of logical lanes is 200 at maximum and thus can be expressed by 8 bits (0 to 255).

An RLCR (Reply for Link Connection Resize) is arranged in $3^{rd}$ and $4^{th}$ bits of RCOH1. The following response message is transmitted from the source to the sink.

A case of increasing a bandwidth 01 (OK): it indicates that a free bandwidth has been secured in response to CTRL=ADD.

10 (NG): it indicates that a free bandwidth has not been secured in response to CTRL=ADD.

A case of decreasing a bandwidth 01 (OK): it indicates that decrease in the number of logical lanes to be lane-distributed has been confirmed at the sink side.

An RBWR (Reply for Bandwidth Resize) is arranged in $5^{th}$ and $6^{th}$ bits of RCOH1. The following response message is transmitted from the sink to the source.

A case of increasing a bandwidth 01 (OK): it indicates that delay correction has succeeded.

10 (NG): it indicates that delay correction has failed.

A case of decreasing a bandwidth 01 (OK): it indicates that CTRL=REMOVE has been received.

The CRC8 (Cyclic Redundancy Check 8) is arranged in $1^{st}$ to $8^{th}$ bits of RCOH3. The CRC8 is used for performing error detection on RCOH1 and RCOH2.

$7^{th}$ and $8^{th}$ bits of RCOH1 are spare regions. When the LNUM is to be extended, for example, when the speed of a logical lane is assumed to be 1.25 Gbps and a maximum bandwidth is assumed to be 1 Tbps, the number of logical lanes to be increased and decreased is 800 at maximum, and thus 10 bits (0 to 1023) are necessary. In this case, a total of 10 bits of the $7^{th}$ and $8^{th}$ bits of RCOH1 and the $1^{st}$ to $8^{th}$ bits of RCOH2 are allocated to the LNUM (FIG. 5-9(*b*)).

FIG. 5-10 illustrates a procedure of increasing a bandwidth by using the RCOH.

In an initial state, communication is assumed to be being performed between a source So and a sink Sk through M logical lanes.

(1) The source So that has received a bandwidth increase request from an NMS (Network Management System) transmits CTRL=ADD and LNUM=N to the sink Sk (S101). Note that the NMS is a system for performing network management operation.

(2) The sink Sk that has received CTRL=ADD and LNUM=N checks a usage state of bandwidth resources, and when free bandwidth resources have been secured, sends back RLCR=OK to the source So, and when free bandwidth resources have not been secured, sends back RLCR=NG to the source So (S102).

(3) The source So that has received RLCR=OK transmits CTRL=NORM to the sink Sk (S103). Further, the source So copies and transmits the data blocks including the FAS and the MFAS of the existing M logical lanes to a new logical lane as in FIG. 5-5 (S104).

(4) The sink Sk reads the FAS and the MFAS included in the new logical lane, compares the delay time differences of the FASs having the identical MFAS, and when the delay time of the new logical lane is shorter than the delay time of the existing M logical lanes, adds the difference to the new logical lane. Further, when the delay time of the new logical lane is longer than the delay time of the existing M logical lanes, the difference is added to the existing M logical lanes.

Thereafter, the sink Sk confirms that a delay time of all of the logical lanes becomes equal, and sends back RBWR=OK to the source So (S105). When a delay time of all of the logical lanes does not become equal or when the FAS and the MFAS cannot be received normally through the new logical lane, the sink Sk sends back RBWR=NG to the source So (S105).

(5) The source So that has received RBWR=OK starts lane distribution by (M+1) logical lanes from a head of next lane distribution (S107). Further, the source So transmits CTRL=IDLE to the sink (S106).

Note that the source So that has received RLCR=NG or RBWR=NG stops the bandwidth increase operation, and transmits CTRL=IDLE to the sink Sk.

Further, FIG. 5-11 illustrates a procedure of decreasing a bandwidth.

In an initial state, communication is assumed to be being performed between the source So and the sink Sk through M logical lanes.

(1) The source So that has received a bandwidth decrease request from the NMS transmits CTRL=REMOVE and LNUM=N to the sink Sk (S201).

(2) The sink Sk that has received CTRL=REMOVE and LNUM=N sends back RBWR=OK to the source So (S202).

(3) The source So that has received RBWR=OK transmits CTRL=NORM to the sink Sk (S203). Further, the source So starts lane distribution by (M−1) logical lanes from a head of next lane distribution (S204).

(4) The sink Sk that has confirmed the lane distribution by the (M−1) logical lanes releases free bandwidth resources, and sends back RLCR=OK to the source So (S205).

(5) The source So that has received RLCR=OK releases free bandwidth resources, and send backs CTRL=IDLE to the sink Sk (S206).

Second Embodiment

Another example of arrangement of an RCOH will be described.

The RCOH is arranged to occupy 3 bytes in $9^{th}$ to $14^{th}$ columns of a $4^{th}$ row in an ODU OH (FIG. 5-12 illustrates $12^{th}$ to $14^{th}$ columns, but the same effect is also obtained when it is arbitrarily arranged in, for example, $9^{th}$ to $11^{th}$ columns or $10^{th}$ to $12^{th}$ columns). When the OPU OH is allocated to other application, for example, when the OPU OH is allocated to transmission of a mapping parameter of a GMP (Generic Mapping Procedure), the RCOH is arranged in the ODU OH.

Sub fields of the RCOH and a bandwidth change procedure using the sub fields are the same as in the first embodiment.

Sixth Invention

A multilane monitoring system according to the present embodiment includes a transmitting unit that distributes frame signals to a plurality of lanes and transmits the frame signals and a receiving unit that receives frame signals that have been distribute to a plurality of lanes and transmitted.

A multilane monitoring method according to the present embodiment includes a transmission procedure and an error monitoring procedure.

In the transmission procedure, the transmitting unit interleaves each row in a frame including a plurality of rows, divides each row into predetermined number of sub rows, encodes data of each sub row by using an error correction code, deinterleaves each encoded sub row, and performs conversion into a frame including a plurality of rows.

In the error monitoring procedure, an error of each lane is monitored such that the receiving unit interleaves each row of a frame transmitted from the transmitting unit, divides each row into predetermined number of sub rows, detects an error included in data of each sub row, calculates a value of an error locator indicating a position of the error, converts the value of the error locator into a lane number, and counts the number of appearances of the lane number converted from the value of the error locator.

1. Error Correction

In the OTN, parity check bytes of 4 rows×256 columns are added to a frame of 4 rows×3824 columns including an OPU, an ODU OH, an OTU OH, and an FA OH, and error correction is performed (see Annex A of Non-Patent Literature 6-1). The procedure is described below.

The transmitting unit performs an interleaving procedure (1.1.1) of byte-interleaving the frame of 4 rows×3824 columns and divides the frame into 16 sets of sub rows (239 bytes for each), an encoding procedure (1.1.2) of encoding 239 symbols of sub-row data by using a correctable code, and a deinterleaving procedure (1.1.3) of deinterleaving the 16 sets of encoded sub rows (255 bytes for each) and converting the sub rows into one row of encoded data (4080 bytes).

The receiving unit performs an interleaving procedure (1.2.1) of byte-interleaving one row of data (4080 bytes) and further dividing the data into 16 sets of sub rows (255 bytes for each), a decoding procedure (1.2.2) of performing decoding by detecting an error included in sub-row data (239 symbols), correcting the error, and taking out $1^{st}$ to $239^{th}$ bytes of the corrected sub-row data, and a deinterleaving procedure (1.2.3) of deinterleaving the 16 sets of decoded sub-row data (239 bytes for each).

By performing the deinterleaving procedure (1.2.3), one row of decoded data (3824 byte) is obtained. By obtaining the error locator in a course of executing the decoding algorithm and then converting the value of the error locator into a lane number m, the lane number of a lane having an error is determined.

1.1 Transmission Side 1.1.1 Interleaving

At the transmission side, one row of data (3824 bytes) is byte-interleaved and divided into 16 sets of sub rows (239 bytes for each) as illustrated in FIG. 6-6(*a*).

As illustrated in FIG. 6-6(*b*), each sub row includes 239 symbols (D[254], D[253], D[252], D[251], . . . , D[19], D[18], D[17], and D[16]). Here, D[254] is a $1^{st}$ byte of a sub row, and D[16] is a $239^{th}$ byte. Further, each symbol has 8 bits (d[7, j], d[6, j], . . . , d[1, j], and d[0, j]). Here, d[7, j] is an MSB of $D_j$, and d[0, j] is an LSB.

1.1.2 Sub-Row Data Encoding

For 239 symbols of the sub-row data, a Reed-Solomon code (RS (255, 239)) capable of correcting an error of a maximum of 8 symbols is generated. To this end, an eighth-order primitive polynomial P(z) expressed by Formula [1] is given, and an extension field GF ($2^8$) is defined assuming that a primitive solution satisfying P(z)=0 is α.

(Math. 001)

$$P(z)=z^8+z^4+z^3+z^2+1 \qquad \text{Formula [1]}$$

As illustrated in FIG. 6-7, it is realized to relate elements (0 and $\alpha^0$ to $\alpha^{254}$) of the extension field GF ($2^8$) to 8-bit symbols, and a calculation necessary for encoding and decoding is performed on the extension field GF ($2^8$).

Sub-row data can be expressed by the following information polynomial.

(Math. 002)

$$I(z)=D[254]z^{254}+D[253]z^{253}+\dots+D[17]z^{17}+D[16]z^{16} \qquad \text{Formula [2]}$$

$$D[j]=d[7,j]\alpha^7+d[6,j]\alpha^6+d[5,j]\alpha^5+d[4,j]\alpha^4+d[3,j]\alpha^3+d[2,j]\alpha^2+d[1,j]\alpha^1+d[0,j]\alpha^0 \qquad \text{Formula [3]}$$

When a generator polynomial G(z) for performing encoding is given as follows (Math. 004)

$$G(z)=(z-\alpha^0)(z-\alpha^1)\ldots(z-\alpha^{14})(z-\alpha^{15}) \quad \text{Formula [4]},$$

encoded sub-row data can be expressed by the following information polynomial.

(Math. 005)

$$C(z)=I(z)+R(z) \quad \text{Formula [5]}$$

R(z) is an information polynomial of a parity check byte, and is determined as a remainder obtained by dividing the information polynomial I(z) of the sub-row data by the generator polynomial G(z).

(Math. 006)

$$R(z)=I(z)\bmod G(z) \quad \text{Formula [6]}$$

(Math. 007)

$$R(z)=R[15]z^{15}+R[14]z^{14}+\ldots+R[1]z^1+R[0]z^0 \quad \text{Formula [7]}$$

(Math. 008)

$$R[j]=r[7,j]\alpha^7+r[6,j]\alpha^6+r[5,j]\alpha^5+r[4,j]\alpha^4+r[3,j]\alpha^3+r[2,j]\alpha^2+r[1,j]\alpha^1+r[0,j]\alpha^0 \quad \text{Formula [8]}$$

The encoded sub row includes 255 symbols (D[254], D[253], . . . , D[17], D[16], R[15], R[14], . . . , R[1], and R[0]). Here, R[15] is a $240^{th}$ byte of a sub row, and R[0] is a $255^{th}$ byte.

1.1.3 Deinterleaving

As illustrated in FIG. 6-6(*c*), 16 sets of encoded sub rows (255 bytes for each) are deinterleaved, and converted into one of encoded data (4080 bytes). By connecting 4 rows of the encoded data (4080 bytes), an encoded frame of 4 rows×4080 columns is obtained.

1.2. Reception Side 1.2.1 Interleaving

At the reception side, one row of data (4080 bytes) is byte-interleaved and further divided into 16 sets of sub rows (255 bytes for each) as illustrated in FIG. 6-8(*a*).

1.2.2 Sub-Row Data Decoding

Sub-row data before decoding can be expressed by the following information polynomial.

(Math. 009)

$$Y(z)=C(z)+E(z) \quad \text{Formula [9]}$$

(Math. 010)

$$E(z)=E[254]z^{254}+E[253]z^{253}+\ldots+E[1]z^1+E[0]z^0 \quad \text{Formula [10]}$$

E[j] indicates an error that has occurred in a symbol of a $(255-j)^{th}$ byte during transmission.

The decoding procedure is as follows.

(1) A syndrome is calculated, and the presence or absence of an error is determined.

(2) An error locator polynomial necessary for calculation of an error locator (a numerical value indicating a symbol having an error) is determined.

(3) The error locator is determined.

(4) A symbol having an error is corrected.

(5) A parity check byte is deleted.

1.2.2.1 Syndrome

In order to detect the presence or absence of an error, the following syndrome $S_i$ (i=1 to 16) is calculated for sub-row data before decoding.

(Math. 011)

$$S_1 = Y(\alpha^0) \quad \text{Formula [11-(1)]}$$

$$S_2 = Y(\alpha^1) \quad \text{Formula [11-(2)]}$$

$$\ldots$$

$$S_{16} = Y(\alpha^{15}) \quad \text{Formula [11-(16)]}$$

When there is no error in the sub-row data before decoding, $S_i$=0 holds in all "i"s. Thus, when $S_i$=0 holds in all "i"s, it can be estimated with a high probability that there is no error. On the other hand, when $S_i \neq 0$ holds in any of "i"s, there is an error in the sub-row data before decoding.

1.2.2.2 Error Locator Polynomial

The following error locator polynomial is determined assuming that the number of error symbols is k (≤8).

(Math. 012)

$$L(z)=1+L_1z^1+L_2z^2+\ldots+L_kz^k \quad \text{Formula [12]}$$

Assuming that the error locator is p[1], p[2], . . . , and p[k], when coefficients ($L_1$, $L_2$, . . . , $L_k$) of the error locator polynomial can be decided so as to enable factorization as follows:

(Math. 013)

$$L(z)=(1-\alpha^{-p[1]}z)(1-\alpha^{-p[2]}z)\ldots(1-\alpha^{-p[k]}z) \quad \text{Formula [13]},$$

the following relation holds:

(Math. 014)

$$L(\alpha^{p[1]}) = 1 + L_1\alpha^{p[1]} + L_2\alpha^{2p[1]} + \ldots + L_k\alpha^{kp[1]} = 0 \quad \text{Formula [14-(1)]}$$

$$L(\alpha^{p[2]}) = 1 + L_1\alpha^{p[2]} + L_2\alpha^{2p[2]} + \ldots + L_k\alpha^{kp[2]} = 0 \quad \text{Formula [14-(2)]}$$

$$\ldots$$

$$L(\alpha^{p[k]}) = 1 + L_1\alpha^{p[k]} + L_2\alpha^{2p[k]} + \ldots + L_k\alpha^{kp[k]} = 0. \quad \text{Formula [14-(k)]}$$

Meanwhile, the syndrome $S_i$ (i=1 to 16) can be expressed by using non-zero coefficients of the error polynomial E(z) as follows.

(Math. 015)

$$S_1 = E[255-p[1]] + E[255-p[2]] + \ldots + E[255-p[k]] \quad \text{Formula [15-(1)]}$$

$$S_2 = E[255-p[1]]\alpha^{-p[1]} + E[255-p[2]]\alpha^{-p[2]} + \ldots + E[255-p[k]]\alpha^{-p[k]} \quad \text{Formula [15-(2)]}$$

$$\ldots$$

$$S_k = E[255-p[1]]\alpha^{-(k-1)p[1]} + E[255-p[2]]\alpha^{-(k-1)p[2]} + \ldots + E[255-p[k]]\alpha^{-(k-1)p[k]} \quad \text{Formula [15-(k)]}$$

$$\ldots$$

$$S_{16} = E[255-p[1]]\alpha^{-15p[1]} + E[255-p[2]]\alpha^{-15p[2]} + \ldots + E[255-p[k]]\alpha^{-15p[k]} \quad \text{Formula [15-(16)]}$$

When p[k] and E[255-p[k]] are eliminated by using the above relation, the following formulas are obtained.

(Math. 016)

$$S_{k+1}+S_kL_1+S_{k-1}L_2+\ldots+S_1L_k=0 \quad \text{Formula [16-(1)]}$$

$$S_{k+2}+S_{k+1}L_1+S_kL_2+\ldots+S_2L_k=0 \quad \text{Formula [16-(2)]}$$

...

$$S_{2k}+S_{2k-1}L_1+S_{2k-2}L_2+\ldots+S_kL_k=0 \quad \text{Formula [16-(k)]}$$

The error locator polynomial L(z) is specifically obtained by solving Formulas [16-(1)] to [16-(k)] as a k-order simultaneous linear equation for unknowns ($L_1$, $L_2$, . . . , and $L_k$). However, when a coefficient determinant becomes zero (0) and the k-order simultaneous linear equation cannot be solved, since an assumption of the number k of error symbols is wrong, a value of k is changed, and a calculation is performed again.

1.2.2.3 Error Locator

Values of error locators p[1], p[2], . . . , and p[k] are specifically obtained by sequentially substituting $\alpha^j$ into the error locator polynomial L(z) (Formula [12]) and checking whether or not it becomes zero (0).

1.2.2.4 Correction of Symbol Having an Error

After the error locators p[1], p[2], . . . , and p[k] are obtained, when Formulas [15-(1)] to [15-(k)] are solved as a k-order simultaneous linear equation for unknowns (E[255-p[1]], E[255-p[2]], . . . , and E[255-p[k]]), non-zero coefficients (E[255-p[1]], E[255-p[2]], . . . , E[255-p[k]]) of E(z) are specifically obtained.

Using the above results, the error correction can be performed as follows.

(Math. 017)

$$C(z)=Y(z)+E[255-p[1]]z^{p[1]}+E[255-p[2]]z^{p[2]}+\ldots+E[255-p[k]]z^{p[k]} \quad \text{Formula [17]}$$

1.2.2.5 Deletion of Parity Check Byte

Decoded sub-row data (239 bytes) is obtained by deleting $240^{th}$ to $255^{th}$ bytes of the error-corrected sub-row data.

1.2.3 Deinterleaving

As illustrated in FIG. 6-8(*b*), by deinterlevening the 16 sets of decoded sub-row data (239 bytes for each), one row of decoded data (3824 bytes) is obtained. By connecting 4 rows of the decoded data, the decoded frame of 4 rows×3824 columns is obtained.

2. OTN-MLD

When transmission is performed with the OTN-MLD, as illustrated in FIG. 6-9, at the transmission side, portions other than an FAS of the encoded frame of 4 rows×4080 columns are scrambled, distributed to M (M=4 in the example of FIG. 6-9) lanes in a unit of 16-byte data blocks, and transmitted. At this time, By performing lane rotation each time one frame is transmitted, a data block (a data block denoted by "1" in FIG. 6-9) positioned at a head of a frame is equally distributed to all lanes. This data block includes the FAS, an MFAS, and an LLM (Logical Lane Marker), and identifying a position of a frame head and a lane number can be realized.

Here, the LLM may be a VLM, and the LLM and the VLM are not distinguished from each other in the present application.

At the reception side, signals distributed to the respective lanes are received, a delay time difference between lanes is compensated for based on the position of the FAS and the value of the MFAS, 16-byte data blocks are sequentially combined to be reconfigured in a format of an OTU frame of 4 rows×4080 columns, and portions other than the FAS are descrambled.

3. Relation Between Lane Number and Error Locator

When the OTN-MLD is used, the lane number m (m=1 to 4) of a lane through which data of a $b^{th}$ block (b=1 to 1020) of a frame 1 is transmitted is obtained as follows:

(Math. 018a)

$$m=\{(b-1)\bmod 4\}+1 \quad \text{Formula [18-(1)].}$$

Similarly, the lane numbers m of lanes through which data of $b^{th}$ blocks of frames 2, 3, and 4 are transmitted are obtained respectively as follows:

(Math. 018b)

$$m=\{b \bmod 4\}+1 \quad \text{Formula [18-(2)]}$$

$$m=\{(b+1)\bmod 4\}+1 \quad \text{Formula [18-(3)]}$$

$$m=\{(b+2)\bmod 4\}+1 \quad \text{Formula [18-(4)].}$$

Since the error locators p[0] to p[k] are obtained in a course of executing the decoding algorithm, the lane number of a lane having an error can be determined by converting the value of the error locator into the lane number m by using the above relation.

As described above, according to the present invention, performing quality monitoring for each lane can be realized, and thus when transmission quality of a certain lane has only degraded, a backup lane or a lane being used for a service having a low priority can be used if the lane is available. Further, it becomes possible to perform the shrink by excluding a lane having degraded transmission quality and using the remaining normal lane.

First Embodiment

FIG. 6-10 illustrates configuration of a receiving unit of a multilane transmission device using a multilane monitoring scheme of the present invention.

In a lane identifying & delay difference compensating unit 1, an FAS, an MFAS, and an LLM are detected by signals received through multiple lanes, (LLM mod M) is calculated to identify a lane number, and delay difference compensation is performed based on the positions of the FAS and the values of the MFAS or the LLM. Further, an FAS appearance cycle is monitored for each lane, and when there is abnormality in periodicity, frame synchronization loss is recorded in a register.

An OTU frame reconfiguring unit 2 sequentially combines 16-byte data blocks of the signals that have been subjected to the lane identification/delay difference compensation, and reconfigures the data blocks in a form of an OTU frame of 4 rows×4080 columns.

A descrambling unit 3 descrambles all regions of the reconfigured OTU frame except the FAS.

An FEC decoding unit 4 performs error correction on the descrambled OTU frame. Further, the number of errors is counted for each lane number and recorded in a register.

An OTU/ODU OH processing unit 5 outputs an OPU frame in which an OTU FEC, an FA OH, an OTU OH, and an ODU OH are eliminated from the error-corrected frame of 4 rows×3824 columns. Further, the BIP-8 sub field value of an SM OH/PM OH is compared with the BIP-8 value calculated from the OPU, and the number of errors that have occurred in a section/path monitoring zone is counted and recorded in a register.

A demapping unit 6 demaps a client signal from an OPU PLD based on information of an OPU OH, and outputs the client signal.

A quality monitoring unit 7 reads the registers of the respective functional blocks (the lane identifying & delay difference compensating unit 1, the FEC decoding unit 4, the OTU/ODU OH processing unit 5, and the like), and performs quality monitoring.

FIG. 6-11 illustrates configuration of the FEC decoding unit 4.

An interleaving unit 10 performs byte-interleaving on one row of data (4080 bytes), and divides the data into 16 sets of sub rows (255 bytes for each) as illustrated in FIG. 6-8(*a*).

Sub-row data decoding units 11-1 to 11-16 decode the sub-row data (255 bytes), and outputs the sub-row data as original sub-row data (239 bytes).

A deinterleaving unit 12 deinterleaves the 16 sets of decoded sub-row data (239 bytes for each), and outputs one row of the decoded data (3824 bytes) as illustrated in FIG. 6-8(*b*). By connecting 4 rows of the decoded data, the error-corrected frame of 4 rows×3824 columns is obtained.

The lane error register recording unit 13 aggregates lane numbers 1 of lanes in which an error has detected by the sub-row data decoding units 11-1 to 11-16, and records the number of errors for each lane in a register.

FIG. 6-12 illustrates configuration of the sub-row data decoding unit 11.

A syndrome calculating unit 21 calculates a syndrome $S_i$ (i=1 to 16) by Formulas [11-(1)] to [11-(16)]. When $S_i=0$ holds in all "i"s, it is determined that there is no error. When $S_i \neq 0$ holds in any one of "i"s, there is an error in input sub-row data. An error locator polynomial coefficient calculating unit 22 solves the simultaneous linear equations [16-(1)] to [16-(k)], and decides coefficients ($L_1$, $L_2$, . . . , and $L_k$) of the error locator polynomial.

An error locator calculating unit 23 decides the error locators p[1], p[2], . . . , and p[k] by sequentially substituting $\alpha^j$ into the error locator polynomial (Formula [12]) and checking whether or not it becomes zero (0).

An error coefficient calculating unit 24 solves the simultaneously linear equations [15-(1)] to [15-(k)], and decides non-zero coefficient (E[255-p[1]], E[255-p[2]], . . . , E[255-p[k]]) of E(z).

An error correcting unit 25 performs error correction by Formula [17].

When the syndrome calculating unit 21 determines that there is no error, the selecting/outputting unit 26 selects and outputs $1^{st}$ to $239^{th}$ bytes of input sub-row data as is. Further, when it is determined that there is an error, the selecting/outputting unit 26 selects and outputs $1^{st}$ to $239^{th}$ bytes of output data of the error correcting unit 25.

A lane number calculating unit 27 calculates a lane number m from an error locator p by the following formulas.

(Math. 019)

$$b=p+(s-1)*255 \quad \text{Formula [19]}$$

(Math. 020)

$$m=\{b-1+rt\} \bmod M\}+1 \quad \text{Formula [20]}$$

Here, s is a row number in a frame (s=1 to 4). M is the number of lanes in an OTN-MLD, and is dynamically changeable (may be used as a fixed value). rt is a value indicating a lane that has been rotated, and depends on an employed lane rotation rule. For example, in a case of performing rotation on a +1-lane basis per frame as illustrated in FIG. 6-8, rt becomes as follows:

(Math. 021)

$$rt=\text{LLM} \bmod M\ M \quad \text{Formula [21].}$$

Note that as decoding algorithm of a Reed-Solomon code, various kinds of approaches have been proposed, but the present invention does not depend on the decoding algorithm itself (any decoding algorithm may be used as long the error locator can be obtained). Further, the present invention is applicable to a Reed-Solomon code (other than RS (255, 239)) of different error correction ability or an encoding scheme other than the Reed-Solomon code as long as the error locator is obtained.

FIG. 6-13 illustrates a second configuration example of the sub-row data decoding unit 11.

The syndrome calculating unit 21 calculates the syndrome Si (i=1 to 16) according to Formulas [11-(1)] to [11-(16)]. When $S_i=0$ holds in all "i"s, it is determined that there is no error. When $S_i \neq 0$ holds in any one of "i"s, there is an error in input sub-row data. The error locator polynomial coefficient calculating unit 22 solves the simultaneous linear equations [16-(1)] to [16-(k)], and decides coefficients ($L_1$, $L_2$, . . . , and $L_k$) of the error locator polynomial.

The error locator calculating unit 23 decides the error locators p[1], p[2], . . . , and p[k] by sequentially substituting $\alpha^j$ into the error locator polynomial (Formula [12]) and checking whether or not it becomes zero (0).

The error coefficient calculating unit 24 solves the simultaneously linear equations [15-(1)] to [15-(k)], and decides non-zero coefficient (E[255-p[1]], E[255-p[2]], . . . , E[255-p[k]]) of E(z).

The error correcting unit 25 performs error correction by Formula [17].

When the syndrome calculating unit 21 determines that there is no error, the selecting/outputting unit 26 selects and outputs $1^{st}$ to $239^{th}$ bytes of input sub-row data as is. Further, when it is determined that there is an error, the selecting/outputting unit 26 selects and outputs $1^{st}$ to $239^{th}$ bytes of output data of the error correcting unit 25.

A data comparing unit 28 sequentially compares data (D[254], D[253], . . . , D[17], and D[16]) after error correction output from the selecting/outputting unit 26 with data (Y[254], Y[253], . . . , Y[17], and Y[16]) before error correction, and when D[255-p]≠Y[255-p], outputs p thereof.

The lane number calculating unit 27 calculates the lane number m from p by Formula [19] and Formula [20] described above.

Here, s is a row number in a frame (s=1 to 4). M is the number of lanes in the OTN-MLD, and is dynamically changeable (may be used as a fixed value). rt is a value indicating a lane that has been rotated, and depends on an employed lane rotation rule. For example, in a case of performing rotation on a +1-lane basis per frame as illustrated in FIG. 6-8, rt becomes as in Formula [21].

FIG. 6-14 illustrates a third configuration example of the sub-row data decoding unit 11.

The syndrome calculating unit 21 calculates the syndrome Si (i=1 to 16) by Formulas [11-(1)] to [11-(16)]. When $S_i=0$ holds in all "i"s, it is determined that there is no error. When $S_i \neq 0$ holds in any one of "i"s, there is an error in input sub-row data. The error locator polynomial coefficient calculating unit 22 solves the simultaneous linear equations [16-(1)] to [16-(k)], and decides coefficients ($L_1$, $L_2$, . . . , and $L_k$) of the error locator polynomial.

The error locator calculating unit 23 decides the error locators p[1], p[2], . . . , and p[k] by sequentially substituting $\alpha^j$ into the error locator polynomial (Formula [12]) and checking whether or not it becomes zero (0).

The error coefficient calculating unit 24 solves the simultaneously linear equations [15-(1)] to [15-(k)], and decides non-zero coefficient (E[255-p[1]], E[255-p[2]], . . . , E[255-p[k]]) of E(z).

The error correcting unit 25 performs error correction by Formula [17].

When the syndrome calculating unit 21 determines that there is no error, the selecting/outputting unit 26 selects and outputs $1^{st}$ to $239^{th}$ bytes of input sub-row data as is. Further, when it is determined that there is an error, the selecting/outputting unit 26 selects and outputs $1^{st}$ to $239^{th}$ bytes of output data of the error correcting unit 25.

A sub-row data encoding unit 29, outputs data (C[254], C[253], . . . , C[2], and C[1]) obtained by re-encoding data (D[254], D[253], . . . , D[17], and D[16] to a data comparing unit 28) after error correction output from the selecting/outputting unit 26. The data comparing unit 28 sequentially compares the re-encoded data (C[254], C[253], . . . , C[2], and C[1]) output from the sub-row data encoding unit 29 with data (Y[254], Y[253], . . . , Y[2], and Y[1]) before error correction, and when C[255-p]≠Y[255-p], outputs p thereof.

The lane number calculating unit 27 calculates the lane number m from p by Formula [19] and Formula [20].

Here, s is a row number in a frame (s=1 to 4). M is the number of lanes in the OTN-MLD, and is dynamically changeable (may be used as a fixed value). rt is a value indicating a lane that has been rotated, and depends on an employed lane rotation rule. For example, in a case of performing rotation on a +1-lane basis per frame as illustrated in FIG. 6-8, rt becomes as in Formula [21]. The present embodiment is also applicable when the existing FEC decoder that cannot take the error locator outside is employed.

Second Embodiment

When a variable length frame of 4M rows×4080 columns is used instead of a fixed length frame of 4 rows×4080 columns, and lane rotation is performed for each variable length frame, the lane number m is calculated from the error locator p by Formulas [19] and [20], similarly to the first embodiment. Here, s=1 to 4M.

Seventh Invention

An individual lane monitoring method in a multilane transmission system of the present embodiment relates to monitoring the number of errors of individual lanes in multilane transmission in which a signal of a frame format is divided into data blocks, distributed to a plurality of lanes, and transmitted, and particularly, spare regions of an OTU OH of $13^{th}$ and $14^{th}$ columns of a $1^{st}$ row of an OTU frame or a part of an FAS in an FA OH of a $5^{th}$ column of a $1^{st}$ row of an OTU frame is defined as an LM (Lane Monitoring) OH, the CRC-8 of a previous cycle is inserted as an error detection code in a lane, and the number of errors of an individual lane is monitored.

FIG. 7-6 illustrates a position of the LM OH. Bytes of $13^{th}$ and $14^{th}$ columns of a $1^{st}$ row of an OTU frame are spare regions. Either or both are defined as the LM (Lane Monitoring) OH for lane monitoring, and an error detection code in a lane is inserted into the LM OH. Alternatively, a byte of a $1^{st}$ column of a $1^{st}$ row of the OTU frame is a $1^{st}$ byte of the FAS in the FA OH, but this byte is defined as the LM OH, and an error detection code in a lane is inserted into the LM OH. Hereinafter, an example will be described in which a $14^{th}$ column of a $1^{st}$ row of the OTU frame is defined as the LM OH, but operation is similar even when the position of the LM OH is different.

As illustrated in FIG. 7-7, when the FAS is detected in each lane at the transmission device side, a calculation result of the CRC-8 (Cyclic Redundancy Check 8) of a previous cycle is inserted into the LM OH of an $14^{th}$ byte from the head of a frame with the FAS as an origin. A calculation of the CRC-8 of a next cycle is started with a $15^{th}$ byte next to the LM OH and ends with a byte just before the next FAS. When a generator polynomial used for a calculation of the CRC-8 is assumed to be as G(z) and an information polynomial of transmission data is assumed to be D(z), an information polynomial of the CRC-8 code is given as follows:

$$R(z)=D(z) \bmod G(z) \quad [1].$$

The CRC-8 code obtained as described above is inserted into the LM OH of the $14^{th}$ byte from the head of a next frame.

When the FAS is detected in each lane at the reception device side, the previous CRC-8 code is read from the LM OH of the $14^{th}$ byte from the head of a frame with the FAS as an origin, an error inspection is performed on reception data from a $15^{th}$ byte next to the previous LM OH to a byte just before the FAS. In other words, an information polynomial for reception data is assumed to D'(z), an information polynomial for the received CRC-8 code is assumed to be R'(z), and $$C(z)=\{z^8D'(z)+R'(z)\} \bmod G(z) \quad [2]$$

is calculated.

When there is no error, since D'(z)=D(z) and R'(z)=R(z), when C(z)=0, it can be estimated with a high probability that there is no error.

On the other hand, when C(z)≠0, it is determined that an error has occurred in a corresponding lane during transmission.

FIG. 7-8 illustrates configuration of a transmission device in the multilane transmission system using the individual lane monitoring scheme in multilane transmission of the present invention. The transmission device of the present embodiment includes a mapping unit 1, an OH processing unit 2, an FEC coding unit 3, a scrambling unit 4, and a lane distributing unit 5. The transmission device executes an error detection code insertion procedure with the lane distributing unit 5 operating as an error detection code calculating function unit and the OH processing unit 2 operating as an error detection code inserting function unit.

The mapping unit 1 maps a client signal to an OPU PLD.

The OH processing unit 2 adds an overhead to an OPU frame. Examples of the overhead include the FA OH, the OTU OH, the LM OH, and an ODU OH. Here, it is assumed that an LLM (Logical Lane Marker) is included in a $6^{th}$ byte of the FA OH. When M is assumed to be the number of lanes, and N is assumed to be an integer of 1 or more, the LLM has a value from 0 to N*M−1. Here, N*M is a maximum value that can be 256 or less among multiples of M.

Here, the LLM may be a VLM, and the LLM and the VLM are not distinguished from each other in the present application.

Here, the OH processing unit 2 operates as the error detection code inserting function unit, detects the FAS in each lane, and inserts an error detection code that has been calculated for data before a data block including the FAS by the lane distributing unit 5 into the LM OH. For example, the CRC-8 code is inserted into the LM OH.

The FEC coding unit 3 performs FEC coding on the frame of 4 rows×3824 columns in which the overhead is added to the OPU frame.

The scrambling unit 4 scrambles all regions of the FEC-coded OTU frame of 4 rows×4080 columns except the FAS.

FIG. 7-9 illustrates configuration of the lane distributing unit 5. The lane distributing unit 5 includes a data block dividing unit 6, a lane number deciding unit 7, and CRC-8 calculating units 8-1 to 8-M. The CRC-8 calculating units 8-1 to 8-M operate as the error detection code calculating function unit, detects a synchronization pattern in each lane, and calculates an error detection code for data subsequent to data blocks arrived after a data block including the synchronization pattern.

The data block dividing unit 6 divides the scrambled OTU frame into 16-byte data blocks, and distributes the data blocks to M lanes.

The lane number deciding unit 7 decides a lane number of a lane to which a data block is output. Here, a lane number m (m=0 to M−1) of a lane to which a head data block including the FAS is output is decided by:

$$LLM \bmod M = 1 \rightarrow m = 1$$
$$LLM \bmod M = 2 \rightarrow m = 2$$
$$\ldots$$
$$LLM \bmod M = 0 \rightarrow m = M$$

A lane number of a lane to which a subsequent data block is output is decided by a round robin.

The CRC-8 calculating units 8-1 to 8-M detect the FAS as the synchronization pattern, and calculate the CRC-8 code according to Formula [1] from data of the $15^{th}$ byte from the head of the frame to data just before the next FAS. The OH processing unit 2 functions as the error detection code inserting function unit, and inserts the calculation results of the CRC-8 calculating units 8-1 to 8-M into the LM OH that is a predetermined field.

FIG. 7-10 illustrates configuration of a reception device in the multilane transmission system. The reception device includes an OH decoding unit 11, a lane identifying & delay difference compensating unit 12, an OTU frame reconfiguring unit 13, a descrambling unit 14, an FEC decoding unit 15, an OH processing unit 16, a demapping unit 17, and a quality monitoring unit 18.

FIG. 7-11 illustrates configuration of the OH decoding unit 11. The OH decoding unit 11 includes an FAS detecting unit 20, an FAS cycle monitoring unit 21, a descrambling unit 22, and an error detecting unit 23. The OH decoding unit 11 operates as an error monitoring function unit, calculates the error detection code for data subsequent to data blocks arrived after the data block including the FAS, and detects an error of each lane by using the calculation result and the error detection code read from the LM OH.

The FAS detecting unit 20 outputs a synchronous pulse when the synchronization pattern of the FAS is detected. Further, the data block including the FAS is taken out.

The FAS cycle monitoring unit 21 monitors an appearance cycle of the FAS for each lane, and when there is abnormality in periodicity, records frame synchronization loss in a register.

The descrambling unit 22 descrambles the data block including the FAS as illustrated in FIG. 7-12, and outputs the LLM and the CRC-8 code of the LM OH. In the present embodiment, the LM OH is a predetermined field, and the CRC-8 code is the error detection code.

The error detecting unit 23 calculates Formula [2] based on the reception signal and the CRC-8 code, performs error detection, and records the number of error occurrences for each lane in a register. Then, the error detection result is output to the quality monitoring unit 18.

The lane identifying & delay difference compensating unit 12 calculates (LLM mod M), identifies a lane number, and performs delay difference compensation based on the position of the FAS and the value of the MFAS or the LLM.

The OTU frame reconfiguring unit 13 sequentially combines 16-byte data blocks of the signals that have been subjected to the lane identification/delay difference compensation, and reconfigures the data blocks in a form of an OTU frame of 4 rows×4080 columns.

The descrambling unit 14 descrambles all regions of the reconfigured OTU frame except the FAS.

The FEC decoding unit 15 performs error correction on the descrambled OTU frame.

The OH processing unit 16 outputs an OPU frame in which the overheads such as the FA OH, the OTU OH, the LM OH, and the ODU OH are eliminated from the error-corrected frame of 4 rows×3824 columns. Further, the BIP-8 sub field value of the SM OH/PM OH is compared with the BIP-8 value calculated from the OPU, and the number of errors that have occurred in the section/path monitoring zone is counted and recorded in a register.

The demapping unit 17 demaps the client signal from the OPU PLD based on information of the OPU OH, and outputs the client signal.

The quality monitoring unit 18 reads the registers of the respective functional blocks (the OH decoding unit 11, the lane identifying & delay difference compensating unit 12, the OTU/ODU OH processing unit 16, and the like), and performs quality monitoring.

Note that in the present embodiment, the CRC-8 is used as the error detection code, but configuration of allocating the LM OH that is a predetermined filed to 2 bytes of $13^{th}$ and $14^{th}$ columns of a $1^{st}$ row of the OTU frame and using the CRC-16 is possible as well. Further, configuration of using an error detection code (a BIP or the like) other than the CRC is possible as well.

Eighth Invention

First Embodiment

Hereinafter, a multilane transmission device according to a first embodiment of the present invention and a fault lane notifying method performed by the multilane transmission device will be described with reference to the appended drawings.

When faults have occurred, for example, when decrease in a level of an optical signal is detected in a certain lane at a reception side or an FAS is not properly detected, the whole or a part of an OTU OH is changed to an E-OH (Emergency OverHead), and a notification of a lane number of a lane having a fault is given to a transmission side by using the E-OH.

FIG. 8-1 is a diagram illustrating a position of the E-OH in the OTU OH when a notification of a fault lane is given. In example 1 illustrated in FIG. 8-1, 3 bytes of $8^{th}$ to $10^{th}$ columns (regions used as an SM OH normally) of a $1^{st}$ row are used for the E-OH. A case in which a GCC0 (General Communication Channel 0) and a spare region (in use for other purposes) cannot be used even during an emergency applies to this example. In example 2 illustrated in FIG. 8-1, 5 bytes of $8^{th}$ to $12^{th}$ columns (regions normally used as the SM OH and the GCC0) of a $1^{st}$ row are used for the E-OH. A case in which the GCC0 can be used but the spare region cannot be used applies to this example. In example 3 illustrated in FIG. 8-1, all 7 bytes of $8^{th}$ to $14^{th}$ columns of a $1^{st}$ row are used for the E-OH. This example becomes possible in a case in which both the GCC0 and the spare field can be used.

As a notation in the E-OH, the following methods (1) and (2) can be applied:

(1) a method of writing the number of lanes having a fault and individual lane numbers; and (2) a method of denoting a position of a lane having a fault in a bitmap format.

Further, means of explicitly expressing that the E-OH is included is necessary, and to this end, an FAS is changed. FIG. 8-2 is a diagram illustrating a position of the E-OH in an FA OH when a notification of a fault lane is given. In the OTN-MLD illustrated in FIG. 8-2, a $6^{th}$ column is allocated to an LLM (Logical Lane Marker), and the FAS becomes total 5 bytes of $1^{st}$ to $5^{th}$ columns, but when the E-OH is included, change to an E-FAS (Emergency FAS) in which a $1^{st}$ column (OA1) is replaced with another appropriate pattern is made. In a literature ""Characteristics of optical transport network hierarchy equipment functional blocks": ITU-T G.798, 2010," 4 bytes in the FAS are used for determination of IF (In Frame), and $3^{rd}$ to $5^{th}$ columns (OA1, OA2, and OA2) are used for determination of OOF (Out of Frame), and since the replacement of the $1^{st}$ column maintains compatibility with an IF/OOF determination criterion, this replacement cannot cause erroneous determination of frame synchronization loss.

Here, the LLM may be a VLM, and the LLM and the VLM are not distinguished from each other in the present application.

Since erroneous operation occurs when a $1^{st}$ column of the normal FAS is erroneously determined as the E-FAS, a replacement pattern that is large in a distance from OA1 is desirable. Thus, a replacement pattern illustrated in FIG. 8-3 can be used as the replacement pattern. FIG. 8-3 is a diagram illustrating an example of a replacement pattern of a head byte in the E-FAS. Particularly, "00001001" obtained by inverting all bits of OA1 ("11110110") or a pattern ("11001001," . . . , "10101001", or the like) that is large in DC balance and a distance from OA1 is desirable.

Next, configuration of the multilane transmission device will be described. FIG. 8-4 is a block diagram illustrating configuration of the multilane transmission device in this embodiment. The multilane transmission device illustrated in FIG. 8-4 is a multilane transmission device that gives a fault lane notification.

In a multilane transmission device 1, a frame processing unit 101 maps a client signal to an OPU PLD, and adds the FA OH, the OTU OH, and an ODU OH. An encoding/scrambling unit 102 performs FEC coding on a frame of 4 rows×3824 columns in which the FA OH, the OTU OH, and the ODU OH are added to an OPU frame, and scrambles all regions of the FEC-coded OTU frame of 4 rows×4080 columns except the FAS.

A lane distributing unit 103 divides the scrambled OTU frame into 16-byte data blocks, and distributes the data blocks to a plurality of logical lanes (here, 8 logical lanes). Here, a speed of each logical lane is assumed to be 5 Gbps, and the respective logical lanes (LLs) are assumed to LL1#0 to LL1#7.

Each of transmitters (hereinafter, referred to as TXs) 104-1 to 104-4 multiplexes 2 logical lanes, and performs transmission through physical lanes (PLs) PL1#0 to PL1#3 of 10 Gbps.

In a multilane transmission device 2, receivers (hereinafter, referred to as RXs) 205-1 to 205-4 receive optical signals of the physical lanes PL1#0 to PL1#3 of 10 Gbps, convert the optical signals into electrical signals, and demultiplex each electrical signal into two logical lanes.

The lane combining unit 206 identifies LL1#0 to LL1#7 based on the LLM included in each received logical lane, compensates for a delay time difference between the logical lanes based on the FAS and the MFAS, and reconfigures the OTU frame of 4 rows×4080 columns from 16-byte data blocks.

The descrambling/decoding unit 207 descrambles the reconfigured OTU frame, performs FEC decoding, corrects an error that has occurred during transmission, and outputs a frame of 4 rows×3824 columns.

A frame processing unit 208 reads the OTU OH and the ODU OH of the decoded frame of 4 rows×3824 columns, monitors quality of a section and a path, demaps the client signal from the OPU from which the FA OH, the OTU OH, and the ODU OH are eliminated, and outputs the client signal.

Note that transmission from the multilane transmission device 2 to the multilane transmission device 1 is similar to that in the above-described configuration, and thus a detailed description thereof is omitted.

Here, it is assumed that a fault has occurred in the TX 104-3 of the multilane transmission device 1 that transmits PL1#2, optical power is decreased, and it becomes difficult to normally detect the FAS in LL1#4 and LL1#5 in the lane combining unit 206 of the multilane transmission device 2. At this time, the lane combining unit 206 of the multilane transmission device 2 outputs a warning signal indicating that LoF has occurred in LL1#4 and LL1#5 to a control and management unit 200. The control and management unit 200 changes the FAS of the FA OH to be added in a frame processing unit 201 to the E-FAS, and changes the whole or a part of the OTU OH to the E-OH. FIG. 8-5 is a diagram illustrating an example of a format of the E-OH.

In the example described here, a description is given by using an example in which 5 bytes in the OTU OH are allocated to the E-OH (example 3 illustrated in FIG. 8-1). A head byte (an $8^{th}$ column of a $1^{st}$ row) of the E-OH is an NFL (Number of Fault Lanes) sub field, and indicates the number of lanes having a fault. Subsequent 3 bytes (1 byte in a case of example 1 illustrated in FIG. 8-1 and 5 bytes in a case of example 3) are an FL (Fault Lane) sub field, and indicates a lane number of a lane having a fault (identification information specifying a lane). A last 1 byte is used for error detection in the E-OH using the CRC-8 (Cyclic Redundancy Check 8). When a maximum value of all bandwidths of the multilane transmission device is assumed to be 1 Tbps and a speed of a logical lane is assumed to be 5 Gbps, the number of logical lanes becomes 200 at maximum, and thus each of an NFL and an FL can be denoted by 1 byte.

Further, when a fault has occurred in LL1#4 and LL1#5, it is assumed that NFL=2, FL1=4, FL2=5, and FL3=5. Here, duplicated FL #3=5 is ignored. When the number of lanes having a fault is larger than the number of bytes (3 in this example) allocated to the FL, a plurality of EOHs is used. For example, when a fault has occurred in LL1#2, LL1#3, LL1#4, and LL1#5, it is assumed that NFL=4, FL1=2, FL2=3, and FL3=4 in the first E-OH, and NFL=4, FL1=5, FL2=5, and FL3=5 in the second E-OH. Here, duplicated FL #2=5 and FL #3=5 are ignored.

Further, since a similar fault is likely to be also occurring in transmission in an opposite direction (transmission from the multilane transmission device 2 to the multilane transmission device 1), the E-OH is repeated only number of times corresponding to the number of logical lanes.

A lane combining unit 106 of the multilane transmission device 1 determines that a lane has not been normally received in the multilane transmission device 2 when the E-FAS is received at a timing at which the FAS is to be received through a certain lane, and the E-FAS is received again at a next timing. At this time, more protection stages may be used. The lane combining unit 106 descrambles the data block including the E-FAS as illustrated in FIG. 8-6, reads the E-OH, and notifies a control and management unit 100 of the E-OH. FIG. 8-6 is a diagram illustrating E-OH descrambling operation.

As a result, since numbers of the logical lanes having a fault are 4 and 5, the control and management unit 100 stops using the corresponding TX 104-3 (the physical lane PL1#2), reduces the number of logical lanes from 8 to 6, and changes the output destination of the logical lanes LL1#4 and LL1#5 to the TX 104-4 (the physical lane PL1#3) (a portion in which a dotted line portion illustrated in FIG. 8-7 has stopped). FIG. 8-7 is a diagram illustrating a multilane device being performing shrink operation. As a result, in the multilane transmission device 2, LL1#0 to LL1#6 can be normally received, and transmission resumes in the state of shrink from 40 Gbps to 30 Gbps. The E-FAS returns to the normal FAS, and the OTU OH returns to the normal one as well.

Second Embodiment

Next, a multilane transmission device according to a second embodiment of the present invention and a fault lane notifying method performed by the multilane transmission device will be described. Configuration of the multilane transmission device according to the second embodiment is the same as the configuration illustrated in FIG. 8-4, and thus a detailed description is omitted. The fault lane notifying method performed by the multilane transmission device according to the second embodiment differs from the fault lane notifying method according to the first embodiment in a format of an E-OH illustrated in FIG. 8-5. FIG. 8-8 is a diagram illustrating an example of the E-OH format according to the second embodiment.

In the example described here, a description is given by using an example in which 5 bytes in an OTU OH are allocated to the E-OH (example 3 illustrated in FIG. 8-1). $1^{st}$ to $4^{th}$ bits of a head byte (an $8^{th}$ column of a $1^{st}$ row) of the E-OH are an SN (Sequential Number) sub field, and indicates a sequence of the E-OHs. 5-th to 8-th bits are an NEOH (Number of E-OGs) sub field, and indicates the number of the E-OHs to be used. Subsequent 3 bytes (1 byte in a case of example 1 illustrated in FIG. 8-1 and 5 bytes in a case of example 3 illustrated in FIG. 8-1) are an LSBM (Lane Status Bitmap) sub field, and denotes a state of a logical lane in a bitmap format (1 when a fault occurs and 0 when it is normal). A last 1 byte is used for error detection in the E-OH using the CRC-8.

When a fault has occurred in LL1#4 and LL1#5 with the maximum number of lanes being 8, it is assumed that SN=1, NEOH=1, LSBM1="00001100," LSBM2="00000000," and LSBM3="00000000" (all lane numbers that are not in use are assumed to be "0").

When a fault has occurred in LL1#4, LL1#5, LL1#30, and LL1#31 with the maximum number of lanes being 40, it is assumed that SN=1, NEOH=2, LSBM1="00001100," LSBM2="00000000," and LSBM3="00000000" in the first E-OH, and SN=2, NEOH=2, LSBM1="00000011," LSBM2="00000000," and LSBM3="00000000" in the second E-OH.

As described above, by replacing the $1^{st}$ column of the $1^{st}$ row in an FA OH in the $1^{st}$ to $7^{th}$ columns of the $1^{st}$ row of an OTU frame while maintaining compatibility with an IF/OOF determination criterion of ITU-T G.798, a notification of a lane number of each fault lane is given through the entire OTU OH including an SM OH of the $8^{th}$ to $10^{th}$ columns of the $1^{st}$ row in the OTU OH of the $8^{th}$ to $14^{th}$ columns of the $1^{st}$ row of the OTU frame, the SM OH of the $8^{th}$ to $12^{th}$ columns of the $1^{st}$ row and a GCC0, or the SM OH of the $8^{th}$ to $14^{th}$ columns of the $1^{st}$ row, the GCC0, and an RES. Accordingly, it can be realized to give a notification of a fault lane from the OTN-MLD at the reception side to the OTN-MLD at the transmission side in the multilane transmission in which a signal of a frame format is divided into data blocks, distributed to a plurality of lanes, and transmitted.

Note that a program for realizing the function of the processing unit illustrated in FIG. 8-4 may be recorded in a computer-readable recording medium, and fault lane notification processing may be performed by causing the program recorded in the recording medium to be read into a computer system and executing the program. Note that the "computer system" here includes an OS and hardware such as peripheral devices. Further, the "computer-readable recording medium" refers to a portable medium such as a flexible disk, a magneto-optical disk, a ROM, or a CD-ROM, or a storage device such as a hard disk equipped in a computer system. Further, the "computer-readable recording medium" also includes a medium holding a program during a certain time such as a volatile memory (RAM) in a computer system serving as a server or a client when a program is transmitted via a network such as the Internet or a communication line such as a telephone line.

The program may be transmitted from a computer system that stores the program in a storage device or the like to another computer system via a transmission medium or by a transmission wave in a transmission medium. Here, the "transmission medium" through which a program is transmitted refers to a medium having a function of transmitting information such as a network such as the Internet or a communication line (communication wire) such as a telephone line. Further, the program may be one for realizing some of the above-described functions. Further, the above program may be a so-called differential file (a differential program) capable of realizing the above-described function in combination with a program already recorded in a computer system.

The embodiments of the present invention have been described above with reference to the drawings, but it is obvious that the above embodiments are merely examples of the present invention, and the present invention is not limited to the above embodiments. Thus, addition, omission, replacement, or any other change of a constituent may be performed within a range not departing from the technical sprit and scope of the present invention.

Ninth Invention

According to the present invention, in multilane transfer using a plurality of lanes, based on a frame alignment overhead positioned in a head of a frame to be transferred or an FAS (Frame Alignment Signal) in the frame alignment overhead, a multilane transfer function extension block serving as a block on which a function extension is performed in multilane transfer is inserted into each virtual lane.

In the multilane transfer scheme, for such a problem that it is difficult to perform error monitoring for each virtual lane, error monitoring for each lane is performed by notifying of information of a BIP through the inserted multilane transfer function extension block.

Further, for such a problem that it is difficult to perform frame reconstruction because a fault has occurred in only some lanes in the multilane transfer, by defining a region of a fault lane notification bit in the inserted multilane transfer function extension block and giving a notification of a lane number of a virtual lane having a fault from a receiver to a transmitter, a lane number of a lane having a fault is specified, and shrink operation or protection is performed.

According to the present invention, in multilane transfer, even when it is difficult to perform deskew processing and reconstruct a frame, monitoring and management for each lane, and a deskew function are provided without reconstructing an OTUk frame nor changing a way to use an overhead of an OTUk frame of the related art. A BIP for each lane is calculated, and information is exchanged between the multilane transmission device 1 at the transmission device side and the multilane transmission device 2 at the reception device side by using the multilane transfer function extension block, and thus it becomes possible to perform error monitoring for each lane that has not been possible in the multilane transfer of the related art. Further, when a function of notifying of a fault lane number is provided by exchanging information of a detected fault lane number between the multilane transmission device 2 at the reception device and the multilane transmission device 1 at the transmission device by using the multilane transfer function extension block, the shrink operation or the protection can be performed.

In addition, in the multilane transfer, for such a problem that a deskew amount for performing frame reconstruction is deficient, a deskew amount is increased by defining a region of an LLM in the inserted multilane transfer function extension block.

Providing a deskew amount increasing function enables multilane transfer which corresponds to a deskew amount deficiency that is concern in future due to occurrence of path difference or increase in the number of virtual lanes, and which makes reconstruction of a frame possible.

Here, the LLM may be a VLM, and the LLM and the VLM are not distinguished from each other in the present application.

First Embodiment

FIG. 9-1 illustrates an example of a case in which a multilane transfer system of the present invention is used in a network, The multilane transfer system includes multilane transmission devices 1 and 2, frame processing units 11, 16, 21, and 26, multilane transfer processing units 12, 15, 22, and 25, multilane processing units 121, 154, 221, and 254, lane state detecting units 151 and 251, block inserting units 123 and 223, block removing units 152 and 252, multilane transfer function extension block processing units 122, 153, 222, and 253, transceivers 13-0 to **13-*x*, 14-0 to 14-*x*, 23-0 to 23-*x*, and 24-0 to 24-*x*, and a network 3**.

In the first present embodiment, operation of notifying of a fault lane by using a multilane transfer function extension block in a point to point connection will be described. In FIG. 9-1, a case is considered in which a notification of a fault lane number detected by the multilane transmission device 2 is given from the multilane transmission device 2 to the multilane transmission device 1 when a fault occurs in transfer from the multilane transmission device 1 to the multilane transmission device 2.

FIG. 9-2 is a processing flowchart at a transmission device side that performs outbound communication, and FIG. 9-3 is a processing flowchart at a reception device side that received inbound communication. A block insertion procedure is executed in step S103 of FIG. 9-2.

When a fault has occurred in transfer from the multilane transmission device 1 to the multilane transmission device 2, the lane state detecting unit 251 of the multilane transmission device 2 specifies a lane number of a lane having a fault such as decrease in received optical power and occurrence of LOR.

A mechanism of notifying of a specified lane number will be described next.

First, in step S101, the frame processing unit 21 adds an error correction code and an overhead to a client signal to be transferred from the multilane transmission device 2 to the multilane transmission device 1, and generates an OTUk frame (sub frames configuring a multi-frame). Thereafter, the number of sub frames is decided in conformity to the number of virtual lanes decided in conformity to a transfer capacity, and a multi-frame is configured by using a plurality of sub frames. Specifically, the transfer capacity is divided by a bit rate per virtual lane equipped in the transmission device, and the number of virtual lanes is decided. A multi-frame is configured by using the equal number of sub frames to the number of virtual lanes.

Here, in the ninth invention, a multi-frame in which the number of sub frames varies in conformity to the number of lanes becomes a variable frame and a transport frame.

Next, in step S102, the sub frames configuring the multi-frame are transferred by using a plurality of lanes. The sub frames output from the frame processing unit 21 are input to the multilane transfer processing unit 22. The multilane processing unit 221 of the multilane transfer processing unit 22 divides the sub frame into data blocks on a 16-byte basis, and distributes the data blocks to a plurality of virtual lanes used for transfer. The distribution method is a round robin, and lane rotation is performed in a unit of multi-frames.

Here, in order to insert the multilane transfer function extension block (S103), when distribution to virtual lanes is performed, a 16-byte reference block SB including a fixed bit pattern included in an FAS of a sub frame SF positioned in a head among sub frames SF configuring a multi-frame MF illustrated in FIG. 9-4 is detected. Specifically, the fixed bit pattern positioned in the FAS of a frame alignment overhead is first detected.

Here, when the multi-frame is transferred, an MFAS is further detected and it is determined whether or not it is a head sub frame of the multi-frame. When the value of the MFAS is 0 and it is the head sub frame of the multi-frame, a 16-byte block including the MFAS is detected. Further, when a frame is transferred without using a multi-frame, it is not necessary to detect the MFAS, and only the fixed bit pattern positioned in the FAS of the frame alignment overhead may be detected. This 16-byte block is assumed to be the reference block SB in the specification of the present application. Since the FAS of the reference block SB is not subject to scrambling processing in order to identify the head of the frame and includes the fixed bit pattern, it is realized to find out the position of the reference block SB without reconstructing the frame. In the first present embodiment, the multilane transfer function extension block is provided with a function of notifying of a fault lane number (S105).

In step S103, the multilane transfer function extension block processing unit 222 that has received the notification of the lane number of the lane having a fault from the lane state detecting unit 251 inputs the lane number of the lane having a fault in the multilane transfer function extension block. The multilane transfer function extension block is inserted into all virtual lanes through the block inserting unit 223 after the reference block SB is distributed. Specifically, the multilane transfer function extension block is inserted into all virtual lanes at a timing next to a timing at which the reference block SB is inserted as illustrated in FIGS. 9-5 and 9-6. Note that when the number of lanes is 10, 1020 blocks are equally distributed as illustrated in FIG. 9-5. When the number of lanes is 7, as illustrated in FIG. 9-6, 1020 blocks are not equally distributed, but since a multi-frame includes 1020×7 blocks, equal distribution can be performed in terms of a unit of multi-frames.

The multilane transfer function extension block becomes in a format of 16×n bytes. In order to easily perform processing by standardizing a processing unit of 16 bytes, the multilane transfer function extension block is assumed to be a block including n 16-byte units. A value of n becomes (n=1, 2, . . . ), and mainly depends on the number of virtual lanes or a parity code, but a basic system is assumed to be: n=1.

FIG. 9-7 illustrates an example of the details of 16 bytes of the multilane transfer function extension block.

A $1^{st}$ byte is assumed to be a number of virtual lanes notification region, and the number of all virtual lanes used in multilane transfer. When the number of all virtual lanes can be determined in an out bandwidth, the $1^{st}$ byte may not be used and may be assumed to be a fault lane notification bit region which will be described later. A $2^{nd}$ byte is a virtual lane number notification region, and a lane number is written. In the present embodiment, the number of lanes is 256. When the lane number is determined from the value of an LLM, the $2^{nd}$ byte may not be used and may be assumed to be the fault lane notification bit region which will be described later. $3^{rd}$ to $16^{th}$ bytes are assumed to be the fault lane notification bit region. Here, for example, a case is considered in which the fault lane notification bit region is from $3^{rd}$ to $12^{th}$ bytes. At this time, $1^{st}$ to $16^{th}$ bytes of the multilane transfer function extension block may be assumed to be a reserved region.

A method of notifying of the fault lane notification bit region is arbitrary, but for example, the position of the bit corresponds to a virtual lane number. When the fault lane notification bit is 0, it indicates that a lane is normal and in an available state (S107), and when the fault lane notification bit is 1, it indicates that a lane is in an unavailable state due to a fault (S106). A 14-byte fault lane notification bit is associated with a virtual lane number, and for example, when transfer is performed by using 100 lanes, a $1^{st}$ bit of the fault lane notification bit region becomes a lane #0, a $2^{nd}$ bit becomes a lane #1, and a $100^{th}$ bit indicates a state of a lane #99. The number of lanes that can be indicated by 14 bytes becomes up to 112 lanes.

FIG. 9-8 illustrates a case in which 112 or more virtual lanes are used. FIG. 9-8 illustrates a method of inserting the multilane transfer function extension block when n=2. As illustrated in FIG. 9-8, when the 16-byte multilane transfer function extension block is additionally inserted, the fault lane notification bit region is increased. When a fault has occurred, the reception device side changes a fault lane notification bit corresponding to a lane having a fault from 0 to 1.

For example, In a case in which transfer from the multilane transfer processing unit 12 to the multilane transfer processing unit 25 is performed through 10 lanes by using the transceivers 13-0 to 13-3, when the lane state detecting unit 251 detects the occurrence of a fault in the transceivers 13-1 and 24-1 and the transceivers 13-2 and 24-2, the multilane transfer processing unit 22 generates the multilane transfer function extension block in which the fault lane notification bit is changed to 1 regarding the virtual lane numbers transferred through the transceivers 13-1 and 24-1 and the transceivers 13-2 and 24-2.

As a method of associating the fault lane notification bit with the virtual lane number, a state of one lane may be indicated by a plurality of bits. For example, when a state of one lane is indicated by 2 bits, a normal lane is indicated by 00, an unavailable lane having a fault is indicated by 11, and an unavailable lane because of being used for transfer of another flow is assumed to be 01.

Further, as a method other than the method of associating the bit in the fault lane notification bit region with the lane number, the fault lane notification bit region may be delimited on a 1-byte basis, and the number of fault lanes may be input in a first one byte. In this case, a notification of a virtual lane number of a virtual lane having a fault may be given by using $2^{nd}$ to $14^{th}$ bytes.

The block inserting unit 223 inserts the multilane transfer function extension block into the respective virtual lanes. The virtual lanes into which the multilane transfer function extension block is inserted are transferred to the opposite transceivers 14-0 to 14-*x* through the transceivers 23-0 to 23-*x* (S104). Here, the virtual lanes are multiplexed n conformity to the transfer bit rate of the transceiver.

The multilane transfer processing unit 15 of the multilane transmission device 1 that has received the virtual lanes from the transceivers 14-0 to 14-*x* demultiplexes the virtual lanes from the physical lane (here, a wavelength being used by the transceiver) (S201).

The lane state detecting unit 151 checks whether or not the transfer has been normally performed by detecting decrease in received optical power or decrease in a bit error rate (S202).

When a fault has occurred in a lane (No in S202), the lane state detecting unit 151 specifies a fault lane number (S204), and transfers the fault lane number to the multilane transfer function extension block processing unit 122 (S205). Meanwhile, detection of LOR occurring when a frame is reconstructed is performed by the multilane processing unit 154, and a fault lane number is similarly transferred to the multilane transfer function extension block processing unit 122.

When the transfer is determined to have been normally performed (Yes in S202), the multilane processing unit 154 reconstructs sub frames from a plurality of virtual lanes (S207), and transfers the sub frames to the frame processing unit 16. The frame processing unit 16 reconstructs a client signal from the frames (S208).

After the fixed bit pattern included in the reference block SB is detected, the block removing unit 152 identifies a 16-byte block received at a timing immediately after the reference block SB as the multilane transfer function extension block. After the reference block is received, the multilane transfer function extension block is detected on a basis of 1020+n blocks. Thereafter, the multilane transfer function extension block is removed (S203).

The multilane transfer function extension block processing unit 153 acquires information of the removed multilane transfer function extension block. The multilane transfer function extension block is transferred from the block removing unit 152 to the multilane transfer function extension block processing unit 153. The virtual lane from which the multilane transfer function extension block has been removed by the block removing unit 152 is transferred to the multilane processing unit 154. The multilane processing unit 154 reconstructs frames from a plurality of virtual lanes. When it is difficult to reconstruct frames, the multilane processing unit 154 gives a warning such as LOR, detects a number of a virtual lane causing it, and transfers the detected number of the virtual lane to the multilane transfer function extension block processing unit 122.

The multilane transfer function extension block processing unit 153 functions as a lane monitoring unit, and determines whether or not all outbound transfer lanes have been normal (S206).

When all outbound transfer lanes are determined to have been normal (Yes in S206), a fault lane number is not transferred, or information indicating that there is no fault lane is transferred from the multilane transfer function extension block processing unit 153 to the multilane transfer processing unit 12 (S210).

Meanwhile, when any of lanes is determined to have been abnormal (No in S206), the multilane transfer processing unit 12 receives a fault lane number acquired by the multilane transfer function extension block processing unit 153 (S209), and obtains a fault lane number (S210).

The multilane transfer processing unit 12 that has obtained the fault lane number starts the shrink operation using the normal virtual lanes from which the virtual lane having a fault is excluded or starts the protection using a free lane (S211).

FIG. 9-9 illustrates an example of inserting the multilane transfer function extension block when a multi-frame is configured. A multi-frame is configured by using X SFs. In this case, the multi-frame is divided into 1020X 16-byte blocks. The divided blocks are distributed to X virtual lanes. After the blocks are distributed to the virtual lanes, the reference block SB positioned in the head of the multi-frame is detected. The multilane transfer function extension block is inserted into all virtual lanes at a timing immediately after the reference block SB as illustrated in FIG. 9-9. After the multilane transfer function extension block is inserted, the virtual lanes are multiplexed into a physical lane, and transferred to a counterpart.

Second Embodiment

In a second present embodiment, fault lane notification operation in network configuration of transferring a flow to a plurality of end nodes will be described. Configuration of a multilane transmission device, a multi-frame configuring method, and a multilane transfer method are the same as in the first embodiment.

A difference from the first embodiment lies in that an independent number is added regarding a virtual lane number in a fault lane notification bit for each flow having a different end node. When a frame is reconstructed from a plurality of virtual lanes configuring a flow, a remainder is calculated, and a virtual lane number is determined. The reason why an independent number is attached for each flow is to prevent a value of a virtual lane number obtained by a remainder from being different from a value of a virtual lane number of a virtual lane configuring a flow.

When a multilane transfer to a plurality of end nodes is being performed as illustrated in FIG. 9-10, a virtual lane number is input in a fault lane notification bit region for each end node. In a multilane transmission device 7*a*, transfer from a multilane transmission device 7*a* to the multilane transmission device 7*c* is assumed to be performed through transceivers 70-0 to 70-5, and transfer from the multilane transmission device 7*a* to the multilane transmission device 7*b* is assumed to be performed through transceivers 70-6 to 70-9. One virtual lane is considered to be associated with one transceiver.

At this time, virtual lane numbers are independently allocated so that $1^{st}$ to $6^{th}$ bits indicating lanes #0 to #5 are used in the fault lane notification bit from the multilane transmission device 7*a* to the multilane transmission device 7*c*, and $1^{st}$ to $4^{th}$ bits indicating the lanes #0 to #3 are used in the fault lane notification bit from the multilane transmission device 7*a* to the multilane transmission device 7*b*.

FIG. 9-11 illustrates a state in which the multilane transfer function extension block is inserted into the virtual lanes when the multilane transfer to the multilane transmission device 7*b* and the multilane transmission device 7*c* is performed in the multilane transmission device 7*a* of FIG. 9-10. Multilane transfer processing units of the multilane transmission devices 7*b* and 7*c* acquire a virtual lane number of a virtual lane having a fault from the fault lane notification bit sent from the multilane transmission device 7*a*, and starts shrink operation or starts protection through the normal virtual lanes from which the virtual lane number of the virtual lane having a fault is excluded.

Third Embodiment

In the present embodiment, in the multilane transmission device 1 at the transmission device side of the first embodiment, when a multilane transfer function extension block processing unit 122 generates a multilane transfer function extension block, the CRC (Cyclic Redundancy Check) is included as a checksum of a fault lane notification bit region. Inclusion of the CRC makes it possible to perform error detection of the fault lane notification bit region.

When a fault lane notification bit is calculated by using the CRC-32, the 4-byte CRC region is defined after the fault lane notification bit region as a region of transmitting the CRC-32 calculation result, and the multilane transfer function extension block is transmitted to a counterpart. In a multilane transmission device 2 at the reception device side, a multilane transfer function extension block processing unit 253 reads the CRC from the multilane transfer function extension block, and performs error detection.

Fourth Embodiment

In the present embodiment, in the multilane transmission device 1 at the transmission device side of the first embodiment, when a multilane transfer function extension block processing unit 122 generates a multilane transfer function extension block, a BIP in each lane is calculated and included for error monitoring for each lane. Inclusion of the BIP makes it possible to measure a BER.

FIG. 9-12 illustrates an example of a block of calculating the BIP. In the multilane transmission device 1 at the transmission device side, the BIP (Bit Interleaved Parity) is calculated for 1020 blocks=16320 bytes positioned between the multilane transfer function extension blocks. When the BIP-8 is used, a 1-byte region is defined in the multilane transfer function extension block as a BIP region, and the multilane transfer function extension block is transmitted to a counterpart.

In a multilane transmission device 2 at the reception device side, when a block removing unit 252 reads BIP information from the multilane transfer function extension block, a multilane transfer function extension block processing unit 253 at the reception device side calculates the BIP-8 value for 16320 bytes positioned between the multilane transfer function extension blocks, similarly to the transmission device side, compares the calculated BIP-8 value with the received BIP information, and performs error measurement.

Fifth Embodiment

Deskew amount deficiency is envisaged because due to increase in a skew by different path transfer or increase in the number of virtual lanes, only 256 values can be expressed in an LLM positioned in a 6-th byte of an FAS of an OTUk frame of the related art. Then, in the present embodiment, in the multilane transmission device at the transmission device side of the first embodiment, when a multilane transfer function extension block is generated, an LLM extension region serving as a counter for extending a deskew amount is included in the multilane transfer function extension block.

In the multilane transmission device at the transmission device side, in addition to a 1-byte LLM region included in a frame alignment overhead, for example, a 1-byte region is secured in the multilane transfer function extension block as the LLM extension region, and 65536 LLMs are expressed by a total 2-byte region. A block inserting unit 123 inserts the multilane transfer function extension block including the LLM extension region into a predefined position of each virtual lane.

In a multilane transmission device 2 at the reception device side, a multilane transfer function extension block processing unit 253 reads a value of the LLM extension region from the multilane transfer function extension block. The read value of the LLM extension region is transferred to a multilane processing unit 254. The multilane processing unit 254 performs deskewing by using the value of the LLM extension region and the 1-byte LLM region included in the frame alignment overhead, and reconstructs a frame from a plurality of lanes.

Further, even when the multilane transfer of the 1-byte LLM region included in the frame alignment overhead is performed, the $6^{th}$ byte of the FA OH of the frame alignment overhead is assumed to be used as the LLM region, and deskewing between lanes which skewing is occurring in the multilane transfer may be performed by using the LLM extension region included the multilane transfer function extension block.

Sixth Embodiment

FIG. 9-13 illustrates configuration when transfer is performed in one direction from the multilane transmission device 2 to the multilane transmission device 1 in a case of using an Inner-Code. Here, the Inner-Code refers to a Second FEC described in G.975.1. RS (255, 239) described in G.709 Annex A is added as a First FEC, and then the Inner-Code is added as a Second FEC, and thus it becomes possible to perform more robust error correction than when only the First FEC is added.

When transfer is performed by using the Inner-Code, an Inner-Code processing unit 224 of the multilane transmission device 2 at the transmission device side inserts a multilane transfer function extension block generated by a multilane transfer function extension block processing unit 222 into data distributed to a plurality of lanes through a multilane processing unit 221, and then performs Inner-Code addition processing. After the Inner-Code is added, transfer to a multilane transmission device 1 of the counterpart is performed. An Inner-Code processing unit 155 of the multilane transmission device 1 at the reception device side performs error correction by the Inner-Code, and removes the multilane transfer function extension block.

The above-described configuration makes it possible to perform error correction on the multilane transfer function extension block in the Inner-Code processing unit 155. Further, the Inner-Code processing unit inserts and extracts the multilane transfer function extension block, and thus it becomes possible to reduce the number of insertion/extraction circuits for the multilane transfer function extension block including a clock conversion circuit that absorbs a clock difference occurring due to insertion and extraction.

Note that in the multilane transfer function extension block, the fault lane notification bit region for giving a notification of a lane number of a virtual lane having a fault in virtual lanes to be transmitted in the opposite direction from the reception device to the transmission device, the BIP region for performing error monitoring for each lane, and the LLM field used to cope with the deficiency in the deskew amount destined for frame reconstruction are defined, and notified of respectively, but information notified of from the reception device side to the transmission device side is not limited to the information described above.

Further, the frame alignment overhead or an FAS in the frame alignment overhead has been described as an example of the reference of the insertion position of the multilane transfer function extension block, but the reference is not limited to thereto and one that identifies a frame position can be used, and the position of the multilane transfer function extension block with respect to the reference may be a position other than the described position as well.

Further, a sub frame has been described as an OTU frame, but the sub frame is not limited to the OTU frame, and may be a frame having a fixed head bit pattern for obtaining frame synchronization such as the FAS of the frame alignment overhead.

INDUSTRIAL APPLICABILITY

First Invention

The multilane transmission device and the multilane reception device according to the present invention can be applied to a transmission device positioned between a network intended to economically perform high-speed large-capacity data communication and a client device that generates a data signal to be transferred via the network.

Second Invention

The multilane transmission device and the multilane reception device according to the present invention are appropriate for logically bundling a plurality of physical lanes and economically realizing a high-speed data link.

Third Invention

The present invention can be applied to information and communication industries.

Fourth Invention

The present invention can be applied to information and communication industries.

Fifth Invention

The present invention can be applied to information and communication industries.

Sixth Invention

The present invention can be applied to information and communication industries.

Seventh Invention

The present invention can be applied to information and communication industries.

Eighth Invention

The present invention can be applied to application in which it is essential to give a notification of a lane number of a lane having a fault from a reception side to a transmission side in a multilane transmission device.

Ninth Invention

The present invention can be applied to information and communication industries.

REFERENCE SIGN LIST

First Invention

1: transmission device
2: client device
3: optical switch
4: network
11: multilane transmission device
12: multilane reception device
111: client signal allocating unit
112: buffer memory
113: transfer bandwidth calculating unit
114: shaping unit
115: framer unit
116: transport frame generating unit
117: virtual lane group generating unit
121: deframer unit
122: virtual lane group reconstructing unit
123: client signal reconstructing unit
124: client signal allocating unit
VL: virtual lane
F: transport frame Second Invention

100, 200, 300: multilane communication node device
400: network
500: management control system
T: multilane transmission device
R: multilane reception device
1: setting table
2: physical interface
3: data frame allocating unit
4: buffer memory
5: data stream dividing unit
6: physical interface
7: physical interface
8: data frame reconfiguring unit
9: buffer memory
10: data frame multiplexing unit
11: physical interface
31: VLAN tag decoding unit
32: data frame writing unit
51: data frame reading unit
52: encoding unit
53: data string dividing unit
54: flow group information sequence information adding unit
55: transmission frame processing unit
56: lane selecting/outputting unit
81: transmission frame processing unit
82: lane selecting/combining unit
83: decoding unit
84: data frame allocating unit Third Invention

1: mapping unit
2: OH processing unit
3: interleaving unit
4-1 to 4-16: encoding unit
5: deinterleaving unit
6: scrambling unit
7: data block dividing unit
8: lane number deciding unit
10: lane identifying & delay difference compensating unit
11: OTU frame reconfiguring unit
12: descrambling unit
13: interleaving unit
14-1 to 14-16: decoding unit
15: deinterleaving unit
16: OH processing unit
17: demapping unit Fourth Invention

1 to 4: multilane optical transport equipment (MLOT)
5 to 8: router
9: optical cross-connect switch (OXC)
10: network management system (NMS)
101: flow distributor (FLD)
102: framer (FRM)
103: OTU4 encoder (OTU4 ENC)
104: 100G modulator (100G MOD)
105: optical aggregator (OAGG)
106: control and management unit (CMU)
110: framer (FRM)
111: flexible OTU encoder (OTUf ENC)
112: multilane distributor (MLD)
113: 100G modulator (100G MOD)
201: optical deaggregator (ODEAGG)
202: 100G demodulator (100G DEM)
203: OTU4 decoder (OTU4 DEC)
204: deframer (DEF)
205: flow combiner (FLC)
206: control and management unit (CMU)

210: 100G demodulator (100G DEM)
211: multilane overhead detector (MLOD)
212: multilane combiner (MLC)
213: flexible OTU decoder (OTUf DEC)
214: deframer (DEF)
1030: OTU5 encoder (OTU5 ENC)
1040: 400 Gbps modulator (400G MOD)
2020: 400 Gbps demodulator (400G DEM)
2030: OTU5 decoder (OTU5 DEC)

Fifth Invention

1: mapping unit
2: OH processing unit
3: interleaving unit
4-1 to 4-16: encoding unit
5: deinterleaving unit
6: scrambling unit
7: data block dividing unit
8: lane number deciding unit
10: lane identifying & delay difference compensating unit
11: OTU frame reconfiguring unit
12: descrambling unit
13: interleaving unit
14-1 to 14-16: decoding unit
15: deinterleaving unit
16: OH processing unit
17: demapping unit
20-1 to 20-M: FA OH detecting unit
21: delay comparing unit
22-1 to 22-M: delay adjusting unit Sixth Invention

1: lane identifying & delay difference compensating unit
2: OTU frame reconfiguring unit
3: descrambling unit
4: FEC decoding unit
5: OTU/ODU OH processing unit
6: demapping unit
7: quality monitoring unit
10: interleaving unit
11-1 to 11-16: sub-row data decoding unit
12: deinterleaving unit
13: lane error register recording unit
21: syndrome calculating unit
22: error locator polynomial coefficient calculating unit
23: error locator calculating unit
24: error coefficient calculating unit
25: error correcting unit
26: selecting/outputting unit
27: lane number calculating unit Seventh Invention

1: mapping unit
2: OH processing unit
3: FEC coding unit
4: scrambling unit
5: lane distributing unit
6: data block dividing unit
7: lane number calculating unit
8-1 to 8-M: CRC-8 calculating unit
11: OH decoding unit
12: lane identifying & delay difference compensating unit
13: OTU frame reconfiguring unit
14: descrambling unit
15: FEC decoding unit
16: OH processing unit
17: demapping unit
18: quality monitoring unit
20: FAS detecting unit
21: FAS cycle monitoring unit
22: descrambling unit
23: error detecting unit Eighth Invention

1, 2: multilane transmission device
100, 200: control and management unit
101, 201: frame processing unit
102, 202: encoding/scrambling unit
103, 203: lane distributing unit
104-1 to 104-4, 204-1 to 204-4: transmitter (TX)
205-1 to 205-4, 105-1 to 105-4: receiver (RX)
106, 206: lane combining unit
107, 207: descrambling/decoding unit
108, 208: frame processing unit
LL1#0 to LL1#7, LL2#0 to LL2#7: logical lane
PL1#0 to PL1#3, PL2#0 to PL2#3: physical lane Ninth Invention

1, 2, 7*a*, 7*b*, 7*c*: multilane transmission device
3: network
11, 16, 21, 26: frame processing unit
12, 15, 22, 25: multilane transfer processing unit
13-0 to 13-*x*, 14-0 to 14-*x*, 23-0 to 23-*x*, 24-0 to 24-*x*, 70-0 to 70-9: transceiver
121, 154, 221, 254: multilane processing unit
122, 153, 222, 253: multilane transfer function extension block processing unit
123, 223: block inserting unit
151, 251: lane state detecting unit
152, 252: block removing unit
155, 224: Inner-Code processing unit

What is claimed is:

1. A multilane transmission device comprising:

a computer; and a non-transitory computer-readable recording medium that contains a program for controlling the computer to perform operations of:

a client signal allocating unit that allocates data signals to a transport frame based on a transmission destination or a priority;

a transfer bandwidth calculating unit that calculates a transfer bandwidth of the transport frame on a basis of a number of physical lanes used to transfer the transport frame and a path capacity determined as a bandwidth per single physical lane;

a virtual lane group generating unit that decides a number of virtual lanes necessary for transmission of the transport frame on a basis of the transfer bandwidth of the transport frame and a bandwidth per virtual lane, and multiplexes the virtual lanes into a physical lane used to transfer the transport frame; and a transport frame generating unit that allocates the data signals allocated by the client signal allocating unit, to the virtual lanes in a virtual lane group, adds a virtual lane marker (VLM) determined by the number of virtual lanes decided by the virtual lane group generating unit, and frames the data signals allocated to the virtual lanes as transport frames.

2. The multilane transmission device according to claim 1, further comprising:

a buffer that stores the data signals allocated by the client signal allocating unit for each of the transport frames; and a shaping unit that reads the data signals stored in the buffer at a reading speed based on the path capacity of the transport frames and outputs the data signals to the transport frame generating unit.

3. A multilane reception device comprising:

a computer; and a non-transitory computer-readable recording medium that contains a program for controlling the computer to perform operations of:

a virtual lane group reconstructing unit that acquires, for each of a plurality of optical paths, a number of virtual lanes necessary for reception of transport frames allocated based on each transmission destination or each priority, receives the transport frames from one or more of the optical paths by using a physical lane, and demultiplexes the physical lane into virtual lanes; and a client signal reconstructing unit that deframes the transport frames allocated to the virtual lanes as data signals, wherein the number of virtual lanes is decided based on a transfer bandwidth of a transport frame and a bandwidth per one virtual lane, and wherein the transfer bandwidth of a transport frame is calculated based on a number of physical lanes used for transfer of a transfer frame and a path capacity decided by a bandwidth per one virtual lane.

4. A multilane transmission method comprising in order:

a client signal allocating step of allocating data signals to a transport frame based on a transmission destination or a priority;

a transfer bandwidth calculating step of calculating a transfer bandwidth of the transport frame on a basis of a number of physical lanes used to transfer the transport frame and a path capacity determined as a bandwidth per single physical lane;

a virtual lane group generating step of deciding a number of virtual lanes necessary for transmission of the transport frame on a basis of the transfer bandwidth of the transport Frame and a bandwidth per virtual lane and multiplexes the virtual lanes into a physical lane used to transfer the transport frame; and a transport frame generating step of allocating the data signals allocated in the client signal allocating step, to the virtual lanes in a virtual lane group, adding a virtual lane marker (VLM) determined by the number of virtual lanes decided by the virtual lane group generating step, and framing the data signals allocated to the virtual lanes as transport frames.

5. The multilane transmission method according to claim 4, further comprising:

a buffer step that stores the data signals allocated by the client signal allocating step for each of the transport frames; and a shaping step that reads the data signals stored by the buffer step at a reading speed based on the path capacity of the transport frames and outputs the data signals to the transport frame generating step.

6. A multilane reception method comprising in order:

a virtual lane group reconstructing step of acquiring, for each of a plurality of optical paths, a number of virtual lanes necessary for reception of transport frames allocated based on each transmission destination or each priority, receiving the transport frames from one or more of the optical paths by using a physical lane, and demultiplexing the physical lane into virtual lanes; and a client signal reconstructing step of deframing the transport frames allocated to the virtual lanes as data signals, wherein the number of virtual lanes is decided based on a transfer bandwidth of a transport frame and a bandwidth per one virtual lane, and wherein the transfer bandwidth of a transport frame is calculated based on a number of physical lanes used for transfer of a transfer frame and a path capacity decided by a bandwidth per one virtual lane.

* * * * *